US009866837B2

(12) United States Patent
Carmel et al.

(10) Patent No.: US 9,866,837 B2
(45) Date of Patent: Jan. 9, 2018

(54) APPARATUS AND METHODS FOR RECOMPRESSION OF DIGITAL IMAGES

(71) Applicant: BEAMR IMAGING LTD, Tel-Aviv (IL)

(72) Inventors: Sharon Carmel, Ramat Hasharon (IL); Dror Gill, Haifa (IL); Tamar Shoham, Netanya (IL)

(73) Assignee: BEAMR IMAGING LTD, Tel Aviv (IL)

( * ) Notice: Subject to any disclaimer, the term of this patent is extended or adjusted under 35 U.S.C. 154(b) by 0 days.

(21) Appl. No.: 15/265,353

(22) Filed: Sep. 14, 2016

(65) Prior Publication Data

US 2017/0150149 A1 May 25, 2017

Related U.S. Application Data

(63) Continuation of application No. 14/527,218, filed on Oct. 29, 2014, now Pat. No. 9,503,738, which is a
(Continued)

(51) Int. Cl.
*H04N 19/124* (2014.01)
*H04N 19/86* (2014.01)
(Continued)

(52) U.S. Cl.
CPC ......... *H04N 19/124* (2014.11); *H04N 19/126* (2014.11); *H04N 19/14* (2014.11);
(Continued)

(58) Field of Classification Search
CPC combination set(s) only.
See application file for complete search history.

(56) References Cited

U.S. PATENT DOCUMENTS 5,157,488 A    10/1992 Pennebaker
5,426,512 A *   6/1995 Watson ............... H04N 19/176
                                          375/E7.13
(Continued)

FOREIGN PATENT DOCUMENTS

JP    04-280167    6/1992
JP    06-006610    1/1994
(Continued)

OTHER PUBLICATIONS

Wen Xu et al "Picture quality evaluation based on error segmentation" Proc. SPIE, 2308:1454-1465 (1994).
(Continued)

*Primary Examiner* — Tsung-Yin Tsai
(74) *Attorney, Agent, or Firm* — Browdy and Neimark, PLLC

(57) ABSTRACT

A system and method for generating a second reduced size digital image from a first digital image, the method including iteratively compressing the first digital image to an extent determined by a quality measure comprising at least a blockiness measure quantifying added artifactual edges along coding block boundaries of the second image and/or use of a quantization matrix generated by computing a weighted average of the quantization matrix of the first digital image and a scaled second quantization matrix.

23 Claims, 96 Drawing Sheets

2310: Provide first image to be re-compressed and extract its quantization matrix

↓

2320: Pick initial MQF value e.g. by using quantization matrix as key for consulting historical archive of first image characteristics (fig. 100b e.g.) which may store MQF values &/or step sizes successfully used in past for various quantization matrices

↓

2330: search for better MQF value in MQF value range, e.g. by using step size as stored in archive and using bisecting search or secant based search

↓

2340: preferably repeat search until best MQF in MQF value range, given constraints on perceptual degradation, has been found

↓

2350: use better/best MQF value to scale quantization matrix

↓

2360: use computed quantization matrix to recompress 1st image thereby to generate 2nd, recompressed image

↓

2370: store or send or apply 2nd image to application-specific destination or purpose e.g. storage, broadcast, processing

Related U.S. Application Data continuation of application No. 13/500,473, filed as application No. PCT/IL2010/000809 on Oct. 5, 2010, now Pat. No. 8,908,984.

(60) Provisional application No. 61/248,521, filed on Oct. 5, 2009, provisional application No. 61/253,872, filed on Oct. 22, 2009, provisional application No. 61/292,622, filed on Jan. 6, 2010, provisional application No. 61/302,193, filed on Feb. 8, 2010, provisional application No. 61/329,217, filed on Apr. 29, 2010, provisional application No. 61/383,750, filed on Sep. 17, 2010.

(51) Int. Cl.
*H04N 19/14* (2014.01)
*H04N 19/625* (2014.01)
*H04N 19/154* (2014.01)
*H04N 19/126* (2014.01)
*H04N 19/176* (2014.01)
*H04N 19/17* (2014.01)

(52) U.S. Cl.
CPC ......... *H04N 19/154* (2014.11); *H04N 19/625* (2014.11); *H04N 19/86* (2014.11); *H04N 19/17* (2014.11); *H04N 19/176* (2014.11)

(56) References Cited

U.S. PATENT DOCUMENTS

| | | | |
|---|---|---|---|
| 5,432,870 A | 7/1995 | Schwartz | |
| 5,539,842 A | 7/1996 | Schwartz | |
| 5,625,714 A | 4/1997 | Fukuda | |
| 5,629,780 A | 5/1997 | Watson | |
| 5,734,755 A | 3/1998 | Ramchandran et al. | |
| 5,739,457 A | 4/1998 | Devecka | |
| 5,787,204 A | 7/1998 | Fukuda | |
| 5,790,717 A | 8/1998 | Judd | |
| 6,018,121 A | 1/2000 | Devecka | |
| 6,225,547 B1 | 5/2001 | Toyama et al. | |
| 6,233,359 B1 | 5/2001 | Ratnakar et al. | |
| 6,252,994 B1 | 6/2001 | Nafarieh | |
| 6,347,998 B1 | 2/2002 | Yoshitomi et al. | |
| 6,369,313 B2 | 4/2002 | Devecka | |
| 6,390,923 B1 | 5/2002 | Yoshitomi et al. | |
| 6,425,822 B1 | 7/2002 | Hayashida et al. | |
| 6,614,942 B1 | 9/2003 | Meier | |
| 6,645,067 B1 | 11/2003 | Okita et al. | |
| 6,835,887 B2 | 12/2004 | Devecka | |
| 6,982,762 B1 | 1/2006 | Hui | |
| 7,027,507 B2 | 4/2006 | Wu | |
| 7,050,656 B2 | 5/2006 | Bhaskaran et al. | |
| 7,092,578 B2 | 8/2006 | Kakarala et al. | |
| 7,095,787 B2 | 8/2006 | Kadono et al. | |
| 7,155,069 B2 * | 12/2006 | Ishizaka | G06T 3/403 358/1.2 |
| 7,430,330 B2 | 9/2008 | Hamilton | |
| 7,580,579 B2 | 8/2009 | Wang et al. | |
| 7,978,934 B2 | 7/2011 | Yu et al. | |
| 8,233,727 B2 | 7/2012 | Wang et al. | |
| 8,503,538 B2 | 8/2013 | Dei et al. | |
| 8,832,434 B2 | 9/2014 | Apostolopoulos et al. | |
| 2001/0019630 A1 | 9/2001 | Johnson | |
| 2001/0028743 A1 | 10/2001 | Kostrzewski et al. | |
| 2003/0035586 A1 | 2/2003 | Chou et al. | |
| 2004/0028139 A1 | 2/2004 | Zaccarin et al. | |
| 2004/0076237 A1* | 4/2004 | Kadono | H04N 19/105 375/240.29 |
| 2005/0175093 A1 | 8/2005 | Haskell et al. | |
| 2006/0008167 A1* | 1/2006 | Yu | H04N 1/33307 382/250 |
| 2006/0034531 A1 | 2/2006 | Poon et al. | |
| 2006/0050972 A1 | 3/2006 | Reznic et al. | |
| 2006/0083309 A1 | 4/2006 | Schwarz et al. | |
| 2006/0193527 A1 | 8/2006 | Kalva et al. | |
| 2008/0175491 A1 | 7/2008 | Kondo | |
| 2008/0212682 A1 | 9/2008 | Kalva | |
| 2009/0141990 A1 | 6/2009 | Pigeon et al. | |
| 2009/0147845 A1 | 6/2009 | Matsumura et al. | |
| 2009/0190660 A1 | 7/2009 | Kusakabe et al. | |
| 2009/0201316 A1 | 8/2009 | Bhatt et al. | |
| 2009/0202164 A1 | 8/2009 | Rossato et al. | |
| 2009/0204894 A1 | 8/2009 | Bhatt et al. | |
| 2009/0204895 A1 | 8/2009 | Bhatt et al. | |
| 2011/0222786 A1 | 9/2011 | Carmel et al. | |
| 2012/0057788 A1* | 3/2012 | Fukuhara | H04N 19/647 382/173 |
| 2012/0201476 A1* | 8/2012 | Carmel | H04N 19/176 382/239 |
| 2014/0177734 A1 | 6/2014 | Carmel | |

FOREIGN PATENT DOCUMENTS

| | | |
|---|---|---|
| JP | 10-271498 | 10/1998 |
| JP | 2005-176069 A | 6/2005 |
| JP | 2005-323192 | 11/2005 |
| JP | 2007-526507 A | 9/2007 |
| JP | 2008-244993 | 10/2008 |
| JP | 2009-141815 | 6/2009 |
| WO | 9737322 A1 | 10/1997 |
| WO | 2005/074291 A1 | 8/2005 |
| WO | 2008/081461 A2 | 7/2008 |
| WO | 2009/113276 A1 | 9/2009 |
| WO | 2011/042900 A1 | 4/2011 |

OTHER PUBLICATIONS

S. Cho, Z. Bojkovic, D. Milovanovic, J. Lee and J. Hwang, "image quality evaluation: JPEG2000 versus Intra-only H.264/AVC High Profile", Facta Universitatis Elec. Engerg., vol. 20, No. 1, 71-83 (Apr. 2007).
F. De Simone, M. Ouaret, F. Dufaux, A. G. Tescher, and T. Ebrahimi, "A comparative study of JPEG 2000, AVC/H.264 and HD Photo", Applications of Digital Image Processing XXX, Proceedings of SPIE, vol. 6696, San Diego, CA USA, Aug. 28-30, 2007.
Ismail Dalgic, Fouad A. Tobagi, "Constant Quality Video Encoding", Proc. of IEEE ICC'95, Seattle, Washington, Jun. 1995.
I. Matsuda, Y. Nomoto, K. Wakabayashi and S. Itoh, "Lossless Re-encoding of JPEG Images Using Block-Adaptive Intra Prediction" Proc. of 16th European Signal Processing Conference (EUSIPCO 2008), Lausanne, Switzerland, L3-6, Aug. 25-29, 2008.
Anthony J Maeder, Birgit M Planitz, "Medical Image Watermarking for Multiple Modalities," aipr, pp. 158-165, 34th Applied Imagery and Pattern Recognition Workshop (AIPR'05), 2005.
Z.Wang, A.C.Bovik, H.R.Sheikh, E.P. Simoncelli, "Image Quality Assessment: From Error Visibility to Structural Similarity", IEEE Transactions on Image Processing, vol. 13, No. 4, pp. 600-612, Apr. 2004.
M. Martinez-Rach, O. Lopez, P. Pinol, M.P. Malumbres and J. Oliver, "A Study of Objective Quality Assessment Metrics for Video Codec Design and Evaluation", IEEE International Symposium on Multimedia, pp. 517-524, Dec. 2006 (ISM'06).
A. Ouled Zaid, A. Makhloufi, A. Bouallegue, C. Oliver, "JP3D compressed-domain watermaking of still and volumetric medical images", Signal, Image and Video Processing, vol. 4, No. 1, 11-21 (2010).
A. Basso, I. Dalgic, Fouad A. Tobagi and C. J. Van den Branden Lambrecht, "Feedback-control scheme for low-latency constant-quality MPEG-2 video encoding", Proc. SPIE 2952, 460 (1996); doi:10.1117/12.251307 (Sep. 1998).
http://web.archive.org/web/20090228194214/http://infima-compression.com/images (Sep. 16, 2009).
http://my.smithmicro.com/stuffitcompression/imagecompression.html (Sep. 16, 2009).
http://www.winsoftmagic.com/ajc_features.html (Sep. 16, 2009).
http://www.facebook.com/note.php?note_id=76191543919 (Sep. 30, 2009).

(56) References Cited

OTHER PUBLICATIONS http://www.accusoft.com/jpegwizard.htm (Sep. 30, 2009).
http://en.wikipedia.org/wiki/H.264/MPEG-4_AVC (Dec. 13, 2009).
http://en.wikipedia.org/wiki/JPEG (Sep. 30, 2009).
Ramos, M. de Queiroz, R.L., "Adaptive rate-distortion-based thresholding: application in JPEG compression of mixed images for printing", Acoustics, Speech and Signal Processing, 1999, vol. 5.
Kannan Ramchandran and Martin Vetterli, "Rate-Distortion Optimal Fast Thresholding with Comlete JPEG/MPEG Decoder compatability", IEEE Transactions on Image Processing, vol. 3, No. 5 (Sep. 1994).
Ruth Rosenholtz & Andrew B. Watson, "Perceptual adaptive JPEG coding", IEEE International Conference on Image Processing, Lausanne, Switzerland, vol. 1, pp. 901-904, 1996.
Andrew B. Watson, "Perceptual optimization of OCT color quantization matrices", Proceedings of IEEE International conference on Image Processing, Austin, TX, IEEE Computer Society Press, pp. 100-104, (1994).
Andrew B. Watson,"DCTune: A Technique for visual optimization of OCT quantization matrices for individual images", Society for Information Display Digest ofTechnical Papers XXIV, 946-949, (1993).
Andrew B. Watson, "DCT quantization matrices visually optimized for individual images",Proceedings of Human Vision, Visual Processing, and Digital Display IV, Bellingham, WA, SPIE, pp. 202-216, (1993).
Andrew B. Watson, "Visually optimal DCT quantization matrices for individual images", Data Compression Conference, 1993. DCC '93. Mar. 30-Apr. 2, 1993 pp. 178-187, (1993).
Albert J. Ahumada Jr. & Heidi A. Peterson, "Luminance-model-based DCT quantization for color image compression", SPIE Proceedings, pp. 365-374, 1992.
Albert J. Ahumada Jr., "Computational image quality metrics: A review", Society for Display International Symposium Digest of Technical Papers, ed. J. Morreale, val. 24, pp. 305-308. Santa Ana, CA, 1993.
H.R.Sheikh, A.C. Bovik, "Image information and visual quality", IEEE Transactions on Image Processing, vol. 15, No. 2, pp. 430-44, Feb. 2006.
Ora Gendler and Moshe Porat,"Toward optimal real-time transcoding using requantization in the DCT domain", 6th IEEE International Conference on Image Processing, (ICIP), pp. 3677-3680, Nov. 7-10, 2009.
Ora Gendler and Moshe Porat,"On efficient quantization for image recompression", 17th European Signal Processing conference, Glasgow, Scotland, Aug. 24-28, 2009.
Heinz H. Bauschke, Christopher H. Hamilton, Mason S. Macklem, Justin S. McMichael, and Nicholas R. Swart, "Recompression of JPEG Images by Requantization", IEEE transactions on Image Processing, vol. 12 (7), pp. 343-849, Jul. 2001.
T. Richter, "On the mDCT-PSNR image quality index", International Workshop on Quality of Multimedia Experience (QoMEX) 2009, pp. 53-58, Germany, Jul. 2009.
Z. Wang, E.P. Simoncelli and A.C. Bovik, "Multi-scale structural similarity for image quality assessment", Proc. 37th IEEE Asilomar conference on Signals, Systems and Computers, pp. 1398-1402, New-York, USA, Nov. 2003.
W. Lin, C.-C. Jay Kuo, "Perceptual visual quality metrics: A survey", J. Visual Communications (2011), doi:10.1016/j.ivcir.2011.01.005.
George A. Triantafyllidis. "Image quality measurement in the frequency domain".4th International Symposiumon on communications, Control and Signal Processing (ISCCSP), 2010, pp. 1-4, Greece, Mar. 2010.
M. Crouse and L. Ramchandran, "Joint thresholding and quantizer selection for decoder-compatible baseline JPEG", Int. conf. on Acoustics, Speech, and Signal Processing (ICASSP) 1995, val. 4, pp. 2231-2234, May 1995.
R. Kakarala, R. Bagadi, "A method for signalling block-adaptive quantization in baseline sequential JPEG",' Proceedings of IEEE Tencon, Singapore, 2009.
Adriaan Barri, Ann Dooms, Peter Schelkens, "Combining the Best of Perceptual Quality Metrics", Proceedings of the Sixth International Workshop on Video Processing and Quality Metrics (VPQM), 2012.
Nikolay Ponomarenko, Alexander Zemlyachenko,Vladimir Lukin, Karen Egiazarian and Jaakko Astola, "Performance Analysis of Visually Lossless Image Compression", Proceedings of the Sixth International Workshop on Video Processing and Quality Metrics (VPQM), 2012.
Paolo Gastaldoa and Judith A. Redib,"Machine Learning Solutions for Objective Visual Quality Assessment", Proceedings of the Sixth International Workshop on Video Processing and Quality Metrics (VPQM), 2012.
Ricky D. Nguyen, "Rate Control and Bit Allocation for JPEG Transcoding", Master of Engineering Thesis at MIT, May 2, 2007.
Track Duy Tran, "A Locally Adaptive Perceptual Masking Threshold Model for Image Coding", Master of Science Thesis at MIT, May 1994.
Michael P. Eckert and Andrew P. Bradley, "Perceptual quality metrics applied to still image compression", Journal of Signal Processing—Special issue on image and video quality metrics, vol. 70 Issue 3, Nov. 1998, pp. 177-200.
"A Novel Perceptual Image Quality Measure for Block Based Image Compression" Tamar Shoham, Dror Gill,, Sharon Carmel, presented at the SPIE 2011 conference in San Francisco, Jan. 24, 2011.
"Optimizing Bandwidth and Storage Requirements for Mobile Images Using Perceptual-Based Jpeg Recompression", Tamar Shoham, Dror Gill Sharon Carmel, presented at the SPIE 2011 conference in San Francisco, Jan. 24, 2011.
Toshiaki Endo, "International standard encoding scheme—JPEG algorithm of color still image-", Interface, vol. 17, No. 12 (Dec. 1991), CQ Publishing Co., Ltd., 1991 years Dec. 1, pp. 160-182, ISSN: 0387-9569.

\* cited by examiner

Fig. 1

5: provide at least two images, one before provisional compression and one after

↓

10: Compute a pixel wise local similarity score between both images typically for entire image

↓

20: Compute blockiness score between both images typically for entire image

↓

30: Compute texture distortion score between both images typically for entire image

↓

40: pool individual scores computed in steps 10, 20, and 30 into a global quality score for the entire image, e.g. by multiplying the three values

↓

50: use the global quality score as a quality measure to govern continued iterative compression of the digital images based on the provisional compression to date e.g. by finding a compression level that provides a perceptually lossless reconstructed image.

Fig. 2

110: compute PSNR (peak signal-to-noise ratio, in decibels) between both images, using conventional methods

↓

120: normalize PSNR by computing a general local similarity score PSNRs as follows:

IF (PSNR>50dB)   PSNRs=1; ELSE   PSNRs=PSNR/50.

Fig. 3

210: Compute the difference image between both images: imDiff.

↓

220: On imDiff, run along the 4x4 grid, e.g. for JPEG to H.264 recompression applications, or along the 8x8 grid, e.g. for JPEG to JPEG recompression applications, and for each point on a horizontal or vertical block edge check for the presence of an edge. This results in edgeValues, a 2-D edge map, containing 1 where an edge is present and 0 where not.

↓

230: The global blockiness score is then computed as: [1- average (edgeValues)], which is a score in the range [0,1] with 1 indicating no "new" edges in the reconstructed image.

Fig. 4

310: compute the variance in each block in the source image, V1, and the variance of the same block in the reconstructed image, V2. 4 x 4 blocks may be used e.g. for JPEG to H.264 recompression applications, or 8 x 8 blocks may be used, e.g. for JPEG to JPEG recompression applications, or 4x4 blocks may be used e.g. for JPEG to JPEG recompression applications.

↓

320: If the ratio V1/V2 lies outside a predetermined range, the local texture distortion score for that block is set to 1 otherwise it is set to 0. An example range suitable for certain JPEG to H.264 recompression applications is [0.8,1.2]. An example range suitable for certain JPEG to JPEG recompression applications is [0.8,1.1].

↓

330: compute overall texture distortion score by averaging local scores computed in step 320

Fig. 5

410: Compute general local similarity score for each variable size image block

↓

420: Compute blockiness score for each variable size image block

↓

430: Compute texture distortion score for each variable size image block

↓

440: for each variable size image block, pool individual scores computed in steps 10, 20, and 30 into an imageTile Score, e.g. by combining the three values using multiplication or a weighted geometric mean

↓

450: optionally, use the imageTile Scores for local QP (quantization parameter) adaptation when recompression is done using H.264, or for local DCT coefficient thresholding when recompression is done using JPEG

Fig. 6

510: perform steps 410 – 440 of Fig. 5

↓

520: average the Tilescores to obtain a global score, using a min{tilescores} scheme 610: Perform steps 410 - 440 of Fig. 5

620: Average the Tilescores obtained in step 440 to obtain a global score, using a 0.5*{[min{tilescores+}avg{tilescores )} scheme in which the global score is taken to be the average of the 'worst' block and the mean block score

Fig. 11a

| A11 | A12 | A13 | A14 | B11 | B12 | B13 | B14 |
|-----|-----|-----|-----|-----|-----|-----|-----|
| A21 | A22 | A23 | A24 | B21 | B22 | B23 | B24 |
| A31 | A32 | A33 | A34 | B31 | B32 | B33 | B34 |
| A41 | A42 | A43 | A44 | B41 | B42 | B43 | B44 |

Fig. 11b

| A11 | A12 | ... | A18 | B11 | B12 | ... | B18 |
|-----|-----|-----|-----|-----|-----|-----|-----|
| A21 | A22 | ... | A28 | B21 | B22 | ... | B28 |
| .   | .   | .   | .   | .   | .   | .   | .   |
| .   | .   | .   | .   | .   | .   | .   | .   |
| .   | .   | .   | .   | .   | .   | .   | .   |
| A81 | A82 | A83 | A88 | B81 | B82 | ... | B88 |

Fig. 12

1010. provide a first image which has at least one first quantization matrix associated therewith and which was generated by independent coding of disjoint blocks in a precursor image

↓

1015. provide an initial Quality Factor (QF) value e.g. QFnext=80

↓

1017. Compute an initial scaling factor S as follows:

IF QFnext<50 S=(5000/QFnext)/100 ELSE S=(200-2*QFnext)/100.

↓

1020. generate a new quantization matrix by scaling the at least one first quantization matrix by at least one initial scaling factor

↓

1030. use new quantization matrix generated in step 1020, for provisional independent disjoint block-level compression of the first image, thereby to generate a recompressed second image

↓

1040. compute a quality measure for the provisional compression e.g. using some or all of the quality measures described herein with reference to Figs. 1 – 11b

↓

1050: if the quality measure falls within a target quality interval, output the current recompressed second image, and otherwise, use a subsequent value, which may be computed using the method of Figs. 13A – 13B, and which is greater or smaller than the initial value for said scaling factor if the quality measure falls on one or another side of the textural change measure interval respectively.

Fig. 13A

1100 Initialize e.g. as per Fig. 13B

↓

1110 Encode image using QF=QFnext. Compute obtained image quality : qualScore.

↓

1120 IF |qualScore-qualTgt|<qualTol (or reached maximum allowed iteration number): GOTO step 1170

↓

1130 IF (maxQF-minQF==1) , i.e., our target QF has been found within the range of a single integer, QFnext=maxQF, minQF=maxQF (to ensure this is the last iteration). GOTO step 1110.

↓

1140 IF (maxQF==minQF), i.e., the target QF has been found, GOTO step 1170.

↓

1150 IF qualScore<qualTgt:     minQF=QF, QFnext=QF+min(round(0.5*(maxQF-QF)),5)
ELSE                maxQF=QF, QFnext=QF-min(round(0.5*(QF-minQF)),5).

↓

1160 return to image encoding step 1110

↓

1170 Target QF = QF -- END.

*Fig. 13B*

1210: Initialize quality thresholds including target quality and quality tolerance e.g qualTgt(=0.5), qualTol (0.05).

↓

1220: Set lowest and highest allowed QF values: minQF and maxQF e.g. minQF=60, maxQF=98

↓

1230: Set initial guess for Quality Factor - QFnext. E.g. QFnext=80.

Fig. 14A

| 50 | 62 | 91 | 115 | 98 | 98 | 88 | 75 |
|----|----|----|-----|----|----|----|----|
| 89 | 62 | 80 | 98  | 91 | 73 | 65 | 70 |
| 85 | 77 | 96 | 115 | 90 | 83 | 72 | 68 |
| 87 | 91 | 100| 113 | 100| 99 | 92 | 79 |

Fig. 14B

| 40 | 56 | 67 | 90 | 95 | 97 | 93 | 88 |
|---|---|---|---|---|---|---|---|
| 79 | 58 | 73 | 96 | 91 | 96 | 92 | 90 |
| 80 | 71 | 68 | 83 | 85 | 80 | 77 | 70 |
| 74 | 83 | 93 | 100 | 110 | 120 | 111 | 100 |

Fig. 14C

| 10 | 6 | 24 | 25 | 3 | 1 | -5 | -13 |
|---|---|---|---|---|---|---|---|
| 10 | 4 | 7 | 2 | 0 | -23 | -27 | -20 |
| 5 | 6 | 28 | 32 | 5 | 3 | -5 | -2 |
| 13 | 8 | 7 | 13 | -10 | -21 | -19 | -21 |

Fig. 15

| | | | 1 | | | | |
|---|---|---|---|---|---|---|---|
| | | | 0 | | | | |
| | | | 1 | | | | |
| | | | 0 | | | | |

Fig. 16A

| 50 | 62 | 70  | 101 |
|----|----|-----|-----|
| 89 | 62 | 80  | 98  |
| 85 | 77 | 72  | 95  |
| 87 | 91 | 100 | 113 |

Fig. 16B

| 40 | 56 | 67 | 90  |
|----|----|----|-----|
| 79 | 58 | 73 | 96  |
| 80 | 71 | 68 | 83  |
| 74 | 83 | 93 | 100 |

Fig. 17A

| 33.25 | 21.25 | 13.25 | 17.75 |
|-------|-------|-------|-------|
| 5.75  | 21.25 | 3.25  | 14.75 |
| 1.75  | 6.25  | 11.25 | 11.75 |
| 3.75  | 7.75  | 16.75 | 29.75 |

Fig. 17B

| 35.69 | 19.69 | 8.69  | 14.31 |
|-------|-------|-------|-------|
| 3.31  | 17.69 | 2.69  | 20.31 |
| 4.31  | 4.69  | 7.69  | 7.31  |
| 1.69  | 7.31  | 17.31 | 24.31 |

Fig. 18

1810. provide a first image which has at least one first quantization matrix associated therewith and which was generated by independent coding of disjoint blocks in a precursor image

↓

1820. generate a new quantization matrix by scaling a second quantization matrix, for example a default JPEG quantization matrix, using a scaling factor derived from a Modified Quality Factor (MQF), and combine it with the quantization matrix of the input JPEG image using weighted averaging, e.g. as per Fig. 19

↓

1830. use new quantization matrix computed in step 1820, for provisional independent disjoint block-level compression of the first image, thereby to generate a re-compressed second image

↓

1840. compute a quality measure for the provisional compression e.g. using some or all of the quality measures described herein with reference to Figs. 1 - 10

↓

1850: if the quality measure falls within the a target quality interval, output the current recompressed second image, and otherwise, use a subsequent MQF value, which may be computed using the method of Figs. 20A – 20B, and which is smaller or greater than said initial value for said scaling factor if the quality measure falls on one or another side of the textural change measure interval respectively.

Fig. 19

1910: $QO_{ij}$ (i,j = 1..8) is the quantization matrix of the original image.

$QD_{ij}$ (i,j = 1..8) is a second quantization matrix, for example the default quantization matrix described in the JPEG standard, an optimal JPEG quantization matrix computed for the image, the quantization matrix of the original image, or any other second quantization matrix selected for encoding the image.

MQF is the Modified Quality Factor used in the current iteration of recompression, found as described above in reference to Figs. 20A and 20B

↓

1915: Compute S, the scaling parameter used to scale the second t quantization matrix $QD_{ij}$ as follows:.

IF MQF<50 S=(5000/MQF)/100 ELSE S=(200-2*MQF)/100.

↓

1920: compute scaled quantization matrix $QS_{ij}$ (i,j = 1..8) as follows: $QS_{ij}$ = S * $QD_{ij}$ (i,j = 1..8)

↓

1930: generate temporary quantization matrix of the reconstructed image $QT_{ij}$ (i,j = 1..8) as follows:

$QT_{ij}$ = $W_{ij}$ * $QS_{ij}$ + (1- $W_{ij}$) * $QO_{ij}$ (i,j = 1..8) where $W_{ij}$ (i,j = 1..8) is a weighting matrix, with values between 0 and 1.

↓

1940: generate quantization matrix of the reconstructed image $QR_{ij}$ (i,j = 1..8) as follows:

if $QT_{ij}$ >= $QO_{ij}$, then $QR_{ij}$ = $QT_{ij}$ , otherwise, $QR_{ij}$ = $QO_{ij}$

Fig. 20A

1100 Initialize e.g. as per Fig. 20B

↓

1110 Encode image using MQF=MQFnext. Compute obtained image quality : qualScore.

↓

1120 IF |qualScore-qualTgt|<qualTol (or reached maximum allowed iteration number): GOTO step 1170

↓

1130 IF (maxMQF-minMQF==1), i.e., our target MQF has been found within the range of a single integer, MQFnext=maxMQF, minMQF=maxMQF (to ensure this is the last iteration). GOTO step 1110.

↓

1140 IF (maxMQF==minMQF), i.e., the target MQF has been found, GOTO step 1170.

↓

IF qualScore<qualTgt: minMQF=MQF, MQFnext=MQF+min(round(0.5*(maxMQF-MQF)),8)
ELSE maxMQF=MQF, MQFnext=MQF-min(round(0.5*(MQF-minMQF)),8.

↓

1160 return to image encoding step 1110

↓

1170 Target MQF = MQF -- END.

*Fig. 20B*

1210: Initialize quality thresholds including target quality and quality tolerance e.g qualTgt(=0.5), qualTol (0.05).

↓

1220: Set lowest and highest allowed MQF values: minMQF and maxMQF e.g. minMQF=35, maxMQF=95

↓

1230: Set initial guess for Quality Factor - MQFnext. E.g. MQFnext=70.

Fig 21

2110. Set MQF(i,j) to the initial value: If i=1 and j=1, MQF (i,j)=initial default value, e.g. 65. Otherwise if i=1, MQF (i,j) = MQF (i,j-1). Otherwise if j=1, MQF (i,j) = MQF (i-1,j). Otherwise, MQF(i,j) = 0.5* MQF(i,j-1) + 0.5 * MQF (i-1,j)

↓

2120. Encode the image tile with the proposed MQF

↓

2130. Evaluate obtained quality (on this tile only)

↓

2140. IF quality is within tolerance of target (in the range [0.4, 0.5]) GOTO step 2160.

↓

2150. Update MQF (using same bi-section function as described in Fig. 20A above) and GOTO step 2120.

↓

2160. M(i,j)=proposed MQF; FINISHED TILE.

Fig. 22
2210. Block1 = block quantized using Qmax (quantization matrix derived from MAX(M))
2220. IF M(i,j) ==max(M) GOTO 2250.
2230. Block2 = block quantized using Q matrix derived from local MQF (M(i,j)).
2240. Block 1({p,q} s.t. Block2{p,q}==0)=0, i.e, set to zero all values in Block1 for which the co-located values in Block2 (stronger quantization) are zero.
2250. Set quantized coefficients values for block to Block1; FINISHED.

Fig. 23:

2310: Provide first image to be re-compressed and extract its quantization matrix

↓

2320: Pick initial MQF value e.g. by using quantization matrix as key for consulting historical archive of first image characteristics (fig. 100b e.g.) which may store MQF values &/or step sizes successfully used in past for various quantization matrices

↓

2330: search for better MQF value in MQF value range, e.g. by using step size as stored in archive and using bisecting search or secant based search

↓

2340: preferably repeat search until best MQF in MQF value range, given constraints on perceptual degradation, has been found

↓

2350: use better/best MQF value to scale quantization matrix

↓

2360: use computed quantization matrix to recompress $1^{st}$ image thereby to generate $2^{nd}$, recompressed image

↓

2370: store or send or apply $2^{nd}$ image to application-specific destination or purpose e.g. storage, broadcast, processing

Fig. 24

| ID & other data re image to be recompressed | Quantization matrix of image to be recompressed | MQF value recommended /used in past for recompression of this image | Step size recommended/used in past to search for better mqf value for this image |
|---|---|---|---|
| | | | |

Fig. 29

| Setup # | Q matrix | Normal | | | | With resize by 5/8 | | | |
|---|---|---|---|---|---|---|---|---|---|
| | | MQF Start Value | MQF Step Size | Confidence Score (CS) | Frequency Score (FS) | MQF Start Value | MQF Step Size | Confidence Score (CS) | Frequency Score (FS) |
| 1 | Q1 | 75.6 | 8 | 0.9 | 18 | 60 | 10 | 0.6 | 18 |
| 2 | Q2 | 82.5 | 6.2 | 0.8 | 4 | 61 | 8 | 0.7 | 4 |
| 3 | Q3 | 74 | 8 | 0.9 | 2 | 58 | 5 | 0.8 | 2 |
| 4 | Q4 | 70 | 8 | 0.9 | 3 | 69 | 7 | 0.8 | 3 |
| 5 | Q5 | 68.6 | 2 | 0.7 | 3 | 65 | 3 | 0.7 | 3 |

Fig. 30

3100. Increase FS of the current entry by 1.

3200. Decrease FS of all other entries by 1.

3300. Set the MQF start value and step size as follows:
        3310 IF MQF==startMQF, CS=min(0.9,CS + 0.1); [Convergence after one step]
        3320 ELSE
            3321 startMQF= CS*(startMQF)+(1-CS)*MQF; [CS-weighted average]
            3322 IF number of iterations > 2
                3323 IF(abs(MQF-startMQF))<step_size, step_size=(step_size)*max(CS,0.5) ;
                3324 ELSE step_size=(step_size)/min(CS,0.5) ;
                [typically, If confident about working point, don't perform any drastic changes, otherwise reduce the step size by up to 2x]
        3330 CS=max(0.1,CS-0.1);

Fig. 35

| 61 | 63 | 70 | 90  |
|----|----|----|-----|
| 85 | 63 | 78 | 92  |
| 84 | 77 | 71 | 93  |
| 86 | 88 | 90 | 102 |

Fig. 36

| 19.81 | 17.81 | 10.81 | 9.19  |
|-------|-------|-------|-------|
| 4.19  | 17.81 | 2.81  | 11.19 |
| 3.19  | 3.81  | 9.81  | 12.19 |
| 5.19  | 7.19  | 9.19  | 21.19 |

Fig. 37b

| 6 | 4 | 4 | 6 | 8 | 14 | 18 | 21 |
|---|---|---|---|---|---|---|---|
| 4 | 4 | 5 | 7 | 9 | 20 | 21 | 19 |
| 5 | 5 | 6 | 8 | 14 | 20 | 24 | 19 |
| 5 | 6 | 8 | 10 | 18 | 30 | 28 | 21 |
| 6 | 8 | 13 | 19 | 23 | 37 | 35 | 27 |
| 8 | 12 | 19 | 22 | 28 | 36 | 39 | 32 |
| 17 | 22 | 27 | 30 | 35 | 42 | 41 | 35 |
| 25 | 32 | 33 | 34 | 39 | 35 | 35 | 34 |

Fig. 37c

| 8  | 6  | 5  | 8  | 12 | 21 | 26 | 31 |
|----|----|----|----|----|----|----|----|
| 6  | 6  | 7  | 10 | 13 | 30 | 31 | 28 |
| 7  | 7  | 8  | 12 | 21 | 29 | 35 | 29 |
| 7  | 9  | 11 | 15 | 26 | 45 | 41 | 32 |
| 9  | 11 | 19 | 29 | 35 | 56 | 53 | 40 |
| 12 | 18 | 28 | 33 | 42 | 53 | 58 | 48 |
| 25 | 33 | 40 | 45 | 53 | 62 | 62 | 52 |
| 37 | 48 | 49 | 51 | 58 | 52 | 53 | 51 |

Fig. 37d

| 39 | 68 | 50 | 69 | 63 | 61 | 53 | 53 |
|---|---|---|---|---|---|---|---|
| 70 | 59 | 28 | 63 | 48 | 22 | 60 | 43 |
| 235 | 231 | 215 | 226 | 217 | 211 | 246 | 210 |
| 242 | 218 | 210 | 224 | 222 | 223 | 219 | 251 |
| 29 | 59 | 50 | 44 | 27 | 69 | 53 | 63 |
| 34 | 54 | 34 | 76 | 42 | 25 | 36 | 36 |
| 209 | 237 | 215 | 230 | 237 | 212 | 251 | 242 |
| 215 | 220 | 214 | 209 | 265 | 198 | 214 | 245 |

Fig. 37e

| 183 | -3 | 2 | -2 | 3 | -1 | -2 | 0 |
|---|---|---|---|---|---|---|---|
| -63 | 5 | 1 | 2 | -1 | 1 | 0 | -1 |
| 2 | 0 | -3 | 0 | 1 | -1 | -1 | 1 |
| -107 | 0 | -3 | -2 | -1 | 0 | 0 | -2 |
| 2 | -3 | 0 | 0 | 0 | -1 | 1 | 0 |
| 47 | -1 | 0 | 0 | 0 | 0 | 0 | 0 |
| -1 | 1 | -1 | 0 | 0 | 0 | 0 | 0 |
| 3 | -1 | 0 | 0 | -1 | 0 | 0 | 0 |

Fig. 37f

| 137 | -2 | 2 | -2 | 2 | 0 | -2 | 0 |
|---|---|---|---|---|---|---|---|
| -42 | 3 | 1 | 2 | -1 | 1 | 0 | -1 |
| 2 | 0 | -2 | 0 | 1 | -1 | -1 | 1 |
| -77 | 0 | -2 | -1 | -1 | 0 | 0 | -1 |
| 1 | -2 | 0 | 0 | 0 | -1 | 1 | 0 |
| 32 | -1 | 0 | 0 | 0 | 0 | 0 | 0 |
| -1 | 0 | -1 | 0 | 0 | 0 | 0 | 0 |
| 2 | 0 | 0 | 0 | -1 | 0 | 0 | 0 |

Fig. 37g

| 183 | -3 | 2 | -2 | 3 | 0 | -2 | 0 |
|---|---|---|---|---|---|---|---|
| -63 | 5 | 1 | 2 | -1 | 1 | 0 | -1 |
| 2 | 0 | -3 | 0 | 1 | -1 | -1 | 1 |
| -107 | 0 | -3 | -2 | -1 | 0 | 0 | -2 |
| 2 | -3 | 0 | 0 | 0 | -1 | 1 | 0 |
| 47 | -1 | 0 | 0 | 0 | 0 | 0 | 0 |
| -1 | 0 | -1 | 0 | 0 | 0 | 0 | 0 |
| 3 | 0 | 0 | 0 | -1 | 0 | 0 | 0 |

Fig. 38a

| 1 | 2  | 3  | 4  | 5  | 6  | 7  | 8  |
|---|----|----|----|----|----|----|----|
| 2 | 4  | 6  | 8  | 10 | 12 | 14 | 16 |
| 3 | 6  | 9  | 12 | 15 | 18 | 21 | 24 |
| 4 | 8  | 12 | 16 | 20 | 24 | 28 | 32 |
| 5 | 10 | 15 | 20 | 25 | 30 | 35 | 40 |
| 6 | 12 | 18 | 24 | 30 | 36 | 42 | 48 |
| 7 | 14 | 21 | 28 | 35 | 42 | 49 | 56 |
| 8 | 16 | 24 | 32 | 40 | 48 | 56 | 64 |

Fig. 38b

| 1099 | -5 | 3  | -3 | 4  | -1 | -6 | -1 |
|------|----|----|----|----|----|----|----|
| -125 | 5  | 1  | 2  | -1 | 2  | 0  | -1 |
| 4    | 0  | -2 | 0  | 1  | -1 | -1 | 1  |
| -134 | 0  | -2 | -1 | -1 | 0  | 0  | -1 |
| 2    | -2 | 0  | 0  | 0  | -1 | 1  | 0  |
| 63   | -1 | 0  | 0  | 0  | 0  | 0  | 0  |
| -2   | 1  | -1 | 0  | 0  | 0  | 0  | 0  |
| 8    | -1 | 0  | 0  | -1 | 0  | 0  | 0  |

Fig. 38c

| 39 | 68 | 50 | 69 | 63 | 61 | 53 | 53 |
|---|---|---|---|---|---|---|---|
| 70 | 59 | 28 | 63 | 48 | 22 | 60 | 43 |
| 235 | 231 | 215 | 226 | 217 | 211 | 246 | 210 |
| 242 | 218 | 210 | 224 | 222 | 223 | 219 | 251 |
| 29 | 59 | 50 | 44 | 27 | 69 | 53 | 63 |
| 34 | 54 | 34 | 76 | 42 | 25 | 36 | 36 |
| 209 | 237 | 215 | 230 | 237 | 212 | 251 | 242 |
| 215 | 220 | 214 | 209 | 265 | 198 | 214 | 245 |

Fig. 38d

| 6 | 4 | 4 | 6 | 9 | 14 | 18 | 22 |
|---|---|---|---|---|---|---|---|
| 4 | 4 | 5 | 7 | 9 | 21 | 21 | 20 |
| 5 | 5 | 6 | 9 | 14 | 20 | 25 | 20 |
| 5 | 6 | 8 | 10 | 18 | 31 | 28 | 22 |
| 6 | 8 | 13 | 20 | 24 | 39 | 37 | 27 |
| 9 | 12 | 20 | 23 | 29 | 37 | 40 | 33 |
| 17 | 23 | 28 | 31 | 37 | 43 | 43 | 36 |
| 26 | 33 | 34 | 35 | 40 | 36 | 37 | 35 |

Fig. 38e

| 35 | 70 | 52 | 64 | 67 | 59 | 47 | 53 |
|----|----|----|----|----|----|----|----|
| 67 | 58 | 27 | 61 | 48 | 25 | 64 | 49 |
| 236 | 232 | 215 | 226 | 213 | 209 | 237 | 199 |
| 239 | 216 | 212 | 220 | 227 | 231 | 223 | 262 |
| 30 | 57 | 55 | 36 | 29 | 65 | 48 | 62 |
| 34 | 50 | 41 | 75 | 48 | 24 | 39 | 37 |
| 211 | 236 | 217 | 225 | 236 | 209 | 252 | 241 |
| 213 | 222 | 213 | 206 | 267 | 203 | 212 | 245 |

Fig. 38f

| 4 | 2 | 3 | 4 | 5 | 6 | 7 | 8 |
|---|---|---|---|---|---|---|---|
| 2 | 4 | 6 | 8 | 10 | 13 | 15 | 17 |
| 3 | 6 | 9 | 12 | 16 | 20 | 23 | 24 |
| 4 | 8 | 12 | 16 | 20 | 26 | 30 | 32 |
| 5 | 10 | 15 | 21 | 26 | 33 | 38 | 40 |
| 6 | 13 | 20 | 25 | 31 | 39 | 44 | 48 |
| 7 | 15 | 23 | 31 | 38 | 45 | 49 | 56 |
| 18 | 17 | 26 | 35 | 42 | 48 | 56 | 64 |

Fig. 38g

| 4 | 2 | 3 | 4 | 5 | 6 | 7 | 8 |
|---|---|---|---|---|---|---|---|
| 2 | 4 | 6 | 8 | 10 | 13 | 15 | 17 |
| 3 | 6 | 9 | 12 | 16 | 20 | 23 | 24 |
| 4 | 8 | 12 | 16 | 20 | 26 | 30 | 32 |
| 5 | 10 | 15 | 21 | 26 | 33 | 38 | 40 |
| 6 | 13 | 20 | 25 | 31 | 39 | 44 | 48 |
| 7 | 15 | 23 | 31 | 38 | 45 | 49 | 56 |
| 18 | 17 | 26 | 35 | 42 | 48 | 56 | 64 |

Fig. 39a

| 1 | 1 | 1 | 1 | 1 | 2 | 3 | 4 |
|---|---|---|---|---|---|---|---|
| 1 | 1 | 1 | 1 | 2 | 3 | 4 | 3 |
| 1 | 1 | 1 | 1 | 2 | 3 | 4 | 3 |
| 1 | 1 | 1 | 2 | 3 | 5 | 5 | 4 |
| 1 | 1 | 2 | 3 | 4 | 7 | 6 | 5 |
| 1 | 2 | 3 | 4 | 5 | 6 | 7 | 6 |
| 3 | 4 | 5 | 5 | 6 | 7 | 7 | 6 |
| 4 | 6 | 6 | 6 | 7 | 6 | 6 | 6 |

Fig. 39b

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Fig. 39c

| 3.2 | 2.2 | 2 | 3.2 | 4.8 | 8 | 10.2 | 12.2 |
|---|---|---|---|---|---|---|---|
| 2.4 | 2.4 | 2.8 | 3.8 | 5.2 | 11.6 | 12 | 11 |
| 2.8 | 2.6 | 3.2 | 4.8 | 8 | 11.4 | 13.8 | 11.2 |
| 2.8 | 3.4 | 4.4 | 5.8 | 10.2 | 17.4 | 16 | 12.4 |
| 3.6 | 4.4 | 7.4 | 11.2 | 13.6 | 21.8 | 20.6 | 15.4 |
| 4.8 | 7 | 11 | 12.8 | 16.2 | 20.8 | 22.6 | 18.4 |
| 9.8 | 12.8 | 15.6 | 17.4 | 20.6 | 24.2 | 24 | 20.2 |
| 14.4 | 18.4 | 19 | 19.6 | 22.4 | 20 | 20.6 | 19.8 |

Fig. 39d

| 2 | 2 | 2 | 2 | 3 | 5 | 7 | 8 |
|---|---|---|---|---|---|---|---|
| 2 | 2 | 2 | 2 | 4 | 7 | 8 | 7 |
| 2 | 2 | 2 | 3 | 5 | 7 | 9 | 7 |
| 2 | 2 | 3 | 4 | 7 | 11 | 11 | 8 |
| 2 | 3 | 5 | 7 | 9 | 14 | 13 | 10 |
| 3 | 5 | 7 | 8 | 11 | 13 | 15 | 12 |
| 6 | 8 | 10 | 11 | 13 | 16 | 16 | 13 |
| 9 | 12 | 13 | 13 | 15 | 13 | 13 | 13 |

Fig. 40a

4205: provide search algorithm parameters: initial MQF, valid MQF range: [MinMQF, maxMQF] and step-size.

↓

4210: In first iteration set MQF_i=initial MQF.

↓

4220: Compute corresponding quantization matrix – Q_i=func(MQF_i).

↓

4230: Perform recompression and compute Qscore=obtained perceptual quality score.

↓

4240: If Qscore is within target range, finished. Otherwise proceed to next step.

↓

4250: Update valid range and set next candidate MQF value using an appropriate search algorithm, for instance according to fig E2. (As shown there, if the search process is "stalled" we may decide to terminate the search).

↓

4260: MQF_i is set to next candidate MQF value.

↓

4270: Goto step 4220.

Fig. 41:

4410: compressing a first (e.g. input, JPEG) image (or other disjoint block level encoded image compressed by independent coding of disjoint blocks in a precursor image) giving rise to a second (e.g. provisionally compressed, JPEG) image (or other disjoint block level encoded image generated from said first digital image by independently coding disjoint blocks in the first image) e.g. using provisional compression parameters. Optionally a further iteration of a search for improved compression parameters is invoked (each iteration optionally including adapting a compression parameter based on at least one of, e.g. all, iterations previous to said individual iteration) if it is determined that the quality score for the second image does not lie within a predetermined perceptual quality range.

↓

4420: implementing a measure of added artifactual edges along coding block boundaries

↓

4430: determining based at least upon said region quality score whether a perceptual quality criterion is met by said second image e.g. optionally determining based at least upon said image quality score whether a perceptual quality criterion is met by said second image.

↓

4440: optionally, if it is determined that the quality score for the second image does not meet a perceptual quality criterion, recomputing provisional compression parameters and repeating provisional compression, search and determining using the recomputed parameters

Fig. 42

4510: computing a difference image between the first and second images

↓

4520: defining a region within said difference image, said region comprising a plurality of image blocks;

↓

4530: within said region, computing for each boundary between two coding blocks a respective added-blockiness score indicating an extent of added artifactual edges along the respective boundary

↓

4540: computing a region quality score based on the added-blockiness scores computed for each boundary within the region

Fig. 43:

4610: defining a plurality of regions within the difference image, each region comprising a plurality of image blocks

↓

4620: computing a region quality score for each of said plurality of regions, giving rise to a respective plurality of region quality scores, e.g. computing at least two region quality scores for a corresponding set of at least two regions in the output image and providing compression instructions based at least in part on said at least two region quality scores.

↓

4630: computing an image quality score for the second image based on said plurality of region quality scores

| MQF | 64 | 66 | 68 | 70 | 72 | 74 | 76 | 78 | 80 | 82 | 84 |
|---|---|---|---|---|---|---|---|---|---|---|---|
| qual | 0.45 | 0.46 | 0.46 | 0.26 | 0.21 | 0.23 | 0.30 | 0.35 | 0.42 | 0.50 | 0.55 |

Fig. 46B

| | | | | | | | |
|---|---|---|---|---|---|---|---|
| 1 | 1 | 1 | 1 | 1 | 2 | 3 | 4 |
| 1 | 1 | 1 | 1 | 2 | 3 | 4 | 3 |
| 1 | 1 | 1 | 1 | 2 | 3 | 4 | 3 |
| 1 | 1 | 1 | 2 | 3 | 5 | 5 | 4 |
| 1 | 1 | 2 | 3 | 4 | 7 | 6 | 5 |
| 1 | 2 | 3 | 4 | 5 | 6 | 7 | 6 |
| 3 | 4 | 5 | 5 | 6 | 7 | 7 | 6 |
| 4 | 6 | 6 | 6 | 7 | 6 | 6 | 6 |

Fig. 46C

| | | | | | | |
|---|---|---|---|---|---|---|
| 3 | 2 | 2 | 3 | 5 | 8 | 10 | 12 |
| 2 | 2 | 3 | 4 | 5 | 12 | 12 | 11 |
| 3 | 3 | 3 | 5 | 8 | 11 | 14 | 11 |
| 3 | 3 | 4 | 6 | 10 | 17 | 16 | 12 |
| 4 | 4 | 7 | 11 | 14 | 22 | 21 | 15 |
| 5 | 7 | 11 | 13 | 16 | 21 | 23 | 18 |
| 10 | 13 | 16 | 17 | 21 | 24 | 24 | 20 |
| 14 | 18 | 19 | 20 | 22 | 20 | 21 | 20 |

```
for i=1:8
    for j=1:8
        finished=0;
        while(finished==0)
            Qr=inQM(i,j)/outQM(i,j);
            if((Qr-round(Qr))<-0.1)
                outQM(i,j)=outQM(i,j)-1;
            else
                finished=1;
            end
        end
    end
end
```

Fig. 49A

6510. provide a first image compressed using a known first quantization matrix $\downarrow$ 6520. provide a candidate second quantization matrix e.g. using an iterative process including computation of a modified quality factor, using this MQF to generate a quantization matrix. For example, e.g. as per fig. 12, two matrices may be combined, including the first quantization matrix used to compress the input JPEG image and a second matrix such as a default JPEG matrix or such as a matrix suited to the image being compressed. The MQF is used to compute a scaling factor, the second matrix is scaled, and a weighted average of the resulting scaled matrix and the first matrix is computed $\downarrow$ 6530. in candidate $2^{nd}$ matrix, search for "problematic" values which fall between 1 X corresponding value in the $1^{st}$ matrix, and 2 X corresponding value in the $1^{st}$ matrix. Replace each problematic value with corresponding value in the $1^{st}$ matrix, thereby to obtain a final $2^{nd}$ quantization matrix $\downarrow$ 6540. use the final $2^{nd}$ quantization matrix to compress the $1^{st}$ image

Fig. 49B

6550: provide a first image compressed using a known first quantization matrix

↓

6560: provide a candidate second quantization matrix e.g. as per figs. 12

↓

6570: for each element in candidate second quantization matrix:

↓

6580: estimate rounding error which can be expected given relationship between first and candidate second matrices, e.g. using method of Fig. 5C

↓

6590: If rounding error is too far from zero e.g. too negative e.g. less than -0.1, add/subtract one from current $2^{nd}$ matrix element and return to step 580

↓

6600: once one's have been added/subtracted to all elements in $2^{nd}$ matrix sufficiently to ensure satisfactory estimated rounding error for all elements in candidate $2^{nd}$ q matrix, use this modified candidate second quantization matrix to recompress first image

Fig. 49C

6610: Compute 'rounding error': compute Qr=Qv_input/Qv_proposed;

↓

6620: Compute: Er=Qr-round(Qr)

↓

6630: for each of the 64 elements, while Er<-0.1 : (Er will not be smaller than -0.5 because of how it is created), compute: Qv_proposed=Qv_proposed-1 (or +1) then repeat unless it is no longer true that Er<-0.1

Fig. 51

6710. Compute Q matrix according to proposed MQF, e.g. as per Fig. 12.

↓

6720. For each of the 64 q values in Q, compute the rounding error using the proposed q value and the corresponding q value from the quantization matrix in the original image.

↓

6730. For any q value whose rounding error is below a given threshold, increase or decrease its value by 1 repeatedly, until the rounding error exceeds the threshold.

↓

6740. When the rounding error exceeds the threshold, use the resulting q value.

Fig. 52

| 1 | 1 | 1 | 1 | 3 | 5 | 7 | 4 |
|---|---|---|---|---|---|---|---|
| 1 | 1 | 1 | 1 | 2 | 7 | 4 | 7 |
| 1 | 1 | 1 | 3 | 5 | 7 | 9 | 7 |
| 1 | 1 | 3 | 2 | 7 | 11 | 11 | 4 |
| 1 | 3 | 5 | 7 | 9 | 7 | 13 | 5 |
| 3 | 5 | 7 | 4 | 11 | 13 | 15 | 6 |
| 3 | 4 | 5 | 11 | 13 | 16 | 16 | 13 |
| 9 | 6 | 13 | 13 | 15 | 13 | 13 | 13 |

Fig. 53a

| 1099 | -10 | 10 | -10 | 18 | -4 | -40 | -12 |
|---|---|---|---|---|---|---|---|
| -249 | 19 | 4 | 13 | -5 | 30 | -6 | -18 |
| 12 | 2 | -19 | -5 | 16 | -22 | -18 | 22 |
| -536 | 1 | -18 | -13 | -12 | 3 | -9 | -22 |
| 8 | -20 | 7 | 10 | -3 | -32 | 20 | -6 |
| 377 | -7 | -4 | -3 | 12 | 0 | 5 | 20 |
| -18 | 15 | -12 | -3 | -12 | -10 | -5 | -12 |
| 60 | -16 | 4 | -12 | -28 | -24 | 4 | -4 |

Fig. 53b

| 3 | 3 | 5 | 5 | 6 | 5 | 6 | 6 |
|---|---|---|---|---|---|---|---|
| 4 | 3 | 3 | 4 | 4 | 5 | 6 | 6 |
| 6 | 3 | 3 | 3 | 5 | 5 | 6 | 7 |
| 5 | 3 | 3 | 3 | 5 | 7 | 7 | 7 |
| 4 | 5 | 3 | 5 | 7 | 8 | 10 | 10 |
| 6 | 4 | 4 | 7 | 6 | 10 | 11 | 10 |
| 6 | 5 | 6 | 7 | 8 | 11 | 11 | 12 |
| 6 | 8 | 7 | 6 | 7 | 8 | 9 | 10 |

Fig. 53c

| 1098 | -9 | 10 | -10 | 18 | -5 | -42 | -12 |
|---|---|---|---|---|---|---|---|
| -248 | 18 | 3 | 12 | -4 | 30 | -6 | -18 |
| 12 | 3 | -18 | -6 | 15 | -20 | -18 | 21 |
| -535 | 0 | -18 | -12 | -10 | 0 | -7 | -21 |
| 8 | -20 | 6 | 10 | 0 | -32 | 20 | -10 |
| 378 | -8 | -4 | 0 | 12 | 0 | 0 | 20 |
| -18 | 15 | -12 | 0 | -16 | -11 | 0 | -12 |
| 60 | -16 | 7 | -12 | -28 | -24 | 0 | 0 |

Fig. 53d

| 1 | 1 | 0 | 0 | 0 | 1 | 2 | 0 |
|---|---|---|---|---|---|---|---|
| 1 | 1 | 1 | 1 | 1 | 0 | 0 | 0 |
| 0 | 1 | 1 | 1 | 1 | 2 | 0 | 1 |
| 1 | 1 | 0 | 1 | 2 | 3 | 2 | 1 |
| 0 | 0 | 1 | 0 | 3 | 0 | 0 | 4 |
| 1 | 1 | 0 | 3 | 0 | 0 | 5 | 0 |
| 0 | 0 | 0 | 3 | 4 | 1 | 5 | 0 |
| 0 | 0 | 3 | 0 | 0 | 0 | 4 | 4 |

Fig. 53e

| 2 | 2 | 3 | 3 | 3 | 3 | 5 | 5 |
|---|---|---|---|---|---|---|---|
| 2 | 2 | 2 | 2 | 2 | 4 | 4 | 4 |
| 2 | 2 | 2 | 2 | 4 | 4 | 5 | 4 |
| 2 | 2 | 2 | 2 | 4 | 6 | 6 | 4 |
| 2 | 2 | 2 | 4 | 6 | 8 | 8 | 7 |
| 2 | 2 | 4 | 6 | 6 | 8 | 10 | 8 |
| 4 | 4 | 6 | 6 | 8 | 10 | 10 | 8 |
| 6 | 6 | 6 | 5 | 6 | 7 | 8 | 8 |

Fig. 53f

| 1100 | -10 | 9   | -9  | 18  | -3  | -40 | -10 |
|------|-----|-----|-----|-----|-----|-----|-----|
| -250 | 20  | 4   | 14  | -6  | 32  | -8  | -20 |
| 12   | 2   | -20 | -6  | 16  | -24 | -20 | 24  |
| -536 | 2   | -18 | -14 | -12 | 6   | -12 | -24 |
| 8    | -20 | 8   | 12  | -6  | -32 | 24  | -7  |
| 378  | -8  | -4  | -6  | 12  | 0   | 10  | 24  |
| -20  | 16  | -12 | -6  | -16 | -10 | -10 | -16 |
| 60   | -18 | 6   | -10 | -30 | -21 | 8   | -8  |

Fig. 53g

| 1 | 0 | 1 | 1 | 0 | 1 | 0 | 2 |
|---|---|---|---|---|---|---|---|
| 1 | 1 | 0 | 1 | 1 | 2 | 2 | 2 |
| 0 | 0 | 1 | 1 | 0 | 2 | 2 | 2 |
| 0 | 1 | 0 | 1 | 0 | 3 | 3 | 2 |
| 0 | 0 | 1 | 2 | 3 | 0 | 4 | 1 |
| 1 | 1 | 0 | 3 | 0 | 0 | 5 | 4 |
| 2 | 1 | 0 | 3 | 4 | 0 | 5 | 4 |
| 0 | 2 | 2 | 2 | 2 | 3 | 4 | 4 |

Fig. 54A

| 1 | 1 | 1 | 1 | 1 | 2 | 3 | 4 |
|---|---|---|---|---|---|---|---|
| 1 | 1 | 1 | 1 | 2 | 3 | 4 | 3 |
| 1 | 1 | 1 | 1 | 2 | 3 | 4 | 3 |
| 1 | 1 | 1 | 2 | 3 | 5 | 5 | 4 |
| 1 | 1 | 2 | 3 | 4 | 7 | 6 | 5 |
| 1 | 2 | 3 | 4 | 5 | 6 | 7 | 6 |
| 3 | 4 | 5 | 5 | 6 | 7 | 7 | 6 |
| 4 | 6 | 6 | 6 | 7 | 6 | 6 | 6 |

Fig. 54B

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Fig. 54C

| 3.2 | 2.2 | 2 | 3.2 | 4.8 | 8 | 10.2 | 12.2 |
|---|---|---|---|---|---|---|---|
| 2.4 | 2.4 | 2.8 | 3.8 | 5.2 | 11.6 | 12 | 11 |
| 2.8 | 2.6 | 3.2 | 4.8 | 8 | 11.4 | 13.8 | 11.2 |
| 2.8 | 3.4 | 4.4 | 5.8 | 10.2 | 17.4 | 16 | 12.4 |
| 3.6 | 4.4 | 7.4 | 11.2 | 13.6 | 21.8 | 20.6 | 15.4 |
| 4.8 | 7 | 11 | 12.8 | 16.2 | 20.8 | 22.6 | 18.4 |
| 9.8 | 12.8 | 15.6 | 17.4 | 20.6 | 24.2 | 24 | 20.2 |
| 14.4 | 18.4 | 19 | 19.6 | 22.4 | 20 | 20.6 | 19.8 |

Fig. 54D

| 2 | 2 | 2 | 2 | 3 | 5 | 7 | 8 |
|---|---|---|---|---|---|---|---|
| 2 | 2 | 2 | 2 | 4 | 7 | 8 | 7 |
| 2 | 2 | 2 | 3 | 5 | 7 | 9 | 7 |
| 2 | 2 | 3 | 4 | 7 | 11 | 11 | 8 |
| 2 | 3 | 5 | 7 | 9 | 14 | 13 | 10 |
| 3 | 5 | 7 | 8 | 11 | 13 | 15 | 12 |
| 6 | 8 | 10 | 11 | 13 | 16 | 16 | 13 |
| 9 | 12 | 13 | 13 | 15 | 13 | 13 | 13 |

Fig. 54E

| 1 | 1 | 1 | 1 | 3 | 5 | 7 | 4 |
|---|---|---|---|---|---|---|---|
| 1 | 1 | 1 | 1 | 2 | 7 | 4 | 7 |
| 1 | 1 | 1 | 3 | 5 | 7 | 9 | 7 |
| 1 | 1 | 3 | 2 | 7 | 11 | 11 | 4 |
| 1 | 3 | 5 | 7 | 9 | 7 | 13 | 5 |
| 3 | 5 | 7 | 4 | 11 | 13 | 15 | 6 |
| 3 | 4 | 5 | 11 | 13 | 16 | 16 | 13 |
| 9 | 6 | 13 | 13 | 15 | 13 | 13 | 13 |

Fig. 55A

6810: performing at least one independent disjoint block-level compression operation, using a processor, on the first image thereby to generate a re-compressed second image including generating a new quantization matrix

↓

6820: using said new quantization matrix for said independent disjoint block-level compression, including performing the method of Fig. 11B for at least one of and typically all of the (row, column) positions in the matrices

Fig. 55B

6830: computing a rounding error created by the quantization process utilizing the new quantization matrix

↓

6840: if the rounding error fulfils an unacceptability criterion e.g. the rounding error being more negative than a threshold acceptable rounding value such as but not limited to -0.1, adjusting at least one values of said new quantization matrix to reduce the rounding error created by the quantization process utilizing said new quantization matrix.

7310

| 87 | 91 | 96 | 104 | 107 | 109 | 105 | 102 | 100 | 100 | 97 | 97 | 97 | 99 | 94 | 88 |
|---|---|---|---|---|---|---|---|---|---|---|---|---|---|---|---|
| 84 | 87 | 93 | 99 | 104 | 105 | 105 | 103 | 103 | 103 | 100 | 97 | 94 | 94 | 91 | 89 |
| 84 | 85 | 88 | 91 | 93 | 99 | 102 | 106 | 105 | 105 | 101 | 98 | 92 | 92 | 91 | 91 |
| 80 | 83 | 86 | 88 | 89 | 92 | 97 | 99 | 102 | 101 | 100 | 99 | 95 | 95 | 93 | 93 |
| 76 | 81 | 87 | 89 | 91 | 90 | 91 | 91 | 99 | 98 | 97 | 99 | 102 | 101 | 95 | 95 |
| 79 | 81 | 84 | 85 | 87 | 89 | 90 | 93 | 96 | 95 | 96 | 100 | 103 | 101 | 97 | 95 |
| 83 | 82 | 82 | 81 | 84 | 87 | 90 | 92 | 95 | 93 | 94 | 98 | 100 | 99 | 96 | 97 |
| 79 | 80 | 83 | 86 | 88 | 88 | 86 | 84 | 93 | 92 | 93 | 96 | 97 | 96 | 96 | 100 |
| 69 | 70 | 72 | 77 | 80 | 84 | 85 | 88 | 91 | 95 | 99 | 101 | 102 | 100 | 100 | 100 |
| 80 | 79 | 78 | 78 | 81 | 85 | 87 | 90 | 92 | 96 | 100 | 101 | 102 | 100 | 100 | 98 |
| 82 | 85 | 87 | 87 | 88 | 88 | 87 | 87 | 92 | 94 | 98 | 98 | 99 | 98 | 97 | 97 |
| 85 | 88 | 90 | 92 | 93 | 91 | 90 | 89 | 89 | 92 | 95 | 95 | 96 | 96 | 96 | 94 |
| 89 | 91 | 89 | 88 | 87 | 89 | 92 | 94 | 87 | 90 | 93 | 93 | 95 | 96 | 97 | 94 |
| 87 | 90 | 90 | 90 | 87 | 87 | 86 | 87 | 85 | 88 | 90 | 89 | 89 | 93 | 94 | 90 |
| 84 | 88 | 91 | 92 | 87 | 83 | 77 | 75 | 80 | 83 | 82 | 83 | 83 | 89 | 90 | 88 |
| 87 | 89 | 89 | 88 | 82 | 79 | 75 | 75 | 78 | 81 | 81 | 81 | 83 | 89 | 91 | 89 |

| 723 | -41 | -9 | -2 | -1 | 0 | 1 | 0 | 775 | 13 | -5 | 5 | 1 | -1 | 1 | -2 |
|---|---|---|---|---|---|---|---|---|---|---|---|---|---|---|---|
| 43 | -13 | -7 | 1 | 0 | 1 | 0 | -1 | 0 | 20 | 3 | 0 | -6 | 1 | -1 | -1 |
| 12 | 3 | -7 | 6 | 0 | 0 | 0 | -1 | -6 | -5 | 0 | 1 | 0 | 0 | 0 | 0 |
| 3 | 2 | -5 | 0 | 0 | -1 | 0 | 0 | 4 | -7 | -8 | 7 | 0 | -1 | 0 | 1 |
| -2 | 4 | -8 | 0 | -1 | 0 | -1 | 0 | 0 | -4 | 0 | 1 | 0 | 0 | 0 | 0 |
| 0 | 0 | 9 | 0 | 0 | 0 | 0 | -1 | 0 | 0 | 0 | 0 | 1 | 0 | 0 | 0 |
| 0 | 0 | 0 | 0 | 0 | 0 | 1 | -2 | 0 | 0 | 0 | 0 | 0 | 0 | -1 | 0 |
| 0 | 1 | 1 | 0 | 0 | 0 | 0 | 0 | 1 | 0 | 1 | 1 | 0 | -1 | 0 | 0 |
| 682 | -3 | -6 | -4 | -1 | -1 | 0 | -2 | 740 | -19 | -9 | -2 | -6 | 1 | -1 | 1 |
| -11 | -28 | 8 | 4 | 1 | -1 | 0 | 1 | 42 | 5 | -8 | -3 | 4 | -1 | 0 | 2 |
| -28 | 1 | -2 | 1 | 1 | 0 | 1 | -1 | -8 | -4 | 2 | 0 | 0 | 0 | 0 | -1 |
| -3 | -9 | 4 | 0 | 0 | 0 | 0 | -1 | 3 | 0 | -1 | 0 | -1 | 1 | -1 | 0 |
| -1 | -4 | 2 | 0 | 1 | 0 | -1 | 0 | 0 | -3 | 0 | 0 | 0 | 0 | 0 | 1 |
| -1 | 1 | -11 | 0 | 1 | 0 | 0 | 0 | -5 | 1 | 1 | 0 | 1 | 0 | 0 | -1 |
| 0 | -1 | -1 | -1 | 0 | 0 | 0 | 0 | 1 | 0 | 0 | 0 | 0 | 0 | 1 | 0 |
| -1 | 0 | 0 | -1 | -1 | 0 | 0 | 0 | 0 | -1 | 0 | 0 | 1 | 0 | 0 | 0 |

| 45 | -4 | -1 | 0 | 0 | 0 | 0 | 0 | 48 | 1 | -1 | 0 | 0 | 0 | 0 | 0 |
|---|---|---|---|---|---|---|---|---|---|---|---|---|---|---|---|
| 4 | -1 | -1 | 0 | 0 | 0 | 0 | 0 | 0 | 2 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 43 | 0 | -1 | 0 | 0 | 0 | 0 | 0 | 46 | -2 | -1 | 0 | 0 | 0 | 0 | 0 |
| -1 | -2 | 1 | 0 | 0 | 0 | 0 | 0 | 4 | 0 | -1 | 0 | 0 | 0 | 0 | 0 |
| -2 | 0 | 0 | 0 | 0 | 0 | 0 | 0 | -1 | 0 | 0 | 0 | 0 | 0 | 0 | 0 |
| 0 | -1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 720 | -44 | -10 | 0 | 0 | 0 | 0 | 0 | 768 | 11 | -10 | 0 | 0 | 0 | 0 | 0 |
|---|---|---|---|---|---|---|---|---|---|---|---|---|---|---|---|
| 48 | -12 | -14 | 0 | 0 | 0 | 0 | 0 | 0 | 24 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 688 | 0 | -10 | 0 | 0 | 0 | 0 | 0 | 736 | -22 | -10 | 0 | 0 | 0 | 0 | 0 |
| -12 | -24 | 14 | 0 | 0 | 0 | 0 | 0 | 48 | 0 | -14 | 0 | 0 | 0 | 0 | 0 |
| -28 | 0 | 0 | 0 | 0 | 0 | 0 | 0 | -14 | 0 | 0 | 0 | 0 | 0 | 0 | 0 |
| 0 | -17 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 87 | 91 | 96 | 104 | 107 | 109 | 105 | 102 | 100 | 100 | 97 | 97 | 97 | 99 | 94 | 88 |
|----|----|----|-----|-----|-----|-----|-----|-----|-----|----|----|----|----|----|----|
| 84 | 87 | 93 | 99 | 104 | 105 | 105 | 103 | 103 | 103 | 100 | 97 | 94 | 94 | 91 | 89 |
| 84 | 85 | 88 | 91 | 93 | 99 | 102 | 106 | 105 | 105 | 101 | 98 | 92 | 92 | 91 | 91 |
| 80 | 83 | 86 | 88 | 89 | 92 | 97 | 99 | 102 | 101 | 100 | 99 | 95 | 95 | 93 | 93 |
| 76 | 81 | 87 | 89 | 91 | 90 | 91 | 91 | 99 | 98 | 97 | 99 | 102 | 101 | 95 | 95 |
| 79 | 81 | 84 | 85 | 87 | 89 | 90 | 93 | 96 | 95 | 96 | 100 | 103 | 101 | 97 | 95 |
| 83 | 82 | 82 | 81 | 84 | 87 | 90 | 92 | 95 | 93 | 94 | 98 | 100 | 99 | 96 | 97 |
| 79 | 80 | 83 | 86 | 88 | 88 | 86 | 84 | 93 | 92 | 93 | 96 | 97 | 96 | 96 | 100 |
| 69 | 70 | 72 | 77 | 80 | 84 | 85 | 88 | 91 | 95 | 99 | 101 | 102 | 100 | 100 | 100 |
| 80 | 79 | 78 | 78 | 81 | 85 | 87 | 90 | 92 | 96 | 100 | 101 | 102 | 100 | 100 | 98 |
| 82 | 85 | 87 | 87 | 88 | 88 | 87 | 87 | 92 | 94 | 98 | 98 | 99 | 98 | 97 | 97 |
| 85 | 88 | 90 | 92 | 93 | 91 | 90 | 89 | 89 | 92 | 95 | 95 | 96 | 96 | 96 | 94 |
| 89 | 91 | 89 | 88 | 87 | 89 | 92 | 94 | 87 | 90 | 93 | 93 | 95 | 96 | 97 | 94 |
| 87 | 90 | 90 | 90 | 87 | 87 | 86 | 87 | 85 | 88 | 90 | 89 | 89 | 93 | 94 | 90 |
| 84 | 88 | 91 | 92 | 87 | 83 | 77 | 75 | 80 | 83 | 82 | 83 | 83 | 89 | 90 | 88 |
| 87 | 89 | 89 | 88 | 82 | 79 | 75 | 75 | 78 | 81 | 81 | 81 | 83 | 89 | 91 | 89 |

| 723 | -41 | -9 | -2 | -1 | 0 | 1 | 0 | 775 | 13 | -5 | 5 | 1 | -1 | 1 | -2 |
|-----|-----|----|----|----|---|---|---|-----|----|----|---|---|----|---|----|
| 43 | -13 | -7 | 1 | 0 | 1 | 0 | -1 | 0 | 20 | 3 | 0 | -6 | 1 | -1 | -1 |
| 12 | 3 | -7 | 6 | 0 | 0 | 0 | -1 | -6 | -5 | 0 | 1 | 0 | 0 | 0 | 0 |
| 3 | 2 | -5 | 0 | 0 | -1 | 0 | 0 | 4 | -7 | -8 | 7 | 0 | -1 | 0 | 1 |
| -2 | 4 | -8 | 0 | -1 | 0 | -1 | 0 | 0 | -4 | 0 | 1 | 0 | 0 | 0 | 0 |
| 0 | 0 | 9 | 0 | 0 | 0 | 0 | -1 | 0 | 0 | 0 | 0 | 0 | 1 | 0 | 0 |
| 0 | 0 | 0 | 0 | 0 | 0 | 1 | -2 | 0 | 0 | 0 | 0 | 0 | 0 | -1 | 0 |
| 0 | 1 | 1 | 0 | 0 | 0 | 0 | 0 | 1 | 0 | 1 | 1 | 0 | -1 | 0 | 0 |
| 682 | -3 | -6 | -4 | -1 | -1 | 0 | -2 | 740 | -19 | -9 | -2 | -6 | 1 | -1 | 1 |
| -11 | -28 | 8 | 4 | 1 | -1 | 0 | 1 | 42 | 5 | -8 | -3 | 4 | -1 | 0 | 2 |
| -28 | 1 | -2 | 1 | 1 | 0 | 1 | -1 | -8 | -4 | 2 | 0 | 0 | 0 | 0 | -1 |
| -3 | -9 | 4 | 0 | 0 | 0 | 0 | -1 | 3 | 0 | -1 | 0 | -1 | 1 | -1 | 0 |
| -1 | -4 | 2 | 0 | 1 | 0 | -1 | 0 | 0 | -3 | 0 | 0 | 0 | 0 | 0 | 1 |
| -1 | 1 | -11 | 0 | 1 | 0 | 0 | 0 | -5 | 1 | 1 | 0 | 1 | 0 | 0 | -1 |
| 0 | -1 | -1 | -1 | 0 | 0 | 0 | 0 | 1 | 0 | 0 | 0 | 0 | 0 | 1 | 0 |
| -1 | 0 | 0 | -1 | -1 | 0 | 0 | 0 | 0 | -1 | 0 | 0 | 1 | 0 | 0 | 0 |

| 723 | -41 | -9 | 0 | 0 | 0 | 0 | 0 | 775 | 13 | -5 | 5 | 0 | 0 | 0 | 0 |
|---|---|---|---|---|---|---|---|---|---|---|---|---|---|---|---|
| 43 | -13 | -7 | 0 | 0 | 0 | 0 | 0 | 0 | 20 | 0 | 0 | -6 | 0 | 0 | 0 |
| 12 | 0 | -7 | 6 | 0 | 0 | 0 | 0 | -6 | -5 | 0 | 0 | 0 | 0 | 0 | 0 |
| 0 | 0 | -5 | 0 | 0 | 0 | 0 | 0 | 0 | -7 | -8 | 7 | 0 | 0 | 0 | 0 |
| 0 | 0 | -8 | 0 | 0 | 0 | 0 | 0 | 0 | 0 | 0 | 0 | 0 | 0 | 0 | 0 |
| 0 | 0 | 9 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 682 | 0 | -6 | 0 | 0 | 0 | 0 | 0 | 740 | -19 | -9 | 0 | -6 | 0 | 0 | 0 |
| -11 | -28 | 8 | 0 | 0 | 0 | 0 | 0 | 42 | 5 | -8 | 0 | 0 | 0 | 0 | 0 |
| -28 | 0 | 0 | 0 | 0 | 0 | 0 | 0 | -8 | 0 | 0 | 0 | 0 | 0 | 0 | 0 |
| 0 | -9 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | -11 | 0 | 0 | 0 | 0 | 0 | -5 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 723 | -41 | -9 | 0 | 0 | 0 | 0 | 0 | 775 | 13 | -5 | 5 | 0 | 0 | 0 | 0 |
|---|---|---|---|---|---|---|---|---|---|---|---|---|---|---|---|
| 43 | -13 | -7 | 0 | 0 | 0 | 0 | 0 | 0 | 20 | 0 | 0 | -6 | 0 | 0 | 0 |
| 12 | 0 | -7 | 6 | 0 | 0 | 0 | 0 | -6 | -5 | 0 | 0 | 0 | 0 | 0 | 0 |
| 0 | 0 | -5 | 0 | 0 | 0 | 0 | 0 | 0 | -7 | -8 | 7 | 0 | 0 | 0 | 0 |
| 0 | 0 | -8 | 0 | 0 | 0 | 0 | 0 | 0 | 0 | 0 | 0 | 0 | 0 | 0 | 0 |
| 0 | 0 | 9 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 682 | 0 | -6 | 0 | 0 | 0 | 0 | 0 | 740 | -19 | -9 | 0 | -6 | 0 | 0 | 0 |
| -11 | -28 | 8 | 0 | 0 | 0 | 0 | 0 | 42 | 5 | -8 | 0 | 0 | 0 | 0 | 0 |
| -28 | 0 | 0 | 0 | 0 | 0 | 0 | 0 | -8 | 0 | 0 | 0 | 0 | 0 | 0 | 0 |
| 0 | -9 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | -11 | 0 | 0 | 0 | 0 | 0 | -5 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 60D

| 723 | -41 | -9 | 0 | 0 | 0 | 0 | 0 | 775 | 13 | -5 | 5 | 0 | 0 | 0 | 0 |
|---|---|---|---|---|---|---|---|---|---|---|---|---|---|---|---|
| 43 | -13 | -7 | 0 | 0 | 0 | 0 | 0 | 0 | 20 | 0 | 0 | -6 | 0 | 0 | 0 |
| 12 | 0 | -7 | 6 | 0 | 0 | 0 | 0 | -6 | -5 | 0 | 0 | 0 | 0 | 0 | 0 |
| 0 | 0 | -5 | 0 | 0 | 0 | 0 | 0 | 0 | -7 | -8 | 7 | 0 | 0 | 0 | 0 |
| 0 | 0 | -8 | 0 | 0 | 0 | 0 | 0 | 0 | 0 | 0 | 0 | 0 | 0 | 0 | 0 |
| 0 | 0 | 9 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 682 | 0 | -6 | 0 | 0 | 0 | 0 | 0 | 740 | -19 | -9 | 0 | -6 | 0 | 0 | 0 |
| -11 | -28 | 8 | 0 | 0 | 0 | 0 | 0 | 42 | 5 | -8 | 0 | 0 | 0 | 0 | 0 |
| -28 | 0 | 0 | 0 | 0 | 0 | 0 | 0 | -8 | 0 | 0 | 0 | 0 | 0 | 0 | 0 |
| 0 | -9 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | -11 | 0 | 0 | 0 | 0 | 0 | -5 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 62A

| 723 | -41 | -9 | -2 | -1 | 0 | 1 | 0 | 775 | 13 | -5 | 5 | 1 | -1 | 1 | -2 |
|---|---|---|---|---|---|---|---|---|---|---|---|---|---|---|---|
| 43 | -13 | -7 | 1 | 0 | 1 | 0 | -1 | 0 | 20 | 3 | 0 | -6 | 1 | -1 | -1 |
| 12 | 3 | -7 | 6 | 0 | 0 | 0 | -1 | -6 | -5 | 0 | 1 | 0 | 0 | 0 | 0 |
| 3 | 2 | -5 | 0 | 0 | -1 | 0 | 0 | 4 | -7 | -8 | 7 | 0 | -1 | 0 | 1 |
| -2 | 4 | -8 | 0 | -1 | 0 | -1 | 0 | 0 | -4 | 0 | 1 | 0 | 0 | 0 | 0 |
| 0 | 0 | 9 | 0 | 0 | 0 | 0 | -1 | 0 | 0 | 0 | 0 | 0 | 1 | 0 | 0 |
| 0 | 0 | 0 | 0 | 0 | 0 | 1 | -2 | 0 | 0 | 0 | 0 | 0 | 0 | -1 | 0 |
| 0 | 1 | 1 | 0 | 0 | 0 | 0 | 0 | 1 | 0 | 1 | 1 | 0 | -1 | 0 | 0 |
| 682 | -3 | -6 | -4 | -1 | -1 | 0 | -2 | 740 | -19 | -9 | -2 | -6 | 1 | -1 | 1 |
| -11 | -28 | 8 | 4 | 1 | -1 | 0 | 1 | 42 | 5 | -8 | -3 | 4 | -1 | 0 | 2 |
| -28 | 1 | -2 | 1 | 1 | 0 | 1 | -1 | -8 | -4 | 2 | 0 | 0 | 0 | 0 | -1 |
| -3 | -9 | 4 | 0 | 0 | 0 | 0 | -1 | 3 | 0 | -1 | 0 | -1 | 1 | -1 | 0 |
| -1 | -4 | 2 | 0 | 1 | 0 | -1 | 0 | 0 | -3 | 0 | 0 | 0 | 0 | 0 | 1 |
| -1 | 1 | -11 | 0 | 1 | 0 | 0 | 0 | -5 | 1 | 1 | 0 | 1 | 0 | 0 | -1 |
| 0 | -1 | -1 | -1 | 0 | 0 | 0 | 0 | 1 | 0 | 0 | 0 | 0 | 0 | 1 | 0 |
| -1 | 0 | 0 | -1 | -1 | 0 | 0 | 0 | 0 | -1 | 0 | 0 | 1 | 0 | 0 | 0 |

| 723 | -41 | -9  | -2 | 0 | 0 | 0 | 0  | 775 | 13  | -5 | 5  | 0  | 0 | 0 | -2 |
|-----|-----|-----|----|---|---|---|----|-----|-----|----|----|----|---|---|----|
| 43  | -13 | -7  | 0  | 0 | 0 | 0 | 0  | 0   | 20  | 3  | 0  | -6 | 0 | 0 | 0  |
| 12  | 3   | -7  | 6  | 0 | 0 | 0 | 0  | -6  | -5  | 0  | 0  | 0  | 0 | 0 | 0  |
| 3   | 2   | -5  | 0  | 0 | 0 | 0 | 0  | 4   | -7  | -8 | 7  | 0  | 0 | 0 | 0  |
| -2  | 4   | -8  | 0  | 0 | 0 | 0 | 0  | 0   | -4  | 0  | 0  | 0  | 0 | 0 | 0  |
| 0   | 0   | 9   | 0  | 0 | 0 | 0 | 0  | 0   | 0   | 0  | 0  | 0  | 0 | 0 | 0  |
| 0   | 0   | 0   | 0  | 0 | 0 | 0 | -2 | 0   | 0   | 0  | 0  | 0  | 0 | 0 | 0  |
| 0   | 0   | 0   | 0  | 0 | 0 | 0 | 0  | 0   | 0   | 0  | 0  | 0  | 0 | 0 | 0  |
| 682 | -3  | -6  | -4 | 0 | 0 | 0 | -2 | 740 | -19 | -9 | -2 | -6 | 0 | 0 | 0  |
| -11 | -28 | 8   | 4  | 0 | 0 | 0 | 0  | 42  | 5   | -8 | -3 | 4  | 0 | 0 | 2  |
| -28 | 0   | -2  | 0  | 0 | 0 | 0 | 0  | -8  | -4  | 2  | 0  | 0  | 0 | 0 | 0  |
| -3  | -9  | 4   | 0  | 0 | 0 | 0 | 0  | 3   | 0   | 0  | 0  | 0  | 0 | 0 | 0  |
| 0   | -4  | 2   | 0  | 0 | 0 | 0 | 0  | 0   | -3  | 0  | 0  | 0  | 0 | 0 | 0  |
| 0   | 0   | -11 | 0  | 0 | 0 | 0 | 0  | -5  | 0   | 0  | 0  | 0  | 0 | 0 | 0  |
| 0   | 0   | 0   | 0  | 0 | 0 | 0 | 0  | 0   | 0   | 0  | 0  | 0  | 0 | 0 | 0  |
| 0   | 0   | 0   | 0  | 0 | 0 | 0 | 0  | 0   | 0   | 0  | 0  | 0  | 0 | 0 | 0  |

— 7616

| 1204 | -20 | 0   | 3 | 0 | -5 | 0 | 0 |
|------|-----|-----|---|---|----|---|---|
| -30  | 44  | 0   | 0 | 0 | 3  | 0 | 0 |
| 57   | -28 | -13 | 0 | 0 | 0  | 0 | 0 |
| -16  | 13  | 5   | 0 | 0 | 0  | 0 | 0 |
| 15   | -6  | -5  | 0 | 0 | 0  | 0 | 0 |
| -9   | 0   | 6   | 0 | 0 | 0  | 0 | 0 |
| 0    | 0   | 0   | 0 | 0 | 0  | 0 | 0 |
| 4    | 0   | -4  | 0 | 0 | 0  | 0 | 0 |

— 7626

| 1707 | 6  | 0 | 0 | 0 | 0 | 0 | 0 |
|------|----|---|---|---|---|---|---|
| 8    | 7  | 0 | 0 | 0 | 0 | 0 | 0 |
| 0    | -3 | 3 | 0 | 0 | 0 | 0 | 0 |
| 0    | 0  | 3 | 0 | 0 | 0 | 0 | 0 |
| 0    | 0  | 0 | 0 | 0 | 0 | 0 | 0 |
| 0    | 0  | 0 | 0 | 0 | 0 | 0 | 0 |
| -4   | 0  | 0 | 0 | 0 | 0 | 0 | 0 |
| 0    | 0  | 0 | 0 | 0 | 0 | 0 | 0 |

FIG. 62C

| 723 | -41 | -9 | -2 | 0 | 0 | 0 | 0 | 775 | 13 | -5 | 5 | 0 | 0 | 0 | -2 |
|---|---|---|---|---|---|---|---|---|---|---|---|---|---|---|---|
| 43 | -13 | -7 | 0 | 0 | 0 | 0 | 0 | 0 | 20 | 3 | 0 | -6 | 0 | 0 | 0 |
| 12 | 3 | -7 | 6 | 0 | 0 | 0 | 0 | -6 | -5 | 0 | 0 | 0 | 0 | 0 | 0 |
| 3 | 2 | -5 | 0 | 0 | 0 | 0 | 0 | 4 | -7 | -8 | 7 | 0 | 0 | 0 | 0 |
| -2 | 4 | -8 | 0 | 0 | 0 | 0 | 0 | 0 | -4 | 0 | 0 | 0 | 0 | 0 | 0 |
| 0 | 0 | 9 | 0 | 0 | 0 | 0 | 0 | 0 | 0 | 0 | 0 | 0 | 0 | 0 | 0 |
| 0 | 0 | 0 | 0 | 0 | 0 | 0 | -2 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 682 | -3 | -6 | -4 | 0 | 0 | 0 | -2 | 740 | -19 | -9 | -2 | -6 | 0 | 0 | 0 |
| -11 | -28 | 8 | 4 | 0 | 0 | 0 | 0 | 42 | 5 | -8 | -3 | 4 | 0 | 0 | 2 |
| -28 | 0 | -2 | 0 | 0 | 0 | 0 | 0 | -8 | -4 | 2 | 0 | 0 | 0 | 0 | 0 |
| -3 | -9 | 4 | 0 | 0 | 0 | 0 | 0 | 3 | 0 | 0 | 0 | 0 | 0 | 0 | 0 |
| 0 | -4 | 2 | 0 | 0 | 0 | 0 | 0 | 0 | -3 | 0 | 0 | 0 | 0 | 0 | 0 |
| 0 | 0 | -11 | 0 | 0 | 0 | 0 | 0 | -5 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

7608

| 1204 | -20 | 0 | 0 | 0 | 0 | 0 | 0 |
|---|---|---|---|---|---|---|---|
| -30 | 44 | 0 | 0 | 0 | 0 | 0 | 0 |
| 57 | -28 | -13 | 0 | 0 | 0 | 0 | 0 |
| -16 | 13 | 0 | 0 | 0 | 0 | 0 | 0 |
| 15 | 0 | 0 | 0 | 0 | 0 | 0 | 0 |
| -9 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

7618

| 1707 | 0 | 0 | 0 | 0 | 0 | 0 | 0 |
|---|---|---|---|---|---|---|---|
| 8 | 7 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

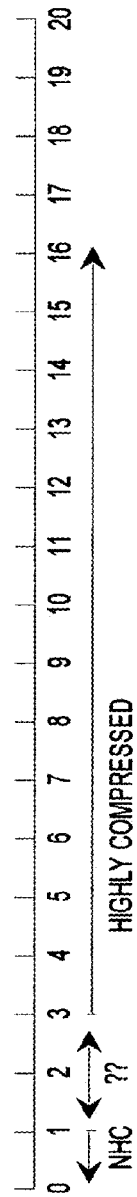
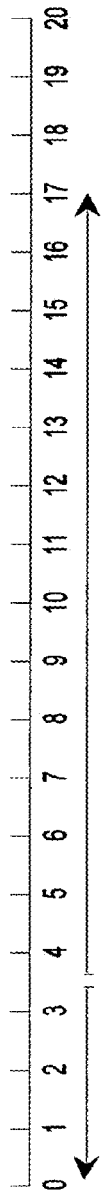
YminDCT: lowest absolute non-zero inverse quantized Luma (Y plane) DCT coefficient
CminDCT: lowest absolute non-zero inverse quantized Chroma (U&V planes) DCT coefficient
| File # | YminDCT | CminDCT | Compression Ratio | Highly Compressed? |
|---|---|---|---|---|
| 1 | 1 | 4 | x1.7 | NO |
| 2 | 2 | 7 | x1.05 | YES |
| 3 | 5 | 10 | x1.02 | YES |
| 4 | 1 | 2 | x2.2 | NO |
| 5 | 2 | 2 | x1.4 | NO |
FIG. 63
FIG. 64A
FIG. 64B

Fig. 65B 9010. provide a first image which has at least one first quantization matrix associated therewith and which was generated by independent coding of disjoint blocks in a precursor image

↓

9011. classify the first image's compression level using the compression level classifier

↓

9012. if the first image is classified as highly compressed, output the first image, else continue to the next step

↓

9015. provide an initial Quality Factor (QF) value e.g. QFnext=80

↓

9017. Compute an initial scaling factor S as follows:

IF QFnext<50 S=(5000/QFnext)/100 ELSE S=(200-2*QFnext)/100.

↓

9020. generate a new quantization matrix by scaling the at least one first quantization matrix by at least one initial scaling factor

↓

9030. use new quantization matrix generated in step 1020, for provisional independent disjoint block-level compression of the first image, thereby to generate a recompressed second image

↓

9040. compute a quality measure for the provisional compression e.g. using some or all of the quality measures described herein with reference to Figs. 1 – 11b

↓

9050: if the quality measure falls within a target quality interval, output the current recompressed second image, and otherwise, use a subsequent value, which may be computed using the method of Figs. 13A – 13B, and which is greater or smaller than the initial value for said scaling factor if the quality measure falls on one or another side of the textural change measure interval respectively.

Fig. 65C 9810. provide a first image which has at least one first quantization matrix associated therewith and which was generated by independent coding of disjoint blocks in a precursor image

9812. classify the first image's compression level using the compression level classifier

9815. if the first image is classified as highly compressed, output the first image, else continue to the next step

9820. generate a new quantization matrix by scaling a second quantization matrix, for example a default JPEG quantization matrix, using a scaling factor derived from a Modified Quality Factor (MQF), and combine it with the quantization matrix of the input JPEG image using weighted averaging, e.g. as per Fig. 19

9830. use new quantization matrix computed in step 1820, for provisional independent disjoint block-level compression of the first image, thereby to generate a re-compressed second image

9840. compute a quality measure for the provisional compression e.g. using some or all of the quality measures described herein with reference to Figs. 1 - 10

9850: if the quality measure falls within the a target quality interval, output the current recompressed second image, and otherwise, use a subsequent MQF value, which may be computed using the method of Figs. 20A – 20B, and which is smaller or greater than said initial value for said scaling factor if the quality measure falls on one or another side of the textural change measure interval respectively.

| File # | Subjective CDS classification (*) | Number of blocks with maximal errors above THR1 | Number of blocks with maximal errors above THR2 | Number of blocks with maximal errors above THR3 |
|---|---|---|---|---|
| 1 | OK | 1125 | 9 | 1 |
| 2 | OK | 2300 | 7 | 0 |
| 3 | OK | 1091 | 5 | 0 |
| 4 | NOT OK | 1972 | 13 | 2 |
| 5 | NOT OK | 3204 | 76 | 1 |
| 6 | NOT OK | 2179 | 23 | 0 |

FIG. 68

| 105 | 81 | 0 | -34 | 40 | 0 | 0 | 0 | 42 | 117 | -38 | 0 | 0 | 0 | 0 |
|---|---|---|---|---|---|---|---|---|---|---|---|---|---|---|
| -90 | 108 | -19 | -56 | 42 | 0 | 0 | 0 | 36 | -36 | 19 | 0 | 0 | 0 | 0 |
| -38 | 38 | 0 | -28 | 0 | 0 | 0 | 0 | 76 | -114 | 28 | 0 | -24 | 0 | 0 |
| 0 | 0 | 0 | 0 | 0 | 0 | 0 | 0 | -34 | 28 | 0 | 0 | 24 | 0 | 0 |
| 20 | 0 | 0 | 0 | 0 | 0 | 0 | 0 | -40 | 28 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 182 | 9 | 0 | 0 | 0 | 0 | 0 | 0 | 161 | -18 | 19 | 0 | 0 | 0 | 0 |
| 9 | 12 | 0 | 0 | 0 | 0 | 0 | 0 | -45 | -12 | 19 | 0 | 0 | 0 | 0 |
| 0 | -19 | 0 | 0 | 0 | 0 | 0 | 0 | -38 | -19 | 0 | 0 | 0 | 0 | 0 |
| 0 | 0 | 0 | 0 | 0 | 0 | 0 | 0 | 0 | 0 | -28 | 0 | 0 | 0 | 0 |
| 0 | 0 | 0 | 0 | 0 | 0 | 0 | 0 | 0 | 0 | -24 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

10605

| 157 | 154 | 165 | 163 | 114 | 58 | 61 | 103 | 142 | 141 | 139 | 137 | 138 | 143 | 147 | 149 |
|---|---|---|---|---|---|---|---|---|---|---|---|---|---|---|---|
| 153 | 148 | 156 | 157 | 118 | 71 | 73 | 108 | 143 | 149 | 150 | 147 | 148 | 155 | 156 | 151 |
| 155 | 146 | 149 | 155 | 133 | 99 | 99 | 123 | 148 | 155 | 156 | 149 | 143 | 139 | 130 | 119 |
| 161 | 149 | 149 | 157 | 151 | 132 | 130 | 144 | 156 | 153 | 149 | 142 | 124 | 98 | 76 | 65 |
| 160 | 149 | 146 | 154 | 157 | 152 | 150 | 154 | 161 | 147 | 142 | 142 | 119 | 78 | 52 | 48 |
| 153 | 146 | 141 | 145 | 152 | 155 | 155 | 154 | 156 | 145 | 144 | 148 | 133 | 101 | 81 | 81 |
| 150 | 148 | 144 | 142 | 147 | 154 | 156 | 154 | 142 | 146 | 148 | 146 | 141 | 133 | 123 | 115 |
| 153 | 154 | 150 | 145 | 148 | 157 | 160 | 157 | 130 | 147 | 150 | 137 | 136 | 147 | 143 | 125 |
| 152 | 152 | 152 | 152 | 152 | 152 | 152 | 152 | 122 | 125 | 129 | 134 | 138 | 141 | 142 | 143 |
| 154 | 154 | 153 | 153 | 152 | 151 | 150 | 150 | 144 | 138 | 130 | 126 | 128 | 138 | 150 | 158 |
| 157 | 156 | 154 | 153 | 151 | 149 | 147 | 147 | 159 | 150 | 138 | 130 | 131 | 141 | 155 | 165 |
| 157 | 157 | 155 | 152 | 150 | 147 | 146 | 145 | 157 | 155 | 152 | 149 | 149 | 151 | 154 | 156 |
| 156 | 155 | 153 | 151 | 149 | 147 | 146 | 145 | 152 | 155 | 159 | 161 | 161 | 157 | 152 | 149 |
| 152 | 151 | 151 | 150 | 150 | 149 | 148 | 148 | 154 | 155 | 156 | 157 | 157 | 156 | 154 | 153 |
| 147 | 147 | 148 | 149 | 150 | 151 | 152 | 152 | 152 | 151 | 150 | 150 | 151 | 153 | 155 | 157 |
| 144 | 144 | 146 | 148 | 150 | 152 | 154 | 155 | 145 | 146 | 147 | 149 | 150 | 152 | 154 | 155 |

10610

10615

| 154 | 159 | 91 | 85 | 143 | 144 | 147 | 152 |
|---|---|---|---|---|---|---|---|
| 153 | 152 | 129 | 124 | 153 | 149 | 125 | 97 |
| 151 | 147 | 154 | 155 | 152 | 145 | 108 | 65 |
| 151 | 145 | 152 | 155 | 141 | 145 | 139 | 126 |
| 153 | 152 | 152 | 150 | 135 | 130 | 136 | 149 |
| 157 | 154 | 149 | 147 | 154 | 142 | 143 | 157 |
| 154 | 151 | 149 | 147 | 154 | 158 | 158 | 152 |
| 146 | 148 | 151 | 153 | 149 | 149 | 152 | 155 |

↙ 10620

| 123 | 38 | -2 | 33 | -4 | -12 | -6 | 2 |
|---|---|---|---|---|---|---|---|
| -55 | 26 | 0 | 46 | -11 | -18 | -10 | 2 |
| -4 | -33 | 30 | 27 | -4 | -23 | -11 | 4 |
| 8 | -35 | 56 | -3 | 12 | -23 | -9 | 3 |
| 0 | -27 | 35 | -16 | 6 | -3 | -5 | -4 |
| 7 | -14 | 7 | 8 | -3 | 1 | -1 | -1 |
| -6 | 9 | -6 | -1 | 5 | -4 | -1 | 0 |
| -9 | 11 | -5 | 0 | -3 | 1 | 0 | -1 |

↖ 10625

10630

| 70 | -99 | 0 | 68 | 60 | 0 | 0 | 0 | 167 | -26 | 0 | 0 | 0 | 0 | 0 |
|---|---|---|---|---|---|---|---|---|---|---|---|---|---|---|
| 0 | -12 | 0 | 0 | 0 | 0 | 0 | 0 | 0 | 24 | 19 | 0 | 0 | 0 | 0 |
| 95 | 95 | 0 | -42 | -60 | -24 | 0 | 0 | -19 | -19 | 0 | 0 | 0 | 0 | 0 |
| 0 | 0 | 0 | 0 | 0 | 0 | 0 | 0 | 0 | 0 | 0 | 0 | 0 | 0 | 0 |
| -40 | -42 | 0 | 0 | 24 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

10635

10640

| 141 | 147 | 140 | 141 | 155 | 153 | 147 | 155 | 150 | 148 | 145 | 144 | 144 | 147 | 150 | 153 |
|---|---|---|---|---|---|---|---|---|---|---|---|---|---|---|---|
| 151 | 146 | 138 | 142 | 156 | 158 | 150 | 147 | 153 | 152 | 149 | 148 | 148 | 149 | 151 | 152 |
| 138 | 104 | 100 | 133 | 155 | 154 | 149 | 150 | 154 | 153 | 152 | 151 | 151 | 151 | 152 | 152 |
| 111 | 47 | 49 | 120 | 153 | 143 | 145 | 162 | 150 | 150 | 152 | 153 | 153 | 153 | 153 | 152 |
| 112 | 48 | 50 | 120 | 153 | 142 | 144 | 161 | 142 | 144 | 148 | 151 | 154 | 155 | 154 | 154 |
| 141 | 107 | 102 | 133 | 154 | 152 | 147 | 146 | 133 | 137 | 143 | 149 | 153 | 155 | 156 | 155 |
| 155 | 150 | 140 | 143 | 155 | 155 | 146 | 142 | 127 | 132 | 139 | 147 | 153 | 156 | 156 | 156 |
| 147 | 152 | 143 | 142 | 154 | 150 | 142 | 149 | 150 | 148 | 145 | 144 | 144 | 147 | 150 | 153 |

10645

| 143 | 142 | 152 | 151 | 149 | 144 | 145 | 151 |
| --- | --- | --- | --- | --- | --- | --- | --- |
| 148 | 141 | 156 | 150 | 152 | 149 | 149 | 151 |
| 119 | 117 | 154 | 150 | 153 | 152 | 151 | 152 |
| 75 | 84 | 149 | 152 | 152 | 152 | 153 | 153 |
| 76 | 85 | 148 | 151 | 145 | 149 | 154 | 154 |
| 122 | 118 | 153 | 146 | 136 | 146 | 154 | 156 |
| 152 | 143 | 154 | 143 | 130 | 143 | 155 | 156 |
| 149 | 144 | 150 | 146 | 149 | 144 | 145 | 151 |

— 10650

| 118 | -71 | -39 | -36 | -2 | 21 | 25 | 16 |
| --- | --- | --- | --- | --- | --- | --- | --- |
| 5 | -2 | -16 | 2 | 4 | -5 | 0 | 2 |
| 43 | 71 | 48 | 22 | 7 | -13 | -13 | -7 |
| -5 | 0 | 9 | -6 | -3 | 5 | 0 | -4 |
| -21 | -26 | -27 | -8 | 3 | -3 | 0 | 2 |
| -2 | -1 | 5 | -3 | -3 | 3 | 0 | -2 |
| 0 | 1 | -3 | 1 | 2 | -3 | 0 | 1 |
| -1 | 0 | 2 | -1 | -1 | 1 | -1 | -1 |

— 10655

10660

Fig. 72c 10910. provide a first image which has at least one first quantization matrix associated therewith and which was generated by independent coding of disjoint blocks in a precursor image

↓

10911. determine potential chroma downsampling error of first image

↓

10912. Control chroma downsampling process of first image based on a relation between the potential chroma downsampling error and a chroma downsampling error threshold

↓

10915. provide an initial Quality Factor (QF) value e.g. QFnext=80

↓

10917. Compute an initial scaling factor S as follows:

IF QFnext<50 S=(5000/QFnext)/100 ELSE S=(200-2*QFnext)/100.

↓

10920. generate a new quantization matrix by scaling the at least one first quantization matrix by at least one initial scaling factor

↓

10930. use new quantization matrix generated in step 1020, for provisional independent disjoint block-level compression of the first image, thereby to generate a recompressed second image

↓

10940. compute a quality measure for the provisional compression e.g. using some or all of the quality measures described herein with reference to Figs. 1 – 11b

↓

10950: if the quality measure falls within a target quality interval, output the current recompressed second image, and otherwise, use a subsequent value, which may be computed using the method of Figs. 13A – 13B, and which is greater or smaller than the initial value for said scaling factor if the quality measure falls on one or another side of the textural change measure interval respectively.

Fig. 72d

10810. provide a first image which has at least one first quantization matrix associated therewith and which was generated by independent coding of disjoint blocks in a precursor image

↓

10812. determine chroma downsampling error of first image

↓

10815. Control chroma downsampling process of first image based on a relation between the chroma downsampling error and a chroma downsampling error threshold

↓

10820. generate a new quantization matrix by scaling a second quantization matrix, for example a default JPEG quantization matrix, using a scaling factor derived from a Modified Quality Factor (MQF), and combine it with the quantization matrix of the input JPEG image using weighted averaging, e.g. as per Fig. 19

↓

10830. use new quantization matrix computed in step 1820, for provisional independent disjoint block-level compression of the first image, thereby to generate a re-compressed second image

↓

10840. compute a quality measure for the provisional compression e.g. using some or all of the quality measures described herein with reference to Figs. 1 - 10

↓

10850: if the quality measure falls within the a target quality interval, output the current recompressed second image, and otherwise, use a subsequent MQF value, which may be computed using the method of Figs. 20A – 20B, and which is smaller or greater than said initial value for said scaling factor if the quality measure falls on one or another side of the textural change measure interval respectively.

APPARATUS AND METHODS FOR RECOMPRESSION OF DIGITAL IMAGES

REFERENCE TO APPLICATIONS

Priority is claimed from U.S. Provisional Application No. 61/248,521, filed 5 Oct. 2009; from U.S. Provisional Application No. 61/253,872, filed 22 Oct. 2009; from U.S. Provisional Application No. 61/302,193, filed 8 Feb. 2010; and from U.S. Provisional Application No. 61/329,217 filed 29 Apr. 2010, all entitled "A method and system for processing an image", from U.S. provisional application No. 61/383,750 filed 17 Sep. 2010 and entitled "recompression of digital images" and from U.S. provisional application No. 61/292,622 entitled "Recompression of digital images using a robust measure of perceptual quality including improved quantization matrix computation" filed 6 Jan. 2010.

FIELD OF THE INVENTION

The present invention relates generally to image compression and more particularly to recompression of JPEG images.

BACKGROUND OF THE INVENTION

The following references are considered to be pertinent for the purpose of understanding the background of the present invention:

[1] S. Cho, Z. Bojkovic, D. Milovanovic, J. Lee, and J. Hwang, "Image quality evaluation: JPEG2000 versus Intra-only H.264/AVC High Profile", FACTA UNIVERSITATIS Elec. Energ., vol. 20, no. 1, 71-83 (April 2007)

[2] F. De Simone, M. Ouaret F. Dufaux, A. G. Tescher, and T. Ebrahimi, "A comparative study of JPEG 2000, AVC/H.264, and HD Photo", Applications of Digital Image Processing XXX, Proceedings of SPIE, vol. 6696, San Diego, Calif. USA, 28-30; August 2007.

[3] Anthony J Maeder, Birgit M Planitz, "Medical Image Watermarking for Multiple Modalities," aipr, pp. 158-165, 34th Applied Imagery and Pattern Recognition Workshop (AIPR '05), 2005.

Re-compression of digital images such as JPEG images is well known. It is desirable to have a monotonic relationship between the extent of compression and the quality of the compressed image.

U.S. Pat. No. 6,233,359 to Ratnaker et al. describes a technique that reduces the size of an existing JPEG file or set of DCT coefficients to satisfy a certain bit budget by setting to zero coefficients whose magnitude is below a certain threshold and which occur after a certain ordinal number in the zig-zag scan. The cutoff ordinal number is chosen using a clever savings computation strategy. This strategy is implemented by filling appropriate savings values in an array of savings values, Savings[1], . . . , Savings[63]. The value Savings[n] is exactly the number of bits saved by reducing the thresholding cutoff ordinal number from n+1 to n. When a non-zero coefficient is set to zero, bits are saved because two runs of zeros (the one preceding it and the one following it) get combined into a single, longer run of zeros. The exact number of bits saved may be computed by adding the bits needed to code the previous and next runs, and subtracting the bits needed to code the combined run. Some special conditions (runs longer than 16 and end-of-block conditions) need to be carefully factored into the computation:

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide methods for at least one of the following features:

Re-encoding a discrete compressed image to reduce its size, while controlling the quality of encoding based on a quality measure of the output image relative to the input image.

Using a minimum similarity or an acceptable difference as the quality measure.

Using "perceptual identity" or "quantitative similarity difference" as the quality measure.

Using a hard-coded quality threshold level.

Setting the quality threshold level by the system operator.

Iterative image compression e.g. including Raw to JPEG and JPEG to JPEG based on a quality measure which includes an added artifactual edges measure, an added artifactual edges measure and another quality measure, an added artifactual edges measure and a texture measure, an added artifactual edges measure and a similarity (e.g. PSNR) measure, a texture measure and a similarity measure, a texture measure only.

Dependency between the texture measure threshold and the PSNR measure threshold.

Identifying blockiness along coding block boundaries, in particular 8×8 for JPEG, 4×4 for H.264, and 8×8 for H.264 High Profile. The term "blockiness" is intended to represent or quantify presence of added artifactual edges which are present after (re)compression but are not present in the image entering the (re)compression process.

Setting the compression level to maximize the file size reduction while maintaining the quality measure threshold.

Using an iterative search process to find the best compression level. Terminating the search using an optimization criterion, which may take into account a convergence criterion.

Computing the quality measure on a subset of blocks for performance optimization.

Setting the resolution of the output image to be the same or similar to the input image, possibly by padding/cropping by a small number of pixel rows/columns, for example to fit the requirements of the H.264 standard.

Setting the resolution manually by the user, or according to the requirements of a storage system or application.

Using JPEG as the input image format, or "generalized JPEG".

Using a high-quality JPEG captured by a camera at a resolution of more than 2 Megapixels as the input format.

The input image may be received from a PC, camera, mobile phone, network, data center or local storage.

The input image may be decoded to raw format, for example YUV, RGB, BMP, PNG and TIFF.

Decoding of the input image may be partial, for example to the frequency domain or the pixel domain. For example, decoding from JPEG to YUV 4:2:0 or from JPEG to the DCT domain.

Using H.264 as the encoder. Using only the Intra-image encoding part of the encoding, and disabling the inter-image encoding.

Using JPEG as the encoder

Performing local-adaptive JPEG compression by utilizing a DCT coefficient zeroing method.

Methods for improving SSIM:

Identifying smooth areas and penalizing the SSIM in these areas

Block-based SIM and averaging on poorest performing areas

Performing SSIM on randomly selected pixels instead of the whole image to improve performance Computing the Quantization Matrix characterized in that one or more of the following is provided:

Scaling the original image's quantization matrix to obtain the recompressed image's quantization matrix. Scaling a given (e.g. default or image-optimized) quantization matrix and optionally then averaging it (using a weighted average) with the original image's quantization matrix to obtain the recompressed image's quantization matrix Method for selecting a good MQF starting point for images based on their quantization matrix Method of dynamically adapting the MQF starting point and step size based on accumulated knowledge of the images Generation of disjoint block level encoded images, such as but not limited to JPEG images, which are compressed by independent coding of disjoint blocks in a precursor image, such as but not limited to JPEG encoding, is known. JPEG encoding is used throughout the digital imaging industry, and in particular in digital cameras, to encode images. With the growing resolution of digital cameras to 10 megapixel and beyond, image file sizes have grown to several megabytes, while the ease of use of digital cameras enables users to take numerous pictures. The above results in immense storage requirements for digital photo albums on the users' personal computers and on servers used by online photo services.

Commercial software such as Winsoft Advanced JPEG Compressor and Pegasus JPEG Wizard enable users to reduce the file size of JPEG images using recompression, by visibly comparing the original and recompressed files on the computer's screen, and allowing a user to set a quality for an output (recompressed) image manually, possibly, in such a manner that no visible artifacts exist in the output image. It would be clear to a person skilled in the art that it is not reasonable to use such recompression methods which require manual intervention and configuration for recompressing multiple (e.g., tens, hundreds thousands, etc.) of photos (e.g. user photos).

Intra-prediction encoding such as H.264 encoding is known. Cho et al [1] and Simone et al. [2] report that H.264 Intra frame encoding could possibly be, in some respects, more efficient than JPEG encoding. Automatic recompression of JPEG images into H.264 images or JPEG images requires an objective quality measure that takes into account the characteristics of the human visual system and its sensitivities for evaluating the output image quality.

Ringing and blockiness as a result of JPEG compression is a known phenomenon in digital images. It is desirable therefore to detect and reduce ringing and blockiness artefacts when recompressing digital images.

U.S. Pat. No. 5,790,717 to Judd describes apparatus and methods for predicting subjective quality of compressed images. The prediction is based on computing an "intensity variation loss", based on the percentage of blocks in the compressed image that have less than a pre-determined fraction of the intensity variation of a corresponding block of the reference image.

The common practice in the industry for creating a quantization matrix when compressing an image into JPEG format is to use a scaling factor to uniformly scale the default quantization matrix found in the JPEG standard. This method is used by the Independent JPEG Group (IJG) software, and other common JPEG encoding implementations. Some applications scale a different quantization matrix which is considered suited for the specific application. However, when recompressing an image that has been decoded from JPEG format image, this method does not take into account the frequency relationships that existed in the original JPEG image quantization matrix.

Certain embodiments of the present invention seek to provide a computerized system that generates a reduced size second digital image from a first digital image by compressing the first digital image to an extent determined by a perceptual compression quality measure other than a structure measure quantifying constancy of edges in the second image relative to the first image.

Certain embodiments of the present invention seek to provide a system which re-compresses a JPEG (say) image which may for example comprise the output of a digital camera, to another typically smaller JPEG image where recompression includes multiplying all or a selected subset of values of a given or default quantization matrix by a scale factor, averaging the resulting quantization matrix with the quantization matrix of the original JPEG image using a matrix of weighted average factors and using the updated quantization matrix to re-encode the input JPEG image into the output JPEG image. After applying the recompression, the JPEG-to-JPEG quality measure is compared to a criterion such as a threshold or interval. If the quality measure fails the criterion, the scaling factor is modified, recompression is repeated, and the quality measure re-computed. When the quality measure meets the criterion, the process is terminated.

The term "scaling" as used herein typically includes multiplying by a scaling factor to obtain a product and approximating that product by a nearby integer by a suitable process such as rounding or truncation.

Other embodiments of the present invention seek to provide a system which re-compresses a JPEG (say) image which may for example comprise the output of a digital camera, to another typically smaller H.264 Intra frame image where recompression includes utilizing an H.264 QP (Quality Parameter) for encoding the input image. After applying the recompression, the JPEG-to-H.264 quality measure is compared to a criterion such as a threshold or interval. If the quality measure fails the criterion, the QP is modified, recompression is repeated, and the quality measure re-computed. When the quality measure meets the criterion, the process is terminated.

It is appreciated that "iteratively compressing" is used herein to mean a compression operation including one or more iterations. "Compressing" or "iteratively compressing" as used herein is intended to include a typically iterative process wherein in a first round, one or more images or portions thereof are provisionally compressed using provisional compression parameters such as a QP (quantization parameter) or a scaling factor as described herein. Then, results of the provisional compression are subjected to analysis (such as computation of a quality measure e.g. an SSIM quality measure or any of the quality measures described herein) to determine how satisfactory they are. In a subsequent iteration, if required, one or more images or portions thereof, which may or may not be the same as the images or portions provisionally compressed in the first round, are subsequently compressed using post-analysis compression parameters derived from the analysis. For example, a new QP or scaling factor value may be computed as a function of the QP or scaling factor used in the first round and of at least one quality measure computed during the analysis. Each subsequent round may of course in some variations serve as a "first round" for an additional subsequent round, such that the process may be iterative. Many variations of iterative compression are known such as but not limited to single pass compression, double pass compression and multi-pass compression and the particular iteration method is typically application-dependent.

Generally, terms used herein may be construed either in accordance with any definition thereof appearing in the prior art literature or in accordance with the specification.

SSIM is a conventional measure of structural similarity. In brief, SSIM is focused on preservation, in a compressed image, of structural features of the pre-compressed image such as edges, external contours, and internal boundaries. It has been posited that an SSIM value equal or greater than 0.95 represents images which are perceptually identical (e.g. in above-referenced publication [3]). However, even though 0.95 has been considered to be an acceptable SSIM value for globally evaluating perceptual similarity between images, it was found that even at an SSIM value of almost 0.98, some images suffered noticeable perceptual degradation in certain areas of the compressed image. Examples of types of image which may suffer noticeable perceptual degradation if recompressed using the SSIM measure, even when the SSIM value used is 0.95, include images with very smooth (untextured) areas such as sky, particularly if these areas were large, dark, or both, and images including significant textured (high-frequency) surfaces, such as images depicting freckles and skin texture.

In certain state of the art image compression systems, a major concern is texture loss due to excessive deep compression and there is no teaching as to achievement of perceptually lossless compression by avoidance of textural artifacts, such as ringing, generated as an artifact of tandem compression. In tandem compression, initial compression is followed by high quality recompression which does not eliminate high frequency data hence does not cause perceptual loss of texture but unfortunately may tend to introduce textural artifacts.

There is thus provided, in accordance with at least one embodiment of the present invention, a method for generating a second reduced size digital image from a first digital image, the method including iteratively compressing the first digital image to an extent determined by a blockiness measure quantifying added artifactual edges along coding block boundaries in the second image.

Still further in accordance with at least one embodiment of the present invention, the recompression comprises block-based coding of the first image to obtain the second image, thereby to define coding blocks having boundaries, and wherein the blockiness measure is computed by identifying artifactual edges added along coding block boundaries.

As an example, the blockiness measure may include: computing a difference image between the first and second images; defining a region within the difference image, the region comprising a plurality of image blocks; within the region, computing for each boundary between two coding blocks a respective added-blockiness score indicating an extent of added artifactual edges along the respective boundary; computing a region quality score based on the added-blockiness scores computed for each boundary within the region; and determining based at least upon the region quality score whether a perceptual quality criterion is met by the second image. It is appreciated that a small image may include only a single region.

Further by way of example, implementing the blockiness measure may include defining a plurality of regions within the difference image, each region comprising a plurality of image blocks, computing a region quality score for each of the plurality of regions, giving rise to a respective plurality of region quality scores, and computing an image quality score for the second image based on the plurality of region quality scores, and wherein determining whether a perceptual criterion is met by the second image, comprises determining based at least upon the image quality score whether a perceptual quality criterion is met by the second image.

Still further by way of example, implementing a measure and determining whether a perceptual quality criterion is met are part of a search for a compression parameter, the search further including: if it is determined that the quality score for the second image does not meet a perceptual quality criterion, the first image is recompressed using different compression parameters, giving rise to a third image, and wherein implementing a quality measure and determining whether a perceptual quality criterion is met are implemented with respect to the third image.

Still further by way of example compressing and searching are implemented iteratively, and at each iteration a different amount of compression is applied relative to a previous iteration giving rise to a recompressed provisional output image, and wherein the search ends when the quality score for a current recompressed provisional output image meets the perceptual quality criterion.

In yet another example, the first image is an input image and the second image is a provisionally compressed image, and the compressing is carried out using provisional compression parameters, and wherein a further iteration of the search is invoked if it is determined that the quality score for the second image fails to meet a perceptual quality criterion.

In still a further example, if it is determined that the quality score for the second image does not meet a perceptual quality criterion, the provisional compression parameters are adjusted and the provisional compression, the search and determining are repeated. In yet a further example, adjusting the provisional compression parameters further comprises, evaluating an estimated added compression which is expected to be achieved by compressing the input image using the provisional compression parameters and repeating the provisional compression, the search for a compression parameter and the determining whether a perceptual quality criterion is met only if the estimated added compression exceeds a compression threshold.

According to certain embodiments, a first compressed image is recompressed using a quantization matrix e.g. by following a suitable process for independent disjoint block-level recompression of a first image generated by independent coding of disjoint blocks in a precursor image, the first image having at least one first quantization matrix associated therewith. For example, the process may include performing at least one iterative independent disjoint block-level compression operation on the first image thereby to generate a re-compressed second image including generating a new quantization matrix and using said new quantization matrix for said independent disjoint block-level compression, wherein the new quantization matrix is generated by scaling at least one second quantization matrix by at least one scaling factor, thereby to provide at least one scaled matrix, and subsequently computing at least one additional quantization matrix as a weighted average of the at least one scaled matrix with the at least one first quantization matrix.

The quantization matrix used above may be formed by scaling, say, a JPEG standard default quantization matrix or a quantization matrix selected to match image characteristics such as frequency content, using known techniques. Typically, an MQF (Modified Quality Factor) is translated into a scaling factor which actually scales the matrix, just as in conventional JPEG, a QF (Quality Factor) is translated into a scaling factor which actually scales the matrix.

According to certain embodiments, the scaling factor for the above scaling process may be a function of an MQF value. Performing a search for an appropriate MQF value may include providing an initial MQF e.g. a default value which has worked well for average images or a value suited to some characteristic of the first image such as a quantization matrix thereof. The initial. MQF may in fact be practically any number between, say, 1 an 100, however, a poor e.g. merely random choice unnecessarily lengthens the search process. A step size may be selected anywhere in the range of, say, 1 to 100 e.g. 10, however again, a poor e.g. merely random choice hampers the search process. The search enables a good or best MQF value for that image to be found, yielding good or maximum compression given an imposed acceptable level of perceptual degradation between the first and second images. The term "perceptual degradation" as used herein refers to an appearance to a human viewer, that the quality or accuracy of an image has deteriorated as a result of its recompression. Perceptual degradation as used here is irrespective of the quality of the image pre-recompression and relates only to deterioration actually introduced by recompression.

The term "Provisional compression parameters" as used herein includes but is not limited to an MQF value.

According to certain embodiments, an initial MQF value is generated and checked; if the perceptual degradation resulting from use of recompression based on that MQF value falls within a target perceptual degradation range—the MQF selection process is finished and the initial MQF value is treated as final. If not, an improved MQF value is computed from the initial value e.g. based on bisection of the lower or higher half of a range of valid MQF values, e.g. 1 to 100 or 50 to 98. The half-range to be bisected depends on whether the degradation resulting from initial MQF value-based recompression falls above or below the target perceptual degradation range. Alternatively, any other search scheme may be employed, such as a secant based search.

The search for a better or best value typically has an application-specific finite resolution, e.g. integer resolution, or the closest value given a certain condition such as a predefined distance or tolerance. Typically but not necessarily, resolution is projected to the perceptual error plane as described herein.

It is appreciated that iteratively searching for a best MQF may use but does not necessarily use an initial MQF as described herein; alternatively any "default" initial MQF may be employed. The best MQF, or any other MQF or alternative factor including a default, may be used for computing a new quantization matrix as described herein and may also be used for other purposes and applications as known and as described herein.

Also provided, in accordance with at least one embodiment of the present invention, is a computer program product, comprising a computer usable medium having a computer readable program code embodied therein, the computer readable program code adapted to be executed to implement any of the recompression methods shown and described herein.

Also provided is a computer program product, comprising a computer usable medium or computer readable non-transitive storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable non-transitive storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards or devices such as USB Flash drives, for storing, and keyboard or mouse for accepting. The term "process" as used above is intended to include any type of computation or manipulation or transformation of data represented as physical, e.g. electronic, phenomena which may occur or reside e.g. within registers and for memories of a computer.

The above devices may optionally communicate via any conventional wired or wireless digital communication means, e.g. via a wired or cellular telephone network or a computer network such as the Internet.

The apparatus of the present invention may include, according to certain embodiments of the invention, machine readable memory containing or otherwise non-transitively storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating". "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of non-transitive electronic device with data processing capabilities, including, by way of non-limiting example, personal computers, servers, computing system, communication devices, processors (e.g. digital signal processor (DSPI), microcontrollers, field programmable gate array (FPGA), application specific integrated circuit (ASIC), Central Processing Unit (CPU), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

In accordance with an aspect of the invention, there is thus provided a method of enabling an image-adaptive, perceprually-lossless and near-maximal image compression, including compressing a first image giving rise to a second image; implementing a measure of added artifactual edges along coding block boundaries, including computing a difference image between the first and second images; defining a region within the difference image, the region comprising a plurality of image blocks; within the region, computing for each boundary between two coding blocks a respective added-blockiness score indicating an extent of added artifactual edges along the respective boundary; computing a region quality score based on the added blockiness scores computed for each boundary within the region; and determining based at least upon the region quality score whether a perceptual quality criterion is met by the second image.

In accordance with an embodiment of the invention, there is provided a method wherein the implementing comprises defining a plurality of regions within the difference image, each region comprising a plurality of image blocks, computing a region quality score for each of the plurality of regions, giving rise to a respective plurality of region quality scores; and computing an image quality score for the second image based on the plurality of region quality scores, and wherein the determining, comprises determining based at least upon the image quality score whether a perceptual quality criterion is met by the second image.

In accordance with an embodiment of the invention, there is further provided a method, wherein, the first image is an input image and the second image is a provisionally compressed image, and the compressing is carried out using provisional compression parameters, and wherein a further iteration of a search for improved compression parameters is invoked if it is determined that the quality score for the second image does not lie within a predetermined perceptual quality range.

In accordance with an embodiment of the invention, there is still further provided a method comprising, if it is determined that the quality score for the second image does not meet a perceptual quality criterion, recomputing the provisional compression parameters and repeating the provisional compression, the search and the determining.

In accordance with an embodiment of the invention, there is still further provided a method, wherein the first image is an input image, and wherein the input image is a disjoint block level encoded image compressed by independent coding of disjoint blocks in a precursor image.

In accordance with an embodiment of the invention, there is still further provided a method, wherein the second image is a disjoint block level encoded image generated from the first digital image by independently coding disjoint blocks in the first image.

In accordance with an embodiment of the invention, there is still further provided a method, wherein the first and second images are JPEG images.

In accordance with an embodiment of the invention, there is still further provided a method, wherein the compressing comprises, at each individual iteration from among the iterations, adapting a compression parameter based on at least one iteration previous to the individual iteration.

In accordance with an embodiment of the invention, there is still further provided a method, wherein the compressing comprises, at each individual iteration from among the iterations, adapting a compression parameter based on all iterations previous to the individual iteration.

In accordance with an embodiment of the invention, there is still further provided a method comprising providing compression instructions based at least in part on the region quality score.

In accordance with an embodiment of the invention, there is still further provided a method, wherein at least two region quality scores are computed for a corresponding set of at least two regions in the output image and wherein the providing compression instructions is based at least in part on the at least two region quality scores.

In accordance with an embodiment of the invention, there is still further provided a method, wherein the compressing comprises iteratively compressing a first digital image into a second reduced size digital image to an extent determined by a blockiness measure quantifying absence of blockiness of the second image.

In accordance with an embodiment of the invention, there is still further provided a method, wherein the blockiness measure comprises a measure of absence of blockiness of the second image relative to the first image.

In accordance with an embodiment of the invention, there is still further provided a method, wherein the extent to which the first digital image is iteratively compressed is also determined by a quality measure other than the blockiness measure.

In accordance with an embodiment of the invention, there is still further provided a method, wherein the quality measure comprises a textural measure quantifying textural similarities between the first and second images.

In accordance with an embodiment of the invention, there is still further provided a method wherein the quality measure comprises a local similarity measure quantifying local similarities between the first and second images.

In accordance with an embodiment of the invention, there is still further provided a method, wherein the first image comprises a compressed image such that the iterative compressing comprises a process of recompression.

In accordance with an embodiment of the invention, there is still further provided a method, wherein the first digital image comprises a disjoint block level encoded image compressed by independent coding of disjoint blocks in a precursor image.

In accordance with an embodiment of the invention, there is still further provided a method, wherein the second digital image comprises a disjoint block level encoded image generated from the first digital image by independently coding disjoint blocks in the first image.

In accordance with an embodiment of the invention, there is still further provided a method, wherein the disjoint block level encoded image comprises a JPEG encoded image.

In accordance with an embodiment of the invention, there is still further provided a method, wherein the second digital image comprises an intra-prediction encoded image.

In accordance with an embodiment of the invention, there is still further provided a method, wherein the first digital image comprises an intra-prediction encoded image.

In accordance with an embodiment of the invention, there is still further provided a method, wherein the intra-prediction encoded image comprises an H.264 image.

In accordance with an embodiment of the invention, there is still further provided a method, wherein the compressing comprises iteratively compressing a first digital image into a second reduced size digital image to an extent determined by a plurality of quality measures including a local similarity measure and by a texture change measure.

In accordance with an embodiment of the invention, there is still further provided a method, wherein the extent is determined such that a first texture change between the first and second images is tolerated if the local similarity measure is high whereas only a second texture change between the first and second images, smaller than the first texture change, is tolerated if the local similarity measure is low.

In accordance with an embodiment of the invention, there is still further provided a method, wherein the recompression comprises block-based coding of the first image to obtain the second image, thereby to define coding blocks having boundaries, and wherein the blockiness measure is computed by identifying artifactual edges added along coding block boundaries.

In accordance with an embodiment of the invention, there is still further provided a method, wherein the block-based coding comprises JPEG coding and the coding blocks comprise 8 pixel×8 pixel blocks.

In accordance with an embodiment of the invention, there is still further provided a method, wherein the block-based coding comprises H.264 coding and the coding blocks comprise 4 pixel×4-pixel blocks.

In accordance with an embodiment of the invention, there is still further provided a method, wherein the block-based coding comprises H.264 High Profile coding and the coding blocks comprise 8 pixel×8 pixel blocks.

In accordance with an embodiment of the invention, there is still further provided a method, wherein the first image comprises a compressed image such that the iterative compressing comprises a process of recompression.

In accordance with an embodiment of the invention, there is still further provided a method, wherein the texture measure comprises a quantitative measure of changes in texture of corresponding areas between the first and second digital images and wherein the recompression comprises pixel-group-based coding defining groups of pixels and wherein the groups define the corresponding areas.

In accordance with an embodiment of the invention, there is still further provided a method, comprising independent disjoint block-level recompression of the first image generated by independent coding of disjoint blocks in a precursor image, the first image having at least one first quantization matrix associated therewith, including performing at least one iterative independent disjoint block-level compression operation on the first image thereby to generate a recompressed second image including generating a new quantization matrix by scaling the at least one first quantization matrix by at least one scaling factor and using the new quantization matrix for the independent disjoint block-level compression.

In accordance with an embodiment of the invention, there is still further provided a method, wherein the block-based coding comprises H.264 coding and the areas comprise 4 pixel×4 pixel blocks.

In accordance with an aspect of the invention, there is still further provided a computerized method that iteratively compresses a first digital image into a second reduced size digital image to an extent determined by a texture change measure including performing at least one initial compression using at least one initial compression parameter; evaluating the initial compression by computing a textural change measure; determining whether the texture change measure falls within a textural change measure interval; and if the textural change measure falls within the textural change measure interval terminating the method, and otherwise, compressing further using a further compression parameter larger or smaller than the initial compression parameter if the textural change measure falls on one or another side of the textural change measure interval respectively.

In accordance with an embodiment of the invention, there is still further provided a method, comprising independent disjoint block-level recompression of the first image generated by independent coding of disjoint blocks in a precursor image, the first image having at least one first quantization matrix associated therewith, including performing at least one iterative independent disjoint block-level compression operation on the first image thereby to generate a recompressed second image including generating a new quantization matrix by scaling the at least one first quantization matrix by at least one scaling factor and using the new quantization matrix for the independent disjoint block-level compression.

In accordance with an aspect of the invention, there is still further provided a method for independent disjoint block-level recompression of a first image generated by independent coding of disjoint blocks in a precursor image, the first image having at least one first quantization matrix associated therewith, the method comprising: performing at least one iterative independent disjoint block-level compression operation on the first image thereby to generate a recompressed second image including generating a new quantization matrix by scaling the at least one first quantization matrix by at least one scaling factor and using the new quantization matrix for the independent disjoint block-level compression.

In accordance with an embodiment of the invention, there is still further provided a method, wherein the independent disjoint block-level recompression comprises JPEG-to-JPEG recompression and the independent disjoint block-level recompression comprises a JPEG operation.

In accordance with an embodiment of the invention, there is still further provided a method, wherein the scaling comprises multiplying all entries in the at least one quantization matrix by a single numerical value.

In accordance with an embodiment of the invention, there is still further provided a method, wherein the scaling includes multiplying by the scaling factor to obtain a product and approximating the product by a nearby integer.

In accordance with an embodiment of the invention, there is still further provided a method, comprising evaluating perceptual quality obtained by an individual independent disjoint block-level compression operation and, if unsatisfactory, initiating an additional independent disjoint block-level compression operation using a different scaling factor than that used in the individual independent disjoint block-level compression operation.

In accordance with an embodiment of the invention, there is still further provided a method, wherein the perceptual quality is considered unsatisfactory both if the quality is unacceptably low and if the quality is high enough to justify use of a higher scaling factor.

In accordance with an aspect of the invention, there is still further provided a computerized system that generates a second reduced size digital image from a first digital image by iteratively compressing the first digital image, to an extent determined by a blockiness measure quantifying absence of blockiness of the second image.

In accordance with an aspect of the invention, there is still further provided a computerized system that iteratively compresses a first digital image into a second reduced size digital image to an extent determined by a local similarity measure and by a texture change measure.

In accordance with an embodiment of the invention, there is still further provided a method, wherein the plurality of quality measures are mutually normalized and the extent depends on a product.

In accordance with an embodiment of the invention, there is still further provided a method, wherein the first image is provisionally compressed using provisional compression parameters and if the product passes a first threshold and at least one of the plurality of quality measures independently passes a second threshold, then the provisional compression parameters are used for subsequent compression.

In accordance with an embodiment of the invention, there is still further provided a method, wherein the performing comprises using an initial value for the scaling factor, computing a quality measure characterizing a provisional independent disjoint block-level compression operation on the first image based on the initial value, and if the quality measure falls within a target quality interval terminating the method, and otherwise, compressing further using a subsequent value which is greater or smaller than the initial value for the scaling factor if the quality measure falls on one or another side of the target quality interval respectively.

In accordance with an aspect of the invention, there is still further provided a method for independent disjoint block-level recompression of a first image generated by independent coding of disjoint blocks in a precursor image, the first image having at least one first quantization matrix associated therewith, the method comprising: performing at least one iterative independent, disjoint block-level compression operation on the first image thereby to generate a recompressed second image including generating a new quantization matrix and using the new quantization matrix for the independent disjoint block-level compression, wherein the new quantization matrix is generated by scaling at least one second quantization matrix by at least one scaling factor, thereby to provide at least one scaled matrix, and subsequently computing at least one additional quantization matrix as a weighted average of the at least one scaled matrix with the at least one first quantization matrix.

In accordance with an embodiment of the invention, there is still further provided a method, wherein the at least one second quantization matrix comprises at least one default quantization matrix specified in the JPEG standard.

In accordance with an embodiment of the invention, there is still further provided a method, wherein the at least one second quantization matrix comprises at least one optimal quantization matrix computed for the image.

In accordance with an embodiment of the invention, there is still further provided a method, wherein at least one second quantization matrix is the same as at least one first quantization matrix.

In accordance with an embodiment of the invention, there is still further provided a method, wherein the independent disjoint block-level recompression comprises JPEG-to-JPEG recompression and the independent disjoint block-level recompression comprises a JPEG operation.

In accordance with an embodiment of the invention, there is still further provided a method, wherein the scaling comprises multiplying all entries in the at least one quantization matrix by a single numerical value.

In accordance with an embodiment of the invention, there is still further provided a method, wherein scaling includes multiplying by the scaling factor to obtain a product and approximating the product by a nearby integer.

In accordance with an embodiment of the invention, there is still further provided a method, wherein the weighted average is computed by multiplying each entry in the at least one scaled quantization matrix by a corresponding entry of an at least one weighting matrix, the weighting matrix entries comprising values between 0 and 1, to produced a first weighted component; multiplying each entry in the at least one first quantization matrix by a value of one minus the value of the corresponding entry of an at least one weighting matrix to produce a second weighted component; and adding the first weighted component to the second weighted component values to produce the weighted average element value of the at least one additional quantization matrix.

In accordance with an embodiment of the invention, there is still further provided a method, wherein all elements of the at least one weighting matrix are identical.

In accordance with an embodiment of the invention, there is still further provided a method, wherein all elements of the at least one weighting matrix equal to 0.5.

In accordance with an embodiment of the invention, there is still further provided a method, wherein all elements of the at least one weighting matrix equal to 1.

In accordance with an embodiment of the invention, there is still further provided a method, comprising evaluating perceptual quality obtained by an individual independent disjoint block-level compression operation and, if unsatisfactory, initiating an additional independent disjoint block-level compression operation using a different scaling factor than that used in the individual independent disjoint block-level compression operation.

In accordance with an embodiment of the invention, there is still further provided a method, wherein the perceptual quality is considered unsatisfactory both if the quality is unacceptably low and if the quality is high enough to justify use of a higher scaling factor.

In accordance with an embodiment of the invention, there is still further provided a system, wherein the first digital image is iteratively compressed by a plurality of iterations.

In accordance with an embodiment of the invention, there is still further provided a method, wherein the plurality of quality measures are mutually normalized and the extent depends on a weighted geometric mean of the mutually normalized plurality of quality measures.

In accordance with an embodiment of the invention, there is still further provided a method, wherein the intra-prediction encoded image comprises an H.264 image.

In accordance with an aspect of the invention, there is still further provided a computer program product, comprising a computer usable medium having a computer readable program code embodied therein, the computer readable program code adapted to be executed to implement any of the recompression methods shown and described herein.

In accordance with an embodiment of the invention, there is still further provided a method, comprising independent disjoint block-level recompression of the first image generated by independent coding of disjoint blocks in a precursor image, the first image having at least one first quantization matrix associated therewith, including performing at least one iterative independent disjoint block-level compression operation on the first image thereby to generate a recompressed second image including generating a new quantization matrix by scaling the at least one first quantization matrix by at least one scaling factor and using the new quantization matrix for the independent disjoint block-level compression.

In accordance with an aspect of the invention, there is still further provided a an image recompression method comprising recompressing various images using a recompression process based on at least one parameter, wherein recompression of at least one individual image from among the various images includes performing a search, within a set of suitable values for the parameter, for a suitable parameter value to be used for recompression of the individual first image, including selecting one parameter value in the set over at least one other parameter value which is found to be less suited for recompression of the individual first image.

In accordance with an embodiment of the invention, there is still further provided a method, wherein recompression of at least one individual image from among the various images includes performing a search, within a set of suitable MQF values, for a MQF value suitable for the individual image; and employing the MQF value in scaling a quantization matrix used in recompression of the individual first image.

In accordance with an embodiment of the invention, there is still further provided a method, wherein the search is characterized by its initial MQF value, and wherein the initial MQF value is determined at least partly based on at least one characteristic of the first image.

In accordance with an embodiment of the invention, there is still further provided a method, wherein the search is characterized by its step size and the step size is determined at least partly based on at least one characteristic of the first image.

In accordance with an embodiment of the invention, there is still further provided a method, wherein the at least one first image characteristic includes a quantization matrix characterizing the first image.

In accordance with an embodiment of the invention, there is still further provided a method, wherein at least one parameter of the search is determined at least partly based on knowledge accumulated in the course of relevant previously performed image recompression processes.

In accordance with an embodiment of the invention, there is still further provided a method, wherein the parameter includes an initial MQF value.

In accordance with an embodiment of the invention, there is still further provided a method, wherein the parameter includes a step size.

In accordance with an embodiment of the invention, there is still further provided a method, wherein the relevant previously performed image recompression processes include recompressions of images having a quantization matrix at least similar to the quantization matrix of the individual first image.

In accordance with an embodiment of the invention, there is still further provided a method, wherein a search, within a set of suitable MQF values, for a suitable MQF value for scaling a quantization matrix to be used for recompressor of an individual first image is performed.

In accordance with an embodiment of the invention, there is still further provided a method, wherein the quantization matrix is used to compute a final quantization matrix which recompresses the individual first image.

In accordance with an embodiment of the invention, there is still further provided a method, wherein the step size is selected to be small or large, based on how closely or disparately MQF values used for images sharing a quantization matrix, cluster around a selected initial MQF value.

In accordance with an embodiment of the invention, there is still further provided a method, wherein a search, within a set of suitable MQF values, for a suitable MQF value for scaling a quantization matrix to be used for recompression of an individual first image is performed.

In accordance with an embodiment of the invention, there is still further provided a method, wherein a search, within a set of suitable MQF values, for a suitable MQF value for scaling a quantization matrix to be used for recompression of an individual first image is performed.

In accordance with an embodiment of the invention, there is still further provided a method, wherein a search, within a set of suitable MQF values, for a suitable MQF value for scaling a quantization matrix to be used for recompression of an individual first image is performed.

In accordance with an embodiment of the invention, there is still further provided a method, wherein a search, within a set of suitable MQF values, for a suitable MQF value for scaling a quantization matrix to be used for recompression of an individual first image is performed.

In accordance with an embodiment of the invention, there is still further provided a method, wherein a search, within a set of suitable MQF values, for a suitable MQF value for scaling a quantization matrix to be used for recompression of an individual first image is performed.

In accordance with an embodiment of the invention, there is still further provided a method, wherein a search, within a set of suitable MQF values, for a suitable MQF value for scaling a quantization matrix to be used for recompression of an individual first image is performed.

In accordance with an embodiment of the invention, there is still further provided a method, wherein the quantization matrix is used to compute a final quantization matrix which recompresses the individual first image.

In accordance with an aspect of the invention, there is still further provided an image recompression system comprising an image recompression subsystem operative for recompressing various images using a recompression process based on at least one recompression parameter, wherein the subsystem includes a recompression parameter definer operative for performing a search, within a set of suitable values for the parameter, for a suitable parameter value to be used for recompression of at least one individual first image from among the various images, including selecting one parameter value in the set over at least one other parameter value which is found to be less suited for recompression of the individual first image.

In accordance with an aspect of the invention, there is still further provided an image recompression system comprising an image recompression subsystem operative for recompressing various images using a recompression process based on at least one recompression parameter; and a historical archive of recompression parameter values in association with at least one image characteristic of images found historically to be suitable for recompression using the parameter values; and wherein the recompression subsystem is operative for determining a suitable parameter value to be used for recompression of at least one individual first image from among the various images by finding in the historical archive at least one recompression parameter values associated with image characteristics at least similar at least one corresponding image characteristic of the individual first image.

In accordance with an embodiment of the invention, there is still further provided a system, wherein the recompression parameter includes an initial MQF value initializing a search for a better MQF value.

In accordance with an embodiment of the invention, there is still further provided a system, wherein the image characteristic comprises a quantization matrix.

In accordance with an embodiment of the invention, there is still further provided a method, wherein the recompression parameter includes a step size characterizing a search for a better MQF value.

In accordance with an embodiment of the invention, there is still further provided a method, wherein the iteratively compressing includes a plurality of iterations.

In accordance with an embodiment of the invention, there is still further provided a method comprising independent disjoint block-level recompression of a first image generated by independent coding of disjoint blocks in a precursor image, the first image having at least one first quantization matrix associated therewith, the independent recompression comprising performing at least one iterative independent disjoint block-level compression operation on the first image thereby to generate a re-compressed second image including generating a new quantization matrix and using the new quantization matrix for the independent disjoint block-level compression, wherein the new quantization matrix is generated by scaling at least one second quantization matrix by at least one scaling factor, thereby to provide at least one scaled matrix, and subsequently computing at least one additional quantization matrix as a weighted average of the at least one scaled matrix with the at least one first quantization matrix.

In accordance with an embodiment of the invention, there is still further provided a method comprising independent disjoint block-level recompression of a first image generated by independent coding of disjoint blocks in a precursor image, the first image having at least one first quantization matrix associated therewith, the independent recompression comprising performing at least one iterative independent disjoint block-level compression operation on the first image thereby to generate a re-compressed second image including generating a new quantization matrix and using the new quantization matrix for the independent disjoint block-level compression, wherein the new quantization matrix is generated by scaling at least one second quantization matrix by at least one scaling factor, thereby to provide at least one scaled matrix, and subsequently computing at least one additional quantization matrix as a weighted average of the at least one scaled matrix with the at least one first quantization matrix.

In accordance with an embodiment of the invention, there is still further provided a method comprising independent disjoint block-level recompression of a first image generated by independent coding of disjoint blocks in a precursor image, the first image having at least one first quantization matrix associated therewith, the independent recompression comprising performing at least one iterative independent disjoint block-level compression operation on the first image thereby to generate, a re-compressed second image including generating a new quantization matrix and using the new quantization matrix for the independent disjoint block-level compression, wherein the new quantization matrix is generated by scaling at least one second quantization matrix by at least one scaling factor, thereby to provide at least one scaled matrix, and subsequently computing at least one additional quantization matrix as a weighted average of the at least one scaled matrix with the at least one first quantization matrix.

In accordance with an embodiment of the invention, there is still further provided a system, wherein the first digital image is iteratively compressed by a plurality of iterations.

In accordance with an embodiment of the invention, there is still further provided a method, wherein the disjoint block level encoded image comprises a JPEG encoded image.

In accordance with an embodiment of the invention, there is still further provided a method, wherein all elements of the at least one weighting matrix equal to 1.

Local adaptive methods shown and described herein include but are not limited to the following:

A recompression method comprising:

Compressing each individual block in at least one image plane of an image to be re-compressed, including:

JPEG-coding said individual block, using a global quantization matrix, thereby to obtain a proposed output block of integers; and For at least one individual region in the image plane:

generating a regional compression parameter defining a region-specific level of compression which will guarantee no more than a controlled amount of perceptual degradation of said region;

generating a regional quantization matrix from said regional compression parameter, and for at least one particular block in said individual region, determining whether at least one entry would have been zero if said JPEG-coding step applied to said particular block had used said regional quantization matrix rather than said global quantization matrix and if so, zeroing said at least one entry in the proposed output block JPEG-coded from said particular block.

Optionally, said JPEG-coding comprises DCT-transforming said individual block, quantizing each DCT-transformed block by dividing each entry therewithin by a corresponding entry in the global quantization matrix, thereby to obtain a block of numbers, and rounding said numbers to obtain a proposed output block of integers.

Optionally, said regional compression parameter is generated by performing a search, within a set of suitable values for said regional compression parameter, for a suitable parameter value to be used for recompression of said region.

Optionally, the method also includes selecting one parameter value in said set over at least one other parameter value which is found to be less suited for recompression of said region.

Optionally, the regional compression parameter comprises an MQF value.

Optionally, said search is computed for at least one first region and subsequently for at least one additional region adjacent to said at least one first region and wherein, when the search is performed for said additional region, said suitable parameter value initiating the search is based at least partly on a final regional compression parameter value generated by said search for said at least one first region.

Optionally, said at least one first region comprises a region adjacent said additional region along a row and a region adjacent said additional region along a column and wherein said suitable parameter value initiating the search is based at least partly on combining final regional compression parameter values generated by said search for said regions adjacent along said row and said column.

Optionally, the method also comprises computing said region-specific level of compression is computed, for a first region comprising a plurality of image blocks, including compressing the first region giving rise to a second region, using a current level of compression; using a measure of added artifactual edges along coding block boundaries to compute a region quality score for said first region; and comparing said region quality score to a desired quality threshold including increasing or decreasing said current level of compression if said region quality score is respectively higher or lower than said quality threshold and returning to said compressing including using said increased or decreased level of compression as a current level; and using said current level of compression as said region-specific level of compression if said region quality score is predeterminedly close to said quality threshold.

Optionally, using a measure comprises computing a difference image between the first and second images, computing, within said region, for each boundary between two coding blocks a respective added-blockiness score indicating an extent of added artifactual edges along the respective boundary; and computing a region quality score based on the added-blockiness scores computed for each boundary within the region.

Optionally, said measure is based on a computation of local similarity and texture.

Optionally, said measure is also based on a computation of local similarity and texture.

Any reference herein to MQF or QF may if desired be replaced by use of any suitable parameter defining a level of compression for a particular image or portion thereof, as appropriate, which will guarantee no more than a controlled amount of perceptual degradation of the image or portion thereof, which degradation may be suitably operationalized e.g. by computation of a QS value. The controlled amount of perceptual degradation may be zero in which case perceptual losslessness is guaranteed by the level of compression defined by the parameter. In JPEG, the parameter typically defines level of compression by being used as a conventional QF value is used, to generate a JPEG quantization matrix which directly determines the level of compression. Perceptual degradation may for example be defined based on any suitable combination of one or more of the following: local similarity, texture and blockiness.

There is provided according to an aspect of the present invention a system for processing a discrete input image to a reduced-size discrete output image, comprising an interface adapted to receive a discrete input image compressed by a compression format utilizing independent coding of disjoint blocks; a quality parameter controller adapted to provide an encoding-quality parameter enabling a substantial size reduction of the discrete output image, wherein the parameter is related to a target quantitative-similarity measure between the output image and the input image; and an intra-prediction encoder adapted to re-encode the input image, wherein re-encoding includes intra-image prediction, and wherein the encoder is configured in accordance with the encoding-quality parameter.

Further in accordance with certain embodiments of the present invention, the discrete input image is a standard JPEG image.

Still further in accordance with certain embodiments of the present invention, the output image is provided in a standard H.264 format.

Also provided, in accordance with certain embodiments of the present invention, is a system for processing a discrete input image to a reduced-size discrete output image, comprising an interface is adapted to receive a discrete input image compressed by a compression format utilizing wavelets with lossless or lossy quantization and block-by-block bit-plane entropy coding; a quality parameter controller adapted to provide an encoding-quality parameter enabling a substantial size reduction of the discrete output image, wherein the parameter is related to a target quantitative-similarity measure between the output image and the input image; and an intra-prediction encoder adapted to re-encode the input image, wherein re-encoding includes intra-image prediction, and wherein the encoder is configured in accordance with the encoding-quality parameter.

Still further in accordance with certain embodiments of the present invention, the discrete input image is a standard JPEG 2000 image.

Additionally in accordance with certain embodiments of the present invention, the output image is provided in a standard H.264 format.

Also provided, in accordance with certain embodiments of the present invention, is a method processing a discrete input image to a reduced-size discrete output image, comprising receiving a discrete input image compressed by a compression format utilizing independent coding of disjoint blocks; providing an encoding-quality parameter enabling a substantial size reduction of the discrete output image, wherein the parameter is related to a target quantitative-similarity measure between the output image and the input image; and re-encoding the input image, wherein re-encoding includes intra-image prediction, and a quantization step that is configured in accordance with the encoding-quality parameter.

Additionally provided, in accordance with certain embodiments of the present invention, is a method processing a discrete input image to a reduced-size discrete output image, comprising receiving a discrete input image compressed by a compression format utilizing wavelets with lossless or lossy quantization and block-by-block bit-plane entropy coding; providing an encoding-quality parameter enabling a substantial size reduction of the discrete output image, wherein the parameter is related to a target quantitative-similarity measure between the output image and the input image; and re-encoding the input image, wherein re-encoding includes intra-image prediction, and a quantization step that is configured in accordance with the encoding-quality parameter.

Still further provided, in accordance with certain embodiments of the present invention, is a system for processing a plurality of input images to provide a respective plurality of reduced-size output images, comprising an interface adapted to receive a plurality of discrete input images compressed by a compression format utilizing independent coding of disjoint blocks or compressed by a compression format utilizing wavelets with lossless or lossy quantization and block-by-block bit-plane entropy coding; a quality parameter controller adapted to provide for each one of the plurality of input images an encoding-quality parameter enabling a substantial size reduction of the respective discrete output image, wherein the parameter is related to a target quantitative-similarity measure between the respective output image and input image pair; and an intra-prediction encoding controller adapted to re-encode each one of the plurality of input images, wherein re-encoding includes intra-image prediction, and wherein the encoder is configured in accordance with the respective encoding-quality parameter provided for each one of the plurality of input images.

Further in accordance with certain embodiments of the present invention, the system further comprises a plurality of quality parameters control instances under the control of the quality parameter controller, and wherein each one of the plurality of quality parameters control instances is assigned with one or more of the plurality of input images and is adapted to provide for each one of the input images assigned thereto an encoding-quality parameter enabling a substantial size reduction of the respective discrete output image, wherein the parameter is related to a target quantitative-similarity measure between the respective output image and input image pair.

Further in accordance with certain embodiments of the present invention, the system further comprises a plurality of instances of an intra-prediction encoder and wherein each one of the plurality of instances of the intra-prediction encoder is assigned with one or more of the plurality of input images to re-encode each one of the input images assigned thereto, wherein re-encoding includes intra-image prediction, and wherein the encoder is configured in accordance with the respective encoding-quality parameter provided for each one of the input images assigned to the encoder instance.

Also provided, in accordance with certain embodiments of the present invention, is a system for processing a plurality of input images, the system comprising an interface adapted to receive a plurality of discrete input images compressed by a compression format utilizing independent coding of disjoint blocks or compressed by a compression format utilizing wavelets with lossless or lossy quantization and block-by-block bit-plane entropy coding; a quality controller adapted to provide for each one of the plurality of input images an encoding-quality parameter enabling a substantial size reduction of the respective discrete output image, wherein the parameter is related to a target quantitative-similarity measure between the respective output image and input image pair, an intra-prediction encoder adapted to re-encode each one of the plurality of input images, wherein re-encoding includes intra-image prediction, the encoder being configured in accordance with the respective encoding-quality parameter provided for each one of the plurality of input images; and a bitstreams packing module adapted to provide a single output file for the plurality of input images, the output file including a plurality of indexed discrete objects corresponding to the plurality of discrete input images.

Further in accordance with certain embodiments of the present invention, each one of the objects includes a discrete image which corresponds to a respective one of the plurality of discrete input images.

Still further in accordance with certain embodiments of the present invention, the output file is an MP4 file.

Also provided, in accordance with certain embodiments of the present invention, is a method of processing a plurality of input images to provide a respective plurality of reduced-size output images, comprising receiving a plurality of discrete input images compressed by a compression format utilizing independent coding of disjoint blocks or compressed by a compression format utilizing wavelets with lossless or lossy quantization and block-by-block bit-plane entropy coding; providing for each one of the plurality of input images an encoding-quality parameter enabling a substantial size reduction of the respective discrete output image, wherein the parameter is related to a target quantitative-similarity measure between the respective output image and input image pair; and re-encoding each one of the plurality of input images, wherein re-encoding includes intra-image prediction, and wherein a quantization step is configured in accordance with the respective encoding-quality parameter provided for each one of the plurality of input images.

Further provided, in accordance with certain embodiments of the present invention, is a method of processing a plurality of input images, comprising receiving a plurality of discrete input images compressed by a compression format utilizing independent coding of disjoint blocks or compressed by a compression format utilizing wavelets with lossless or lossy quantization and block-by-block bit-plane entropy coding; providing for each one of the plurality of input images an encoding-quality parameter enabling a substantial size reduction of the respective discrete output image, wherein the parameter is related to a target quantitative-similarity measure between the respective output image and input image pair; re-encoding each one of the plurality of input images, wherein re-encoding includes intra-image prediction, and wherein a quantization step is configured in accordance with the respective encoding-quality parameter provided for each one of the plurality of input images; and providing a single output file for the plurality of input images, the output file including a plurality of indexed discrete objects corresponding to the plurality of discrete input images.

Also provided, according to certain embodiments, is a method and a system for processing a discrete input image to a reduced-size discrete output image. According to some embodiments, the system may include an interface, a quality parameter controller and an intra-prediction encoder. The quality controller is adapted to provide an encoding-quality parameter enabling a substantial size reduction of the discrete output image, wherein the parameter is related to a target quantitative-similarity measure between the output image and the input image. The intra-prediction encoder is adapted to re-encode the input image, wherein re-encoding includes intra-image prediction, and wherein the encoder is configured in accordance with the encoding-quality parameter.

According to some embodiments, the target quantitative-similarity measure represents an acceptable difference between the output image and the input image. In further embodiments, the target quantitative-similarity measure represents a minimal similarity requirement between the output image and the input image.

In some embodiments, the encoding-quality parameter is set by a fixed and predefined value. In further embodiments, the encoding-quality parameter is computed according to a predefined formula. In still further embodiments, the encoding-quality parameter is selected from a pre-generated look-up table. In yet a further embodiment, the encoding-quality parameter is determined by a predefined iterative search process that is based on predefined search criteria.

In some embodiments, the target quantitative-similarity measure is denoted by a minimum similarity value representing a minimum threshold for similarity between the output image and the input image. In further embodiments, the target quantitative-similarity measure is denoted by a maximum difference value representing a maximum threshold for difference between the output image and the input image. In still further embodiments, the target quantitative-similarity measure is also denoted by a minimum difference value or by a maximum similarity value giving rise to a difference or similarity range, respectively.

In some embodiments, the minimum similarity value and/or the maximum difference value denote a perceptually identical quantitative-similarity (or quantitative-difference). In further embodiments, the minimum similarity value (or the maximum difference value) is denoted by a specific structural similarity (SSIM) index value and specific values of associated parameters. In still further embodiments, the minimum similarity value (or the maximum difference value) corresponds or is substantially equivalent to a structural similarity (SSIM) index value of approximately 0.95 with the following parameters: an 11×11 Gaussian filter with sigma=1.5, and default values for the SSIM constants—[0.01, 0.03]. In yet further embodiments of the invention, the quality parameter controller is adapted to provide an encoding-quality parameter which provides an SSIM index value that equals or is greater than 0.95 with the following parameters or some equivalent thereof, and which enables a substantial size reduction relative to the input image. In still further embodiments of the invention, the quality parameter controller is adapted to provide an encoding-quality parameter which is equivalent to a peak signal-to-noise ratio value of approximately 45 dB.

In some embodiments, the quality parameter controller is adapted to obtain an input image quality parameter related to a quantitative measure of the input image. The quality parameter controller may use the input image quality parameter for characterizing the quality of the input image. In some embodiments, the input image quality parameter may include one or more of the following: bits per pixel, image quality indication, resolution and/or file size. According to some embodiments, for higher quality input images substantially lower values of encoding-quality parameters may be provided to obtain perceptually lossless compression. In further embodiments the input image quality parameter may be used as part of a search for an encoding-quality parameter. In still further embodiments, input image quality parameter may be used to initialize the iterative encoding-quality parameter search process.

In some embodiments of the invention, the quality controller is adapted to provide an encoding-quality parameter which maximizes a size reduction of the discrete output image (compared to the input image) while maintaining similarity between the output image and the input image according to the target quantitative-similarity measure. In further embodiments, the quality controller is adapted to provide an encoding-quality parameter which maximizes a size reduction of the discrete output image (compared to the input image) while, maintaining a similarity between the output image and the input image above or equal to the minimum similarity value. In still further embodiments, the quality controller is adapted to provide an encoding-quality parameter which maximizes a size reduction of the discrete output image (compared to the input image) while maintaining a difference between the output image and the input image above or equal to the maximum difference value.

In further embodiments, the quality controller is adapted to provide an encoding-quality parameter which enables a substantial size reduction of the discrete output image while maintaining similarity (or difference) between the output image and the input image within the predefined similarity (or difference) range.

According to some embodiments, the quality controller may include a similarity evaluation module. The similarity evaluation module may be adapted to implement in cooperation with the intra-prediction encoder an iterative search for an encoding-quality parameter, wherein at each iteration of the search, the encoding-quality parameter is incremented (or decremented) until a convergence criterion is met. According to further embodiments, the convergence criterion is associated with an improvement in terms of a size reduction associated with the current encoding-quality parameter compared to the size reduction associated with one or more of the previous encoding-quality parameters.

In further embodiments, the convergence criterion is associated with a rate of improvement in terms of a size reduction associated with the current encoding-quality parameter compared to the size reduction associated with one or more of the previous encoding-quality parameters. In still further embodiments, the search for an encoding-quality parameter is constrained by a minimum similarity threshold between the output image and the input image (or by a maximum difference threshold).

According to a further embodiment, the similarity evaluation module may be configured to implement an iterative encoding-quality parameter search in cooperation with the intra-prediction encoder, where at each iteration, at least a segment of the input image is compressed using a provisional encoding-quality parameter that is provided for the current iteration, followed by an evaluation of the similarity between a resulting provisional compressed output image and the input image. In some embodiments, in case it is determined that the similarity between the provisional compressed output image and the input image meets the criteria, the quality controller may indicate to the encoder to provide as output the current provisional output image, in some embodiments, in case it is determined that the similarity between the provisional compressed output image and the input image does not meet the similarity criteria, the similarity evaluation module may be adapted to repeat the recompression of the input image using an adjusted provisional encoding-quality parameter followed by an evaluation of the similarity between a resulting provisional compressed output image and the input image. The process of adjusting the provisional encoding-quality parameter and evaluating the recompression of the input image using the adjusted provisional parameter may be repeated until the similarity between the provisional compressed output image and the input image meets the similarity criteria. In still further embodiments, the search criteria may also be related to the size reduction enabled by the provisional encoding-quality parameter.

In further embodiments, the encoder is a standard H.264 or a standard MPEG-4 part 10 encoder. In yet further embodiments, the encoder is configured to disable inter-frame (or inter-image) prediction and to implement a quantization operation in accordance with the encoding quality parameter. In still further embodiments, the standard H.264 or MPEG-4 part 10 encoder is configured to disable an in-loop deblocking filter. In some embodiments, the encoder may be adapted to enable the in-loop deblocking filter. In still further embodiments, the encoder may determine whether to enable or disable the in-loop deblocking filter according to a parameter related to the quality of the input image. In still further embodiments, the encoder may determine whether to enable or disable the in-loop deblocking filter according to an encoding-quality parameter provided by the quality parameter controller. For example, the encoder may be configured to enable the in-loop deblocking filter for an input image characterized by relatively low quality.

According to some embodiments, the encoder is adapted to provide as output a standard H.264 or MPEG-4 part 10 stream which comprises the discrete output image, in still further embodiments, the encoder is adapted to provide as output a standard H.264 or MPEG-4 part 10 stream which comprises a plurality of discrete images. In yet further embodiments, the encoder is adapted to provide as output a standard MP4 file formatted according to the MPEG-4 file format.

According to a further aspect of the invention, a system for processing a discrete input image to a reduced-size discrete output image may include an interface, a quality parameter controller and an encoder, wherein the interface is adapted to receive a discrete input image compressed by a compression format utilizing wavelets with lossless or lossy quantization and block-by-block bit-plane entropy coding. The quality controller is adapted to provide an encoding-quality parameter enabling a substantial size reduction of the discrete output image, wherein the parameter is related to a target quantitative-similarity measure between the output image and the input image. The intra-prediction encoder is adapted to re-encode the input image, wherein re-encoding includes intra-image prediction, and wherein the encoder is configured in accordance with the encoding-quality parameter.

According to still a further aspect of the invention, there is provided, a method of processing a discrete input image to a reduced-size discrete output image, comprising: receiving a discrete input image a discrete input image compressed by a compression format utilizing wavelets with lossless or lossy quantization and block-by-block bit-plane entropy coding; providing an encoding-quality parameter enabling a substantial size reduction of the discrete output image, wherein the parameter is related to a target quantitative-similarity measure between the output image and the input image; and re-encoding the input image, wherein re-encoding includes intra-image prediction, and a quantization step that is configured in accordance with the encoding-quality parameter.

There is also provided according to an aspect of the present invention a method and a system for processing a discrete input image to a reduced-size discrete output image. According to some embodiments, the system may include an interface, a quality parameter controller and an intra-prediction encoder. The interface is adapted to receive a discrete input image compressed by a compression format utilizing independent coding of disjoint blocks. The quality controller is adapted to provide an encoding-quality parameter enabling a substantial size reduction of the discrete output image, wherein the parameter is related to a target quantitative-similarity measure between the output image and the input image. The intra-prediction encoder is adapted to re-encode the input image, wherein re-encoding includes intra-image prediction, and wherein the encoder is configured in accordance with the encoding-quality parameter.

In still further embodiments, the minimum similarity value (or the maximum difference value) is determined using a modified SSIM quality measure. The SSIM quality measure is adapted by applying to certain areas of the image a penalty, giving rise to the modified SSIM quality measure. The SSIM score computed for those areas is penalized according to the respective penalty. In one example, the penalty may involve, for example, squaring the obtained SSIM value in smooth areas. Further by way of example, smooth areas are identified by computing the local image variance in the original image and classifying areas for which the variance is below a threshold as smooth. Other penalties may be used and may be applied in a different manner to the SSIM value for the respective areas. The regional penalty procedure may be integrated with the SSIM scoring process or may be implemented as an additional step which is implemented after the SSIM scoring process is complete. Furthermore other types of areas may exist and the identification thereof may involve further techniques in addition to local image variance.

In yet further embodiments, the SSIM quality measure is modified, so that instead of averaging over all local SSIM scores, averaging is done over the areas with lowest SSIM as determined by a predefined threshold. In further embodiments, the image is divided into blocks, the SSIM quality measure is computed for each block separately, and then a global quality score is computed based on the block scores, and the minimum similarity value used by the system corresponds to the block-wise global quality score.

In further embodiments, the computation of the SSIM quality measure may be optimized by performing it on a selected portion of the pixels of the input image and the corresponding pixels of output image, instead of performing it on the whole image.

In further embodiments, the minimum similarity value (or the maximum difference value) is denoted by a specific peak signal to noise ratio (PSNR) index value and specific values of associated parameters. In still further embodiments of the invention, the quality parameter controller is adapted to provide an encoding-quality parameter which is equivalent to a peak signal-to-noise ratio value of approximately 45 dB.

In further embodiments, the minimum similarity value (or the maximum difference value) is denoted by a quality measure comprising a blockiness measure quantifying absence of blockiness of the output image relative to the input image; a textural measure quantifying textural similarities between the output image and the input image; and a local similarity measure quantifying local similarities between the output image and the input image. Further details of such quality measure are described hereinabove.

In further embodiments of the invention, the minimum similarity value (or the maximum difference value) is denoted by a specific visual information fidelity (VIF) value and specific values of associated parameters. In further embodiments of the invention, the minimum similarity value (or the maximum difference value) is denoted by a specific picture quality scale (PQS) index value and specific values of associated parameters. In further embodiments of the invention, the minimum similarity value (or the maximum difference value) is denoted by a specific video quality metric (VQM) index value and specific values of associated parameters. In further embodiments of the invention, the minimum similarity value (or the maximum difference value) is denoted by a specific perceptual evaluation of visual quality (PEVQ) index value and specific values of associated parameters. In further embodiments of the invention, the minimum similarity value (or the maximum difference value) is denoted by a specific Moscow State University (MSU) blockiness index value and specific values of associated parameters. In further embodiments of the invention, the minimum similarity value (or the maximum difference value) is denoted by a specific Moscow State University (MSU) bluriness index value and specific values of associated parameters.

In some embodiments, the provisional encoding-quality parameter is updated by performing a bi-section on a limited range of encoding-quality parameters. In further embodiments, the encoding-quality parameter range is updated by performing a bi-section on values of encoding-quality parameters which are specified in a look-up table.

Certain embodiments of the present invention seek to provide recompression of images which provides monotony of compressed image quality as a function of extent of compression e.g. by recognizing quantizer values that may cause increased quantization error and avoiding them.

Certain embodiments of the present invention seek to provide a re-compression system comprising apparatus for providing a selected, degree of compression; and apparatus for compressing images in accordance with the selected degree of compression, including apparatus for deriving a quantization matrix from the selected quality factor such that the quality score of images compressed using the quantization matrix is monotonically related to the selected degree of compression. The degree of compression may be represented by a Quality Factor (QF) measure used to derive a scaling factor for scaling a given quantization matrix as commonly used, for example, in common JPEG image encoders, or by a Modified Quality Factor MQF (MQF), which may be computed by any of the methods shown and described herein. The QF or the MQF may be user selected using a suitable user input device such as a GUI, generated by a computer algorithm, or predefined in tables.

There is also provided, in accordance with an aspect of the present invention, a computerized method for independent, disjoint block-level recompression of a first image generated by independent coding of disjoint blocks in a precursor image, the first image having at least one first quantization matrix associated therewith, the method comprising performing at least one independent disjoint block-level compression operation, using a processor, on the first image thereby to generate a re-compressed second image including generating a new quantization matrix and using the new quantization matrix for the independent disjoint block-level compression, including computing a rounding error created by the quantization process utilizing the new quantization matrix.

In accordance with an embodiment of the invention, there is provided a method wherein the new quantization matrix is generated by scaling at least one second quantization matrix by at least one scaling factor, thereby to provide at least one scaled matrix, and subsequently computing at least one additional quantization matrix as a weighted average of the at least one scaled matrix with the at least one first quantization matrix.

In accordance with an embodiment of the invention, there is further provided a method wherein the at least one value of the new quantization matrix is adjusted to minimize the rounding error.

In accordance with an embodiment of the invention, there is still further provided a method comprising transmitting the re-compressed second image to a remote receiver.

In accordance with an embodiment of the invention, there is still further provided a method wherein the adjusting comprises computing a quantization matrix according to a proposed compression level; for each quantization value in the quantization matrix, computing a rounding error using a proposed quantization value and a corresponding quantization value from the quantization matrix in the original image; for any quantization value whose rounding error is below a given threshold, modify its value by 1 repeatedly, in a given direction, until the rounding error exceeds a predetermined threshold; and when the rounding error exceeds the threshold, use the resulting quantization value.

In accordance with an embodiment of the invention, there is still further provided a method comprising providing a first quantization matrix comprising a JPEG standard matrix.

In accordance with an aspect of the invention, there is provided a computerized system for independent disjoint block-level recompression of a first image generated by independent coding of disjoint blocks in a precursor image, the first image having at least one first quantization matrix associated therewith, the system comprising a disjoint rounding error-reducing block-level compressor operative for performing at least one independent disjoint block-level compression operation on the first image thereby to generate a re-compressed second image including generating a new quantization matrix and using the new quantization matrix for the independent disjoint block-level compression, including computing a rounding error for at least one entry in new quantization matrix and if required adjusting the value of the new quantization matrix to reduce a rounding error created by the quantization process utilizing the new quantization matrix.

In accordance with an aspect of the invention, there is further provided a computerized compression method comprising providing a first image compressed using a known first quantization matrix; providing a candidate second quantization matrix; modifying the candidate quantization matrix, using a processor, such that the modified quantization matrix may provide compressed images whose quality is proportional to the extent of compression; and using the final $2^{nd}$ quantization matrix to compress the 1a image.

In accordance with an embodiment of the invention, there is still further provided a method wherein the modifying comprises using a candidate-for-final $2^{nd}$ quantization matrix to evaluate a rounding error between itself and the known $1^{st}$ quantization matrix, searching for problematic values which fall between 1 X corresponding value in the $1^{st}$ matrix, and 2 X corresponding value in the $1^{st}$ matrix, and replacing each problematic value found in the searching, with a corresponding value in the $1^{st}$ matrix, thereby to obtain the final $2^{nd}$ quantization matrix.

In accordance with an embodiment of the invention, there is still further provided a method wherein modifying comprises providing a candidate second quantization matrix; for each individual element in candidate second quantization matrix, estimating the rounding, error which may be expected given the relationship between the first and candidate second matrices and, while the rounding error is too far from zero, repeatedly change, by one, the individual $2^{nd}$ matrix element, thereby to obtain the final $2^{nd}$ quantization matrix.

In accordance with an embodiment of the invention, there is still further provided a method wherein the independent disjoint block-level recompression comprises JPEG recompression.

In accordance with an embodiment of the invention, there is still further provided a method wherein the computing a rounding error comprises computing a difference between a ratio of corresponding quantizer entries in the quantization matrices and the ratio's rounded value.

In accordance with an embodiment of the invention, there is still further provided a method wherein the rounding error comprises an error resulting from rounding a ratio of two corresponding quantizer values in the quantization matrices.

In accordance with an aspect of the invention, there is still further provided a computerized re-compression system comprising apparatus for providing a selected degree of compression; and apparatus for using a processor to compress images in accordance with the selected degree of compression, including apparatus for deriving a quantization matrix from the selected quality factor such that the quality score of images compressed using the quantization matrix is monotonically related to the selected degree of compression.

In accordance with an embodiment of the invention, there is yet further provided a system wherein the degree of compression is represented by a QF measure.

In accordance with an embodiment of the invention, there is still further provided a system wherein the degree of compression is represented by an MQF.

In accordance with an aspect of the invention, there is still further provided a computerized re-compression system comprising apparatus for modifying a candidate quantization matrix to accommodate a known first quantization matrix used to compress at least one first image thereby to generate a modified quantization matrix which may provide at least one re-compressed image, re-compressed from a compressed at least one first image, wherein the quality of the at least one re-compressed image is proportional to the extent of re-compression of the re-compressed image relative to the compressed first image; and apparatus for employing a processor which uses the modified quantization matrix to re-compress at least the compressed first image.

In accordance with an aspect of the invention, there is still further provided a computerized re-compression method comprising providing a selected degree of compression; and compressing images in accordance with the selected degree of compression, using a processor, including deriving a quantization matrix from the selected quality factor such that the quality score of images compressed using the quantization matrix is monotonically related to the selected degree of compression, and using the quantization matrix to compress the images.

In accordance with an embodiment of the invention, there is still further provided a method comprising determining whether or not to adjust at least one value of the new quantization matrix to reduce a rounding error created by the quantization process utilizing the new quantization matrix and, if so, adjusting at least one value of the new quantization matrix to reduce a rounding error created by the quantization process utilizing the new quantization matrix.

In accordance with an embodiment of the invention, there is still further provided a method wherein the compression level is selected by a user using at least one of an MQF and a QF value.

There is further provided according to an aspect of the claimed subject matter a system and a method of classifying an image's compression level e.g. as highly compressed as opposed to otherwise.

BRIEF DESCRIPTION OF THE DRAWINGS

Certain embodiments of the present invention are illustrated in the following drawings:

FIG. 1 is a simplified flowchart illustration of a perceptually lossless compression method which employs a quality measure including some and preferably all of a local similarity score, a blockiness score and a texture distortion score, computed at the whole image level in accordance with certain embodiments of the present invention.

FIG. 2 is a simplified flowchart illustration of a method for performing the local similarity score computation step of FIG. 1, in accordance with certain embodiments of the present invention.

FIG. 3 is a simplified flowchart illustration of a method for performing the blockiness score computation step of FIG. 1, in accordance with certain embodiments of the present invention.

FIG. 4 is a simplified flowchart illustration of a method for performing the texture distortion score computation step of FIG. 1, in accordance with certain embodiments of the present invention.

FIGS. 5-7 are simplified flowchart illustrations of variations on the perceptually lossless compression method of FIG. 1 in which all or some of the local similarity score, a blockiness score and texture distortion score are computed at the block level, in accordance with certain embodiments of the present invention.

FIGS. 8-10 are graphs of the quality measure of FIG. 1 and its components, for three example digital images respectively.

FIGS. 11a and 11b are tables useful in understanding certain aspects of the methods of FIGS. 1-7 as described in detail below.

FIG. 12 is a simplified flowchart illustration of a method for recompression of images operative in accordance with certain embodiments of the present invention and using a quantization matrix generated from a quantization matrix of a precursor image by scaling.

FIG. 13A is a simplified flowchart illustration of a method for computing a target quality factor in accordance with certain embodiments of the present invention.

FIG. 13B is a simplified flowchart illustration of a method for computing the initialization step in FIG. 13A in accordance with certain embodiments of the present invention including example initial values for certain parameters of the method of FIG. 13A which are not intended to be limiting.

FIGS. 14A-17B are tables representing inputs to and results of example computations performed in accordance with certain embodiments of the present invention.

FIG. 18 is a simplified flowchart illustration of a method for recompression of images operative in accordance with certain embodiments of the present invention and using a quantization matrix generated by combining a quantization matrix of a precursor image and a second quantization matrix such as the one given in the JPEG standard.

FIG. 19 is a simplified flowchart illustration of a method for performing the new quantization matrix generation step of FIG. 18, in accordance with certain embodiments of the present invention.

FIGS. 20A-20B, taken together, form a simplified flowchart illustration of a method for generating a subsequent MQF value for use in the method of FIG. 18.

FIGS. 21-22 describe the method of obtaining a different quality for each block when encoding to JPEG, by computing a separate quality factor for each tile, and selectively zeroing DCT coefficients according to the computed quality factor, in accordance with certain embodiments of the present invention.

FIG. 23 is a simplified flowchart illustration of a recompression method constructed and operative in accordance with certain embodiments of the present invention.

FIG. 24 is a diagram of a historical archive recording recompression of past images which is useful for recompressing future images e.g. in accordance with the method of FIG. 23.

FIG. 29 shows an example of a table that may be used by a learning method useful in determining an MQF search starting point.

FIG. 30 is a simplified flowchart which illustrates by way of example a learning process which may be used for determining an MQF start point and step size that may be used as part a search process which may be implemented as part of a compression or recompression process.

FIGS. 35 and 36 are tables illustrating examples of operation of step 320 of FIG. 4.

FIGS. 37a-37g demonstrate by way of example a process of locally zeroing DCT coefficients in accordance with certain embodiments of the present invention.

FIGS. 38a-38g demonstrate by way of example certain aspects of a method for generating a quantization matrix in accordance with, certain embodiments of the present invention.

FIGS. 39a-39d show an example of certain aspects of a method for generating a quantization matrix in accordance with certain embodiments of the present invention.

FIG. 40a is a simplified flowchart illustration of a search process operative in accordance with certain embodiments of the present invention which may be performed by the MQF computer of FIGS. 32a and 32b.

FIG. 40b is a simplified flowchart illustration of a possible implementation of steps 4240 and 4250 in the method of FIG. 40a.

FIG. 41 is a simplified flowchart illustration of a method of enabling an image-adaptive, perceptually-lossless and near-maximal image compression.

FIG. 42 is a simplified flowchart illustration of a possible implementation of implementing step 4420 of FIG. 41.

FIG. 43 is a simplified flowchart illustration of a further alternative implementation of implementing step 4420.

FIGS. 46A-46D are a graph and tables useful in understanding certain aspects of the re-compression methods shown and described herein.

FIG. 48 is a computer coded loop which is useful in conjunction with aquantization matrix computation functionality, according to certain embodiments of the present invention.

FIG. 49A is a simplified flowchart illustration of a method for recompression constructed and operative in accordance with one embodiment of the present invention.

FIG. 49B is a simplified flowchart illustration of a method for recompression constructed and operative in accordance with another embodiment of the present invention.

FIG. 49C is a simplified flowchart illustration of a method for performing the rounding error estimation step of FIG. 49B.

FIG. 51 is a simplified flowchart illustration of a method for disabling problematic quantizer values, according to some embodiments of the present invention.

FIG. 52 is a table representing a final quantization matrix after applying a monotony increasing functionality e.g. as shown and described herein.

FIGS. 53A-53g are tables useful in understanding the problem of increase in rounding error despite finer quantization which is partially or wholly overcome by certain embodiments of the present invention. In particular:

FIG. 53a is a table representing original DCT coefficients after inverse quantization.

FIG. 53b is a table representing a first quantization matrix.

FIG. 53c is a table representing resulting DCT coefficients after quantization with the matrix of FIG. 53b and inverse quantization.

FIG. 53d is a table representing absolute error between the values in FIG. 53c and the values in FIG. 53a.

FIG. 53e is a table representing a second quantization matrix.

FIG. 53f is a table representing resulting DCT coefficients after quantization with the matrix of FIG. 53c and inverse quantization.

FIG. 53g is a table representing absolute error between the values in FIG. 53f and the values in FIG. 53a.

FIGS. 54A-54E are tables useful in understanding a quantization matrix computation process operative in accordance with certain embodiments of the present invention.

FIGS. 55a and 55b, taken together, form a simplified flowchart illustration of a computerized method for independent disjoint block-level recompression of a first image generated by independent coding of disjoint blocks in a precursor image, the first image having at least one first quantization matrix associated therewith, the method comprising some or all of the illustrated steps suitably ordered e.g. as shown.

FIGS. 59A-59D collectively illustrate a recompression process of a 16×16 pixel area, where an initial coarse quantization matrix is used followed by a recompressing using a fine quantization matrix, in accordance with an example of the claimed subject matter;

FIGS. 60a-60d collectively illustrate a compression process of a 16×16 pixel area, where low energy DCT coefficients are Zeroed to reduce bitrate and the modified DCT values matrix is quantized using a fine quantization matrix (such as all 1's), according to one example of the claimed subject matter;

FIGS. 62A-62D illustrate part of a process of identifying highly compressed images, in accordance with an example of the claimed subject matter;

FIG. 63 is illustrates by way of example a data structure including parameters which may be used to determine a threshold that may be used by a method of identifying highly compressed images, in accordance with an example of the claimed subject matter;

FIG. 64A is a graphical illustration of a manner by which classification thresholds may be defined using the lowest non-zero DCT values in the Y plane of images which were recompressed according to a perceptual similarity criterion and whose compression was evaluated using a further compression criterion, according to an example of the claimed subject matter; and FIG. 64B is a graphical illustration of a manner by which classification thresholds may be defined using the lowest non-zero DCT values in the U and V planes of images which were recompressed according to a perceptual similarity criterion and whose compression was evaluated using a further compression criterion, according to an example of the claimed subject matter.

FIG. 65b is a simplified flowchart illustration of a method for recompression of images operative in accordance with certain embodiments of the present invention and using a quantization matrix generated from a quantization matrix of a precursor image by scaling. The method of FIG. 65b include some or all of the illustrated steps, suitably ordered e.g. as shown and may be similar to the method of FIG. 12 except that step 9012 is performed only if the first image is not classified as highly compressed, whereas corresponding step 1012 in FIG. 12 is typically performed unconditionally.

FIG. 65c is a simplified flowchart illustration of a method for recompression of images operative in accordance with certain embodiments of the present invention and using a quantization matrix generated by combining a quantization matrix of a precursor image and a second quantization matrix such as the one given in the JPEG standard. The method of FIG. 65c include some or all of the illustrated steps, suitably ordered e.g. as shown and may be similar to the method of FIG. 18 except that step 9815 is performed only if the first image is not classified as highly compressed, whereas corresponding step 1815 in FIG. 18 is typically performed unconditionally.

FIG. 68 is a graphical illustration of a data structure in which the results of a subjective CDS classification are listed for a plurality of image files, and for each of the plurality of image files, there is recorded the results of an application of three different thresholds for evaluating CDS target block error, according to an example of the claimed subject matter.

FIG. 72c is a simplified flowchart illustration of a method for recompression of images operative in accordance with certain embodiments of the present invention and using a quantization matrix generated from a quantization matrix of a precursor image by scaling.

FIG. 72d is a simplified flowchart illustration of a method for recompression of images operative in accordance with certain embodiments of the present invention and using a quantization matrix generated by combining a quantization matrix of a precursor image and a second quantization matrix such as the one given in the JPEG standard.

Figures 7, 8:
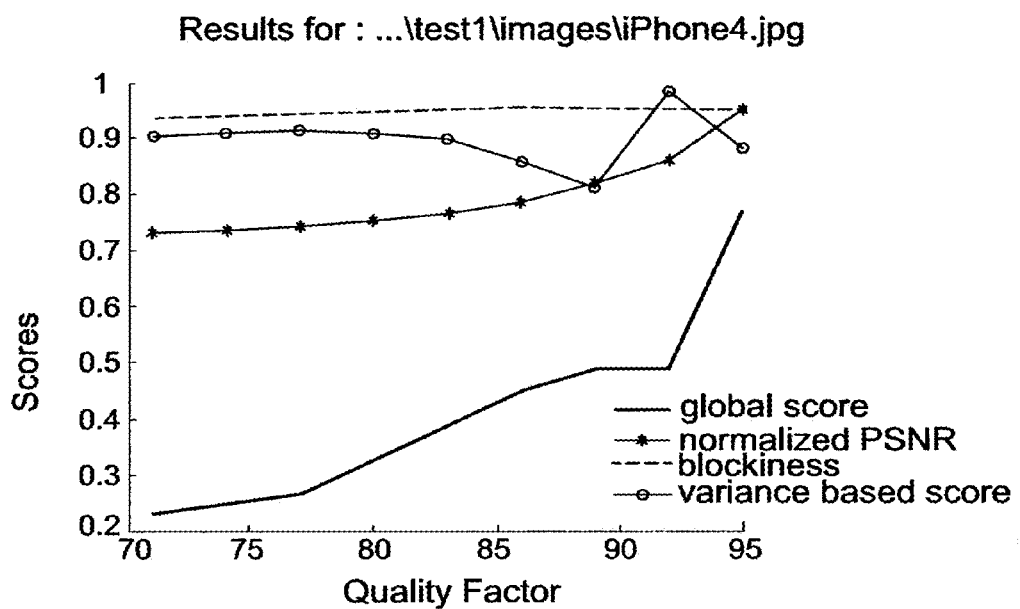

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF CERTAIN EMBODIMENTS

Reference is now made to FIG. 1 which is a simplified flowchart illustration of a perceptually lossless compression method which employs a quality measure, also termed herein "quality score", typically including e.g. combining some and preferably all of a local similarity score, a blockiness score and a texture distortion score, which may be computed on the entire image in accordance with certain embodiments of the present invention.

Methods represented herein by flowcharts are intended to include any method including some or all of the illustrated steps, suitably ordered e.g. as shown.

The quality measure computed according to the method of FIG. 1 comprises some or all of the following components:
a. A general local similarity score.
b. A blockiness score.
c. A texture distortion score.

For example, the quality measure may include only score (b), or only score (c), or scores (a) and (c), or all three scores (a)-(c).

The localized similarity measure may comprise a normalized PSNR however this is not intended to be limiting and instead, the localized similarity measure is intended to include any monotonic function, such as but not limited to a sum of squares, of substantially each of the differences between attributes of, e.g. color values of, corresponding small portions, such as pixels, of the image before and after compression, wherein any suitable difference function such as but not limited to absolute value of subtraction is used. It is appreciated that use of log of the sum of mean squares of pixel by pixel similarity values is just one possible localized similarity measure which is not intended to be limiting. The level of localized similarity need not be the pixel level, other combining functions may be used other than the sum of mean squares, and so forth.

The blockiness measure comprises a measure of absence of added artifactual edges of the second image relative to the first image. The blockiness measure typically measures presence of artifactual edges typically absent from the first digital image and introduced in the second digital image by the compression process e.g. edges along coding block boundaries. This measure may be operationalized by finding and quantifying edges in a difference image generated by comparing the first and second images.

The Texture measure, also termed herein "variance ratio", quantifies textural similarities between the first and second images and is based on quantitative measurement of changes in texture of corresponding areas between the first and second digital images. Typically, it is desired that the texture changes fall within a predetermined target interval and are not very large or very small which yields a texture based quality measure.

It is appreciated that the above quality measures are only examples and are not intended to be limiting. Typically, more than one quality measure is used in which case they are mutually normalized, e.g. such that each quality measure's possible values falls within the [0,1] where 1 denotes the best possible quality (images before and after compression are substantially identical) and 0 denotes the worst possible quality.

With reference to FIG. 1 and also other flowchart illustrations herein, the corresponding methods may comprise some or all of the following steps, suitably ordered, but not necessarily shown.

Use of the method of FIG. 1 for computing a JPEG to H.264 recompression Quality Score (also termed herein "quality measure") is now described. In this type of recompression, expected quality degradations typically have a specific form. Due to the nature of the H.264 coding, besides a possible evenly spread pixel value difference, a loss of detail within 4×4 blocks and added blockiness on the 4×4 grid may be expected. According to certain embodiments of the invention, the extents of the above types of distortion are respectively measured, so as to verity that they do not exceed a perceptual threshold.

In order to obtain scores that are reliable and easily combined, the method typically normalizes e.g. by scaling so as to ensure that the scores lie in the range [0, 1], with 1 indicating "perfect" reconstruction of the content of the input JPEG image, in the re-compressed image generated therefrom. The method also typically verifies that the scores are monotone, i.e. they do not increase as the quantization becomes coarser. The method typically does not require that the score be symmetric, i.e. score (img1, img2) need not necessarily equal score (img2, img1).

Local similarity score computation is now described with reference to FIG. 1, step 10 and FIG. 2. In order to evaluate the overall image distortion PSNR may be used. While PSNR is unreliable at detecting specific types of noise and distortions, since the structural distortions are measured separately, and no unusual noise patterns or unexpected non-linear distortions are typically added, the PSNR may be used as general local similarity score. In order to obtain a score in the range [0 1], the obtained PSNR is normalized. The obtained score is then:

IF (PSNR>50 dB) PSNRs=1;
ELSE PSNRs=PSNR/50.

A Local similarity measure, as disclosed herein, may be used in combination with a textural measure to evaluate a perceptual similarly between a first image and a second image. Various examples and variations of a Local similarity measure and of a textural measure are disclosed herein and such examples and variations may be combined and implemented as part of a method of evaluating a perceptual similarly between a first image and a second image.

A Local similarity measure, as disclosed herein may also be used in conjunction with a blockiness measure to evaluate a perceptual similarly between a first image and a second image. Various examples and variations of a Local similarity measure and of a blockiness measure are disclosed herein and such examples and variations may be combined and implemented as part of a method of evaluating a perceptual similarly between a first image and a second image.

Blockiness score computation is now described with reference to FIG. 1, step 20 and FIG. 3. The blockiness due to the H.264 coding is known to appear on the 4×4 grid. However, it is not sufficient to measure the blockiness in the reconstructed image, since it is not desirable to lower the score due to any blockiness artifacts that may exist in the original JPEG image.

As an example, the blockiness measure may include: computing for each boundary between two coding blocks a respective added-blockiness score indicating an extent of added artifactual edges along the respective boundary; computing a quality score based on the added-blockiness scores computed for each boundary; and determining based upon the quality score whether a perceptual quality criterion is met by the second image.

Any suitable method for blockiness estimation may be employed such as but not limited to that shown and described herein. For example, the H.264 in-loop deblocking filter scheme may be used to determine blockiness in both the input and reconstructed image, and then the amount of 'added' blockiness may be evaluated. According to certain embodiments of the present invention, blockiness detection code that already exists within the codec may be used to this end. This has the advantage of reusing (optimized) code that already exists within the codec, and also using a reliable blockiness indicator.

Figure 34:
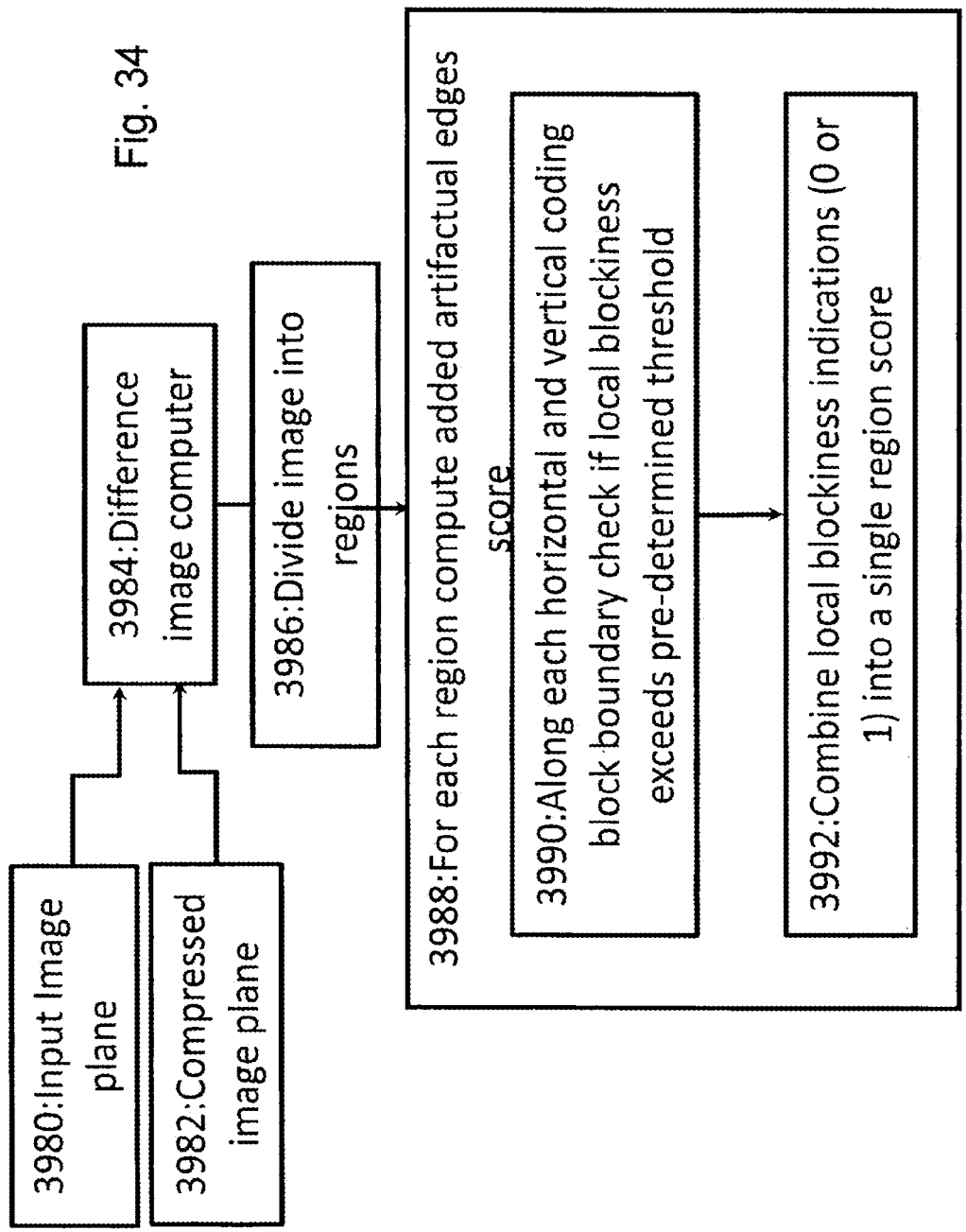
FIG. 34 is a flowchart illustrating by way of example a method for computing a blockiness quality measure in accordance with certain embodiments of the present invention.

Another embodiment involves computing the blockiness of the difference image. FIG. 34 illustrates the process of obtaining a score indicating the absence of added artifactual edges in the recompressed image. The pixel values of two image planes, such as the Luminance plane are used to compute a difference image, which is then divided into regions or tiles. Then a score is computed for each region or tile, along the coding block boundaries (i.e., 8×8 for JPEG or 4×4 for H.264).

The blockiness score may be computed as follows:

Compute the difference image: imDiff. On imDiff, run along the coding block grid (4×4 for H.264 and 8×8 for JPEG) and for each point on a horizontal or vertical block edge check for the presence of an edge.

For instance: For a vertical edge between the A and B blocks illustrated below, an edge exists between A14 and B11 if:

$$\frac{|B11 - A14|}{(|B12 - B11|) + (|A14 - A13|)} > THR \qquad \text{Formula 1}$$

A possible value for THR is 1.5, which is equivalent to a pixel change due to blockiness that is ×3 larger than the average pixel change on either side of the block edge. This results in edgeValues, a 2-D edge map, containing 1 where an edge is present and 0 where not, as shown by way of example in FIG. 11a. The global blockiness score is then computed as: [1−average (edgeValues)], which is a score in the range [0,1] with 1 indicating no "new" edges in the reconstructed image. The above blockiness score has performed well in smooth areas such as sky, and slightly textured areas such as certain articles of clothing.

A blockiness similarity measure, or absence of added artifactula edges, as disclosed herein, may be used in combination with other similarity measures to evaluate a perceptual similarly between a first image and a second image. In particular, certain similarity measures described herein, including the herein described various examples and variations of such similarity measures, may be combined with various examples and variations of the blockiness measure disclosed herein, including for example, various examples and variations of a local similarity measure, and various examples and variations of a textural measure, and various examples and variations of a similarity measure which is based on a combination of a local similarity measure with a textural measure.

Texture distortion score computation is now described with reference to step in FIG. 1 and FIG. 4. For many images, a disturbing loss of texture detail may occur as a result of compression or recompression, a loss which goes unobserved by some perceptual scores such as the SSIM. For example, such detail loss in skin areas may be noticeable in compressed or recompressed images. According to certain embodiments of the present invention, local texture distortion scores are computed e.g. the variance in each 4×4 block in the source image, V1, and compared to the variance of the same 4×4 block in the reconstructed image, V2. If the ratio V1/V2 lies outside a predetermined range, for instance [0.8,1,2], the texture distortion score for that block is set to 1. The overall texture distortion score may then be computed as a simple or suitably weighted average of the local scores over all 4×4 blocks. The weighting may for instance use larger weights for dark areas where texture distortion is more apparent. An example of a suitable routine for computation of variance is the following:

The mean of B, an N×N (e.g. 4×4 or 8×8) block of values B[i][j] with i=1, . . . , N, j=1, . . . , N is given by:

$$mean_{N \times N}(B) = \frac{1}{N^2} \sum_{i=1}^{N} \sum_{j=1}^{N} B[i][j] \qquad \text{Formula 2}$$

Then, the variance of B, an N×N-block of values B[i][j] with i=1, . . . , N j=1, . . . , N is computed as:

$$V_{N \times N}(B) = \frac{1}{N^2} \sum_{i=1}^{N} \sum_{j=1}^{N} |B[i][j] - mean_{N \times N}(B)| \qquad \text{Formula 3}$$

i.e. the mean absolute difference between the block values and the block mean.

Global score computation (step 40) according to certain embodiments of the invention is now described. The three individual scores: local similarity, absence of added artifactual edges and texture score, described above, may be pooled into a global score, by computing each score over the entire image or a portion of the entire image, as determined by the system configuration, and combining the three values using multiplication or a weighted geometric mean to obtain a global quality score.

In the tile based approach, as shown in FIGS. 5-7, the image is divided into tiles, whose size may depend on image dimensions. Then the global score, combining all three components described above, is computed for each tile, providing a set of tilescores, with a value for each tile. The overall image quality score for the entire image or a portion of the entire image may be then computed, for example, by:

$$0.5*(\{\min\{tilescores\}+avg\{tilescores\}\}) \qquad \text{Formula 4}$$

Alternatively, a tile based scheme may be employed, and each of the 3 scores may be computed in each variable size image tile (32×32–256×256), and combined using multiplication or a weighted geometric mean to obtain a set of tilescores, which may then be used either for local QP (quantization parameter) adaptation, or averaged to obtain a global score. The averaging may for example be performed using one of the following schemes: 1, min{tilescores} over all blocks in the image or a portion of the image (global score is the score of the 'worst' block); or 2, taking as the global score the average of the 'worst' block in the image or a portion of the image and the mean block score over all blocks in the image or a portion of the image, using the following formula: 0.5*(min{tilescores}+avg{tilescores}) or any appropriate weighted averaging formula.

A textural measure, as disclosed herein, may be used in combination with a local similarity measure to evaluate a perceptual similarly between a first image and a second image. Various examples and variations of a textural measure and of a local similarity measure are disclosed herein and such examples and variations may be combined and implemented as part of a method of evaluating a perceptual similarly between a first image and a second image.

A textural measure, as disclosed herein may also be used in conjunction with a blockiness measure to evaluate a perceptual similarly between a first image and a second image. Various examples and variations of a textural measure and of a blockiness measure are disclosed herein and such examples and variations may be combined and implemented as part of a method of evaluating a perceptual similarly between a first image and a second image.

Also described herein are examples and variations of a combined similarity measure, for example, a similarity measure that is based on a combination of a local similarity measure, a textural measure and a blockiness measure. Such examples and variations of a combined similarity measure are applicable mutatis-mutandis to the examples and variations of the blockiness measure described herein, and to the herein described examples and variations of the quality measure that is based on a textural measure and a local similarity measure.

According to some embodiments, the quality score computation, including the herein disclosed quality score computation based on a blockiness measure, and herein disclosed examples and variations thereof, the herein disclosed quality score computation based on a combination of a local similarity measure with a textural measure, and herein disclosed examples and variations thereof, and the herein disclosed quality score computation based on a combination of a blockiness measure with a local similarity measure and with a textural measure, may be performed only on a subset of the tiles. For example, the quality score computation may be performed on a 2:1 subsampling applied over the input image, or in a further example, the quality score computation may be performed on a 4:1 subsampling of tiles.

Figure 25A:
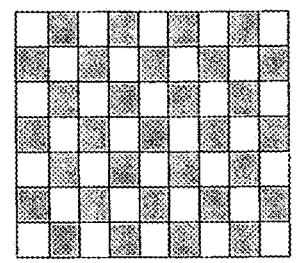
FIGS. 25a-25b show examples of possible 2:1 and 4:1 subsampling (downsampling) of tiles, respectively, which may be used for optimizing the quality score computations in accordance with certain embodiments of the present invention.
Figure 25B:
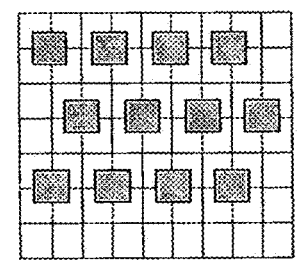

FIG. 25*a* is a graphical illustration of an example of a 2:1 subsampling scheme of tiles using a checkerboard-like pattern, by computing the quality score on every other tile. FIG. 25*b* is a graphical illustration of an example of a 4:1 subsampling scheme of tiles where the quality score is computed on a tile which is located in the middle of every 4 tiles.

Figure 26:
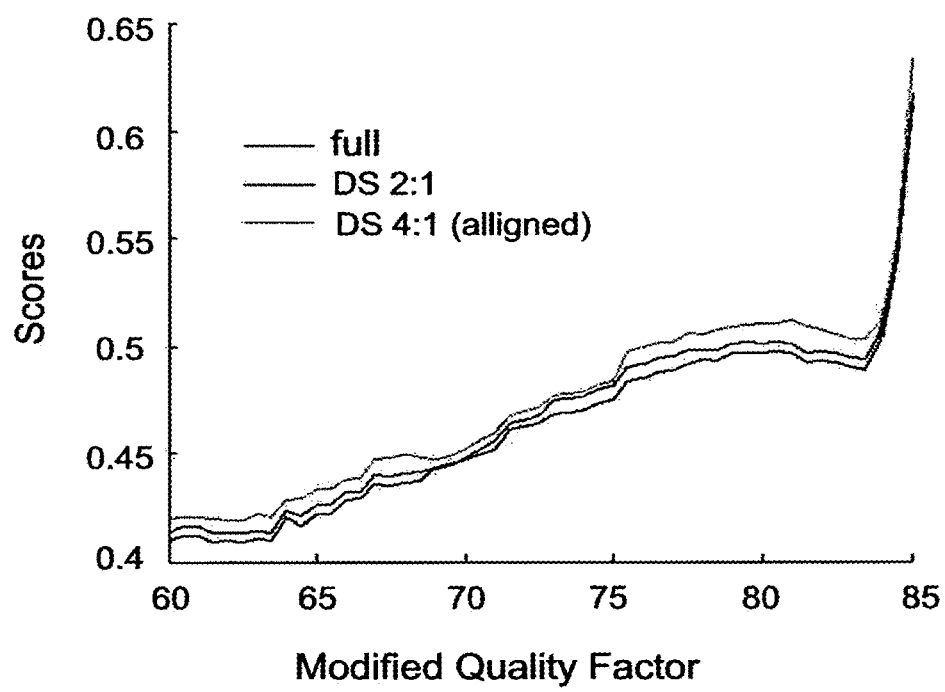
FIG. 26 shows a comparison of the original quality score computed on all tiles, with the quality score resulting from 2:1 and 4:1 subsampling of tiles for various values of MQF for a sample image.

FIG. 26 provides, by way of example, a graphical illustration of a comparison of the original quality score computed on all tiles, with the quality score resulting from 2:1 and 4:1 subsampling of tiles for various values of modified quality factor (abbreviated herein as "MQF") for a sample image, demonstrating that the quality score does not change significantly when performing these optimizations on the sample image. A modified quality factor (MQF) shall be described in greater detail below. The subsampling method may also be used for the local-adaptive recompression method described below, where tiles for which the quality score has not been computed use the MQF of the nearest tile for which a quality score has been computed.

It would be appreciated that rather than combining the three scores (blockiness measure score, local similarity score, and textural similarity score) into a single score and then thresholding the single score, it is possible to apply a soft threshold to each of the three scores separately and then binarize in a manner suitable for the application, to obtain an overall 'pass/fail' decision for the entire image or a portion of the entire image.

The method for finding a recompression iteration quality score illustrated by way of example by FIG. 1 and described with reference thereto is also useful and applicable in JPEG to JPEG recompression applications and may be used as described above, except for certain differences now described.

Step 220 of FIG. 3 comprises running along the coding block grid on imDiff (8×8 for JPEG), and for each point on a horizontal or vertical block edge checking for the presence of an edge, by computing the edge detection ratio between the difference across the edge, and the sum of differences to either side of the edge. For instance: For a vertical edge between the A and B blocks illustrated below, an edge exists between A18 and B11 if:

$$|B11-A8|/(|B12-B11|+|A18-A17|)) > THR \qquad \text{Formula 5}$$

A possible value for THR is 1.5. This results in a 2=D edge map, containing 1 where an edge is present and 0 where not, as shown in FIG. 15.

In step 310 of FIG. 4, the V1, denoting the variance in each 8×8 or 4×4 block in the source image, is computed and divided by V2, denoting the variance of the same 8×8 or 4×4 block in the reconstructed image, to obtain a variance ratio V1/V2. In step 320 of FIG. 4, if the ratio V1/V2 lies outside a predetermined range, for instance [0.8,1.1,], the texture distortion score for that block is set to 1. Note this range is slightly tighter than the one used for JPEG to H.264 recompression, as less texture distortion is expected due to usage of the same coding scheme.

Figure 9:
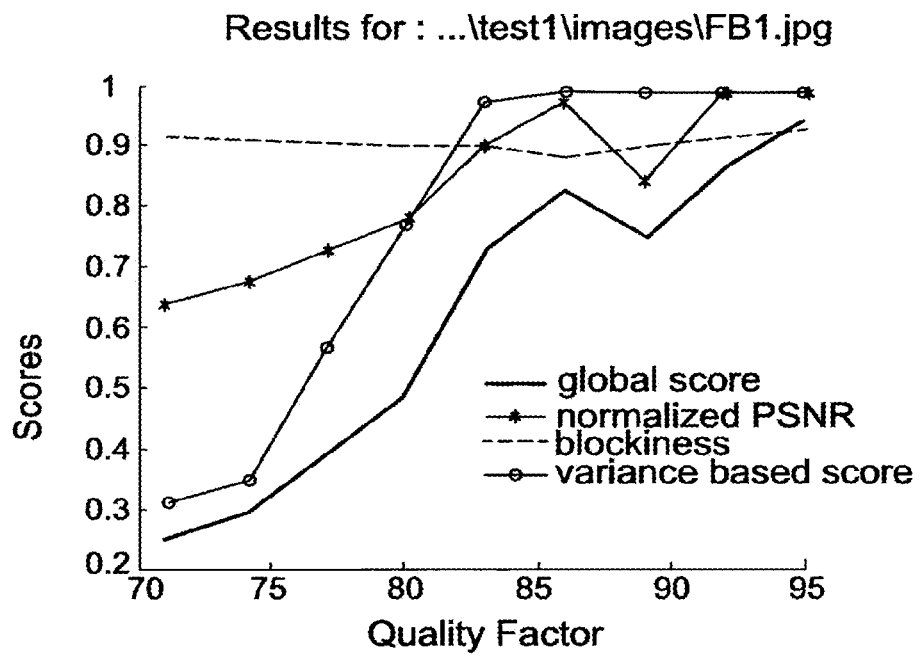
Figure 10:
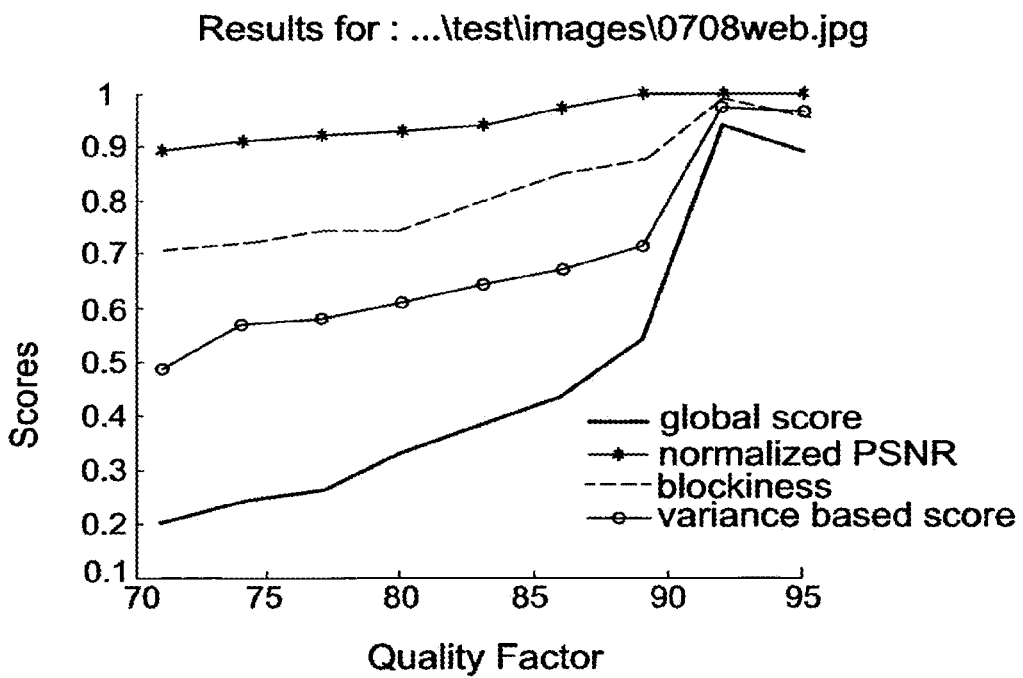

In order to evaluate the quality score obtained by an implementation for JPEG to JPEG recompression applications of the method illustrated by FIG. 1 and described with reference thereto and its three components (absence of added artifactual edges score, local similarity score, and textural similarity score), JPEG recompression was performed using the Matlab software program. Using one example of an implementation for JPEG to JPEG recompression applications of the method illustrated by FIG. 1 and described with reference thereto and its three components, a Quality Factor which determines, for example, the scaling factor of the default quantization images from the JPEG standard was gradually changed. The Matlab JPEG writer is based on the IJG code (using a MEX interface). Graphs of obtained quality scores for 3 example images, as a function of the Quality Factor, are shown by way of example in FIGS. 8-10. The graphs show each of the three scores and their combination into a global score. The graphs were created using block based score computation. The inventors have discovered that a global score of 0.5 correlates well with perceptual "equivalency" as determined by a group of human viewers judging the original and recompressed images as perceptually identical. It is appreciated that the term "Quality Factor" e.g. as shown on the X axis of the graphs in FIGS. 8-10 refers to an input parameter to a JPEG (e.g.) encoder indicating the desired encoding quality. Most commonly, e.g. in IJG, this parameter has values between 1 to 100 and is translated to a scaling factor on the default quantization matrix, which controls the obtained quality, for example, according to the following formula:

IF MQF<50 $S=(500 \text{ MQF})/100$ ELSE $S=(200-2*\text{MQF})/100$   (Formula 6)

The term "quality score" is used herein to denote a computed quality measure indicating perceptual degradation e.g. resulting from compression or re-compression, and is typically based on one or more of blockiness, texture and PSNR and is not synonymous with the quality factor (QF) used in the IJG encoder to determine the quality of the encoded jpeg image by setting the scaling factor of the default quantization matrix. The quality score typically comprises a score obtained by comparing an "original" and a "distorted" image, where by way of example the "original" image may be an input image, and the "distorted" image may be a compressed or recompressed version of the input image, thereby to evaluate the perceptual quality of the "distorted" image relative to that of the original image. By way of example, the quality score has values in the range of [0,1] or is scaled to the range of [0,1].

The differences between use of the method of FIG. 1 for JPEG to JPEG recompression, or for JPEG to H.264 recompression, may be limited to the block sizes used, e.g. 4×4 or 8×8, and the thresholds for the variance ratio, as shown in FIG. 1.

By way of example, two user-selectable recompression modes are provided: mode=0 which includes computation of the score globally over the entire image or a portion of the entire image; and mode=1, which may be a default mode, in which a block-based score is computed as described herein.

Optionally, the local similarity score and texture score may be used to control recompression in a synergistic manner. For example, if the local similarity score is PSNR based and the PSNR score is above a certain threshold such as perhaps 0.95, the allowed range of variance ratio may be extended from [0.8,1.1] (used for PSNR's below the threshold) to [0.6, 1.4], providing about 25% more flexibility in each direction. It is appreciated that the above example is merely one possible example of how application-suitable synergy may be provided between any two or all three of the local similarity, texture and blockiness scores.

Generally, for applications such as certain H.264 applications, in which compression is performed to different depths for different image blocks, local quality scores rather than image-level quality measures may be desirable such that a QP (quantization parameter) or DCT thresholding value may be determined separately for each block. FIGS. 5-7 are simplified generally self-explanatory flowchart illustrations of variations on the perceptually lossless compression method of FIG. 1 in which all or some of the local similarity score, a blockiness score and texture distortion score are computed at the block level, in accordance with certain embodiments of the present invention. In step 450 of FIG. 5, for example, a local QP (quantization parameter) is used for each area instead of pooling the score and determining a global QP for the entire image or a portion of the entire image, particularly since the score may, according to some embodiments, be computed locally in any event. The tile level score may be used for local manipulations.

More generally, according to an embodiment of the invention, which may be one of several modes of operation of a recompression system, quality measures may be computed between two complete images. For example, a quality score may be computed per region, and the results may be pooled to generate a single quality score for the whole image. Another embodiment of the present invention, which may be implemented as a second of two or several modes of the same system, is to perform local-adaptive compression, where the quality measure is evaluated in each region, and the compression parameters are set differently for each region. This may for example be implemented using the QP parameter in H.264 encoding, or through zeroing or thresholding of DCT coefficients in JPEG encoding.

In step 450 of FIG. 5, for example, a local QP (quantization parameter) is used for each area instead of pooling the score and determining a global QP for the entire image or a portion of the entire image, particularly since the score may, according to some embodiments, be computed locally in any event. The tile level score may be used for local manipulations. Locally adaptive JPEG recompression may be performed by locally varying thresholding of DCT coefficients in the method where a different quality is required for each local image area, as described below.

For example, locally varying threshold of DCT may include creating an MQF (Modified Quality Factor) matrix: M, which holds an MQF value for each tile. FIG. 21 is a flowchart illustration of a process of setting values of a matrix M(i,j) used as part of a locally adaptive JPEG recompression process, as part of some embodiments of the present invention. According to some embodiments, and by way of example, as part of a process of setting the values of a matrix M(i,j) at step 2110, the initial MQF value is set. Still further by way of example, for the first tile, the initial MQF is set to a default value, e.g. approximately 65. Such a value may be selected by performing statistical analysis on many images to determine the best initial MQF which results, for the reference image, in the minimum number of iterations, or by simply using a default—mid range value. Further by way of example, in subsequent tiles, the initial MQF value is set to the average of the MQF of the tiles directly above and to the left of the current tile (for tiles in the first row, only the tile to the left is used, and for tiles in the first column, only the tile above is used).

Then, iterative encoding of the image with different MQF values is performed which is similar to the one described below in reference to FIGS. 20A-20B, until the quality falls within the target quality range, which may be different than the one used in the global MQF method, and the value of M(i,j) is set to the MQF reached through this process.

Once this process is carried out over all image tiles, the full matrix M is obtained holding the local MQF value for each tile. In some embodiments, a padding operation may be implemented to pad the matrix to cover all blocks in the image by extending values on the edges of the tile grid to edge blocks that are smaller than the tile size, thereby providing a MQF value for each 8×8 block.

Next a finest quantization matrix Qmax may be computed. Finest quantization matrix Qmax may correspond to the highest MQF value (max(M)), using the process illustrated and described herein with reference to FIG. 19. This quantization matrix may be stored in the JPEG file itself.

Qmax may be used to perform a quantization of the DCT coefficients, but threshold (limit the DCT coefficient to the threshold value) or zero any coefficients that would have been zero if a quantization matrix which corresponds to the local MQF were to be used. FIG. 22 is a flowchart illustration of a process of quantization with adaptive thresholding for each 8×8 DCT block that may be implemented as part of some embodiments of the present invention. The matrix 1, holding the proposed MQF value for each tile, which is acquired according to the description of FIG. 21, is used to perform the appropriate thresholding in each tile. Then for each 8×8 DCT block, two quantization processes are performed once using the quantization matrix derived from the maximal MQF value (Block1 in Step 2210) and once using the corresponding MQF value for the tile to which the DCT block belongs (Block2 in Step 2230). Then in Step 2240, the DCT values in the 8×8 block quantized using Qmax (Block1) are thresholded (set to the threshold value if they are above the threshold) or set to zero in locations where the DCT values quantized using the local MQF are zero (Block2), to obtain the final 8×8 set of quantized DCT coefficients to represent the corresponding 8×8 area in the image. This is of course repeated for each 8×8 DCT block in the recompressed image.

Figure 37A:
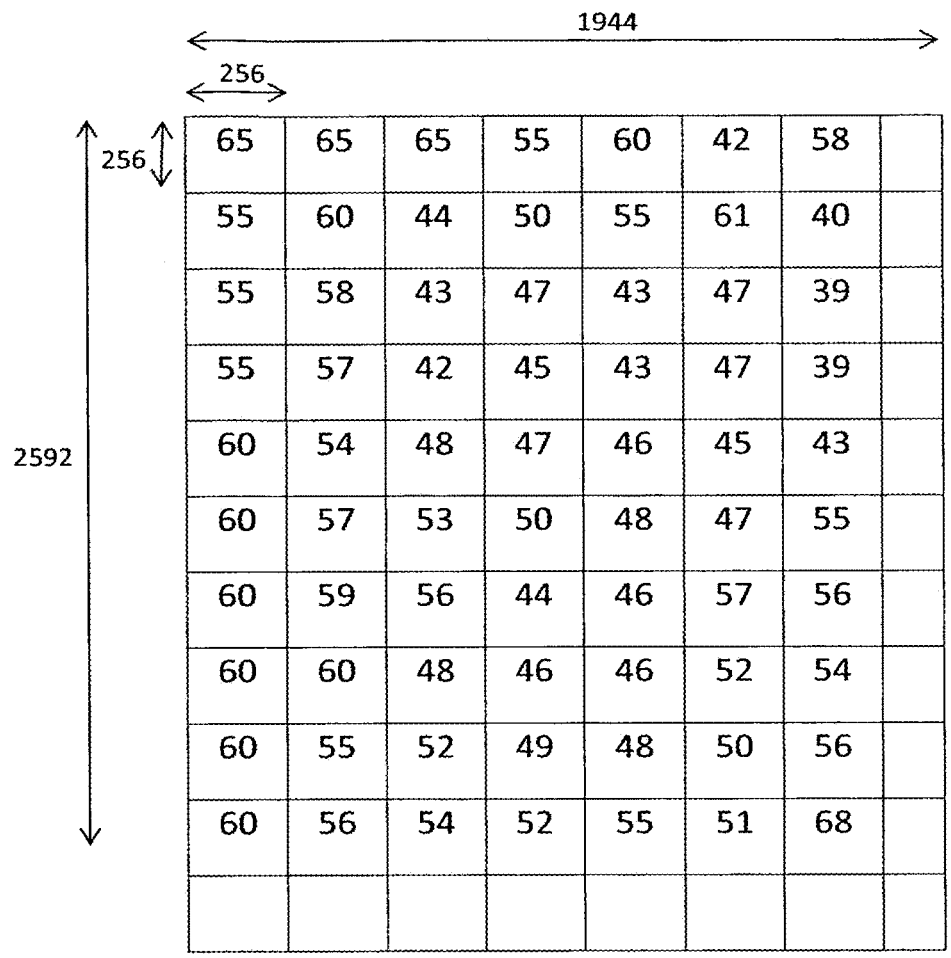

FIGS. 37a-37g show an example of locally zeroing DCT coefficients in accordance with certain embodiments, of the present invention. As an example, an input image with a resolution of 1944×2592 pixels is used and the input image. This image is divided into tiles of 256×256 pixels each for performing the local-adaptive compression described herein, giving 7 full rows of 10 full tiles each. FIG. 37a shows by way of example the MQF values determined for each tile.

The highest MQF value in the example matrix M(i,j) shown in FIG. 37a, which corresponds to the finest quantization table, is 68 (located in the lower right corner of FIG. 37a). Therefore, the whole image will be quantized with a quantization matrix computed based on an MQF value of 68. The values of this quantization table are shown in FIG. 37b.

Now referring for example to the tile adjacent on the left to the one in the lower right corner of FIG. 37a, which has an MQF value of 51. The quantization matrix corresponding to an MQF value of 51 is shown in FIG. 37c.

Referring now by way of example to the 8×8 block of pixels which is located in the tile whose MQF value is 51. An example of the pixel values of such a block is shown in FIG. 37d. FIG. 37e shows the quantized DCT coefficients after quantizing the DCT transform of the pixels in FIG. 37d with the quantization matrix in FIG. 37b (MQF=68).

FIG. 37f shows the quantized DCT coefficients after quantizing the DCT transform of the pixels in FIG. 37d with the quantization matrix in FIG. 37c (MQF=51). These are the coefficients that would been received if the coarser quantization matrix of FIG. 37c (MQF=51) had been used.

Finally, the DCT coefficients matrix of FIG. 37e is obtained, and any coefficient whose corresponding value is zero in the matrix of FIG. 37f is zeroed, resulting in the DCT coefficient matrix of FIG. 37g. The zeroed DCT coefficients are marked in bold. This process is applied to all 8×8 blocks of pixels in the tile whose MQF value should be 51. In this way a lower local MQF value of 51 may be simulated in this tile, even though the image's "global" quantization matrix has a high MQF value of 68.

According to some embodiments, the process illustrated in FIG. 22 may be performed on the Luma channel only, and the Chroma channels may be quantized using Qmax, or the process may be performed both on the Luma channel and on the Chroma channels.

Another possible DCT coefficient modification which may be implemented as part of some embodiments includes rounding the DCT coefficients to the level they would have reached with the coarser quantization matrix derived from M(i,j), i.e., rounding the non-zero DCT values to obtain the same quantization error they would have reached with the quantization matrix derived from M(i, j).

Having described some embodiments of the invention which relate to locally adaptive JPEG recompression, a further block-based approach to quality score computation which may be used for local or global scoring is now described in accordance with some embodiments of the invention. In FIG. 6, step 520, a block or tile-based approach to quality score computation may be employed. The block or tile size may be dependent on input image size. For example, certain predetermined image size ranges may be provided, and for each predetermined image size a respective block size may be provided. By way of example, the block or tile size may be set to 32×32 for small images less than 0.25 Mega Pixel in size, 64×64 for Medium images between 0.25 and 1 Mega Pixel in size, and 128×128 for Large images over 1 Mega Pixel in size. A quality score value, possibly with smooth area penalties, which artificially lower the quality score values in smooth areas is computed for, typically, each pixel in the block or tile and then averaged over the block or tile to yield a set of tilescores. These are suitably pooled into a single overall error for the entire image or a portion of the entire image e.g. by taking the lowest score, min(tilescores), or by averaging the lowest score with the average over the scores:

$$0.5*(\{\min\{\text{tilescores}\}+\text{avg}\{\text{tilescores}\}) \qquad \text{Formula 7}$$

(equivalent to averaging the worst block and the original global quality score).

Combination of block scores to obtain an overall score computation may therefore be performed as follows; Assume a I×J 2-D tile score array TileScore[i][j], with a local score computed for each tile. A single score for each tile may be found by multiplying the above three quality score component values (e.g. local similarity score, blockiness score, and texture distortion score) for that tile. Then the overall score may be computed using one of the following methods:

$$\text{Score} = \frac{1}{I*J}\sum_{i=1}^{I}\sum_{j=1}^{J} TileScore[i][j] \text{ (Average), or} \qquad \text{Formula 8}$$

$$\text{Score} = \min_{i,j} TileScore[i][j] \text{ (Minimum), or} \qquad \text{Formula 9}$$

-continued $$\text{Score} = 0.5 * \left[ \left( \min_{i,j} \text{TileScore}[i][j] \right) + \left( \frac{1}{I * J} \sum_{i=1}^{I} \sum_{j=1}^{J} \text{TileScore}[i][j] \right) \right] \quad \text{Formula 10}$$

Typically:

$$\text{Score} = \left[ \frac{1}{\sum_{i,j} w_{i,j}} \sum_{i=1}^{I} \sum_{j=1}^{J} (w_{i,j} \cdot \text{TileScore}[i][j])^p \right]^{D_p}$$

where the weights w(i,j) and the norm factor p are predetermined.

Another possibility provided here by way of further example is to keep 3 2-D arrays, one holding the PSNR based score, one the blockiness score and one the texture score. Then obtain a global score for each measure using one of the above schemes, and combine the three obtained scores into the final score by multiplying them.

An example of computations useful in performing the blockiness score computation method, one example of which is illustrated by FIG. 3 is now described. In this example, 4×4 image blocks are used for simplicity. FIGS. 14A and 14B are examples of luma pixel values in two adjacent blocks of 4×4 pixels in the original image (the input image), and in the two corresponding blocks of 4×4 pixels in the recompressed image, respectively.

In step 210 of FIG. 3, compute the difference image: imDiff of FIG. 14C by subtracting the recompressed image pixel values from the original image pixel values (subtracting the values of FIG. 14A from those of FIG. 14a).

The following steps (not shown) may optionally be provided e.g. after step 210:

a: On imDiff, run along the 4×4 grid, e.g. for JPEG to H.264 recompression applications, or along the 8×8 grid, e.g. for JPEG to JPEG recompression applications, and for each point on a horizontal or vertical block edge check for the presence of an edge.

b: compute for each block edge a respective added-blockiness score indicating an extent of added artifactual edges along the respective block edge c: Generate edgeValues, a 2-D edge map, containing 1 where an edge is present and 0 where not.

According to certain embodiments, in step 220 of FIG. 3, on imDiff, run along the 4×4 grid, e.g. for JPEG to H.264 recompression applications, or along the 8×8 grid, e.g. for JPEG to JPEG recompression applications and for each point on the vertical edge (in this example the two blocks are adjacent vertically), compute the edge detection ratio between the difference across the edge, and the sum of differences to either side of the edge. An example is given in the following formula for the first row, similarly for other rows:

$$\frac{|B11 - A14|}{|B12 - B11| + |A14 - A13|}$$

This yields:

EdgeRatio1=|3−25|/(|(1−3|+|25−24|)=22/(2+1)=7.33

EdgeRatio2=|0−2|/|((−23)−0)+|2−7|)=2/(23+5)=0.07

EdgeRatio3=|5−32|/((|3−5|+|32−28|)|)=27/(2+4)=4.5

EdgeRatio4=|(−10)−13|/(|−21−(−10)|+|13−7|)=23/(31+6)=0.62

If for example the threshold is 3. EdgeRatio1 and EdgeRatio 3 are above the threshold, and EdgeRatio2 and EdgeRatio4 are below the threshold. Therefore, the edgeValues map for this example is as shown in FIG. 15.

In step 230 of FIG. 3, the global blockiness score is computed as: [1−average (edgeValues)]. Assuming these two blocks are the only blocks in the image, the global score for this image would be 0.5 since average(edgeValues) is (1+0+1+0)/4=0.5.

An example of computations useful in performing the Texture distortion score computation method of FIG. 4 is now described. In the following example, the variance (texture distortion) measure for a block of 4×4 luma pixels is computed. FIGS. 16A and 168 are examples of luma pixel values in a 4×4 block of the original image (the input image), and in the corresponding 4×4 block in the recompressed image, respectively.

In step 310 of FIG. 4, the mean of each block is computed using the following formula:

The mean of B, an N×N block of values B[i][j] with i=1, . . . , N, j=1, . . . , N is given by:

$$\text{mean}_{N \times N}(B) = \frac{1}{N^2} \sum_{i=1}^{N} \sum_{j=1}^{N} B[i][j]$$

Mean (Original) = 1332/16 = 83.25

Mean (Recompressed) = 1211/16 = 75.69

Next, subtract the mean from each value, and take the absolute value of this difference, to obtain normalized values for the original image block and for the recompressed image block, as shown in FIGS. 17A and 178 respectively.

Finally, compute the variance of each of the blocks of FIGS. 17A and 178, using the following formula:

The variance of B, an N×N block of values B[i][j] with i=1, . . . , N, j=1, . . . , N is computed as:

$$\text{var}_{N \times N}(B) = \frac{1}{N^2} \sum_{i=1}^{N} \sum_{j=1}^{N} |B[i][j] - \text{mean}_{N \times N}(B)|,$$

V1 = Var(Original) = 219.5/16 = 13.72

V2 = Var(Recompressed) = 197/16 = 12.31

FIG. 4, step 320: The variance ratio (V1/V2) is 13.72/12.31=1.11. If the predetermined range is [0.8,1.2], then a variance ratio of 0.11 lies within the range, so the texture distortion score for this block is set to 0. On the other hand, in the example demonstrated in FIGS. 35 and 36 the same computations yield Mean (RecompressedB)=1293/16=80.81, thus yielding the absolute, mean substracted values shown in FIG. 17B. These are then used to compute the variance which is V2B=Var(RecompresscdB)=165.4/16=10.34.

Therefore the variance ratio (V1/V2B) is 1.3, which lies outside the above predetermined range and therefore the texture distortion for this block is set to 1. It is appreciated that the perceptual quality measures described herein with reference to FIGS. 1-10 have a wide variety of recompression applications such as but not limited to:

(a) JPEG to H.264 recompression applications such as but not limited to those shown and described in Applicant's co-pending U.S. Provisional Application No. 61/248,521, entitled "A method and system for processing an image", filed 5 Oct. 2009, whose teachings may be adapted in accordance with certain embodiments of the present invention;

(b) JPEG to JPEG recompression applications such as but not limited to that described herein below with reference to FIG. 12;

(c) Any other recompression involving block-based coding schemes using DCT or similar transforms.

It is appreciated that the methods of FIGS. 1-10 provide perceptual quality measures suitable for evaluating recompression of JPEG and H.264 images into JPEG and H.264 format but also for evaluation of recompression of formats and into formats which are similar enough to JPEG and to H.264 for the methods and systems shown and described herein, to be applicable. For example, the methods and systems shown and described herein may be applicable to formats which are not identical to H.264 but have relevant features in common with H.264.

In further embodiments, the input image may be resized to a different resolution before recompression, and recompressed to obtain a recompressed image in said different resolution.

In further embodiments, the input image may be recompressed, and the recompressed image may be resized to a different resolution after recompression, to obtain a recompressed image in said different resolution.

In some embodiments, when the image is resized before or after compression, the target quality range may be reduced, since viewers may tolerate a greater loss in subjective quality when the input image and output image are not directly comparable.

FIG. 12 is a simplified flowchart illustration of a method for recompression of images operative in accordance with certain embodiments of the present invention and using a quantization matrix generated from a quantization matrix of a precursor image by scaling using a Quality Factor (QF). Typically, an initial QF is employed by the method of FIG. 1 for an initial recompression iteration, and a perceptual quality measure is computed. If that measure falls within a target quality interval, the initial QF is deemed satisfactory. If the measure falls above the interval, quality is better than it needs to be and the QF is typically decreased to obtain more compact recompression. If the measure falls below the interval, quality is less than it needs to be and the QF is typically increased at the expense of compactness of recompression. The interval is found by subjective evaluation of a set of test images, with example numerical values, which are not intended to be limiting, set out below.

A method for finding a quality factor (QF) for step 1050 of FIG. 12, is now described with reference to FIGS. 13A-13B. The method is iterative, finds a typically optimal JPEG Quality Factor and assesses the performance of the perpetual measure. It is appreciated that whereas in the method of FIGS. 13A-13B, the Quality Factor is limited to integer values, to reduce complexity, this need not be the case. The recompressed image quality may be assessed using the JPEG quality score described herein. The threshold may be set to 0.5 with 0.05 tolerance, i.e., images that provide a quality score in the range [0.45,0.55] are accepted and do not undergo additional recompression iterations. If the image is resized before or after recompression, the threshold may be reduced to 0.425 with 0.025 tolerance, i.e., images that provide a quality score in the range [0.4, 0.45]

are accepted and do not undergo additional recompression iterations. If the input image is in raw (uncompressed) format, the threshold may be increased to 0.65 with 0.05 tolerance, i.e., images that provide a quality score in the range [0.6, 07] are accepted and do not undergo additional compression iterations. The target QF (Quality Factor) may be found using an iterative, bi-section approach as shown in FIGS. 13A-13B. Initialization as shown in FIG. 13B may include quality thresholds e.g. target quality–qualTgt(=0.5), and quality tolerance–qualTol (0.05). Lowest and highest allowed QF values are set e.g. minQF and maxQF, and the initial guess for the Quality Factor used in step 1020 of FIG. 12—QFnext. Possible values: minQF=60, maxQF=98, QFnext=80. After initialization, the image is encoded using QF=QFnext. Compute obtained image quality: qualScoe.

IF |qualScore–qualTgt|<quaTol (or reached maximum allowed iteration number) then Target QF=QF, and the process ends. If (maxQF–minQF=1), i.e., the target QF has been found within the range of a single integer, QFnext-maxQF, minQF=maxQF (to ensure that this is the last iteration) and the process returns to image encoding. IF (maxQF=minQF), i.e., the target QF has been found, then Target QF=QF, and the process ends. IF qualScore<qualTgt: minQF=QF, QFnext=QF+min(round(0.5*(maxQF–QF)),5). Otherwise, maxQF=QF, QFnext=QF+min(round(0.5*(QF–minQF)),5). Here the process returns to image encoding.

The process of FIGS. 13A-13B is an example of a bi-section search, where an initial allowed range for QF is determined and at each stage the 'valid' section, within which the target point lies, is halved. The following features may or may not be provided: Protection to assure convergence may be added, namely limiting maximum number of iterations and resolving the situation where the target QF has been limited to the range of a single integer (step 1130 in FIG. 13A). Since the target QF is expected to generally be closer to 80 than to the edge values, step-sizes may be limited to 5, to avoid 'over-stepping' the target point in the early iterations. On occasion the same value of QF is examined more than once during the iterative process. To reduce complexity the sets of examined QF values and obtained qualities may be stored to reuse as needed.

In addition to the iterative bi-section search approach described herein, another possible method of searching for the optimal QF value is the secant method.

The secant method uses the two last points to find the next proposed point for evaluation, for example, according to the following formula:

$$x_{n+1} = x_n - \frac{x_n - x_{n-1}}{f(x_n) - f(x_{n-1})} f(x_n) = \frac{x_{n-1} f(x_n) - x_n f(x_{n-1})}{f(x_n) - f(x_{n-1})}$$

Where $x_{n+1}$ is the next point, $x_n$ and $x_{n-1}$ are the two last points, and $f(x_n)$ is the quality score at QF value $x_n$ minus the target quality score (for example 0.5).

While the original secant method may speed up convergence, it does not behave well when the root is not bracketed, i.e. when the two previous points lie on the same side of the desired solution, rather than on either side of it. Therefore, another possible search method is a modified secant approach, sometimes called the "false position" method, where the secant method is only applied once the target point is bracketed, i.e. quality values for QF points are on either side of it. In addition, the result may be clamped so that it lies in an allowed range of QF values. Thus, the iterative process of searching for the QF may start using the bi-section search method, and once two points have been obtained, one with a quality score above the target range, and one with a value below the target range, the secant method is used to find the next point. In addition, if the new proposed QF value is very close to the previous value, the bi-section method is used which speeds up convergence for this case.

In further examples, a scaling factor is used to uniformly scale the default quantization matrix found in the JPEG standard, and then a simple or weighted average is computed between the scaled default quantization matrix and the quantization matrix of the original JPFG image. Typically, an additional step in the process ensures that each value in the new quantization matrix is never smaller than the corresponding value in the quantization matrix of the original image.

Figure 32A:
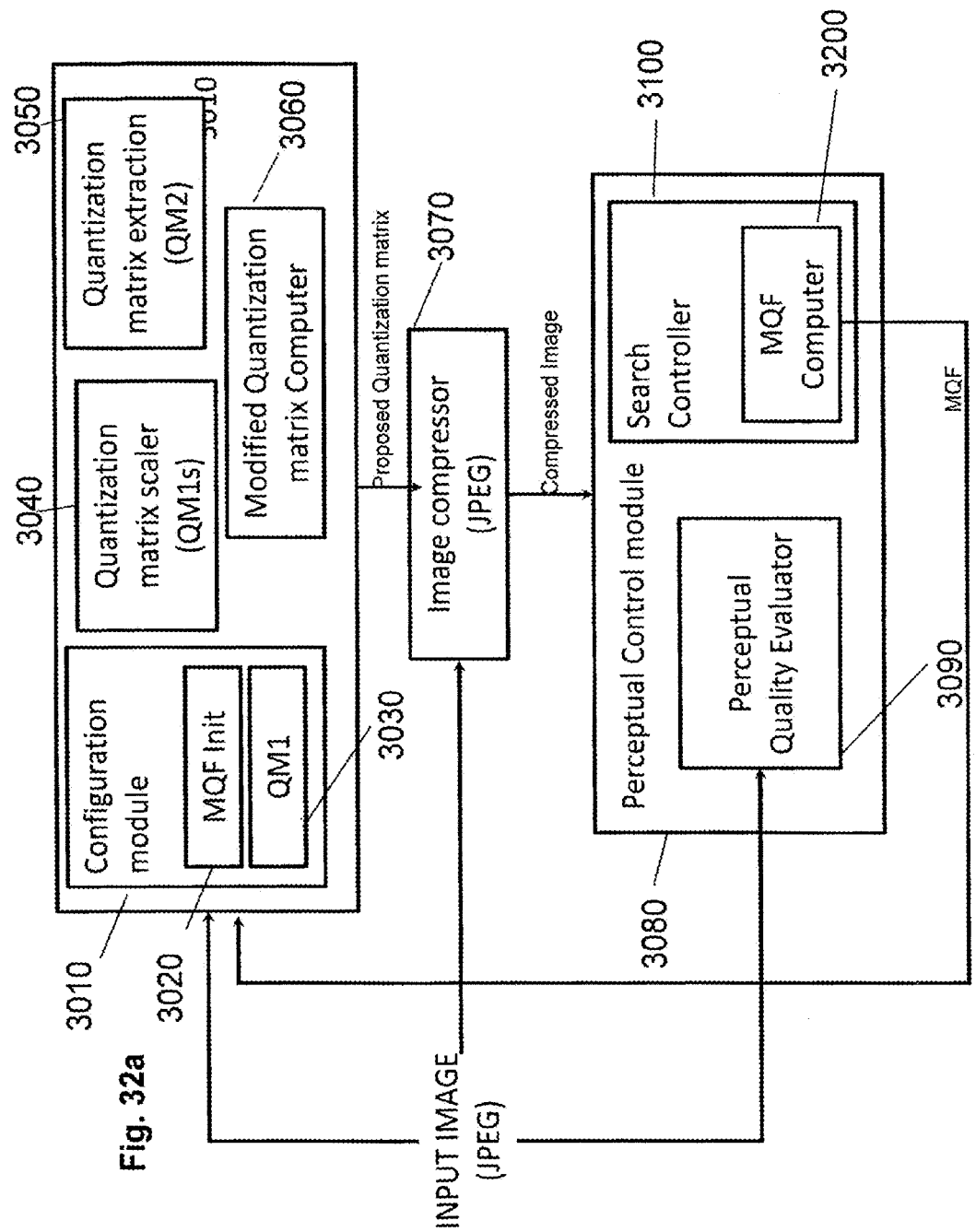
FIG. 32a is a block diagram of illustration showing by way of example a possible implementation of a system for recompressing. JPEG images based on the method of iterative search for compression parameters which cause the recompressed image to satisfy a perceptual quality criteria relative to the input image.

FIG. 32a is a block diagram illustrating by way of example a system for recompression of images operative in accordance with certain embodiments of the present invention and using a quantization matrix generated by combining a quantization matrix of a precursor image and a second quantization matrix, for example a default quantization matrix such as that stipulated in the JPEG standard.

Reference is now made to FIG. 23. According to some recompression embodiments, a first quantization matrix derived from a first image to be recompressed is combined with a second quantization matrix which is scaled using a factor termed MQF (modified quality factor), and the first and scaled second matrices are combined to obtain an "additional quantization matrix" which is used to perform recompression.

The new quantization matrix, used for independent disjoint block-level compression, may be generated by scaling at least one second quantization matrix by at least one scaling factor, thereby to provide at least one scaled matrix, and subsequently computing at least one additional quantization matrix as a weighted average of said at least one scaled matrix with the at least one first quantization matrix. The weighted average may be computed by:

a. multiplying each entry in the at least one scaled quantization matrix by a corresponding entry of an at least one weighting matrix, the weighting matrix entries comprising values between 0 and 1, to produce a first weighted component;
b. multiplying each entry in the at least one first quantization matrix by a value of one minus the value of the corresponding entry of an at least one weighting matrix to produce a second weighted component; and
c. adding the first weighted component to the second weighted component values to produce the weighted average element value of the at least one additional quantization matrix.

FIG. 23 is a simplified flowchart illustration of a recompression method constructed and operative in accordance with certain embodiments of the present invention which may include some or all of the steps shown, suitably ordered e.g. as shown. Step 2360 may comprise or be used for computation of a quantization matrix by combination of matrices as described in detail herein.

An MQF of 100 typically corresponds to the highest recompression quality JPEG may provide and consequently the lowest recompression. An MQF of 1 typically corresponds to the lowest JPEG recompression quality and consequently the highest recompression. Practically speaking. MQF 90 is considered very good quality recompression in many applications.

Since depth of recompression is related to the magnitude of the values of the quantization matrix, the MQF value controls or scales depth of recompression, typically in that the higher the MQF value, the higher the recompression quality and the less or lower the compression obtained.

A particular advantage of using a quantization matrix which is a combination of two quantization matrices is that the first such matrix may be specific to the image to be recompressed including particular suitability to "special areas", e.g. with particular blockiness or texture, in the recompressed image, whereas the second such matrix may be a standard JPEG matrix designed, in general, to provide perceptual similarity before and after JPEG compression for the overall "population" of images. A suitable simple or weighted average of the two yields good compression in combination with minor perceptual degradation.

For example, reference is now made to FIG. 18 which is a simplified flowchart illustration of an example of a method for recompression of images operative in accordance with certain embodiments of the present invention and using a quantization matrix generated by combining a quantization matrix of a precursor image and a second quantization matrix, for example a default quantization matrix such as that stipulated in the JPEG standard. The method of FIG. 18 typically includes some or all of the following steps, suitably ordered e.g. as shown:

Step 1810: provide a first image which has at least one first quantization matrix associated therewith and which was generated by independent coding of disjoint blocks in a precursor image Step 1820: generate a new quantization matrix by scaling a second quantization matrix, for example a default JPEG quantization matrix using a scaling factor derived from a Modified Quality Factor (MQF), and combine it with the quantization matrix of the input JPEG image using weighted averaging, e.g. as per FIG. 19.

Step 1830: use new quantization matrix computed in step 1820, for provisional independent disjoint block-level compression of the first image, thereby to generate a re-compressed second image Step 1840: compute a quality measure for the provisional compression e.g. using some or all of the quality measures described herein with reference to FIGS. 1-10 and any of the herein disclosed variations of the quality measures Step 1850: if the value computed using the quality measure(s) falls within the a target quality interval, output the current recompressed second image, and otherwise, use a subsequent MQF value, which may be for example computed using the method of FIGS. 20A-20B, and which is greater or smaller than the initial value for the scaling factor if the quality measure falls on one or another side of the textural change measure interval respectively.

Figure 33:
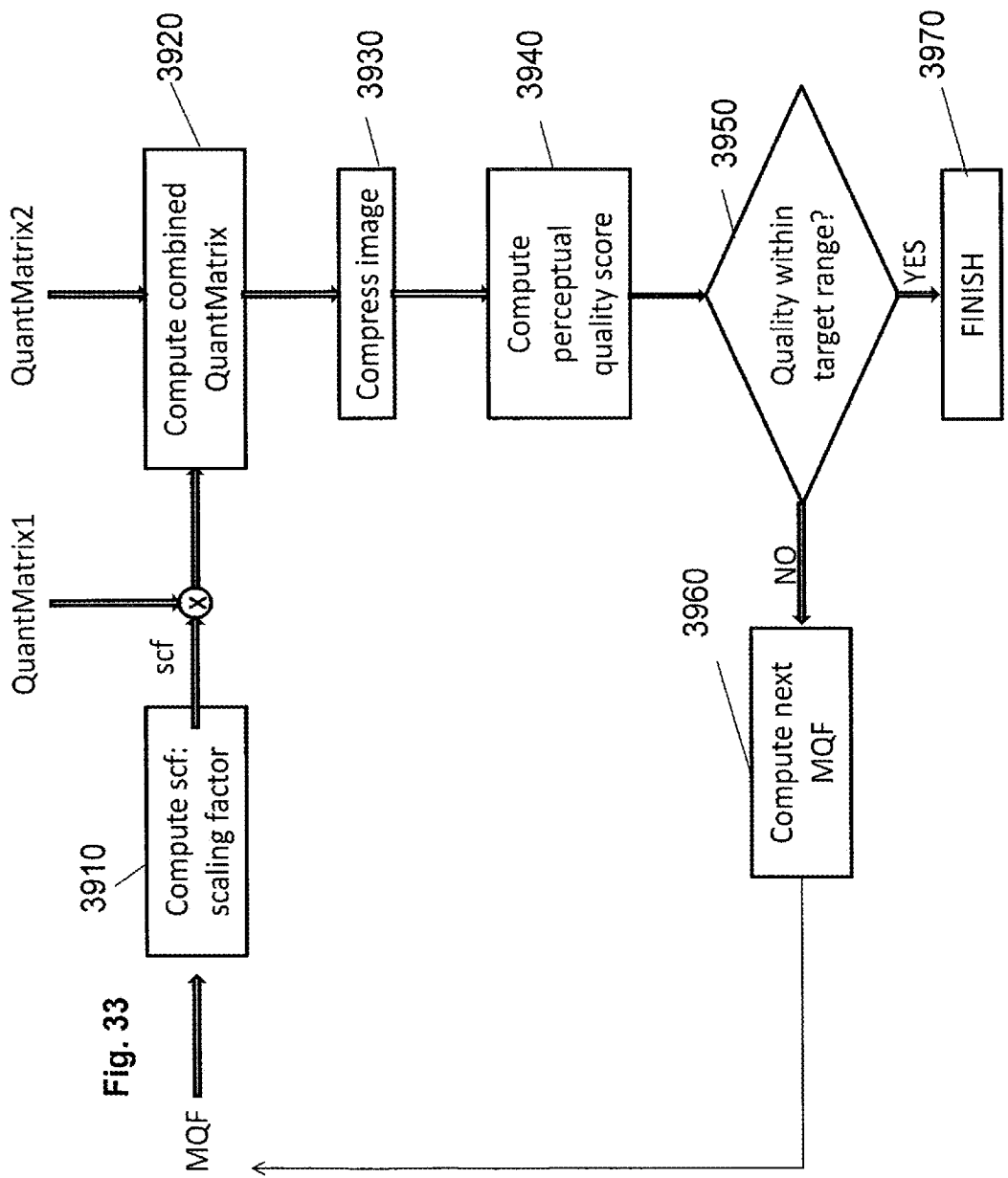
FIG. 33 is a flowchart illustrating by way of example a method for performing a quantization matrix generation process in accordance with certain embodiments of the present invention.

FIG. 33 and FIG. 19 are simplified flowchart illustrations of an example of a method for performing the weighted averaging in step 1820 of FIG. 18, according to certain embodiments of the present invention. The method of FIG. 19 typically includes some or all of the following steps, suitably ordered e.g. as shown:

Step 1910: QOij (i,j=1.8) is the quantization matrix of the original image.

QDij (ij=1.8) is a second quantization matrix, for example the default quantization matrix described in the JPEG standard, an optimal JPEG quantization matrix computed for the image, the quantization matrix of the original image, or any other second quantization matrix selected for encoding the image.

MQF is the Modified Quality Factor used in the current iteration of recompression, which may be computed as described herein with reference to FIGS. 20A and 20B.

Step 1915: Compute S, the scaling parameter used to scale the second quantization matrix QDij as follows:

IF QF<50 $S=(5000/QF)/100$ ELSE $S=(200-2*QF)/100$.

Step 1920: computed scaled quantization matrix QSij (i,j (i 1 ... 8) as follows:

$QSij=S*QDij(i,j=1 ... 8)$

Step 1930: generate temporary quantization matrix of the reconstructed image QTij (i,j: 1 ... 8) as follows:

$-QT_{ij}=W_{ij}*QS_{ij}+(1-W_{ij})*QO_{ij}(i,j=1 ... 8)$

Where Wij (i,j=1 ... 8) is a weighting matrix, with values between 0 and 1.

Step 1940: generate quantization matrix of the reconstructed image QRij (ij=1 ... 8) as follows:

if QTij>=QOij, then QRij=QTij, otherwise, QRij=QOij

If Wij=0.5 for all i,j, the new quantization matrix is an average of the scaled quantization matrix and the original quantization matrix. Typically, the parameter S is the only one that changes during the recompression iterations: S varies in each iteration, then QR is computed, a new image is compressed using QR, the image quality of the new image is evaluated typically employing a perceptual image quality measure including for example any of the herein disclosed quality measures and any of the herein disclosed variations thereof JPEG quality score, and encoding either terminates or another new image is re-encoded using a new S parameter.

FIGS. 39a-39d show an example of the method for performing the new quantization matrix generation in accordance with certain embodiments of the present invention. FIG. 39a shows by way of example the quantization matrix of an input JPEG image. FIG. 39b shows a pre-selected quantization matrix. FIG. 39c shows by way of example a scaled version of the matrix in FIG. 39b, using a scaling factor of 0.2, derived from an MQF value of 90. FIG. 39d shows by way of example the quantization matrix created by averaging the matrix in FIG. 39c with the matrix in FIG. 39a and limiting the resulting values to the values of the input quantization matrix.

FIGS. 38a-38g demonstrates by way of example the advantages of the method described herein for performing the new quantization matrix generation by averaging the input quantization matrix with a selected scaled version of a default matrix, as opposed to using only a scaled version of a default quantization matrix.

FIG. 38a shows an example of the quantization matrix of an original JPEG image. FIG. 38b shows by way of example the quantized DCT coefficients of a single 8×8 block in the image. FIG. 38c shows by way of example the reconstructed pixel values of the block in FIG. 38b.

In this example, it is assumed that the aim is to re-encode the image with an approximate quality factor of 82. FIG. 38d shows the quantization matrix achieved by scaling a default JPEG quantization matrix with a scaling factor corresponding to a QF of 82. FIG. 38e shows the reconstructed pixels after DCT, quantization with the quantization matrix in FIG. 38d; inverse quantization and inverse DCT.

FIG. 38f shows by way of example a quantization matrix that has a similar approximated quality factor as the quantization matrix in FIG. 38d, but is created by averaging a scaled version of the default matrix with the original quantization matrix and clipping, according to an example of the quantization matrix generation method of the present invention. FIG. 38g shows by way of example the reconstructed pixels after DCT, quantization with the quantization matrix in FIG. 38f, inverse quantization and inverse DCT.

Computing the Mean Squared Error between the reconstructed pixels in FIG. 38e and the original reconstructed pixels in FIG. 38c gives a value of 15.84. Computing the Mean Squared Error between the reconstructed pixels in FIG. 38g and the original reconstructed pixels in FIG. 38c gives a value of 1.85. The difference in these values demonstrates that using the method described herein for generating the new quantization matrix results in an image that is closer to the original image than using the standard method of generating a quantization matrix.

An iterative method for finding a Modified Quality Factor (MQF) for step 1850 of FIG. 18, is now described with reference to FIGS. 20A-20B. By way of example, a typically optimal MQF is obtained and the performance of the perceptual measure is assessed. It is appreciated that whereas in the method of FIGS. 20A-20B, the Quality Factor is limited to integer values, to reduce complexity, this need not be the case. The Recompressed image quality may be assessed using the JPEG quality score described herein. For example, the threshold may be set to 0.5 with 0.05 tolerance, i.e., images that provide a quality score in the range [0.45,0.55] are accepted and do not undergo additional recompression iterations.

When using local-adaptive recompression, where a different quality is used to encode each Tile in the image, the target quality may be set to a lower range, such as approximately 0.45 with tolerance of approximately 0.05, since the overall score is an average of the worst behaving tile and average score over the tiles. If the image is resized before or after recompression, the threshold may be reduced to 0.425 with 0.025 tolerance, since it is more difficult for the end user to visually compare and detect artifacts in images that have a different resolution. If the input image is in raw (uncompressed) format, the threshold may be increased to 0.65 with 0.05 tolerance, since artifacts in the output image are more noticeable when the input image is uncompressed, and therefore has very high quality.

The target MQF may be found using an iterative, bi-section approach as shown by way of example in FIGS. 20A-20B. Initialization as shown by way of example in FIG. 208 may include quality thresholds e.g target quality—qualTgt(0.5), and quality tolerance—qualTol (0.05). Lowest and highest allowed QF values are set e.g. minQF and maxQF, and the initial guess for the MQF used in step 1820 of FIG. 18—MQFnext. Possible values: minMQF=35, maxMQF=95, MQFnext=70. When using local-adaptive recompression, where a different quality is used to encode each Tile in the image, by way of example the initial MQF value may be set to MQFnext65, since the entire image is no longer penalized for "difficult" blocks.

After initialization, the image is encoded using MQF-MQFnext. Compute obtained image quality: qualScore.

IF |qualScore−qualTgt|<qualTol (or a maximum allowed iteration number is reached) then Target MQF=MQF, and the method ends. If (maxMQF−minMQF=1), i.e., the target MQF has been found within the range of a single integer, MQFnext-maxMQF, minMQF=maxMQF (to ensure this is the last iteration) and the method returns to image encoding.

IF (maxMQF=minMQF), i.e., the target MQF has been found, then Target MQFP=MQF, and the method ends. IF qualScore<qualTgt: minMQF=MQF,
 MQFnextiMQF+min(round(0.5*(maxMQF−MQF)),8). Otherwise, maxMQF=MQF, MQFnext=MQF+min(round (0.5*(QF−minQF)),8). Here the method returns to image encoding.

The method illustrated by FIGS. 20A-20B is an example of a bi-section search, where an initial allowed range for MQF is determined and at each stage the 'valid' section, within which the target point lies, is halved. The following features may or may not be provided: Protection to assure convergence may be added, namely limiting maximum number of iterations and resolving the situation where the target MQF has been limited to the range of a single integer (step 1130 in FIG. 20A). Since, by way of example, the target MQF is expected to generally be closer to 70 than to the edge values, step-sizes may be limited to 8, to avoid 'over-stepping' the target point in the early iterations. On occasion the same value of MQF is examined more than once during the iterative process. To reduce complexity the sets of examined MQF values and obtained qualities may be stored to reuse as needed.

In addition to the iterative bi-section search approach described above, another possible method of searching is the secant method. The secant method uses the two last points to find the next proposed point for evaluation, according to the following formula:

$$x_{n+1} = x_n - \frac{x_n - x_{n-1}}{f(x_n) - f(x_{n-1})} f(x_n) = \frac{x_{n-1} f(x_n) - x_n f(x_{n-1})}{f(x_n) - f(x_{n-1})}$$

Whre $x_{n+1}$ is the next point, $x_n$ and $x_{n-1}$ are the two last points, and $f(x_n)$ is the quality score at MQF value $x_n$ minus the target quality score (for example 0.5).

While the original secant method speeds up convergence, it does not behave well when the root is not bracketed, i.e. when the two previous points lie on the same side of the desired solution, rather than on either side of it. Therefore, another possible search method is a modified secant approach, sometimes called the "false position" method, where the secant method is only applied once the target point is bracketed, i.e. quality values for MQF points are on either side of it. In addition, the result is clamped so that it lies in an allowed range of MQF values. Thus, the iterative process of searching for the MQF may start using the bi-section search method, and once two points have been obtained, one with a quality score above the target range, and one with a value below the target range, the secant method is used to find the next point. In addition, if the new proposed MQF value is very close to the previous value, the bi-section method is used which speeds up convergence for this case.

Regardless of the search method used (bi-section, secant, or any other method), selecting an optimal MQF starting point and step size for the search is important in order to reduce the number of search iterations, and hence reduce the overall processing time for recompressing an image. Selecting an optimal MQF starting point and step size may also allow converging to a more accurate working point, by reducing the target quality range, without increasing the number of required iterations.

As images are recompressed, historical knowledge accumulates re suitable initial MQF values and step sizes, for various images. Images sharing a certain quantization matrix, or a similar matrix, often recompress well when same or similar MQF values are used, so a historical MQF value used historically for such images is a good guess for an initial value for a new image having the same or similar quantization matrix because good or best MQF values for such images tend to cluster around that historical value. The step size may be selected based on how closely the MQF values used for Images sharing that quantization matrix, or a similar matrix, cluster around the historical MQF value.

Recompression parameters such as MQF may be found by a search whose own parameters e.g. initial MQF and/or step size are derived from any suitable characteristic of the image to be compressed, such as but limited to characteristics related to the quantization matrix of the image to be compressed, and/or any other characteristic such as texture characteristics.

Typically, recompression parameters used in the past are archived in association with relevant characteristics of the image being recompressed, such that subsequent images with the same or similar characteristics, may be recompressed using the same or similar recompression parameters or such that a search for recompression parameters, for subsequent images, may be parameterized based on recompression parameters used in the past for the same or similar images. It is appreciated that recompression parameters include the search parameters used to develop at least one parameter of the actual recompression process. For example, the MQF may be used to develop the quantization matrix actually used in recompression of a particular image, and the recompression parameters of that image in fact include not only the MQF but also initial MQF, step size or any other parameter of the search used to develop the MQF which is used as above.

Any suitable metric may be used to quantize similarity between image characteristics such as similarity between quantization matrices. Such metrics may include the Euclidean distances of at least some corresponding matrix elements, or any other suitable metric.

FIG. 24 is a table representing a historical archive re recompression of past images which is useful in performing the method of FIG. 23.

It is appreciated that even if no metric is defined, say between quantization matrices, FIG. 24 is still, practically speaking, useful since quantization matrices of images to be recompressed do often repeat themselves, e.g. in applications in which the same imaging device or identical imaging devices and same settings (e.g. commercial products with a small number of settings such as an iPhone) are used by one or many users to generate a large number of images.

One possible method of selecting a good MQF starting point and step size is based on the quantization matrix of the input image. This method is performed by first pre-processing an image database which contains a large number of images, and dividing it into groups which have the same quantization matrix (typically images that were taken by the same camera with the same quality settings). For each group, the values of the quality score vs. MQF for all images are plotted. Then, by observing the behaviour of these graphs, an optimal MQF starting point and optimal MQF step size, to use at the onset of the iterative search, may be determined for each group. This process may be repeated while resizing the images by a known factor, to obtain the optimal MQF starting point and step size for resized images. The optimal values may be written in a first table, and the corresponding quantization matrices written in a second table. Then, when the recompression process encounters a known quantization matrix which exists in the second table, it uses the corresponding values of the MQF starting point and step size from the first table. This process ensures a fast convergence of the iterative process which determines the suitable MQF for each image.

Figure 27:
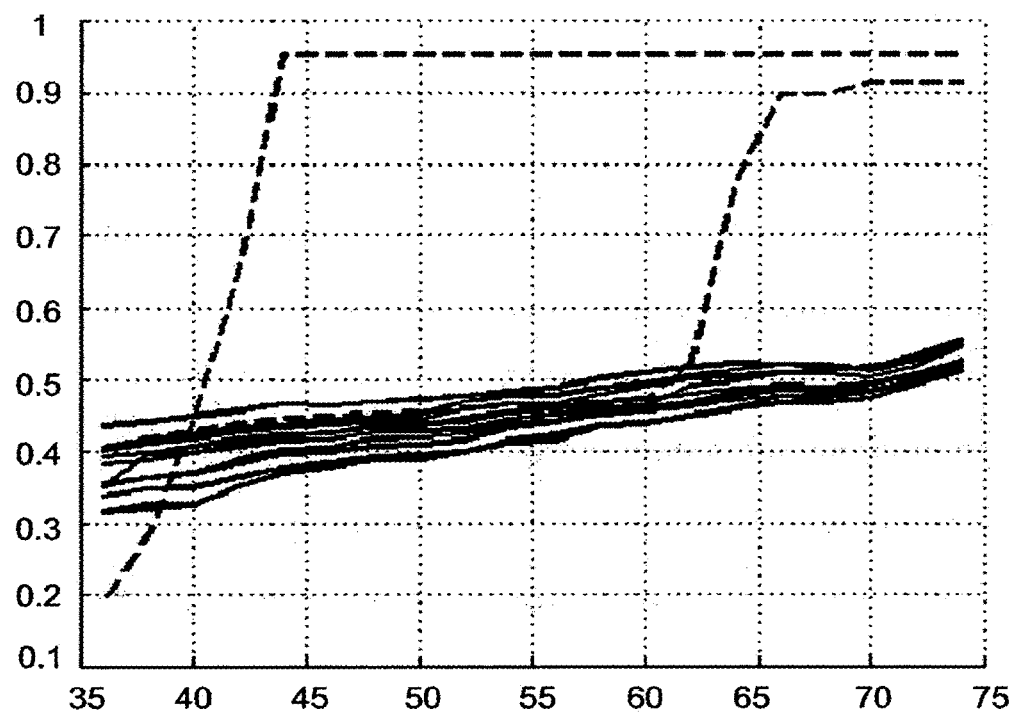
FIGS. 27 and 28 show a relationship between an input image's quantization matrix and the MQF selected by the system of the present invention which performs an iterative search for the MQF value which causes the recompressed image to satisfy a perceptual quality criteria relative to the input image.
Figure 28:
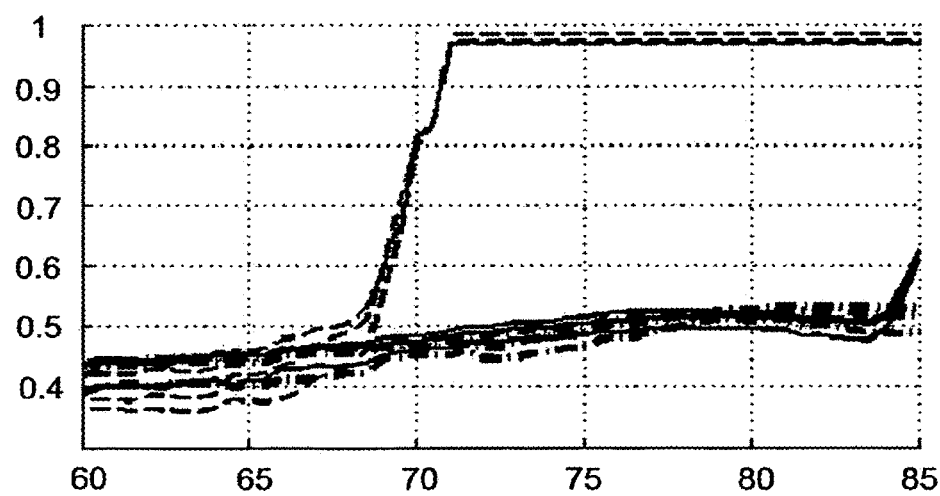

FIG. 27 and FIG. 28 provide examples of obtained quality score vs. MQF for various image sets. FIG. 27 shows by way of example a set of 12 images. Further by way of example 10 of these images share the same quantization matrix, and their quality score vs. MQF is plotted in solid lines. Still further by way of example, the remaining two images each have a different quantization matrix, and their quality score vs. MQF is plotted in dashed lines. FIG. 27 shows that the solid lines are homogeneous, whereas each of the dashed lines are different, demonstrating the correlation between the quality vs. MQF graph and the input image's quantization matrix.

FIG. 28 shows by way of example the quality vs. MQF behaviour of 9 additional images, divided also by way of example into 3 groups, where the 3 images in each group share the same quantization matrix. The first group is plotted solid, the second is dashed and the third dot-dashed. FIG. 28 shows that consistency within each of the 3 groups, demonstrating again that the shapes of these plots indeed correlate highly with the input image's quantization matrix.

A second method enables determining a good MQF starting point for a given input image, based on acquired knowledge. The second method does not require any pre-processing, and operates in a fully automatic manner without manual intervention.

According to the second method, a table of quantization matrices or matrix 'classes' is maintained, and MQF start values and step sizes are stored for each one. Additional columns may exist for MQF start values and step sizes of input images which are resized prior to recompression. Initial values may be taken from a pre-processed image database as described in the previous section, or default values of the regular MQF search process may be used (e.g. MQF=70, step size=8).

For each set of values, a confidence score and a frequency score may be maintained. The Confidence Score (CS) is based on how well the proposed values have performed for the images so far, and is defined as the percent of images, having the same quantization matrix, for which the process converged after 0 or 1 iterations, i.e., the first or second MQF values resulted in a quality score that falls within the accepted quality score range. The Frequency Score (FS) indicates how many images of this type have been encountered so far, i.e., their frequency in the database, and is used to decide which quantization matrix types to keep in the databases in case the database has reached its maximum capacity.

FIG. 29 shows an example of the table used by the MQF start point learning process.

By way of example The process may be implemented as follows: When encountering an image class (Quantization Matrix) that is not included in the Quantization Matrix database, a new entry for this matrix is created, and its values are initialized, for example: Frequency Score: 10; Confidence Score: 0.1; Start MQF: 70; MQF step value: 8. If the maximum number of quantization matrices that may be stored in the database has been reached, this entry will replace entry of the quantization matrix with the lowest FS.

After recompressing an image, the entry corresponding to the image's quantization matrix is updated, for example, according to the process described in FIG. 30. If there are multiple entries, for example due to multiple resize values, each one of them is updated according to the process above. The process demonstrated in FIG. 30 illustrates a single iteration of a possible learning process, i.e. the updates to the values in a table such as the one shown in FIG. 29, upon conclusion of a single image recompression. Given the quantization matrix of the input image the appropriate entry in the table is created or selected, the corresponding FS (frequency score) is updated according to Step 3100 while all other FS scored are updated according to Step 3200. The corresponding entry MQF start value, step size and CS (confidence score) are updated—all according to the presented process, which aims to update the values according to the MQF selected for the current image and the number of iteration required for convergence. For example, in Step 3310, if the resulting MQF is the same as the startMQF stored in the table, then the confidence score is increased, and the start MQF is not changed. Otherwise adaptations are performed as shown in Steps 3320-3322.

The method described above for MQF Start Point Learning was tested on a database of 182 images with 5 different quantization matrices.

Figure 31A:
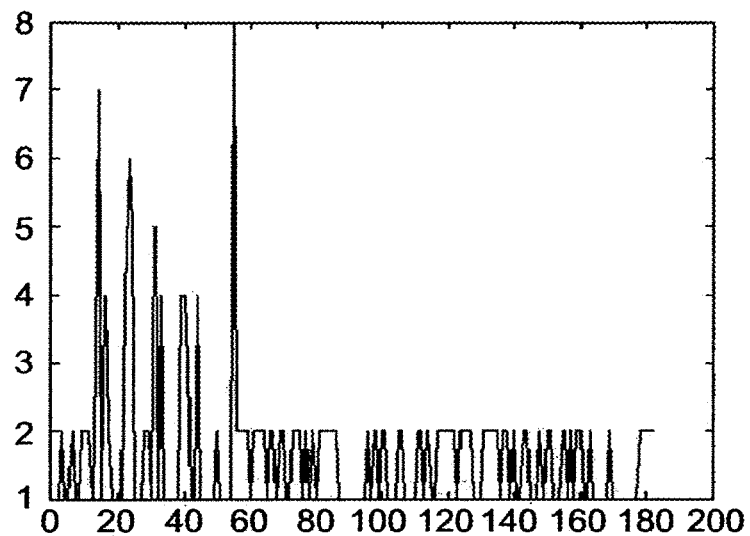
FIG. 31a shows by way of example for each image the number of iterations required for the iterative recompression process to converge without using the MQF start point and step size learning process.
Figure 31B:
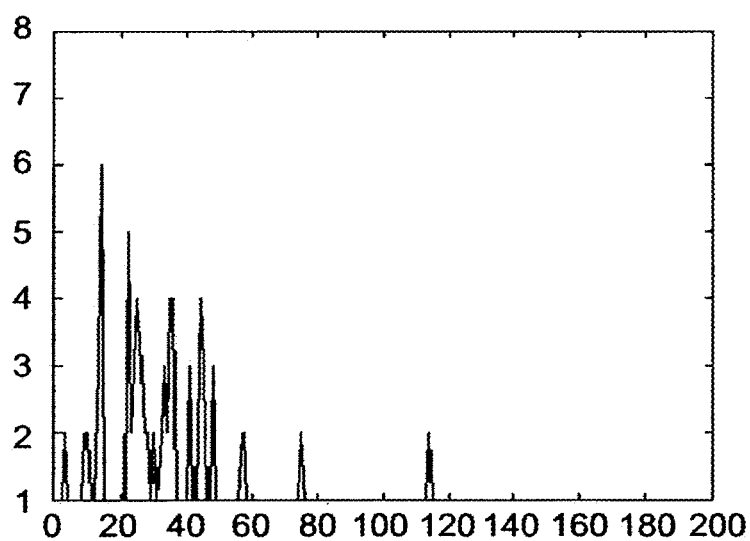
FIG. 31b shows by way of example for each image the number of iterations required for the iterative recompression process to converge when using a MQF start point and step size learning process.

FIG. 31a describes by way of example the number of iterations which may be employed, on the y axis, vs. the sequential number of each image, on the x axis, when using default values for MQF starting point and step size. FIG. 31b describes by way of example the number of iterations required on the y axis, vs. the sequential number of each image on the x axis, when using the MQF starting point and step size learning process described above.

Using the adaptive MQF starting point and step size learning process described herein for the tested image database, the total number of iterations was reduced by a factor of 1.33X (from 305 to 229), the maximum number of iterations was reduced from 8 to 6, and after processing about 50 input images, when the learning process stabilized, only 3 images required more than a single iteration, as opposed to 67 images without using the process.

It is appreciated that many variations of the method of FIGS. 18-20B are possible. For example, at least one and typically a plurality of iterations take place, each using a current proposed scaling factor derived from a Modified Scaling Factor (MQF) to scale a 'target' quantization matrix which may, if desired, be perceptually weighted. In particular, the target quantization matrix comprises, for certain applications, an 8×8 matrix which provides a quantization scale for each of the 8×8 DCT 2-D spatial frequency bins and since the HVS (Human Visual System) is less sensitive to some frequencies than others, a perceptually weighted quantization matrix may be used which has finer (smaller) values, at 'perceptually important' frequencies, which correspond to the HVS sensitivity at each frequency bin.

A candidate quantization matrix is then generated by computing a matrix lying 'between' the input image quantization matrix and the scaled target matrix, such as by, but not necessarily by, a simple, suitably weighted or other averaging or combining process e.g. as described above. Alternatively, as described herein, the candidate quantization matrix may be a scaled input matrix rather than an average between the input matrix and a scaled 'target' matrix. Using this candidate matrix, a corresponding image is generated and the obtained quality is evaluated by any suitable method such as but not limited to those described herein. If the quality is deemed inadequate, using a suitable criterion of adequacy such as but not limited to those specifically shown and described herein, an iterative process typically proposes a "next" proposed MQF value to replace the current proposed MQF value.

FIGS. 39a-39d show an example of the method for performing a quantization matrix generation in accordance with certain embodiments of the present invention.

It is appreciated that for large scale compression operations a dedicated device may be used.

A particular advantage of certain embodiments of the present invention is that compression is not to a target bit rate and does not use a constant quality factor e.g. 95. Instead, a "good" MQF is generated for each individual image where goodness is typically defined as an MQF which results in perceptual degradation which falls inside a target perceptual degradation range and yields high compression, e.g. as high as possible given the perceptual degradation range.

Control of added artifactual edges, as described herein is greatly advantageous relative to conventional blockiness smoothing, such as blockiness smoothing implemented in deblocking filters, described in the literature. The prior art compresses images in such a way as to cause artifactual edges, and then smoothes such edges. According to certain embodiments of the present invention, recompression which would cause artifactual edges is a priori not used, instead being avoided by evaluating the extent of added artifactual edges which certain recompression parameters would cause and reducing the extent of compression if unacceptable artifactual edges would result. Typically, the evaluation identifies added artifactual edges rather than total artifactual edges. Conventionally, blockiness is identified locally, per pixel or block border e.g. 8×8 pixels, and is smoothed if identified. According to certain embodiments of the present invention, artifactual edges are not identified locally and instead are evaluated over a region which includes many blocks, e.g. more than 10 blocks, such as 16×16 blocks. The A process for determining presence of added artifactual edges, according to certain embodiments of the present invention, is illustrated generally in FIG. 34 and examples of suitable processes are described herein with reference to FIGS. 14-15.

The term "input image" and "first image" are sometimes used interchangeably herein to refer to a JPEG image which is to be recompressed.

Figure 32B:
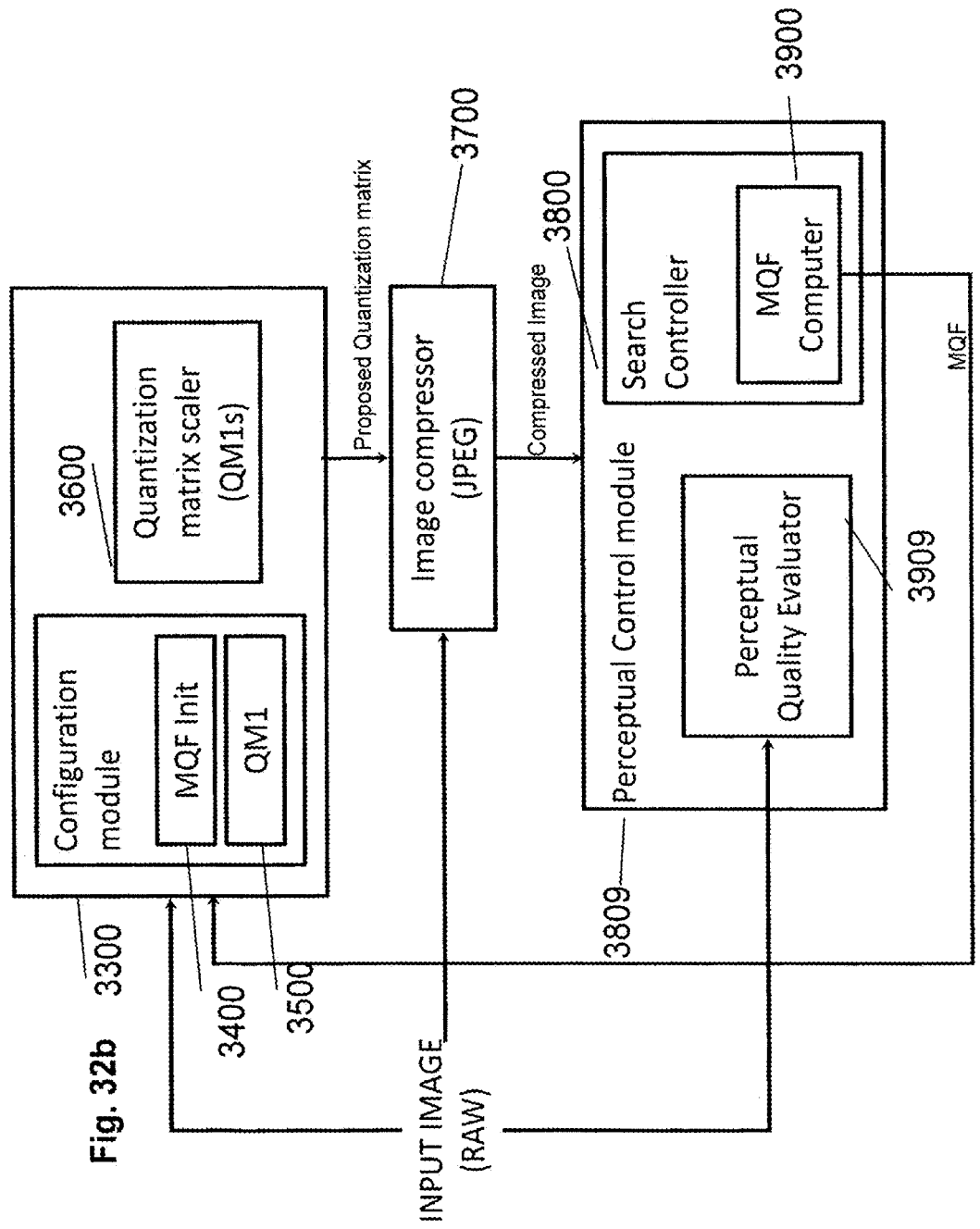
FIG. 32b is a block diagram illustrating by way of example a possible implementation of a system for compressing raw images based on the method of iterative search for compression parameters which cause the recompressed image to satisfy a perceptual quality criteria relative to the input image.

Reference is now made to the systems of FIGS. 32a-32b. It is appreciated that the system of FIG. 32a, any suitable method may be employed to compute the quantization matrix, such as but not limited to scaling a given quantization matrix and averaging it with the input quantization matrix; or scaling the input image's quantization matrix.

The system of FIG. 32b is suitable for JPEG to JPEG recompression applications using a "standard" encoder, which scales a given quantization matrix without taking into account the input image quantization matrix. Instead of averaging with the input quantization matrix the input quantization matrix may simply be disregarded. The method of operation may include running a standard JPEG encoder iteratively on an input image while examining quality measures such as blockiness and texture+PSNR as described in detail herein.

FIG. 40a is a simplified flowchart illustration of a search process operative in accordance with certain embodiments of the present invention which may be performed by the MQF computer of FIGS. 32a and 23b.

Figure 40B:
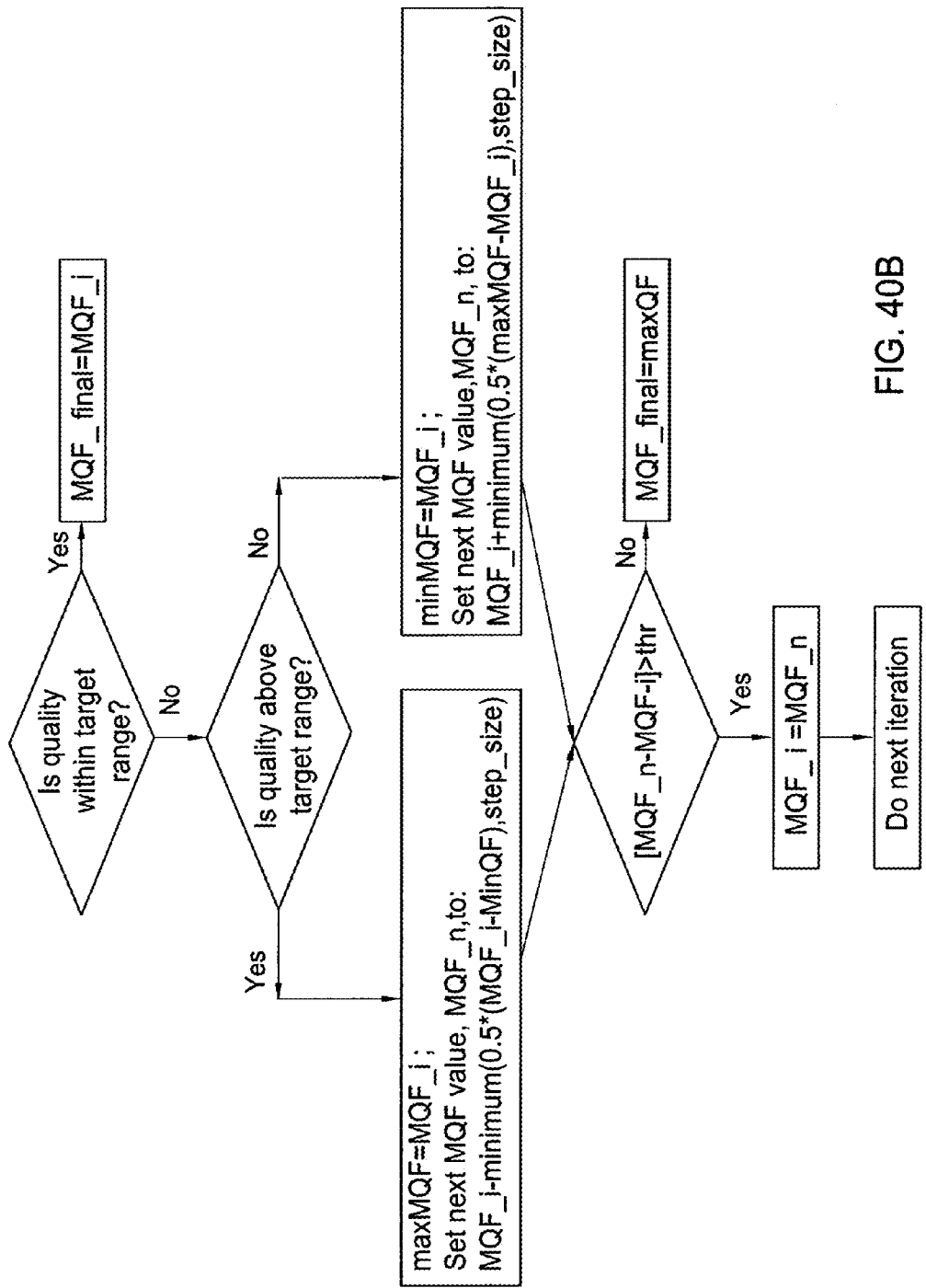

FIG. 40b is a simplified flowchart illustration of a possible implementation of steps 4240 and 4250 in the method of FIG. 40a.

When compressing "provisionally", i.e. in order to evaluate quality and then make decisions as to parameterization of "final" compression process, as shown and described herein, the provisional compression may not be complete e.g. only the Y plane (Luminance) may be compressed. Once a final MQF is selected on the basis of evaluation of the provisional compression, it is used to create a quantization matrix for the chroma which is then compressed accordingly.

FIG. 41 is a simplified flowchart illustration of a method of enabling an image-adaptive, perceptually-lossless and near-maximal image compression. The method of FIG. 41 typically includes some or all of the following steps, suitably ordered e.g. as shown:

4410: compressing a first (e.g. input, JPEG) image (or other disjoint block level encoded image compressed by independent coding of disjoint blocks in a precursor image) giving rise to a second (e.g. provisionally compressed, JPEG) image (or other disjoint block level encoded image generated from said first digital image by independently coding disjoint blocks in the first image) e.g. using provisional compression parameters. Optionally a further iteration of a search for improved compression parameters is invoked (each iteration optionally including adapting a compression parameter based on at least one of, e.g. 11a, iterations previous to said individual iteration) if it is determined that the quality score for the second image does not lie within a predetermined perceptual quality range.

4420: implementing a measure of added artifactual edges along coding block boundaries

4430: determining based at least upon said region quality score whether a perceptual quality criterion is met by said second image e.g. optionally determining based at least upon said image quality score whether a perceptual quality criterion is met by said second image.

4440: optionally, if it is determined that the quality score for the second image does not meet a perceptual quality criterion, recomputing provisional compression parameters and repeating provisional compression, search and determining using the recomputed parameters FIG. 42 is a simplified flowchart illustration of a possible implementation of implementing step 4420 of FIG. 41. The method of FIG. 42 typically includes some or all of the following steps, suitably ordered e.g. as shown:

4510: computing a difference image between the first and second images

4520: defining a region within said difference image, said region comprising a plurality of image blocks;

4530: within said region, computing for each boundary between two coding blocks a respective added-blockiness score indicating an extent of added artifactual edges along the respective boundary;

4540: computing a region quality score based on the added-blockiness scores computed for each boundary within the region FIG. 43 is a simplified flowchart illustration of a further alternative implementation of implementing step 4420. The method of FIG. 43 typically includes some or all of the following steps, suitably ordered e.g. as shown:

4610: defining a plurality of regions within the difference image, each region comprising a plurality of image blocks,

4620: computing a region quality score for each of said plurality of regions, giving, rise to a respective plurality of region quality scores, e.g. computing at least two region quality scores for a corresponding set of at least two regions in the output image and providing compression instructions based at least in part on said at least two region quality scores.

4630: computing an image quality score for the second image based on said plurality of region quality scores The systems and methods shown and described herein are particularly useful in image compression and recompression systems and may be implemented in hardware or in software, including implementation in VLSI, in dedicated, hardware, in embedded systems with a DSP or CPU (computerized device), or running fully in software on a general purpose computer.

Image compression systems incorporating systems and methods shown and described herein may include digital cameras, software and hardware image encoders, command line PC applications such as ImageMagick and jpegtrans, and any PC software application which exports compressed images such as but not limited to PhotoShop, Paint, Microsoft Office Picture Manager.

Image recompression and processing systems incorporating systems and methods shown and described herein may include software and hardware image encoders, command line PC applications such as ImageMagick and jpcgtrans, and any PC imaging software such as but not limited to PhotoShop, Paint, Microsoft Office Picture Manager.

It is appreciated that the terms "quality score" and "quality factor" are not synonymous. "Quality Factor" (QF) is used by conventional JPEG systems to enable the user to control the extent of compression and hopefully also of resulting image quality. Modified Quality Factors (MQF) are described herein. The scope of the present invention is intended to include JPEG systems in which the extent of compression (or re-compression) is controlled by means of a typically user-controlled MQF parameter or a QF parameter, rather than only by means of a conventional QF button.

"Quality score" or "quality measure" is an attempt to provide a formula which correlates with users' direct subjective evaluation of the quality of an image e.g. relative to a previous image from which the evaluated image was derived e.g. by compression. One primitive quality score is PSNR whereas methods for computation of more sophisticated quality scores are described herein e.g. with reference to FIG. 1.

Figure 44A:
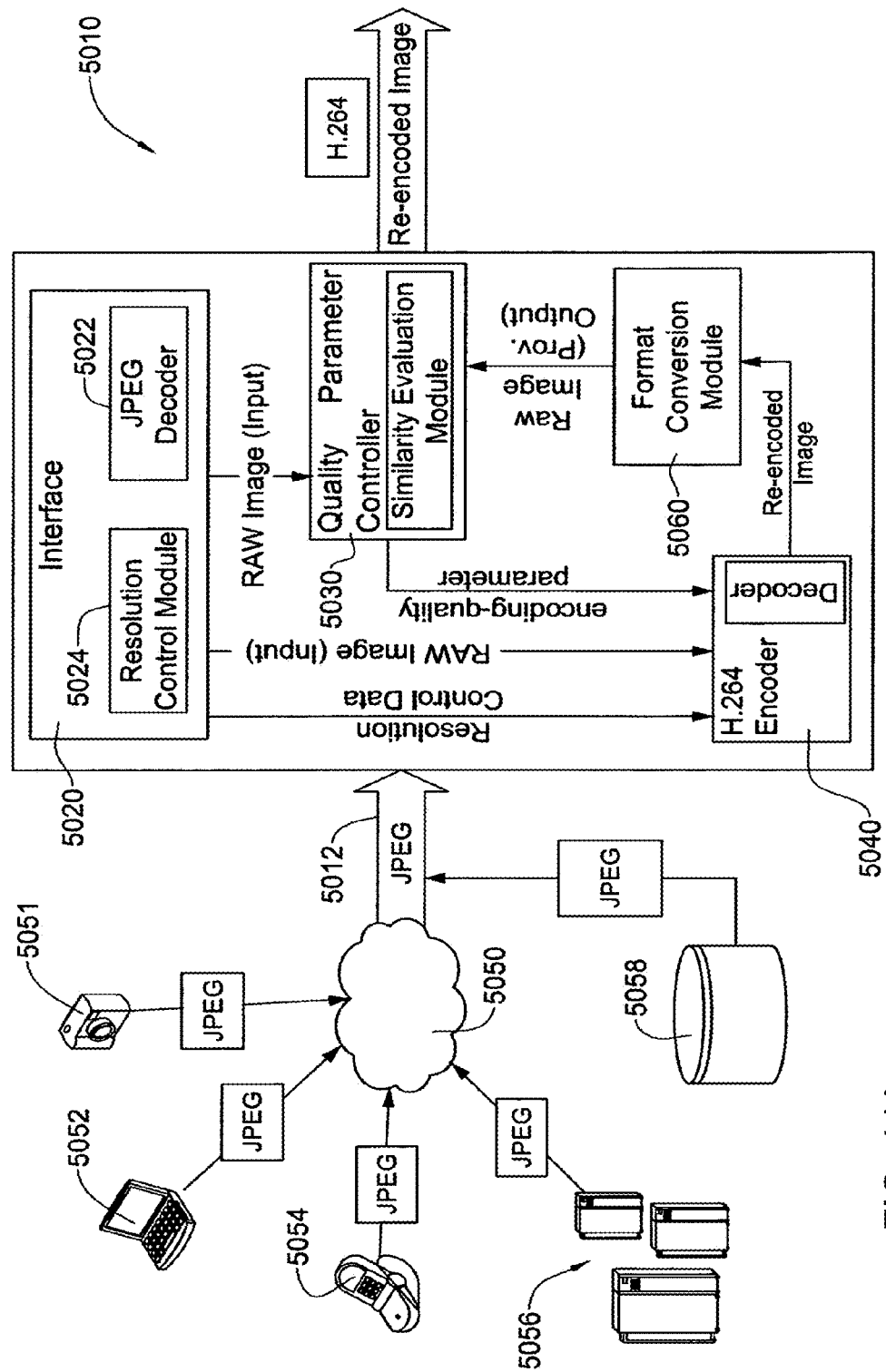
FIG. 44a is a high level block diagram illustration of an image processing system according to some embodiments of the invention.

Reference is now made to FIG. 44a, which is a high level block diagram illustration of a discrete input image processing system, according to some embodiments of the invention. For convenience in the embodiments shown in FIG. 44a and in the description thereof provided herein, reference is made to recompression of JPEG images. In some embodiments, the system 5010 may include an input interface 5020, a quality parameter controller 5030 and a H.264 encoder 5040.

Figure 44B:
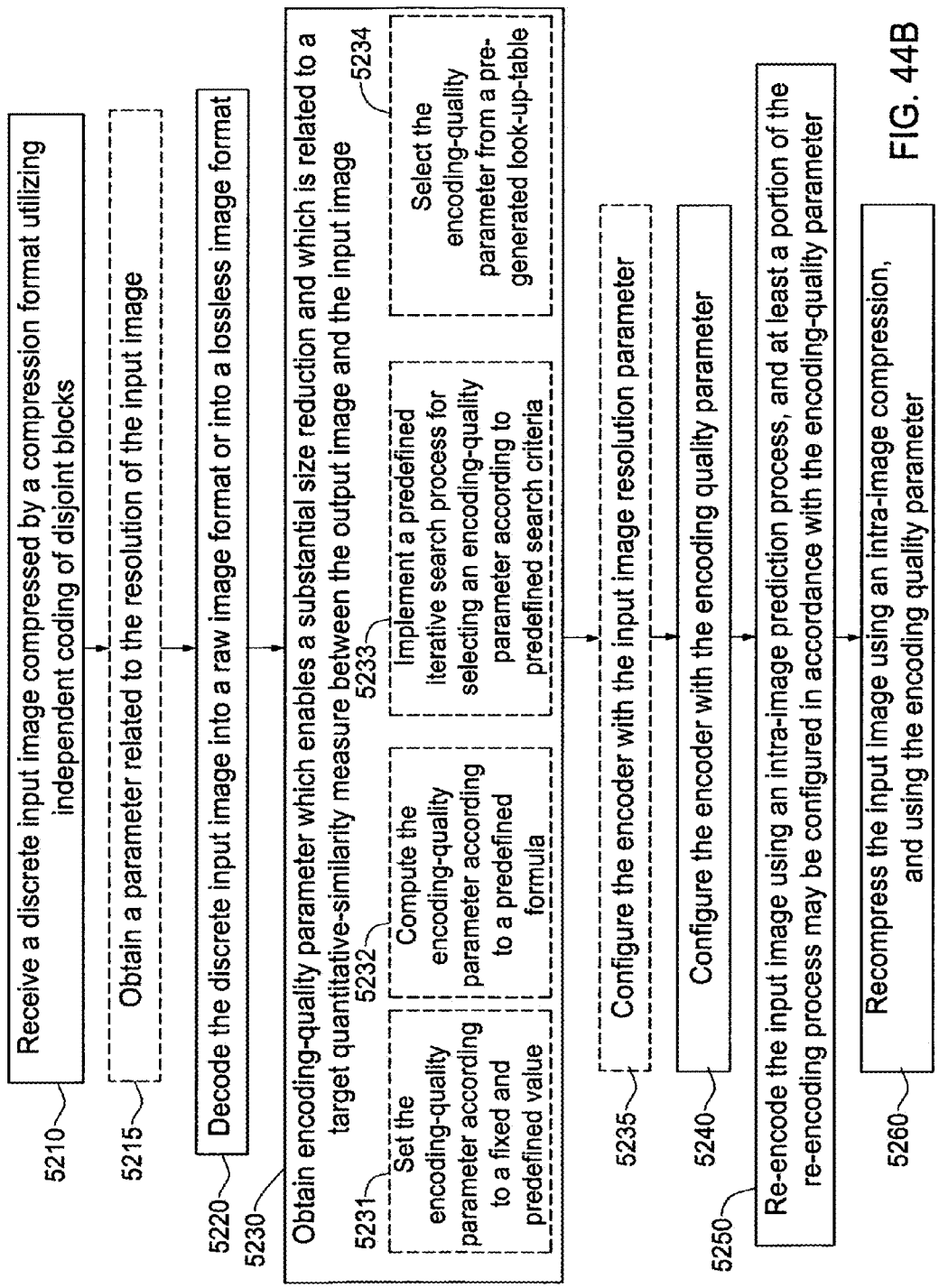
FIG. 44b is a flowchart illustration of a method of processing a discrete input image according to some embodiments of the present invention.

Additional reference is now made to FIG. 44b, which is a flowchart illustration of a method of processing a discrete input image according to some embodiments of the present invention. The process begins with the receipt of a discrete input image compressed by a compression format utilizing independent coding of disjoint blocks. The interface 4020 is adapted to receive the discrete input image compressed by a compression format utilizing independent coding of disjoint blocks (block 5210), such as a discrete JPEG image 5012 compressed in accordance with the JPEG standard, as is shown by way of example in FIG. 44a. In some embodiments, the discrete input image is a high-quality JPEG image.

There are various possible sources for the input image, including, but not limited to, remote devices connected to the system 5010 over a network 5050, such as a digital camera 5051, a personal computer 5052, a mobile communication device 5054 or a data center 5056, and local devices, such as a local storage device 5058 (e.g., a hard drive disk).

In some embodiments, the interface 5020 may include a decoder that is adapted to decode the discrete input image into a RAW image format or into a lossless image format (block 5220). For example, the decoder may decode the compressed image into any one of the following formats: YUV, RGB, BMP, PNG and TIFF. In the embodiment shown in FIG. 44a, the decoder is a JPEG decoder 5022 which is adapted to decode the input JPEG image into a RAW image. In further embodiments, the decoder may be configured to perform partial decoding of the input image and may translate the compressed image to a representation in the pixel domain. In still further embodiments, the decoder may be configured to perform partial decoding of the input image and may translate the compressed image to a representation in the frequency domain. In yet further embodiments, the decoder is a JPEG decoder 5022 as mentioned above, and the JPEG decoder 5022 is configured to perform partial decoding of the input JPEG image. In yet further embodiments, the JPEG decoder 5022 may directly extract the YUV 4:2:0 samples created as part of the JPEG decoding process.

The quality parameter controller 5030 may be operatively connected to the interface 5020. The raw image may be fed as input to the quality parameter controller 5030. As mentioned above, the quality parameter controller 5030 is adapted to provide an encoding-quality parameter enabling a substantial size reduction of the discrete output image, wherein the parameter is related to a target quantitative-similarity measure between the output image and the input image (block 5230). According to some embodiments, the target quantitative-similarity measure represents an acceptable difference between an output image of the system and the input image. In further embodiments, the target quantitative-similarity measure represents a minimal similarity requirement between the output image and the input image.

In some embodiments, the quality parameter controller 5030 may be configured to set the encoding-quality parameter according to a fixed and predefined value (block 5231). In further embodiments, the quality parameter controller 5030 may be configured to compute the encoding-quality parameter according to a predefined formula (block 5232). In still further embodiments, the quality parameter controller 5030 may implement a predefined iterative search process for selecting an encoding-quality parameter according to predefined search criteria (block 5233). In yet further embodiments the quality parameter controller 5030 is adapted to select the encoding-quality parameter from a pre-generated look-up-table (block 5234). More details with respect to each of the above options shall be provided below.

In FIG. 44a and according to some embodiments of the present invention, by way of example, a preconfigured H.264 encoder 5040 is used as the intra-prediction encoder. In accordance with some embodiments, the H.264 encoder 5040 may be preconfigured in a manner to enable intra-image prediction and to disable inter-image (or inter-frame) prediction.

In further embodiments, the H.264 encoder 5040 may be preconfigured in a manner to disable an in-loop deblocking filter. In some embodiments, the H.264 encoder 5040 may be preconfigured in a manner to enable the in-loop deblocking filter. In still further embodiments, H.264 encoder 5040 may be configured to determine whether to enable or disable the in-loop deblocking filter according to a parameter related to the quality of the input image. In still further embodiments, the encoder may determine whether to enable or disable the in-loop deblocking filter according to encoding-quality parameter provided by the quality parameter controller. For example, the H.264 encoder 5040 may be configured to enable the in-loop deblocking filter for an input image characterized by relatively low quality. While in some cases, using a H.264 deblocking may improve perceived quality of an output image re-encoded the H.264 encoder 5040, the deblocking effect may reduce the perceived similarity between the output and the input images.

Resuming the description of FIG. 44b. The H.264 encoder 5040 may be operatively connected to the quality parameter controller 5030, and the encoding-quality parameter may be fed to the H.264 encoder 5040. The H.264 encoder 5040 may be configured with the encoding-quality parameter (block 5240). The H.264 encoder 5040 may be also operatively connected to the interface 5020 and may receive as further input the representation of the input image as generated by a decoder such as the JPEG decoder 5022. The H.264 5040 may be adapted to re-encode the input image using an intra-image prediction process, and at least a portion of the re-encoding process may be configured in accordance with the encoding-quality parameter (block 5250). Further details with respect to the re-encoding process shall be provided below.

Figure 44C:
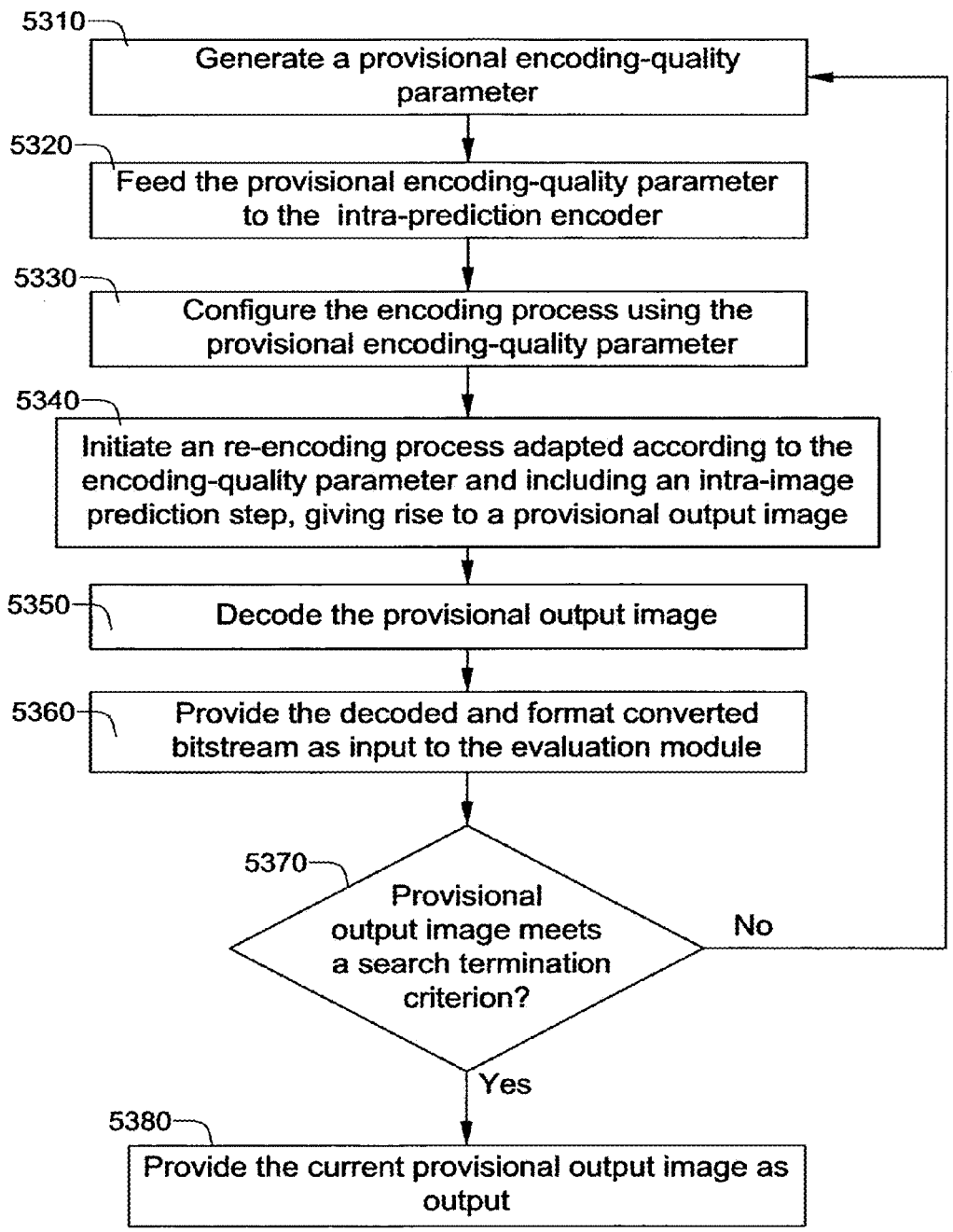
FIG. 44c is a flowchart illustration of an example of an iterative encoding-quality parameter search process which may be implemented as part of some embodiments of the present invention.

Reference is now made to FIG. 44c, which is a flowchart illustration of an example of an iterative encoding-quality parameter search process which may be implemented as part of some embodiments of the present invention. At each iteration of the search process, the similarity evaluation module 5032 may generate a provisional encoding-quality parameter (block 310) which is provided as input to the H.264 encoder 40 (block 320).

According to some embodiments, the initial provisional encoding-quality parameter may be predefined. For example, the initial provisional encoding-quality parameter may be preset to a value which corresponds to a H.264 quantization parameter value of 5022. In further embodiments, the initial provisional encoding-quality parameter may be selected by an operator of the system 5010. For example, the operator of the system 5010 may be presented with two or more choices, each choice representing a different tradeoff between similarity and compression, and correspondingly, each choice associated with a different H.264 quantization parameter value. In further embodiments, the user choices cover a range which corresponds to H.264 quantization parameter values between 14 and 32. In yet further embodiments, the initial provisional encoding-quality parameter may be computed or otherwise determined. For example, the initial provisional encoding-quality parameter may be determined based on parameters related to quality/resolution of the input image, external user-selected parameters, etc. Further by way of example, the possible choices for an initial provisional encoding-quality parameter may be constrained by a predetermined range, for example, only values which correspond to H.264 quantization parameter values between 14 and 32 may be considered.

In some embodiments, the search termination criterion may include an optimization criterion. In further embodiments, according to the optimization criterion, the evaluation module 5032 may be configured to terminate the encoding-quality parameter search when a provisional output image optimizes a similarity (or difference) between the output image and the input image and a size reduction of the discrete output image.

In further embodiments, by way of example, the optimization criterion may take into account a convergence criterion according to which an optimal output image is also related to the difference in the size of the output image at a current iteration of the search compared to the size of the output image at one or more previous iterations. Further by way of example, a convergence criterion implemented by the evaluation module 5032 is related to the rate of improvement in terms of a size reduction associated with the current provisional encoding-quality parameter compared to the size of reduction associated with one or more of the previous provisional encoding-quality parameters. In still further embodiments, the search for an encoding-quality parameter may be constrained by a minimum similarity threshold between the output image and the input image (or by a maximum difference threshold).

According to some embodiments, in case it is determined that the current provisional output image meets the search termination criterion, the similarity evaluation module 5032 may indicate to the H.264 encoder 5040 to provide the H.264 bitstream corresponding to the current provisional output image as the output of the re-encoding process (block 5380).

In the above description, the proposed search for an encoding-quality parameter is implemented with respect to each one of multiple re-encoded provisional output images. There is now provided an alternative implementation of a search process for an encoding-quality parameter, which is based on segmentation of the image and implementing an encoding quality parameter on a segment (and possibly on each segment) of the image, according to some embodiments of the invention.

Figure 44D:
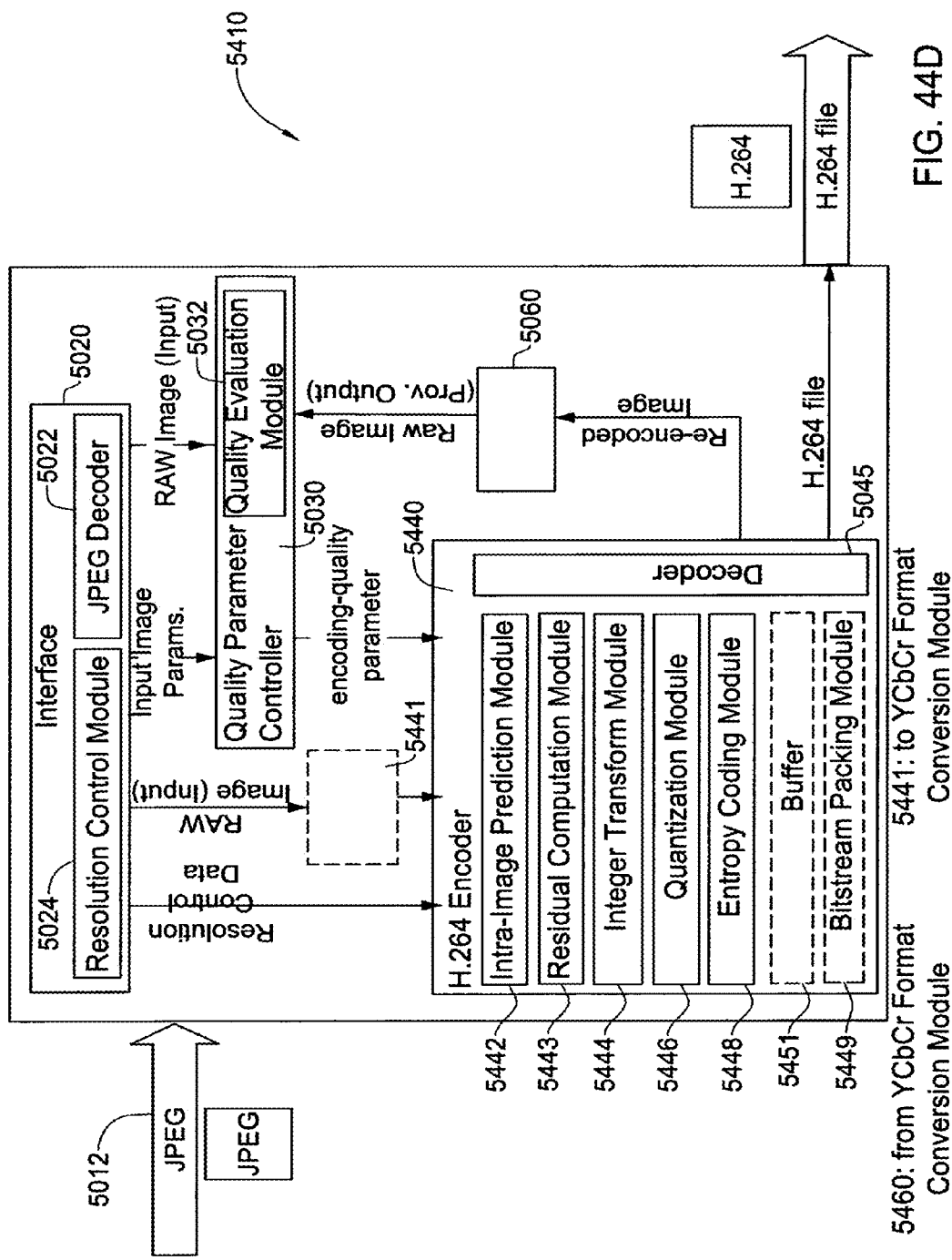
FIG. 44d is a block diagram illustration showing the system of FIG. 44a in further detail, according to some embodiments of the invention.

Reference is now made to FIG. 44d, which is a block diagram illustration showing the system of FIG. 44a in further detail, according to some embodiments of the invention. As mentioned above, in some embodiments of the invention, the intra-prediction encoder may be a H.264 (or an MPEG-4 part 10) encoder 5440. According to some embodiments, H.264 encoder 5440 may be responsive to receiving from the quality parameter controller 5030 an encoding-quality parameter (including a provisional encoding quality parameter) for initiating a re-encoding of the input image (or a representation of the input image) received at the system 5400 and for providing a re-encoded, recompressed output image.

As mentioned above, the re-encoding process implemented by the H.264 encoder 5440 is adapted according to the encoding-quality parameter provided by the quality parameter controller 5030. As was also mentioned above, the re-encoding process implemented by the H.264 encoder 5440 includes an intra-image prediction step. An example of one possible implementation of a re-encoding process which may be implemented by the H.264 encoder 5440 is now provided.

In addition to the encoding-quality parameter received from the quality parameter controller 5030, the H.264 encoder 5440 may receive an input image (or a presentation thereof) that is to be re-encoded. For example, the H.264 encoder 5440 may receive input image from the JPEG decoder 5022 as a RAW format representation of the input image.

In some embodiments, the JPEG decoder 5022 may decode the input JPEG image into a RAW format representation of the input image. The image processing system 410 may include a to-YCbCr format-conversion module 5441 which may be adapted to convert the RAW format representation provided by the JPEG decoder 5022 to a YCbCr format representation. According to yet further embodiments, the to-YCbCr format-conversion module 5441 may also be adapted to modify the spatial resolution of the Cb and Cr components. By way of example, the to-YCbCr format-conversion module 5441 may implement a 4:2:0 chroma sampling scheme to reduce the spatial resolution of the Cb and Cr components by a factor of 2 in the horizontal and vertical directions. Other chroma sampling schemes may be used as part of further embodiments of the invention. Format conversion of JPEG bitstream into YCbCr is an integral process of standard JPEG decoding, and thus the to-YCbCr format-conversion module is optional and the YCbCr representation may be obtained directly from the JPEG decoder.

The H.264 encoder 5440 may be configured to enable the H.264 intra-prediction feature and to disable the inter-prediction feature. The H.264 encoder 5440 may provide the downsampled YCbCr values as input to an intra-image prediction module 5442. According to some embodiments, the intra-image prediction module 5442 may be adapted to partition the transformed representation of the input image into a plurality of macroblocks. In the case of H.264, macroblock partitioning is set forth by the standard. According to the H.264 standard, the transformed representation of the input image is partitioned to 16×16 mactoblocks.

However, in further embodiments of the invention, the macroblock partition method implemented by the intra-prediction encoder may depart from or may be different from the standard H.264 partitioning method. For example, the intra-image encoder may be adapted to partition the JPEG image into 8×8 blocks, with intra-prediction which uses concepts similar to that of the H.264 standard intra-prediction but adapted to 8×8 blocks. By way of example, this configuration may be achieved by a propriety encoder (which is not compatible with the H.264 standard).

Continuing with the description of FIG. 44*d*, the intra-image prediction module 5442 may be adapted to predict one or more 16×16 macroblocks within the transformed representation of the input image from neighboring samples of macroblocks which surround the current macroblock. According to the H.264 standard 16×16 macroblock may be predicted from neighboring samples of previously-coded macroblocks which are to the left and/or above the block to be predicted. Further according to the H.264 standard, prediction may be carried-out on the entire block, or prediction may be performed separately from each 4×4 sub-block.

It would be appreciated that it is possible to devise and implement an intra-prediction encoder which implements and uses other block-size partitions schemes and which predicts blocks or sub-blocks according to a different pattern (e.g., it is not limited to predict from macroblocks/blocks which are to the left or above the current macroblock/block).

According to some embodiments, based on the intra-block prediction, an intra-predicted image may be determined, and a residual computation module 5443, which is implemented as part of the H.264 encoder 5440 is adapted to compute a residual image based on the intra-predicted image and the input image (or the representation of the input image received at the encoder).

Continuing with the description of FIG. 44*d*, following the prediction and residual image computation, an integer transform module 5444 which is also implemented within the H.264 encoder 5440 is utilized to convert each color component of each 4×4 block of pixels of the residual image into the frequency domain. According to some embodiments, in compliance with the H.264 standard, the integer transform module 5444 may be adapted to implement an integer transformation. It would be appreciated that it is possible to devise and implement an intra-prediction encoder which implements and uses other transformation techniques.

The transformed residual image is then passed to a quantization module 5446 which is also integrated as part of the H.264 encoder 5440. According to some embodiments of the present invention, the quantization module 5446 may be configured by the H.264 encoder 5440 in accordance with the encoding-quality parameter provided by the quality parameter controller 5030. According to some embodiments the H.264 encoder 5440 may configure the quantization parameter index value that is used by the quantization module 5446 according to the encoding quality parameter provided by the quality parameter controller 5030. Accordingly, the quantization module 5446 is adapted to quantize the residual data according to the encoding-quality parameter provided by the quality parameter controller 5030.

The quantized frequency domain representation matrix may be fed to the entropy coding module 5448. The entropy coding module 5448 may be adapted to reorder the quantized transform coefficients. For example, a zigzag scan may be performed on the matrix of the quantized transform coefficients. Once reordered, the entropy coding module 5448 may be adapted to perform the entropy coding. By way of example, the entropy coding module 5448 may be configured to implement one of the entropy coding techniques prescribed by the H.264 standard: the context-adaptive variable length coding ("CAVLC") or context-adaptive binary arithmetic coding (CABAC).

According to some embodiments, the coded bitstream representation of the output image generated by the H.264 encoder 5440 may be used to provide a re-compressed discrete output image which is perceptually lossless in relation to the discrete input image.

Using the appropriate quantization parameter for configuring the H.264 re-encoding process, it is possible to generate an encoded H.264 bitstream that is based on a discrete JPEG input image, and based on the H.264 bitstream to provide a discrete output image (e.g., via a H.264-compatible file) which is perceptually lossless (or perceptually identical) relative to the discrete JPEG input image, and the discrete output image is further characterized by a substantially reduced footprint compared to the discrete JPEG input image.

In the embodiments shown in FIGS. 44*a*-44*d* and in the description thereof as provided herein reference is made to recompression of JPEG images. FIGS. 44*a*-44*d* and the description thereof herein, provide an example of one implementation of the proposed system. Further embodiments of the invention are not limited to recompression of JPEG images and that a system similar to the system shown in FIGS. 44*a*-44*d* may be readily devised by those versed in the art for recompressing an input image that was encoded using a format other than JPEG, and in particular a compression format utilizing independent coding of disjoint blocks.

Furthermore, in some of the embodiments shown in FIGS. 44*a*-44*d* and in the description thereof provided herein reference is made to recompression of discrete input images using a H.264 encoder. FIGS. 44*a*-44*d* and the description thereof provided herein provide an example of one implementation of the proposed system. Further embodiments of the invention are not limited to recompression of discrete input images using the H.264 format (or the MPEG-4 part 10 format) and that a system similar to the system shown in FIGS. 44*a*-44*d* may be readily devised by those versed in the art for recompressing an input image using an intra-prediction encoder which is based on a format other than H.264, and in particular a compression format utilizing intra-image prediction and a controllable quantization processes.

Figure 56A:
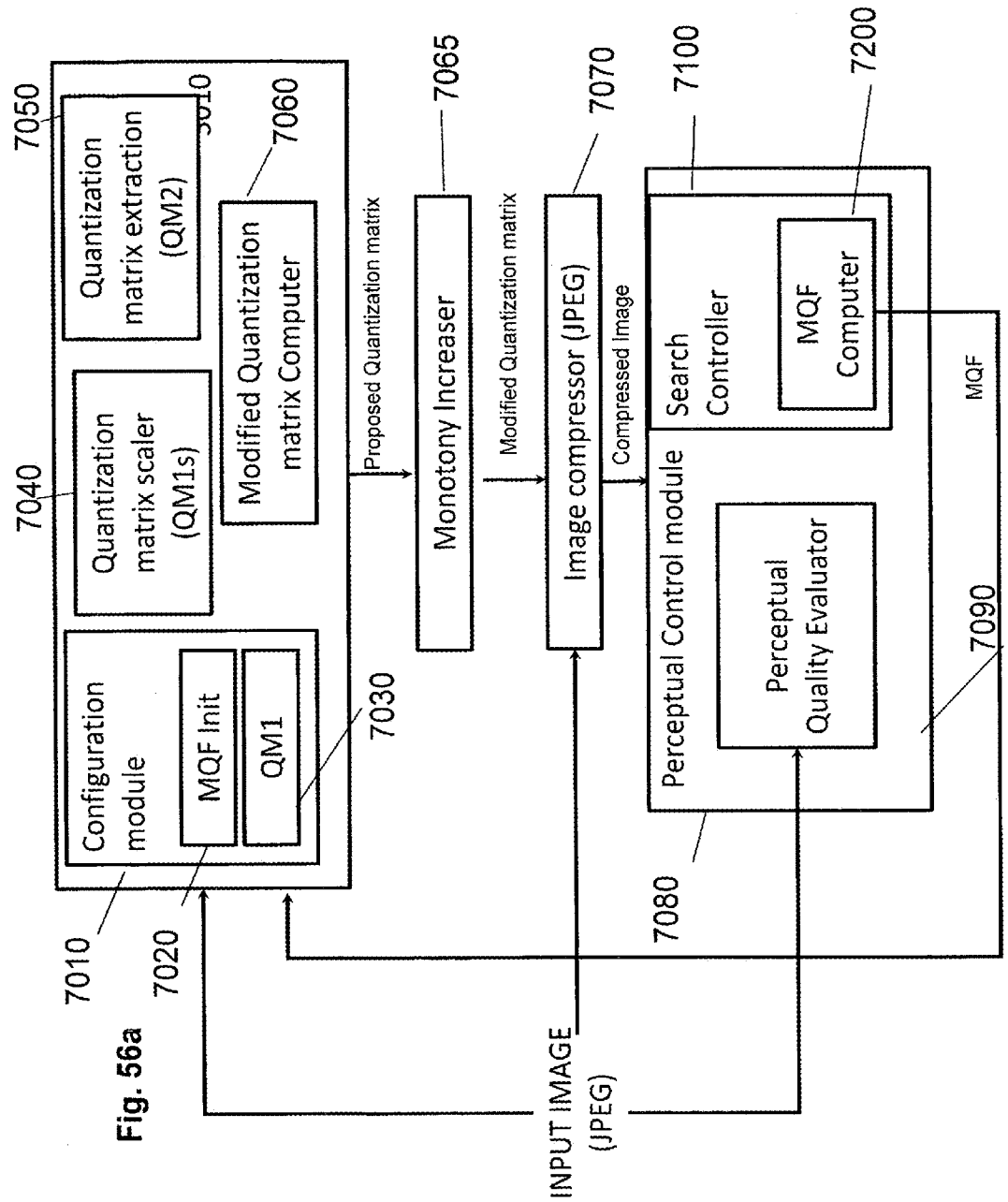
FIG. 56a is a simplified functional block diagram of a recompression system constructed and operative in accordance with certain embodiments of the present invention which is similar to FIG. 32a except that a monotony increaser 7065 is provided which is operative to increase monotony e.g. using any of the methods and apparatus described above with reference to FIGS. 45-55b.
Figure 56B:
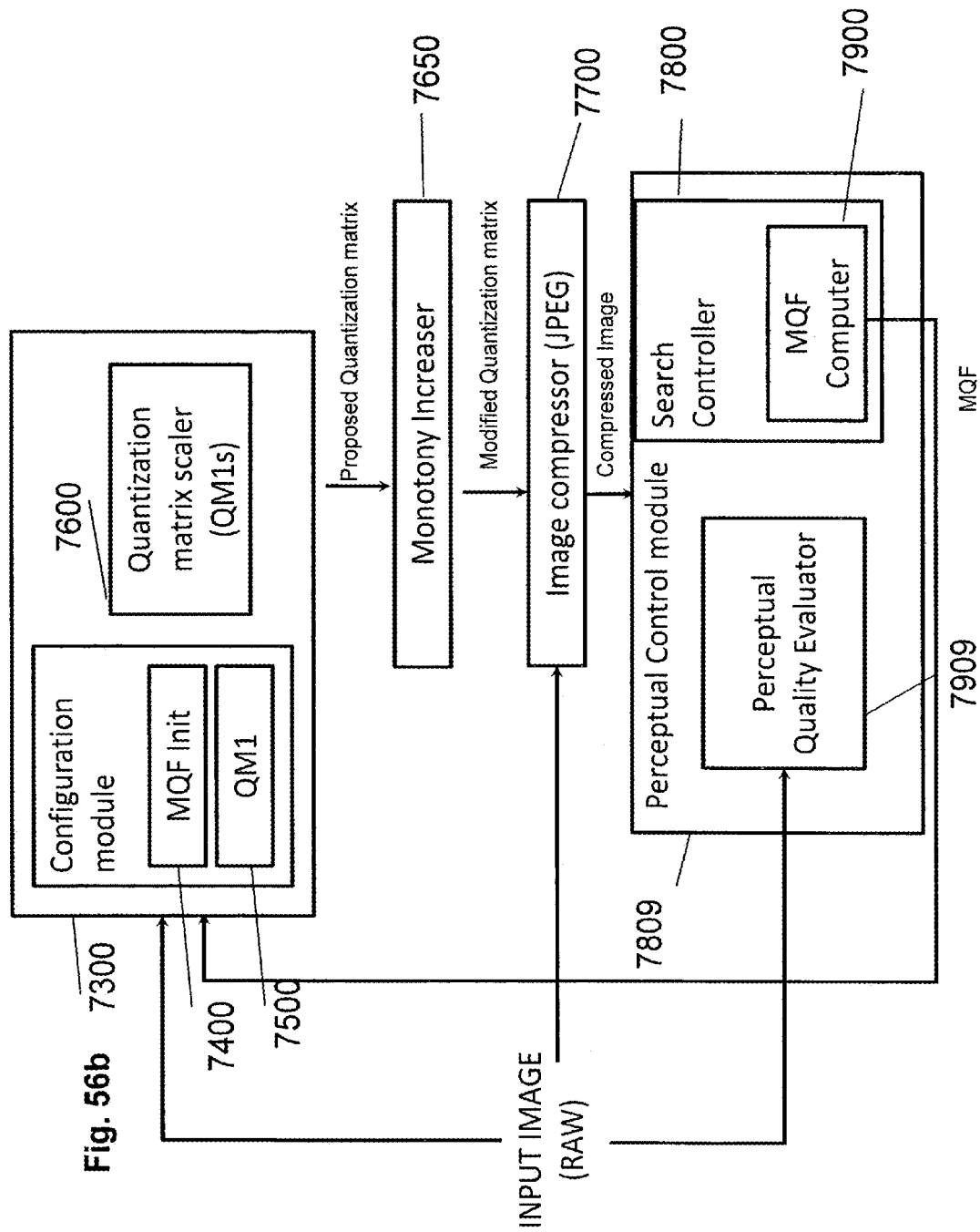
FIG. 56b is a simplified functional block diagram of a recompression system constructed and operative in accordance with certain embodiments of the present invention which is similar to FIG. 32b except that a monotony increaser 7650 is provided which is similarly operative to increase monotony e.g. using any of the methods and apparatus described above with reference to FIGS. 45-55b.
Figure 56C:
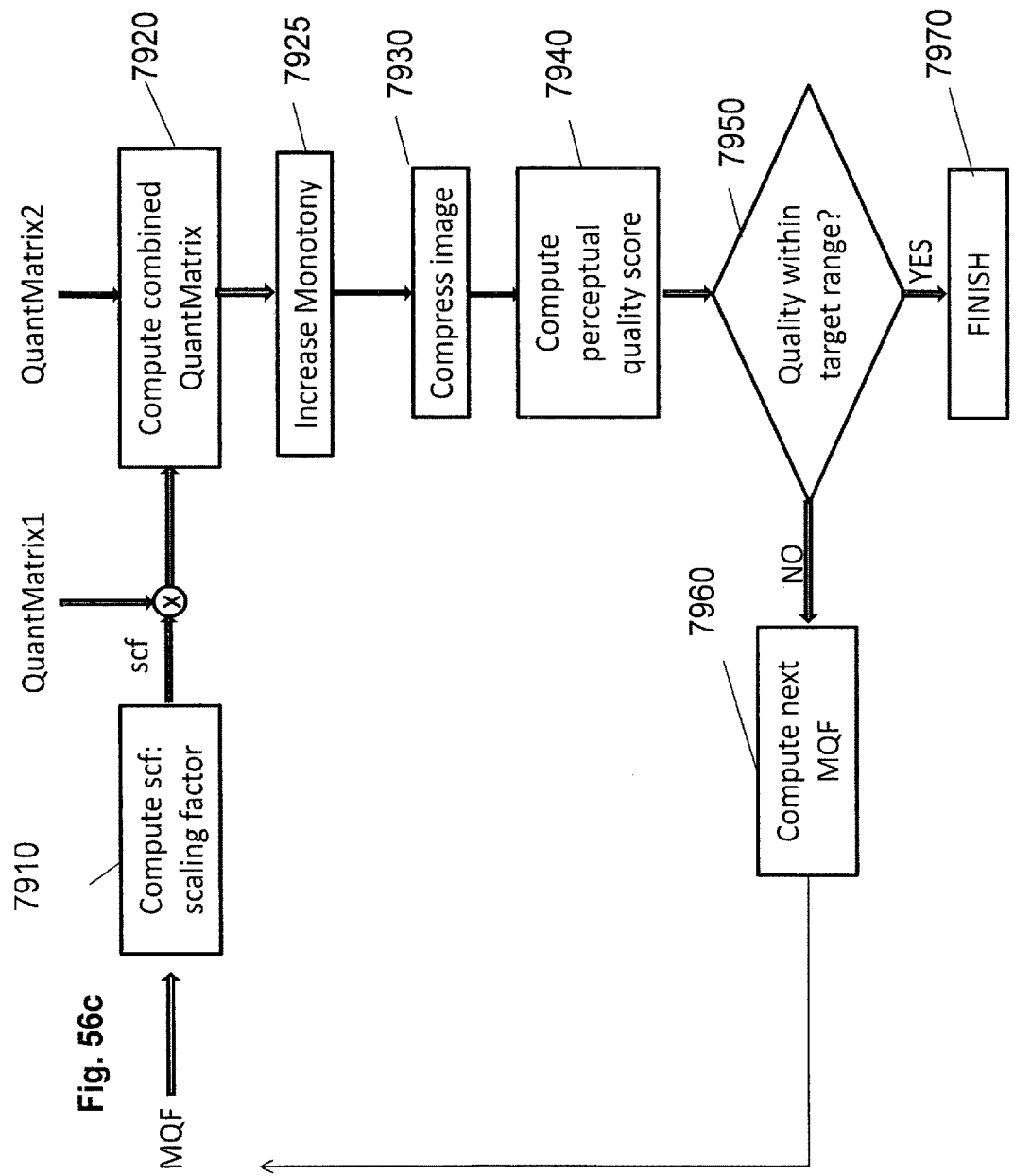
FIG. 56c is a simplified flowchart illustration of a method for performing a quantization matrix generation process in accordance with certain embodiments of the present invention which is similar to FIG. 32b except that a monotony increasing step 7925 is provided which is operative to increase monotony e.g. using any of the methods and apparatus described above with reference to FIGS. 45-55b.

FIGS. 45-55b illustrate systems and methods for recompression of images including providing monotony of compressed image quality as a function of extent of compression The system and methods described below with reference to FIGS. 45-55b are useful both stand-alone and in conjunction with other teachings of the present invention e.g. as described below with reference to FIGS. 56a-56c.

Figure 45:
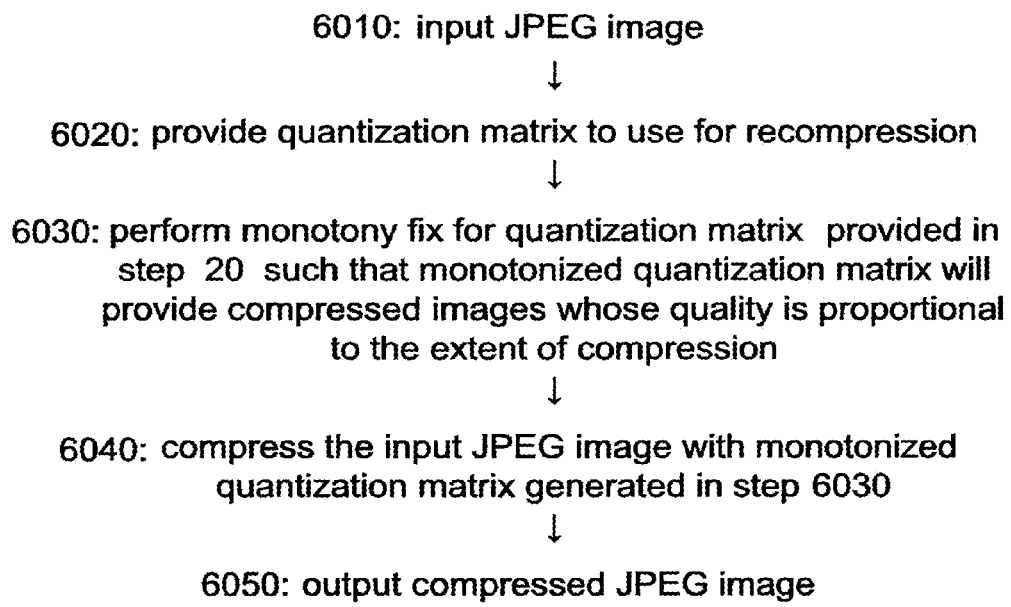
FIG. 45 is a simplified flowchart illustration of a re-compression method constructed and operative in accordance with certain embodiments of the present invention.

The following re-compression method, as illustrated in FIG. 45, is provided in accordance with certain embodiments. The method of FIG. 45 includes some or all of the following steps, suitably ordered e.g. as shown:

Step 6010: input JPEG image

Step 6020: provide quantization matrix to use for recompression

Step 6030: perform monotony increasing process for quantization matrix provided in, step 6020 such that the monotonized quantization matrix provides compressed images whose quality is proportional to the extent of compression Step 6040: compress the input JPEG image with monotonized quantization matrix generated in step 6030

Step 6050: output compressed JPEG image

Generally, quality scores e.g. PSNR are not monotonous with the amount of compression applied in a conventional JPEG coder. For example, in subjective evaluations on occasion the quality decreases when the amount of compression is decreased.

For example, one image was found to yield the following perceptual quality score (qualS) vs. MQF: MQF: 70 qualS: 0.4069
MQF: 80 qualS: 0.38005
MQF: 88 qualS: 0.058504
MQF: 92 qualS: 0.86324
MQF: 90 qualS: 0.1638
MQF: 91 qualS: 0.79987

Figure 46A:
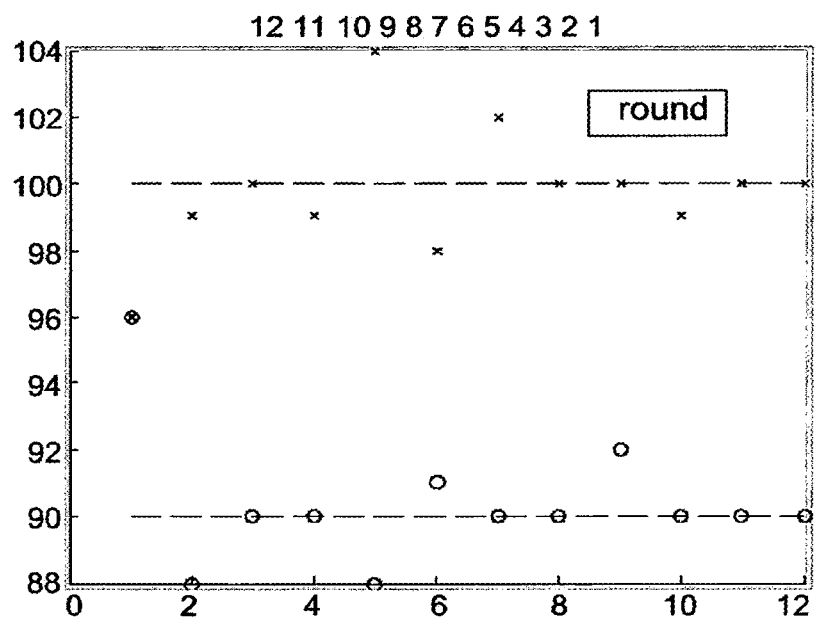
Figure 47A:
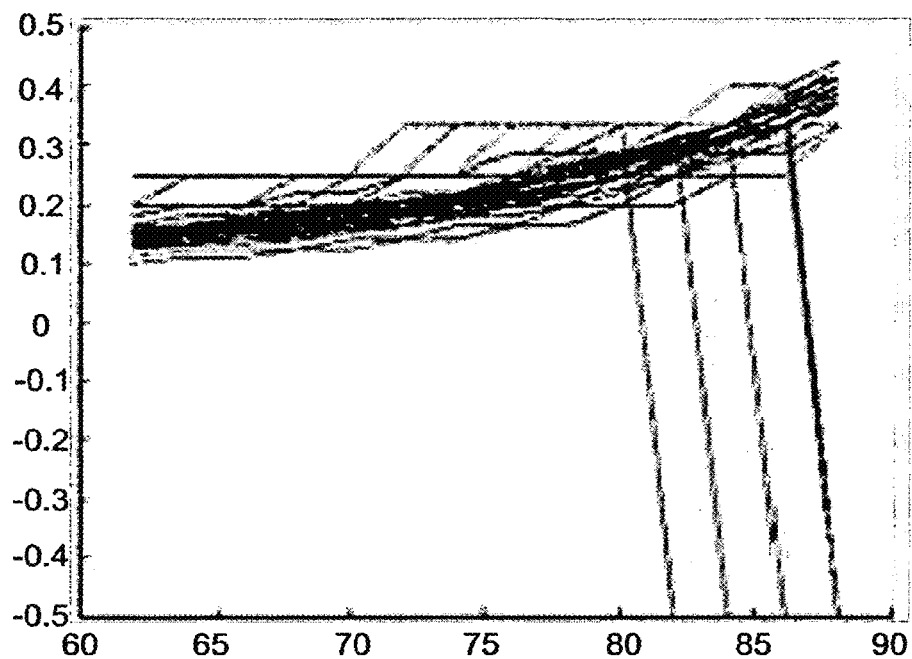
FIGS. 47A and 47B are graphs of the rounding error and the absolute rounding error obtained with the Q matrix (also termed herein "quantization matrix") shown in FIG. 46C for each of the 64 quantization matrix values, as a function of the MQF.
Figure 47B:
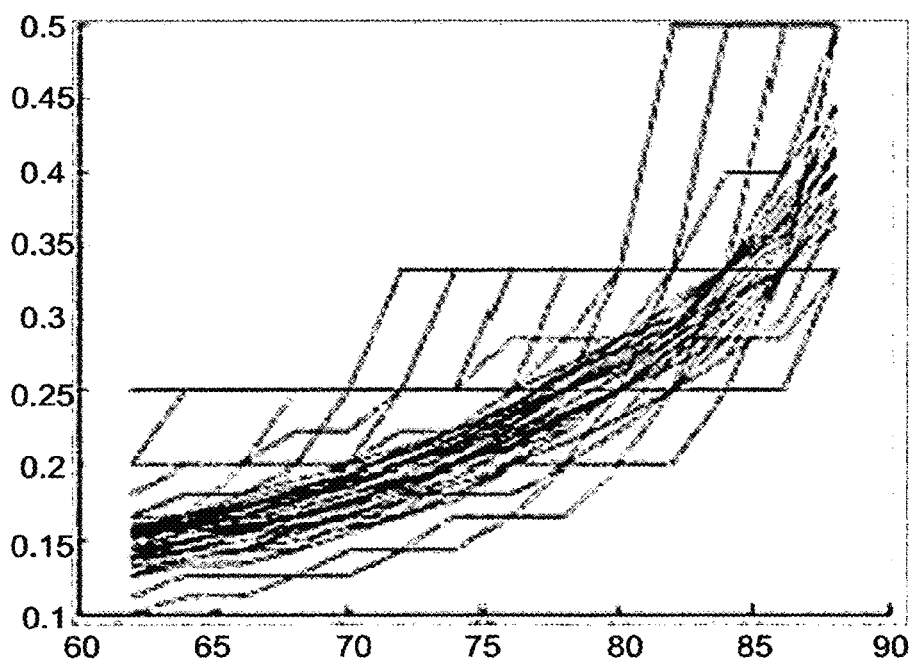
Figure 47C:
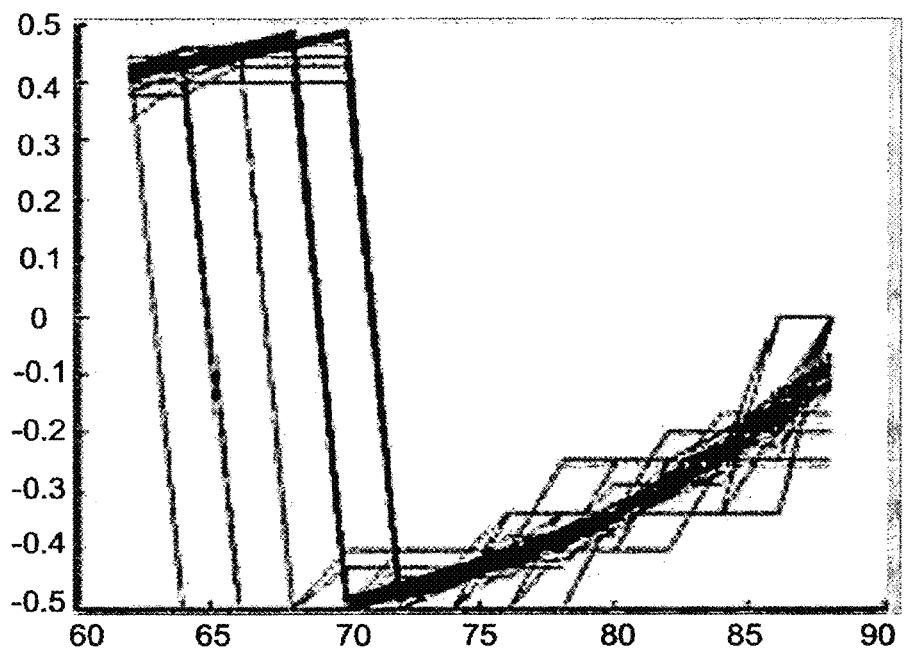
FIGS. 47C-47D are graphs of the rounding error and the absolute rounding error obtained with the quantization matrix shown in FIG. 46C for each of the 64 quantization matrix values, as a function of the MQF.
Figure 47D:
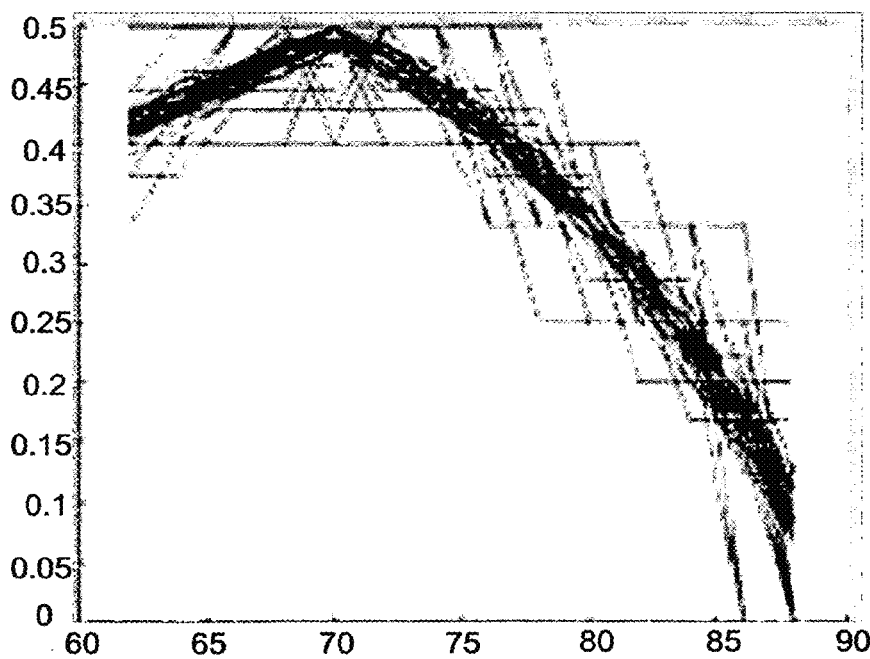

The graph of FIG. 46A shows the actual value obtained when quantizing values 100 (x) and 90 (o) when varying the quantizer value (i.e. quantization matrix element value) from 12 down to 1. Despite the finer quantization, the error often increases. For instance for 100: with Q=10 there is no error whereas for Q=8 there is an error of 4.

According to an embodiment of the present invention, when recompressing an image compressed using a quantization matrix Q1, the quantization matrix Q2 which is used should be such as to avoid the following situation for any of the entries in the matrices:

$$abs(Q1/Q2a - round(Q1/Q2a)) = 0.5.$$

It is believed that what causes the non-monotony i.e. drop in quality is not only the absolute quantization error but also its phase, as demonstrated in FIGS. 47A-47D. In the case of monotone quality almost all quantization element errors are always positive. Therefore, rather than performing adjustments that bound the absolute error, adjustments may be introduced that 'disable' errors that cause rounding that are lower than a certain threshold.

The loop illustrated in FIG. 48 may be added to the function that computes a proposed quantization matrix for recompression, after computing and clipping the values as described herein or as is conventional. The operation of FIG. 48 may be performed only once for each of the 64 quantizer values in an 8×8 quantization matrix, per iteration.

FIG. 49A is a simplified flowchart illustration of a method for recompression constructed and operative in accordance with one embodiment of the present invention. The method of FIG. 49A typically includes some or all of the following steps, suitably ordered e.g. as shown:

Step 6510. provide a first image compressed using a known first quantization matrix Step 6520. provide a candidate second quantization matrix e.g. using an iterative process including computation of a modified quality factor, using this MQF to generate a quantization matrix. For example, e.g. as per FIG. 19, which is a simplified flowchart illustration of a method for generating a new quantization matrix, in accordance with certain embodiments of the present invention, two matrices may be combined, including the first quantization matrix used to compress the input JPEG image and a second matrix such as a default JPEG matrix or such as a matrix suited to the image being compressed. The MQF is used to compute a scaling factor, the second matrix is scaled, and a weighted average of the resulting scaled matrix and the first matrix is computed Step 6530. in candidate $2^{nd}$ matrix, search for "problematic" values which fall between 1 X corresponding value in the $1^{st}$ matrix, and 2 X corresponding value in the $1^{st}$ matrix. Replace each problematic value with corresponding value in the $1^{st}$ matrix, thereby to obtain a final $2^{nd}$ quantization matrix Step 6540. use the final $2^{nd}$ quantization matrix to compress the $1^{st}$ image FIG. 49B is a simplified flowchart illustration of a method for recompression constructed and operative in accordance with another embodiment of the present invention. The method of FIG. 49b typically includes some or all of the following steps, suitably ordered e.g. as shown:

Step 6550: provide a first image compressed using a known first quantization matrix Step 6560: provide a candidate second quantization matrix e.g. as per FIG. 19

Step 6570: for each element in candidate second quantization matrix:

Step 6580: estimate rounding error which may be expected given relationship between first and candidate second matrices, e.g. using method of FIG. 49C Step 6590: If rounding error is too far from zero e.g. too negative e.g. less than −0.1, add/subtract one from current $2^{nd}$ matrix element and return to step 6580

Step 6600; once one's have been added/subtracted to all elements in $2^{nd}$ matrix sufficiently to ensure satisfactory estimated rounding error for all elements in candidate $2^{nd}$ q matrix, use this modified candidate second quantization matrix to recompress first image FIG. 49C is a simplified flowchart illustration of a method for performing the rounding error estimation step of FIG. 49B. The method of FIG. 49C typically includes some or all of the following steps, suitably ordered e.g. as shown:

Step 6610: Compute 'rounding error': compute Q=Qv_input/Qv_proposed;

Step 6620: Compute: Er=Qr−round(Qr)

Step 6630: for each of the 64 elements, while Er<−0.1; (Er cannot be smaller than −0.5 because of how it is created), compute: Qv_proposed=Qv_proposed−1 (or +1) then repeat unless it is no longer true that Er<−0.1

After examining a large number of images which were recompressed using some embodiments of the method proposed herein, it was found that both the quality score and the actual perceived image quality are not monotonous with the MQF, which may extend the search process for the optimal MQF in an iterative, perceptually lossless recompression system.

To demonstrate this effect, let V1 be a decoded, quantized DCT value in the original JPEG, and let Q1 be the corresponding quantizer value in the original JPEG quantization matrix. Then, the reconstructed value after inverse quantization is V1*Q1. Let Q2 be the corresponding quantizer value used by the quantization matrix in a recompression process. Then V2, the new quantized DCT value, is given by V2=round(V1*Q1/Q2). This value may then be reconstructed at the decoder as V2*Q2.

Therefore, the error introduced by the requantization process is:

$$Qe(V1*Q1)-(V2*Q2)V1*Q1-Q2*\text{round}(V1*Q1/Q2)$$

If the quantization ratio QR is defined to be QR=Q1/Q2, this may result in:

$$Qe=Q2*(V1*QR-\text{round}(V1*QR));$$

This error depends on the specific DCT coefficient values, but assuming the coefficients are randomly distributed, the error is proportional to QR-round(QR), i.e., the further QR is from an integer value, the higher the expected error.

Further evaluations have shown that the main drop in quality occurs when this rounding error [QR-round(QR)], is highly negative. Therefore, adjustments may be introduced that disable new quantizer values for which the rounding error is lower than a certain threshold.

Figure 50A:
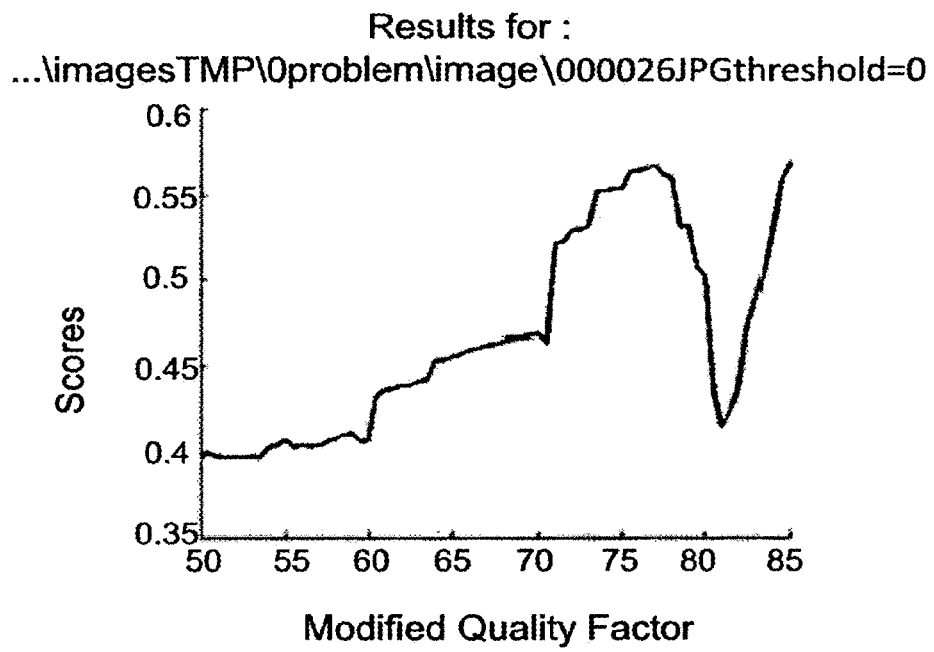
FIG. 50 a is a graph of obtained quality scores vs. MQF for an example image without employing the monotony increasing functionality of FIG. 51.
FIG. 50b is a graph of obtained quality scores vs. MQF for an example image which employs the monotony increasing functionality of FIG. 51.
Figure 50B:
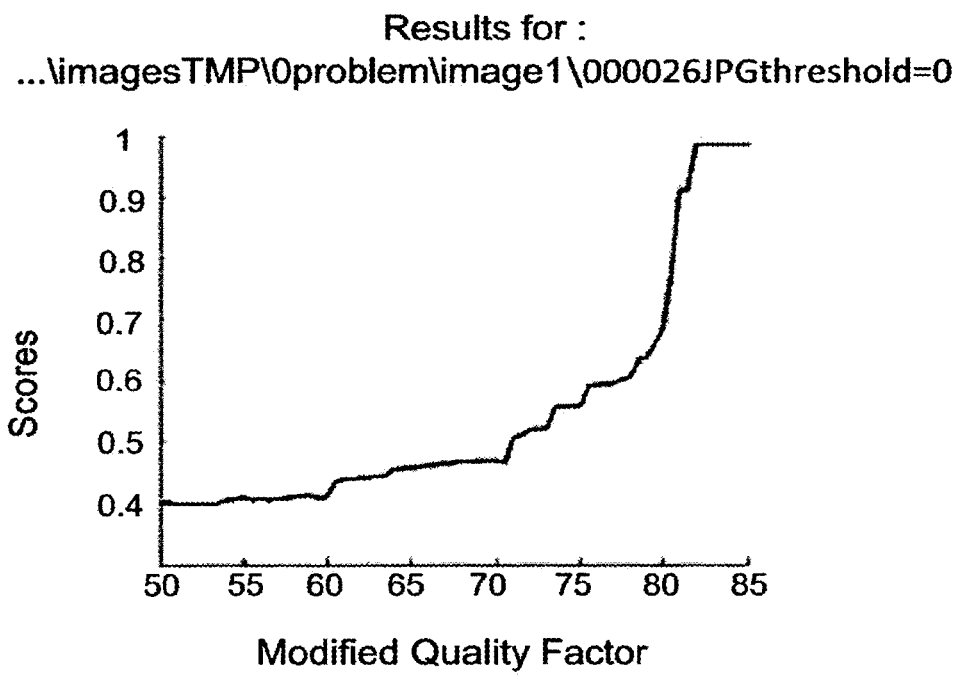

FIGS. 50*a* and 50*b* show an example of obtained quality scores vs. MQF for an example image without and with a monotony improving process, respectively. The monotony improving process used for FIG. 50*b* but not for FIG. 50*a*, is described in FIG. 51. The method of FIG. 51 typically includes some or all of the following steps, suitably ordered e.g. as shown:

Step 6710. Compute quantization matrix Q according to proposed MQF, e.g. as per FIG. 19.

Step 6720. For each of the 64 q values in Q, compute the rounding error using the proposed q value and the corresponding q value from the quantization matrix in the original image.

Step 6730. For any q value whose rounding error is below a given threshold; increase or decrease its value by 1 repeatedly, until the rounding error exceeds the threshold.

Step 6740. When the rounding error exceeds the threshold, use the resulting q value.

The process shown in FIG. 51 has two degrees of freedom: selecting the threshold for an unacceptable rounding error, and correcting the proposed quantization value either by increasing or decreasing its value. It was found that one method of implementing the process shown in FIG. 51 is thresholding, e.g. with a threshold of approximately −0.1, with the quantization value decrease approach.

According to further embodiments, an alternative process may be used with respect to the non-monotony problem including: identifying proposed q values that are equal to double or less the original quantization value, i.e. q_new<=2*q_org, and correcting the quantization value to q_org, or 1.1*q_org. FIGS. 50*a* and 50*b* graphically illustrate an example of obtained quality scores vs. MQF for an example image with and without the monotony fix of FIG. 51, respectively.

FIG. 52 shows an example of applying a monotony fix (monotony increasing) method e.g. as shown and described herein, after computing a new quantization matrix. Values affected by the monotony fix are shown in bold. FIGS. 53*a*-53*g* show an example of increase in the rounding error despite finer quantization, which demonstrates the importance of ensuring or increasing the monotony of the image quality vs. MQF function e.g. by disabling problematic quantizer values, in accordance with certain embodiments of the present invention.

In particular, FIG. 53*a* shows the original DCT coefficients of the input image after inverse quantization. FIG. 53*b* shows an example of a quantization matrix used to compress the input image. FIG. 53*c* shows the resulting DCT coefficients after quantization with the matrix of FIG. 53*b*, and inverse quantization. FIG. 53*d* shows the absolute error between the values in FIG. 53*c* and the values in FIG. 53*a*.

FIG. 53*e* shows an example of a second quantization matrix used to compress the input image, which is finer than the matrix of FIG. 53*b*, and therefore is expected in theory, although not in practice, to create a higher quality image. FIG. 53*f* shows the resulting DCT coefficients after quantization with the matrix of FIG. 53*e* and inverse quantization. FIG. 53*g* shows the absolute error between the values in FIG. 53*f* and the values in FIG. 53*a*.

The mean absolute error between the reconstructed coefficients and the original coefficients using the first quantization matrix e.g. average of the values in FIG. 53*d* is 1.1. The mean absolute error between the reconstructed coefficients and the original coefficients using the second quantization matrix, which is finer than the first matrix e.g. average of the values in FIG. 53*g*, is 1.5. In summary, compressing with a finer quantization matrix may result in an image with lower quality hence the usefulness of the monotony providing or increasing methods shown and described herein.

FIGS. 54A-54E are tables illustrating stages of a quantization matrix computation process useful in conjunction with the methods shown and described herein above:

FIG. 54A is an example quantization matrix used to generate an input JPEG image to be re-compressed.

FIG. 54B is a pre-selected quantization matrix.

FIG. 54C is a scaled quantization matrix, using MQF=90=>scf=0.2.

FIG. 54D is the output of an averaging+clipping stage which may be based on the following formula:

$$\text{Max}\{\text{QMinput},\text{round}[0.5*(\text{QM1}s+\text{QMinput})]\}.$$

FIG. 54E is the output of the monotony increasing stage shown and described herein; matrix elements modified in this stage are shown in bold.

FIGS. 55A and 55B, taken together, form a simplified flowchart illustration of a computerized method for independent disjoint block-level recompression of a first image generated by independent coding of disjoint blocks in a precursor image, the first image having at least one first quantization matrix associated therewith, the method comprising some or all of the illustrated steps suitably ordered e.g. as follows. In FIG. 55A:

Step 6810: performing at least one independent disjoint block-level compression operation, using a processor, on the first image thereby to generate a re-compressed second image including generating a new quantization matrix Step 6820: using the new quantization matrix for the independent disjoint block-level compression, including performing the method of FIG. 55B for at least one of and typically all of the (row, column) positions in the matrices In FIG. 55B:

Step 6830: computing a rounding error created by the quantization process utilizing the new quantization matrix Step 6840: if the rounding error fulfils an unacceptability criterion e.g. the rounding error being more negative than a threshold acceptable rounding value such as but not limited to −0.1, adjusting at least one values of the new quantization matrix to reduce the rounding error created by the quantization process utilizing the new quantization matrix.

According to certain embodiments, the quantization matrix is modified only in situations which are likely to cause a high rounding error.

The monotony improving methods shown and described herein are suitable for implementation inter alia in any system which processes and compresses one or more JPEG images, including decoding and re-encoding the image/s. Typically such a system inputs a JPEG image, decodes it, optionally image processes the decoded image and then encodes to obtain an output JPEG image. Examples of such image processing system are PhotoShop, Windows Image and Fax Viewer, particularly the photograph rotation functionality. The monotony improving methods shown and described herein may be implemented in the JPEG encoder of such systems. The decoding and encoding in the JPEG decoder and encoder respectively may be only partial decoding and encoding, e.g. to the DCT level, rather than full decoding to the pixel level.

Any suitable input device may be used to provide, generate, transmit and/or compress input images for the recompression methods shown and described herein. Any suitable output device or computer display may be used to display images generated by the methods shown and described herein. A computer network may be employed to transmit input images to the recompression systems shown and described herein, or to transmit output images therefrom, to auxiliary computerized systems e.g. using a client-server type relationship between the recipients of output images and providers of input images, on the one hand, and the recompression systems shown herein on the other hand. Any suitable computer processor may be employed to provide any or all of the computational functionalities shown and described herein; any of these, or any combination of these or any suitable portion of these may comprise a module in such a processor. Any suitable form of computerized data storage e.g. computer memory may be employed to store input images to the recompression systems shown and described herein, or output images generated thereby.

The methods and systems shown and described herein may be applicable to formats which are not identical to JPEG but have relevant features in common with JPEG.

The terms "degree of compression" and "compression level" as used herein are generally synonymous, both referring to the extent of reduction in size wrought in the image by (re)compression, this being typically controlled by the magnitude of values in the q matrix, which in turn is normally determined by a user-selected MQF or QF value.

The systems and methods for recompression of images including providing monotony of compressed image quality as a function of extent of compression, described above with reference to FIGS. 45-55b are useful in conjunction with other teachings of the present invention. For example, FIG. 56a is a simplified functional block diagrams of a recompression system constructed and operative in accordance with certain embodiments of the present invention which is similar to FIG. 32a except that a monotony increaser 7065 is provided which is operative to increase monotony e.g. using any of the methods and apparatus described above with reference to FIGS. 45-55b. FIG. 56b is a simplified functional block diagrams of a recompression system constructed and operative in accordance with certain embodiments of the present invention which is similar to FIG. 32b except that a monotony increaser 7650 is provided which is similarly operative to increase monotony e.g. using any of the methods and apparatus described above with reference to FIGS. 45-55b. FIG. 56c is a simplified flowchart illustration of a method for performing a quantization matrix generation process in accordance with certain embodiments of the present invention which is similar to FIG. 32b except that a monotony increasing step 7925 is provided which is operative to increase monotony e.g. using any of the methods and apparatus described above with reference to FIGS. 45-55b.

A system and methods for classifying an image's compression level are now described with reference to FIGS. 57-64B. The system and methods described below with reference to FIGS. 57-64B are useful both stand-alone and in conjunction with other teachings of the present invention e.g. as described below with reference to FIGS. 65a-65c.

In the description of the claimed subject matter below and in the respective claims, reference is made to the term "perceptual quality measure" and to the interchangeable term "perceptual similarity measure", or the like. The terms "perceptual quality measure" or "perceptual similarity measure" as used herein relate to a measure that provides a numerical value indicating the subjective perceptual quality or similarity of an image relative to a reference image. By way of example, a perceptual similarity/quality measure may be expected to be highly correlated with the differential-mean-opinion-score for the evaluated image relative to the reference image. Examples of perceptual quality measures include, but are not limited to: PSNR (Peak Signal-to-Noise Ratio), SSIM (Structural Similarity Index Measure), VIF (Visual Information Fidelity), MSU (Moscow State University) blockiness, MSU (Moscow State University) blurriness, PQS (Picture Quality Scale), VQM (Video Quality Metric) and PEVQ (Perceptual Evaluation of Video Quality). Further examples of further perceptual quality measures are also disclosed herein.

Throughout the description of the claimed subject matter and in the claims, reference is made to the term "highly-compressed input image" or in short "highly-compressed image" or the like. The term "highly-compressed input image" (and also the term "highly-compressed image") is used in the description and in the claims to characterize a compression of an input image in terms of estimated potential further compression (sometimes referred to herein as "recompression") and estimated perceptual-quality loss as a result of such further compression. In the description and in the claims, the compression of an input image is regarded or is classified as being "high", if, for a given (already) compressed input image, any further significant compression would reduce a perceptual quality of the image beyond a perceptual quality threshold. In this regard, a compressed input image that is regarded according to the claimed subject matter as being "highly compressed", is a compressed image which given a perceptual similarity (or quality) constraint, is evaluated to allow only a limited extent of further compression (less than significant) without breaching the given perceptual quality constraint.

It would be appreciated that in this regard, the use of the adjective "high" in the term. "highly-compressed input image" is not meant to limit the compression level of the input image, nor to characterize it. The compression level, or more accurately the further compression potential of an input compressed image, is characterized by a perceptual quality/similarity criterion and a further compression criterion, and these criteria may be set as desired or as appropriate for the underlying application. For example, the claimed subject matter may be used to as part of or in association with a perceptually lossless or with a perceptually lossy recompression process, and may control either of these process so that recompression of a given compressed input image is enabled only if it is determined by a process in accordance with the claimed subject matter that significant further compression may be achieved without breaching a perceptual similarity constraint. The perceptual similarity constraint may dictate that the recompression process be perceptually lossless or it may it may allow perceptual lossy compression and be used to control the recompression process, so that, for example, perceptual similarity is kept above a certain perceptual similarity threshold.

Throughout the description and the claims, the evaluation of a compression level of a compressed input image is carried out using a specific perceptual quality measure and specific configurations for the specific perceptual quality measure. It would be appreciated that different perceptual similarity measures may yield different results in this regard when used to evaluate a given image, including in terms of the perceptual quality loss (or lack thereof) of a recompressed image relative to an input compressed image. Thus, throughout the description and the claims, any reference made to a highly compressed input image, which as mentioned above is evaluated in terms of the potential for further compression versus perceptual-quality loss as a result of such further compression, relates to a specific compression technique (or algorithm) and using specific configurations.

Throughout the description of the claimed subject matter and in the claims, reference is made interchangeably to the terms "significant compression" and "significant further compression" or to the terms "significant compression potential" and "significant further-compression potential" or the like. These terms are used in the description and in the claims to characterize a minimal further compression (potential). The minimal further compression potential may be used as a criterion in combination with a perceptual quality/similarity criterion. The minimal further compression potential criterion together with the perceptual quality/similarity criterion may be used to determine whether a given compressed input image may be further compressed by at least an extent which is defined by the minimal further compression potential without breaching the perceptual quality/similarity criterion.

Throughout the description of the claimed subject matter and in the claims, reference is made to the terms "compressed input image file" or the like. As used in the description and in the claims, this term relates to the computer resource that is used for storing and organizing any information which is required by the computer in order to render a compressed image. By way of example, a compressed input image file may include image data and metadata, where metadata includes compression data, which in turn includes details and data related to the compression that was applied to the image. The compression data may be required for decoding the image. For certain compressed images, the compression data may include a quantization matrix and/or a scaling factor (e.g., in case a scaled standard quantization matrix was used) that were used for the latest compression of the image, and which are required in order to reconstruct the image.

There is provided according to an aspect of the claimed subject matter a system and a method of classifying an image's compression level According to an example, the method classifying an image's compression level may include applying inverse quantization to DCT coefficients extracted from the compressed input image giving rise to dequantized DCT coefficients; applying a predetermined threshold to the dequantized DCT coefficients, the predetermined threshold is associated with a perceptual similarity measure; and determining a compression level classification for the compressed image according to a relation among the predetermined threshold and at least one of the dequantized DCT coefficients. For convenience, this process of classifying a compressed input image and any herein disclosed variation thereof is sometimes referred to herein as the "classification process"

Figure 57:
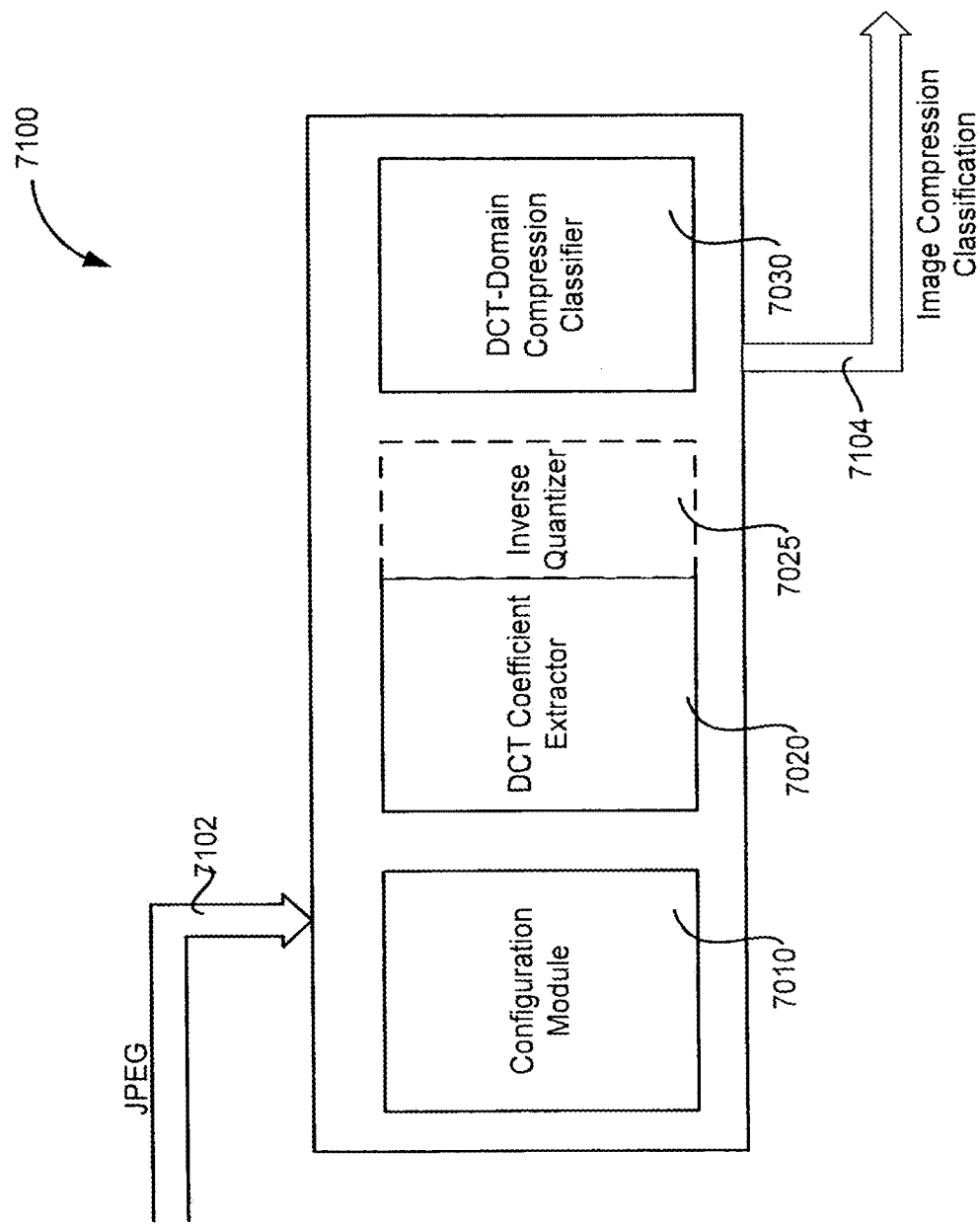
FIG. 57 a block diagram illustration of a system for classifying an image's compression level, according to an example of the claimed subject matter.

Reference is now made to FIG. 57, which is a block diagram illustration of a system for classifying an image's compression level, according to an example of the claimed subject matter. According to an example, a system for classifying an image's compression level 8100 may include: a configuration module 8010, a DCT coefficient extractor 8020 and a DCT-domain compression classifier 8030. Optionally, the DCT coefficient extractor 8020 may include or be associated with an inverse quantizer 8025.

Figure 58:
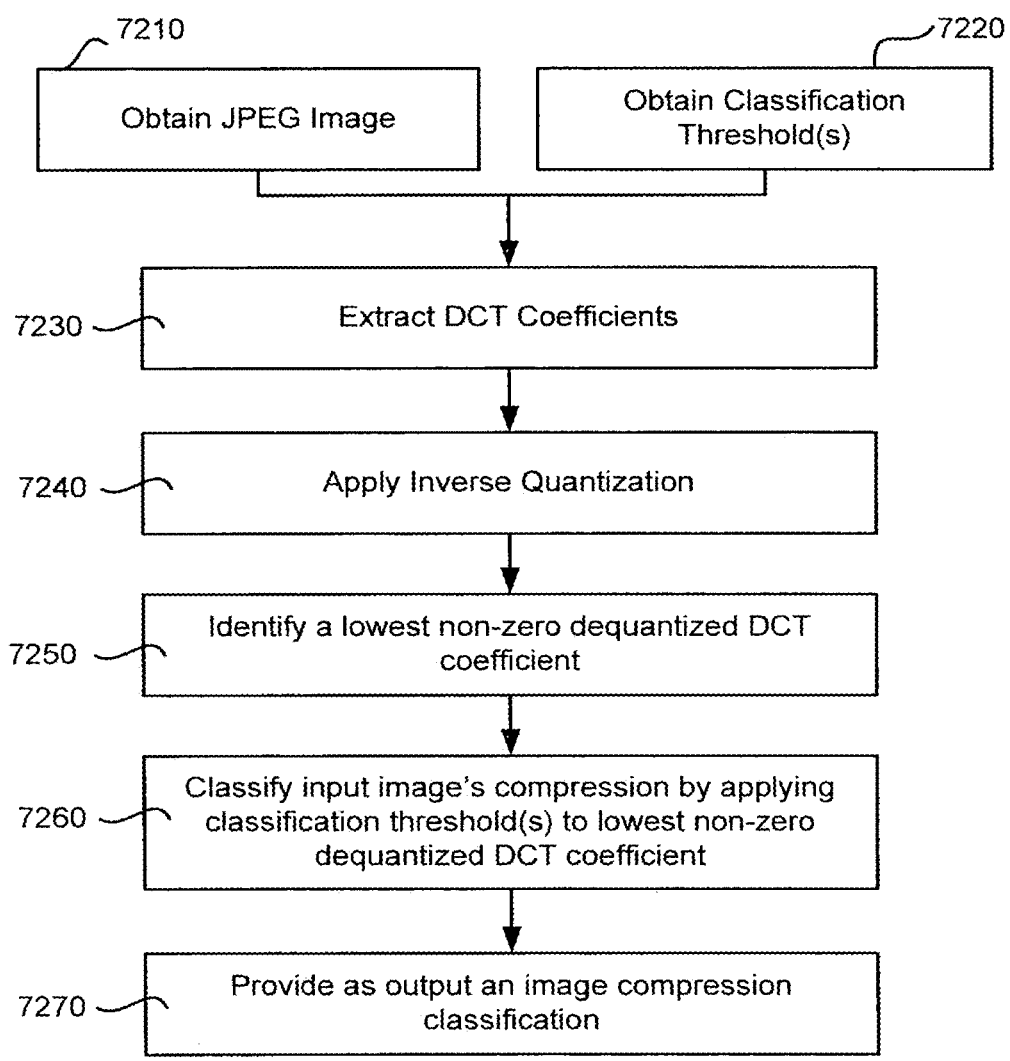
FIG. 58 is a flowchart illustration of a method of classifying an image's compression level, according to an example of the claimed subject matter.

Reference is now additionally made to FIG. 58, which is a flowchart illustration of a method of classifying an image's compression level, according to an example of the claimed subject matter. At block 8210 a compressed input image 8102 is obtained. For example, the compressed input image 8102 is a JPEG image. In addition, classification threshold(s) may be obtained (block 8220). By way of example, the classification threshold(s) may include a minimum absolute non-zero DCT coefficient. Possibly additional configurations for the classification process may be obtained, such as a configuration with respect to which data from the compressed input image should be examined, as further discussed below.

According to an example of the claimed subject matter, the classification threshold(s) is associated with a perceptual similarity measure. For example, the classification threshold(s) is determined using a perceptual similarity measure, e.g. as described below. Still further by way of example, a perceptual similarity measure may be utilized to determine an acceptable (or unacceptable) minimum absolute non-zero DCT coefficient. Such a threshold may be applied after a dequantization of the input compressed image, e.g. as described below.

By way of example, the classification threshold(s) may be recorded within configuration module 8010, and the configuration module 8010 may initialize the DCT-domain compression classifier 8030 with the appropriate classification threshold(s) during initialization of the classification process. As an example, in case the threshold(s) that is selected using the perceptual similarity measure relates for use in the classification process relates to a minimum absolute non-zero DCT coefficient, the DCT-domain compression classifier 8030 may be configured with a certain value which relates to a minimum absolute non-zero DCT coefficient. This value may be used as threshold for classifying a compressed input image as being "highly compressed" or not, e.g. as described below.

Further by way of example, the classification threshold(s) may be fixed, i.e., they may be hardcoded into the configuration module 8010 (or into the DCT-domain compression classifier 8030), or in another example, the classification threshold(s) may be dynamic, and the DCT-domain compression classifier 8030 may be reconfigured from time-to-time with a different value(s). In yet a further example, the value which constitutes the classification threshold(s) may depend upon a certain characteristic or upon a certain component of the compressed input image, such as the image spatial resolution, the variability of DCT coefficients between neighbouring blocks, the frequency content of the image as seen for instance in the DCT coefficient histograms, etc.

For instance, the threshold may be sensitive to and may be adapted according to the spatial resolution of the compressed input image. Further by way of example, for images with low spatial resolution the threshold may be adapted such that when lower minimum absolute non-zero DCT values are identified in such image, they would be classified as highly compressed relative to the minimum absolute non-zero DCT values that are used for classifying images with higher spatial resolution as being highly compressed. In another example, the threshold may be sensitive to and may be adapted according to low energy and/or dispersion of the not DC DCT coefficients. Further by way of example, for images characterized by low energy and/or dispersion of the non DC DCT coefficients the threshold may be adapted such that when lower minimum absolute non-zero DCT values are identified in such images, they would be classified as highly compressed, relative to the minimum absolute non-zero DCT values that are used for classifying images that are characterized by higher energy and/or dispersion of the non DC DCT coefficients as highly compressed.

In an example of the claimed subject matter, a plurality of thresholds may be implemented as part of the classification process. Further by way of example, each of the plurality of thresholds may be associated with a perceptual similarity measure and may relate to a different characteristic or component of the compressed input image. For example, and e.g. as described below, a threshold may be provided for each of the Luma and Chroma components of the compressed input image, and the plurality of thresholds may be used as part of the classification process.

In a further example, in addition to classification threshold(s) that is (or are) associated with a perceptual similarity measure, at least one other threshold, which is not related to a perceptual similarity measure, may be used as part of the classification process. For instance, it may be determined that in addition to the constraint imposed by the perceptual measure a certain threshold (generally higher than the one introduced by the perceptual measure constraint) may be also used for the classification. For example, for any recompression process, regardless of the perceptual similarity criteria used, if the lowest non-zero DCT coefficient is above a given, substantially high threshold, the image is necessarily "highly compressed". As an extreme example, if there are no non-zero non DC DCT coefficients the image may be classified as "highly compressed"—in this case the threshold is essentially infinity.

Having described with some detail the configuration of the classification process and the thresholds which may be utilized as of it, the description of FIGS. 57 and 58 is now resumed, at block 8230, the DCT coefficient extractor 8020 may be utilized to extract the DCT coefficient from the input image 8102, in a manner know per se. An inverse quantizer 8025 may apply inverse quantization to the extract DCT coefficients (block 8240), also in a manner know per se.

In some cases, high compression ratio may be identified by analyzing the quantization matrix of a compressed input image. The claimed subject matter may optionally use known methods for identifying a highly compressed input image by looking at the quantization matrix which is part of or is otherwise associated with the input compressed-image file. However, such an analysis is, as was mentioned above, merely an optional added feature of the classification method, and the claimed subject matter includes at least an analysis of the dequantized DCT coefficients, as described below, and since the latter analysis is performed on the dequantized DCT coefficients, it is insensitive to the quantization matrix which is part of or associated with the input compressed image file.

After dequantization (block 8240), the lowest absolute non-zero dequantized DCT coefficient may be identified (block 8250), for example by the DCT-domain compression classifier 8030. Next, the DCT-domain compression classifier 8030 may classify the input image's compression, for example, by applying the classification threshold(s) to the lowest absolute non-zero dequantized DCT coefficient (block 8260). By way of example, the threshold(s) is intended to characterize a compression of an input image (e.g., JPEG input image 8102) in terms of estimated potential further compression and estimated perceptual-quality loss as a result of such further compression. More specifically, and further by way of example, the threshold(s) may set forth a DCT coefficient value, that below (or above) which the compression of the compressed input image is estimated as not likely to allow any significant further compression (recompression) without degrading perceptual quality beyond a certain degree. Further by way of example, the threshold(s) may be configured so that from a perceptual perspective, as evaluated by a perceptual similarity measure, further compression of the compressed input image is limited to an extent which is estimated to maintain a perceptual identity among the compressed input image and a recompressed image. Further details with regard to the application of the classification threshold(s) are discussed below.

Finally, the classification of the input image's compression 8104 may then be provided as output (block 8270).

By performing a compression classification routine which includes analyzing the dequantized DCT coefficients, the method according to the claimed subject matter may identify compression and/or recompression steps which were applied to the compressed input image or to a previous version of the compressed input image, and which are not reflected by the quantization matrix in the input image file. For example, the method according to the claimed subject matter may identify compression and/or recompression steps which modified the DCT coefficients in the input images regardless of the application of the quantization matrix to the DCT coefficients of the input image.

Reference is now made to FIGS. 59A-59D, which collectively illustrate a recompression process of a 16×16 pixel area, where an initial coarse quantization matrix is used followed by a recompressing using a line quantization matrix, in accordance with an example of the claimed subject matter. In FIG. 59A there is shown an illustration of a 16×16 matrix which represents a zoom into a 16×16 pixel area of an original RAW image. The values in the 16×16 pixel matrix 8310 represent actual Luma plane pixel intensity values.

The RAW image of which a 16×16 pixel area 8310 is shown in FIG. 59A may undergo compression. For example as part of the compression, a DCT transformation may be applied to the pixel values of the RAW image and the resulting DCT coefficient may be rounded. FIG. 59B is an illustration of a 16×16 matrix of (rounded) DCT coefficients 8320 which were computed over the 16×6 matrix of pixel values shown in FIG. 59A. As an example, the 16×16 matrix of DCT coefficients 8320 shown in FIG. 59B was computed according to the DCT transformation defined in the JPEG standard in a manner known per se. As may be seen in FIG. 59B, the 16×16 matrix of DCT coefficients 8320 are the rounded Luma plane DCT coefficients.

In FIG. 59C, there is shown a 16×16 matrix of quantized DCT coefficients, which was computed by applying coarse quantization to the 16×16 matrix of DCT coefficients of FIG. 59B. As an example, the 16×16 matrix of quantized DCT coefficients 8330 shown in FIG. 59C was computed according to the JPEG standard, and using the default quantization matrix provided by the standard and a scaling factor, in a manner known per se. Essentially, the 16×16 matrix of quantized DCT coefficients 8330 represents a result of a first compression process that was applied to the input 16×16 pixel values matrix 8310.

As may be seen in FIG. 59C, the 16×16 matrix of quantized DCT coefficients 8330 includes the Luma plane DCT coefficients from the 16×16 matrix of DCT coefficients 8320 of shown in FIG. 59B after being quantized with a coarse quantization matrix.

Looking at the 16×16 matrix of DCT coefficients 320 (in FIG. 59B) and at the quantized values in the counterpart 16×16 matrix of quantized DCT coefficients 8330 If the compressed image was now analyzed to determine its compression level, it may have been possible to determine that the image is highly compressed by looking at the (coarse) quantization matrix which is part of or is otherwise associated with the input compressed-image file, in a manner know per se.

Reference is now made to FIG. 59D, which is an illustration of a 16×16 matrix of dequantized DCT coefficients of a compressed image, which was created inter-Alia by applying a second compression process to the compressed image that was previously compressed by a first compression process. As was mentioned above, the DCT transformation over the 16×16 pixel values matrix 8310, and the quantization of the 16×16 matrix of DCT coefficients 8320 which yielded the 16×16 matrix of quantized DCT coefficients 8330 were part of a first compression process wherein a course quantization matrix was used. The matrix of dequantized DCT coefficients 8340 in FIG. 59D is a result of a second compression process (recompression) that was applied over a compressed image which is the result of the first compression process.

By way of example, as part of the second compression process, the compressed image which was the result of the first compression process (where a coarse quantization matrix was used) underwent an inverse quantization (using the coarse quantization matrix), an inverse DCT transformation, a second DCT transformation (the DCT applied during the first compression process being a first DCT transformation), and a second quantization process (the quantization during the first compression process being a first quantization process), this time, the second quantization was carried out using a fine quantization matrix (e.g., a quantization matrix consisting of all 1's). It would be appreciated by those versed in the art, that in such a scenario, the significant compression that was applied to the original RAW image as part of the first compression process, would not be apparent from the compressed-image file after the second compression process (recompression), and if a fine quantization matrix was used as part of the second compression process, the compressed-image file would include the fine quantization, and thus looking only at the quantization matrix for classifying the level of compression that was applied to the input compressed image 8102 may be misleading. The claimed subject matter includes at least an analysis of the dequantized DCT coefficients, and since this analysis is performed on the dequantized DCT coefficients, it is insensitive to the quantization matrix which is part of or associated with the input compressed image file.

By way of example, in case a compressed input image 8102, which was subjected to compression (first compression process) and a subsequent recompression (second compression process), by way of example as described above with reference to FIGS. 59A and 59B, is received by at classification system 8100 according to the claimed subject matter, the classification thereof would include at least an analysis that is based on the dequantized DCT coefficients of the input image 8102, and being based on the dequantized DCT coefficients, this analysis is insensitive to the quantization matrix which is part of or associated with the input compressed image file, which may be misrepresent the actual compression which was applied to the original image.

Moving now to FIGS. 60A-60D, which collectively illustrate a compression process of a 16×16 pixel area, where low energy DCT coefficients are Zeroed to reduce bitrate and the modified DCT values matrix is quantized using a fine quantization matrix (such as all 1's), according to one example of the claimed subject matter, In FIG. 60A there is shown an illustration of a 16×16 matrix which represents a zoom into a 16×16 pixel area of an original RAW image. The values in the 16×16 pixel matrix 8410 represent actual Luma plane pixel intensity values.

The RAW image of which a 16×16 pixel area is shown in FIG. 60A may undergo compression. For example, as part of the compression, a DCT transformation may be applied to the pixel values of the RAW image and the resulting DCT coefficient may be rounded. FIG. 60B is an illustration of a 16×16 matrix of (rounded) DCT coefficients which were computed over the 16×16 matrix of pixel values shown in FIG. 60A. As an example, the 16×16 matrix of DCT coefficients 8420 shown in FIG. 60B was computed according to the JPEG standard in a manner known per se. As may be seen in FIG. 60B, the 16×16 matrix of DCT coefficients 8420 includes some non-zero DCT coefficients with low absolute values such as +−1. in the low energy area As part of the compression process illustrated by FIGS. 60A-60D, the DCT coefficients may be zeroed. Reference is now made to FIG. 60C, which is an illustration of a modified 16×16 matrix of DCT coefficients, after zeroing some low energy DCT coefficients tom the original 16×16 matrix of DCT coefficients shown in FIG. 60B have been subjected to zeroing. As an example, in the modified 16×16 matrix of DCT coefficients 430 shown in FIG. 60C, all the low energy DCT coefficients, in this example coefficients with absolute values of 4 and below, have been subjected to zeroing. It would be appreciated that by zeroing low energy DCT coefficients, the file size or bit rate of the image (or in this case a 16×16 pixel area thereof) may be reduced, while maintaining compatibility with standard JPEG decoders.

As an example, DCT coefficients zeroing may be implemented as part of the compression (encoding) process of the RAW input image and may be applied to the low energy DCT coefficients. It would be appreciated that DCT coefficient's zeroing in conjunction with standard compression steps, such as JPEG compression steps for example, may yield a standard compressed image, such as a standard JPEG image.

DCT coefficients zeroing may be implemented as a manual routine, and an operator may select which DCT coefficients should be zeroed, or in another example, an automatic routine may be implemented for zeroing DCT coefficient as part of a compression process, such as a JPEG compression process. The specifics of the DCT coefficients zeroing, including any logic and/or algorithms which may be implemented in this regard are outside the scope of the claimed subject matter, and may be implemented using any presently known or yet to be devised in the future method, technique or routine.

After the DCT coefficients zeroing takes place, practically compressing the respective portion of the original RAW image, a quantization process may be implemented, for example, in accordance with the JPEG standard. By way of example, a fine quantization matrix (e.g., all 1s) may be applied to the modified 16×16 matrix of DCT coefficients. It would be appreciated that even when a fine quantization matrix is used, significant compression may still result due to the DCT coefficients zeroing.

Reference is now made to FIG. 60D, which is an illustration of a 16×16 matrix of dequantized DCT coefficients of a compressed image, the compressed image created, inter-alia, by applying a fine quantization matrix (e.g., all 1s) to the modified 16×16 DCT coefficient matrix (after DCT coefficients zeroing) shown in FIG. 60C. As was mentioned above, the compressed image, which may be provided as an input compressed image 8102 to the classification system 8100 according to the claimed subject matter, may have been generated by a compression process that was applied to an original image (e.g., non-compressed image), an which included, inter-alia perfuming a DCT transformation over the pixel values of the original image (represented above by the 16×16 pixel values matrix 8410), giving rise to a matrix of DCT coefficients (represented above by the 16×16 matrix of modified DCT coefficients 8420), applying DCT coefficients zeroing over the matrix of DCT coefficients, giving rise to a matrix of modified DCT coefficients (represented above by the 16×16 matrix of modified DCT coefficients 8430), and applying a fine quantization matrix over the matrix of modified DCT coefficients. It would be appreciated by those versed in the art, that in such a scenario, the significant compression that was applied to the original RAW image through DCT coefficients zeroing (and not through quantization), would not be apparent from the compressed-image file, and if a fine quantization matrix was used in the compression process, the compressed-image file would include the fine quantization matrix, and thus looking only at the quantization matrix for classifying the level of compression that was applied to the input compressed image 8102 may be misleading. The claimed subject matter includes at least an analysis of the dequantized DCT coefficients, and since this analysis is performed on the dequantized DCT coefficients, it is insensitive to the quantization matrix which is part of or associated with the input compressed image file.

By way of example, in case a compressed input image 8102, which was subjected to during the compression thereof to a DCT zeroing process, by way of example as described above with reference to FIGS. 59A and 59B, is received at the classification system. 8100 according to the claimed subject matter, the classification thereof would include at least an analysis that is based on the dequantized DCT coefficients of the input image 8102, and being based on the dequantized DCT coefficients, this analysis is insensitive to the quantization matrix which is part of or associated with the input compressed image file, which may be misrepresent the actual compression which was applied to the original image.

As already mentioned above, by way of example, the value which constitutes the classification threshold(s) may depend upon a certain characteristic or upon a certain component of the compressed input image, for example the threshold may be associated with the Luma and/or with the Chroma planes of the image, and the image may be classified by comparing its dequantized DCT coefficients in the Luma and/or in the Chroma plane(s) against respective threshold(s) associated specifically with DCT coefficients in the Luma and/or in the Chroma plane(s).

Further by way of example, and as was also mentioned above, a plurality of thresholds may be implemented as part of the classification process. Still further by way of example, each of the plurality of thresholds may relate to a different characteristic or component of the compressed input image. For example, a threshold may be provided for each of the Luma and Chroma components of the compressed input image, and the plurality of thresholds may be used as part of the classification process.

Figure 61:
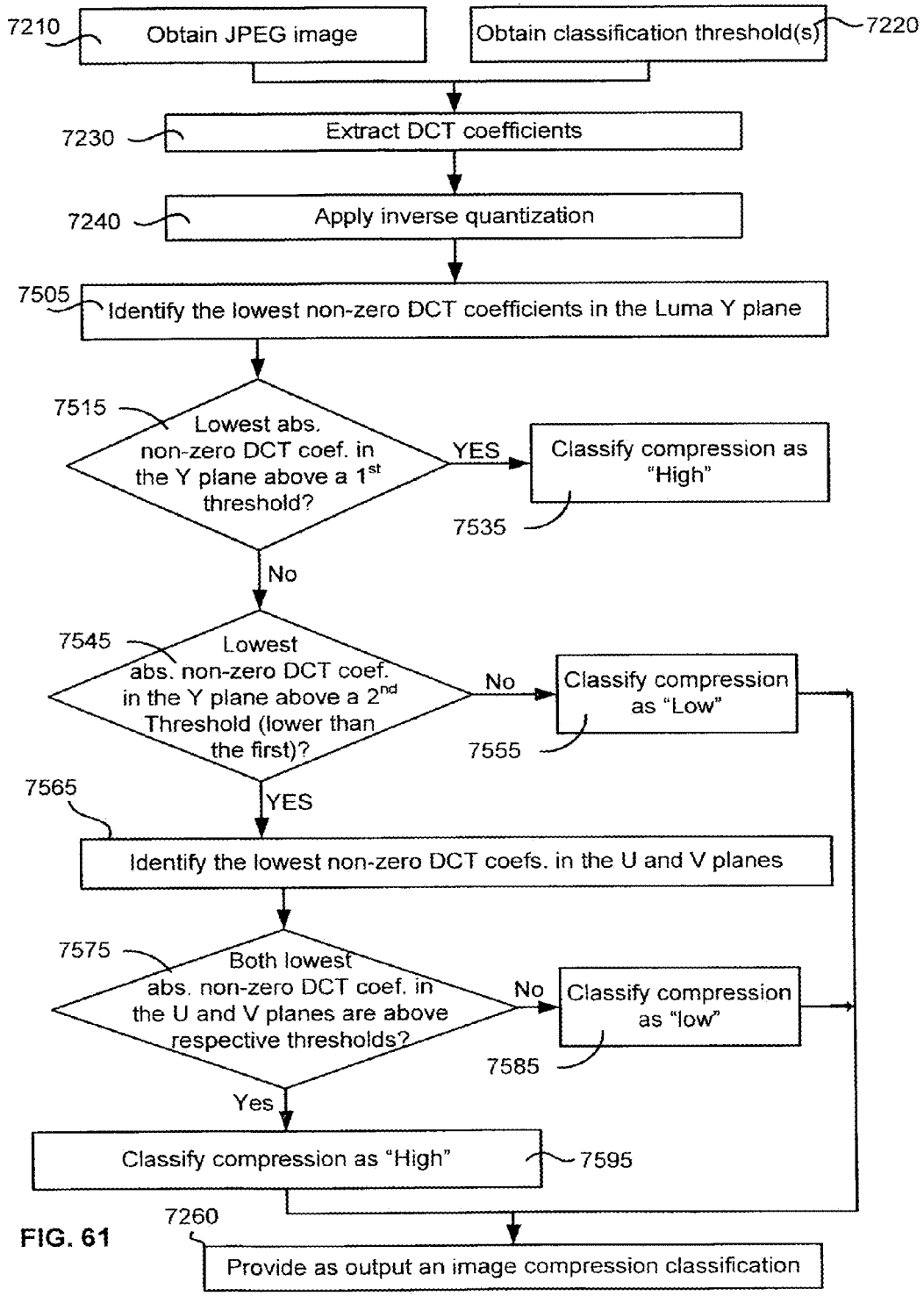
FIG. 61 is a flowchart illustration of a method of classifying an image's compression level, including applying a threshold over dequantized DCT coefficients in each of the Luma and Chroma planes of a compressed input image, according to an example of the claimed subject matter.

There is now provided a description of an example of a method of classifying an image's compression, which includes implementing a threshold over dequantized DCT coefficients in each of the Luma and Chroma planes of a compressed input image. Reference is now made to FIG. 61 which is a flowchart illustration of a method of classifying an image's compression level, including applying a threshold over dequantized DCT coefficients in each of the Luma and Chroma planes of a compressed input image, according to an example of the claimed subject matter. The process shown in FIG. 61 begins with, the system obtaining a compressed input image (e.g., a JPEG image) (block 8210), and obtaining classification thresholds (block 8220). These blocks are similar to the respective blocks that were described above with reference to FIG. 58, with the difference that in block 8220 a plurality of thresholds are obtained one for each of the Luma and Chroma planes of the compressed input image.

Next, the quantized DCT coefficients may be extracted from the compressed input image (block 8230), and inverse quantization may be applied (block 8240) in order to obtain the compressed input image's dequantized DCT coefficients. These blocks are also similar to the respective that were described above with reference to FIG. 58, with the difference that the DCT extraction is used to extract the DCT coefficients in each of the Luma and Chroma planes of the compressed input image, and the inverse quantization is applied to the quantized DCT coefficients in each of the Luma and Chroma planes, thereby giving rise to dequantized DCT coefficients in each of the Luma and Chroma planes.

Once the dequantized DCT coefficients in each of the Luma and Chroma planes are obtained, the lowest non-zero DCT coefficient in the Y (Luma) plane is identified (block 8505). Next, it is determined whether the lowest absolute non-zero DCT coefficient in the Y plane is above a first threshold (block 8510)—the first threshold corresponding to dequantized DCT values in the Y plane. By way of example, the first threshold is intended to characterize a compression of an input image (e.g., JPEG input image 8102) in terms of estimated potential further compression and estimated perceptual-quality loss as a result of such further compression. Mom specifically, and further by way of example, the first threshold may set forth a DCT value in the Y plane that above which the compression of the compressed input image is estimated as not likely to allow any significant further compression (recompression) without degrading perceptual quality beyond a certain degree. Further by way of example, the first threshold may be configured so that from a perceptual perspective, as evaluated by a perceptual similarity measure, further compression of the compressed input image is limited to an extent which maintains perceptual identity among the compressed input image and the recompressed image.

By way of example, in case in block 8510 it is determined that the lowest absolute non-zero DCT coefficient in the Y plane is above the first threshold, the compression of the compressed input image is classified as "high" (block 8535) and this classification may be provided as output (block 8260). A Y plane dequantized DCT coefficients matrix, which illustrates the case where the compression is classified as "high" based on the lowest absolute non-zero DCT coefficient in the Y plane, is illustrated by FIG. 62A. Say that according to a threshold for classifying an input compressed image, any compressed image whose Y plane dequantized DCT coefficients matrix does not include absolute non-zero DCT coefficient in the Y plane which are lower than 5, shall be classified as highly compressed, than the compressed input image associated with the Y plane dequantized DCT coefficients matrix shown in FIG. 62A would be classified as highly compressed, since this matrix does not have values whose absolute non-zero value is lower than 5.

By way of example, in case at block 8510 it is determined that the lowest absolute non-zero DCT coefficient in the Y plane is not above a first threshold, the process moves to determine whether the lowest absolute non-zero DCT coefficient in the Y plane is above a second threshold, the second threshold being lower than the first (block 8545). By way of example, the second threshold is also intended to characterize a compression of an input image (e.g., JPEG input image 8102) in terms of estimated potential further compression and estimated perceptual-quality loss as a result of such further compression, but in the case of the second threshold, it may set forth a DCT value in the Y plane that below which the compression of the compressed input image is estimated as likely to allow significant further compression (recompression) without degrading perceptual quality beyond a certain degree.

Accordingly, by way of example, in case block 8545 it is determined that the lowest absolute non-zero DCT coefficient in the Y plane is not above the second threshold, the compression of the compressed input image is classified as "low" (block 8555) and this classification may be provided as output (block 8260). A Y plane dequantized DCT coefficients matrix, which illustrates the case where the compression is classified as "low" based on the lowest absolute non-zero DCT coefficient in the Y plane, is illustrated by FIG. 62B. Say, that according to a threshold for classifying an input compressed image, any compressed image whose Y plane dequantized DCT coefficients matrix includes absolute non-zero DCT coefficient in the Y plane which are lower than 2 (or equal to 1), shall be classified as being a low compression image, than the compressed input image associated with the Y plane dequantized DCT coefficients matrix shown in FIG. 62B would be classified as not highly compressed, since this matrix has values whose absolute non-zero value is 1.

By way of example, if, however, at block 8510 it was determined that the lowest absolute non-zero DCT coefficient in the Y plane is not above a first threshold, and now at block 8545 it is determined that the lowest absolute non-zero DCT coefficient in the Y plane is above the second threshold, the dequantized DCT coefficients in the Y plane of the compressed input image are considered ambiguous in terms of the ability to determine the likelihood that any significant further compression (recompression) would degrade perceptual quality beyond a certain degree or not.

By way of example, in order to resolve this ambiguity, at least to some degree, the classification process may proceed to block 8565, where the lowest non-zero DCT coefficients in both the U and V (Chroma) planes are identified, followed by block 8575, where it is determined whether both the lowest non-zero DCT coefficient in both the U and V (Chroma) planes are above respective thresholds. By way of example, a third threshold is provided in association with the lowest non-zero DCT coefficients in the U plane, and a fourth threshold is provided in association with the lowest non-zero DCT coefficients in the V plane. Further by way of example, the third and the fourth thresholds are similar in some respects to the first threshold, and each of the third and the fourth thresholds is intended to characterize a compression of an input image (e.g., JPEG input image 8102) in terms of estimated potential further compression and estimated perceptual-quality loss as a result of such further compression. More specifically, and further by way of example, each of the third and the fourth thresholds may set forth for each of the U and V planes a respective DCT value, and if the lowest absolute non-zero DCT value in both the U and V planes is above the respective thresholds, the compression of the compressed input image is estimated as not likely to allow any significant further compression (recompression) without degrading perceptual quality beyond a certain degree. Further by way of example, the third and the fourth thresholds may be configured so that from a perceptual perspective, as evaluated by a perceptual similarity measure, further compression of the compressed input image is limited to an extent which maintains perceptual identity among the compressed input image and the recompressed image. Further by way of example, a single threshold may be provided for both the Chroma components U and V, and the dequantized U and V coefficients are each checked to yield a single unified decision, e.g. the lowest non-zero DCT coefficients in the U and in the V (Chroma) planes are (or are not) above a third threshold.

If it is determined at block 8575 that at least one of the lowest non-zero DCT coefficient in both the U and V (Chroma) planes is below the respective thresholds, the compression of the compressed input image is classified as "low" (block 6585) and this classification may be provided as output (block 8260). Dequantized DCT coefficients matrices for each of the Y, U and V planes of the input image, which illustrate the case where the dequantized DCT coefficients matrix for the Y plane is ambiguous, and the compression of the input image is classified as being low according to the dequantized DCT coefficients matrices for the U and V planes, is illustrated by FIG. 62C. Say that the lowest absolute non-zero DCT coefficient in the Y plane matrix 8606 is two, and thereby (according to the above mentioned first and second thresholds) at block 515 a "No" is returned, and at block 8545 a "Yes" is returned (and thus the dequantized DCT coefficients matrix in the Y plane is ambiguous), the process may proceed to classification based on the dequantized DCT matrices in the Chroma plane. Say, that in such a case any compressed image (or any image whose dequantized DCT coefficients matrix in the Y plane is ambiguous), where at least one of the U or V plane dequantized DCT coefficients matrix includes a value which is equal to or lower than 3, shall be classified as being a "low compression" image, than the compressed input image associated with the dequantized DCT coefficients matrices for the U and V planes 8616 and 8626, respectively, would be classified as a low compression image, since the dequantized DCT coefficients matrix's for (in this case both) the U) and V planes 8616 and 8626 include a value whose absolute non-zero value is 3.

If, however, it is determined at block 8575 that the lowest non-zero DCT coefficient in both the U and V (Chroma) planes are above a third threshold, the compression of the compressed input image is classified as "high" (block 8595) and this classification may be provided as output (block 8260). This case is illustrated by FIG. 62D, where the dequantized DCT coefficients matrix for the Y plane is ambiguous, and the compression of the input image is classified as being high according to the dequantized DCT coefficients matrices for the U and V planes. By way of example, the Y plane matrix 8608 is the same as 8606 and the same thresholds are used, and so at block 8515 a "No" is returned, and at block 8545 a "Yes" is returned, but this time, say that the lowest absolute non-zero DCT coefficient in the matrices for the U and V planes 8618 and 8628, respectively is 7, and say that according to the threshold for the U and V planes (here, as en example, an identical threshold is used for both the U and V planes) a compressed input image is classified as "highly compressed" if the dequantized DCT coefficient matrix for both the U and V planes minimum non-zero absolute value is above 3, and therefore since the lowest absolute non-zero DCT coefficient in both the U and V matrices 8618 and 8628, respectively, is 7, than the compressed input image would be classified as a highly compressed.

Having described with some detail various possible implementation of a process of classifying an image's compression level according to examples of the claimed subject matter, the determination of a classification threshold(s), and the manner by which a perceptual similarity measure is used for determining classification threshold(s) shall now be the focus of the description. As mentioned above, a perceptual similarity measure is used in the classification process according to the claimed subject matter to characterize a compression of an input image in terms of estimated potential further compression (recompression) and estimated perceptual-quality loss as a result of such further compression. More specifically, and further by way of example, the threshold(s) may set forth a DCT coefficient value, that below (or above) which the compression of the compressed input image is estimated as not likely to allow any significant further compression (recompression) without degrading perceptual quality beyond a certain degree. Further by way of example, the threshold(s) may be configured so that from a perceptual perspective, as evaluated by a perceptual similarity measure, further compression of the compressed input image is limited to an extent which is estimated to maintain a perceptual identity among the compressed input image and a recompressed image.

By way of example, further compression of an input image is regarded or is classified as being "high", if, it is estimated that for a given (already) compressed input image, any further significant compression would reduce a perceptual quality of the image beyond a perceptual quality threshold in this regard, a compressed input image that is regarded according to the claimed subject matter as being "highly compressed", is a compressed image which given a perceptual similarity (or quality) constraint, is evaluated to allow only a limited extent of further compression (less than significant) without breaching the given perceptual quality constraint.

As part of an example of the claimed subject matter, the classification of an input compressed image may be based on an evaluation of the dequantized DCT coefficients against one or more thresholds, where the threshold(s) is determined based on a perceptual similarity measure. Further by way of example, the threshold(s) may be associated with a minimal perceptual similarity which should be maintained between the compressed input image and a recompressed image (generated by further compressing the input image), and an estimated further compression which may be achieved by compressing the image to such an extent. Thus, by way of example, the classification threshold(s) determination process may be associated with a minimal further compression criterion in combination and with a perceptual quality/similarity criterion. The threshold(s) may be use to classify which compressed input images may be further compressed, and the classification may be regarded as an estimate as to whether a given compressed input image may be further compressed by at least an extent which is defined by the minimal further compression criterion without breaching the perceptual quality/similarity criterion.

By way of example, the classification threshold(s) relates to a minimum absolute non-zero DCT coefficient and is applied on the dequantized DCT coefficients as explained above. Further by way of example, the classification threshold(s) may relate to a different characteristic or component of the compressed input image, for example, to either the Y (Luma) U, or V (Chroma) planes of the compressed input image.

By way of example, the classification threshold(s) may be determined by empirically evaluating statistics over a plurality of recompressed images (compressed images which are a result of a further compression of an already compressed image), that were recompressed to a maximal extent according to a perceptual similarity criterion and for which the achieved recompression rate was lower than a further compression criterion. Thus for example, in case the perceptual similarity criterion requires that the recompressed image is perceptually identical to the compressed input image, the extent of further compression that is allowed would be constrained by a requirement that the recompressed image is maintained perceptually identical to the image prior to the recompression process.

By way of example, the classification threshold(s) may be determined by empirically evaluating statistics only over a plurality of recompressed images for which the further compression ratio under the perceptual similarity constraint was not in agreement with the further compression criterion (e.g., it was too low). By way of further example, the classification threshold(s) may be determined by empirically evaluating statistics only over a plurality of recompressed images for which the further compression ratio under the perceptual similarity constraint met the further compression criterion (e.g., it was sufficiently high). Still further by way of example, the classification threshold(s) may be determined by empirically evaluating statistics over both of the above groups of images, and possibly by empirically evaluating statistics over other groups of images, e.g., various "intermediate" images in case a plurality of thresholds are used.

By way of example, for each one of the plurality of images, the extent of further compression achieved through the recompression process (under the above constraints) is recorded. The lowest absolute non-zero DCT coefficients in the input image are also recorded. By way of further example, the lowest absolute non-Zero DCT coefficients in each of the Y, U and V planes of the input image are recorded. An example of a data structure which may be used to record the above data in respect of a plurality of images is shown in FIG. 63.

FIG. 64A is a graphical illustration of a manner by which classification thresholds may be defined using the lowest non-zero DCT values in the Y plane of images which were recompressed according to a perceptual similarity criterion and whose compression was evaluated using a further compression criterion, according to an example of the claimed subject matter. According to an example, a plurality of images may be recompressed to a maximal degree which is estimated to maintain a perceptual identity between the compressed input image and a recompressed image. A minimal compression criterion or threshold is set, for example, manually by an operator, and is applied over the plurality of compressed input images, and the recorded absolute non-zero DCT values of the compressed input images are classified in accordance with the minimal further compression criterion.

For example, the lowest absolute non-zero DCT values in the Y plane of images for which a recompression ratio that is below the value set forth by the further recompression criterion are recorded. By way of example, this lowest absolute non-zero DCT value may be used as a (first) threshold for identifying compressed input images whose compression ratio should be regarded as "high" (e.g., the first threshold used to identify the images classified as highly compressed in block 535), and compressed input images whose lowest absolute non-zero DCT value is equal to or above the selected lowest absolute non-zero DCT value would be classified as being highly compressed.

From another perspective, and by way of example, a first threshold for classifying compressed input images as "highly compressed" may be characterized by a lowest absolute non-zero DCT value of images for which perceptually lossless further compression is limited and does not exceed a certain ratio. With reference to FIG. 64A, and further by way of example, the lowest absolute non-zero DCT value of images for which perceptually lossless further compression is limited and does not exceed a certain ratio is 3 or above. Thus, in this example, a-threshold may be set according to which any image whose lowest absolute non-zero DCT value is 3 or above would be classified as being highly compressed.

By way of example, in addition to recording the lowest absolute non-zero DCT values of images for which a recompression ratio that is below the value set forth by the recompression criterion, the lowest absolute non-zero DCT values of images for which a recompression ratio that is above the value set forth by the recompression criterion are recorded. By way of example, this lowest absolute non-zero DCT value may be used as a (second) threshold for identifying compressed input images whose compression ratio should be regarded as "low" (e.g., the second threshold used to identify the images classified as being a low compression image in block 8555), and compressed input images whose lowest absolute non-zero DCT value is equal to or below the selected lowest absolute non-zero DCT value would be classified as being a low compression image From another perspective, and by way of example, a second threshold for classifying compressed input images as a "low compression" image may be characterized by a lowest absolute non-zero DCT value of images for which perceptually lossless further compression exceeds a certain ratio. With reference to FIG. 64A, and further by way of example, the lowest absolute non-zero DCT value of images for which perceptually lossless further compression exceeds a certain ratio is 1 or below. Thus, in this example, a threshold may be set according to which any image whose lowest absolute non-zero DCT value is 1 or below would be classified as being a low compression image. As may be seen for example in FIG. 64A, in between the first threshold (used for classifying images as highly compressed or not) and the second threshold (used for classifying images as being low compression image or not) there may exist an intermediate group of images whose lowest absolute non-zero DCT coefficients in the Y plane fall within an intermediate range between the first and the second thresholds. By way of example, within the intermediate range are lowest absolute non-zero DCT coefficients which can not conclusively classify corresponding images as being highly compressed or low compression images, since at least some images having an absolute non-zero DCT coefficient in the intermediate range, when compressed to a maximal degree which is estimated to maintain a perceptual identity among the compressed input image and a recompressed image provided a compression ratio which is below the value set forth by the further recompression criterion and some other images having an absolute non-zero DCT coefficient in the intermediate range provided a compression ratio which is above the value set forth by the further recompression criterion, and so there is ambiguity within the intermediate range of the lowest absolute non-zero DCT coefficients in the Y plane.

With reference to FIG. 64A, and further by way of example, the intermediate range of lowest absolute non-zero DCT value of images for which perceptually lossless further compression is considered ambiguous is above 1 and below 3.

By way of example, classification thresholds may be defined using the lowest non-zero DCT values in the Chroma, i.e., U and V planes of images which were recompressed according to a perceptual similarity criterion and whose compression was evaluated using a further compression criterion, may be provided. The classification thresholds over the lowest non-zero DCT values in the U and V planes may be used in case the classification based on the DCT values in the Y plane results in an ambiguity, as described above.

Reference is now made to FIG. 64B, which is a graphical illustration of a manner by which classification thresholds may be defined using the lowest non-zero DCT values in the U and V planes of images which were recompressed according to a perceptual similarity criterion and whose compression was evaluated using a further compression criterion, according to an example of the claimed subject matter.

For example, the lowest absolute non-zero DCT values in the U and V planes of images for which a recompression ratio that is below the value set forth by the further recompression criterion are recorded. By way of example, this lowest absolute non-zero DCT value may be used as a (third) threshold for identifying compressed input images whose compression ratio should be regarded as "high" or as "low". Two separate threshold may be provided for each of the U and V planes, or an identical threshold may be used, as appropriate according to the perceptual similarity criterion and the further compression criterion.

For example, with reference to FIG. 64B assuming the threshold for both the U and V planes is 3, any compressed input image whose lowest absolute non-zero DCT value in the Y plane is ambiguous, and having lowest absolute non-zero DCT values in both the U plane and in the V plane which are (in both planes) above 3 is regarded as being highly compressed. And any compressed input image whose lowest absolute non-zero DCT value in the Y plane is ambiguous, and having a lowest non-zero DCT value in at least one of the U and V planes which is equal to or 3 is regarded as being a low compression image.

Figure 65A:
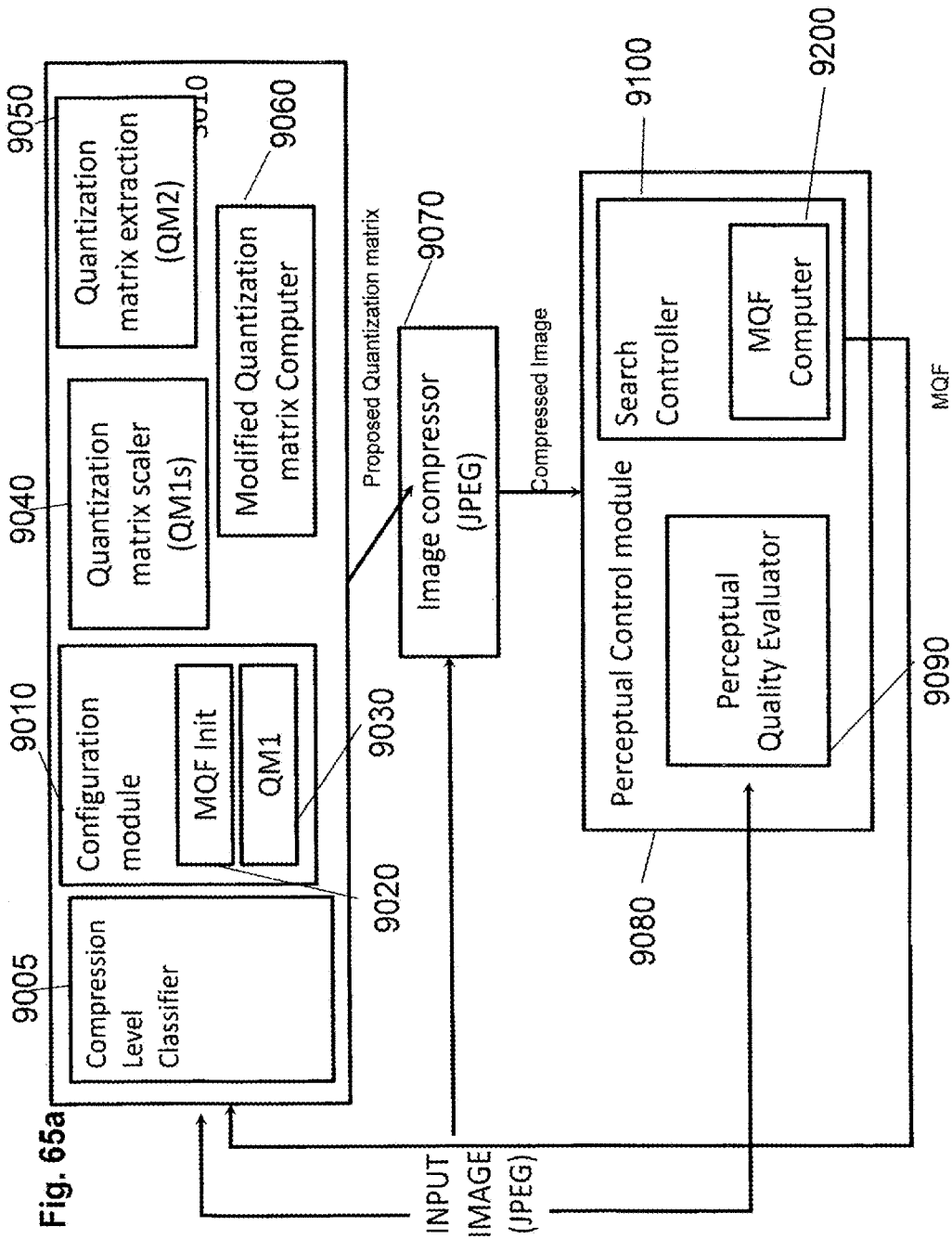
FIG. 65a is a simplified functional block diagrams of a recompression system constructed and operative in accordance with certain embodiments of the present invention which is similar to FIG. 32a except that a compression level classifier 9005 is provided which is operative to identifying highly compressed images e.g. using any of the methods and apparatus described above with reference to FIGS. 57-64B.

The systems and methods for identifying highly compressed images described above with reference to FIGS. 57-64B are useful in conjunction with other teachings of the present invention. For example, FIG. 65a is a simplified functional block diagrams of a recompression system constructed and operative in accordance with certain embodiments of the present invention which is similar to FIG. 32a except that a compression level classifier 9005 is provided which is operative to identifying highly compressed images e.g. using any of the methods and apparatus described above with reference to FIGS. 57-64B. According to certain embodiments of the present invention, if the compression level classifier identifies that the input image is a highly compressed image, the input image is not recompressed at all. All other blocks, other than the compression level classifier, do nothing as per a suitable instruction from the classifier, and the input image is copied directly to the output, with no further processing.

FIG. 65b is a simplified flowchart illustration of a method for recompression of images operative in accordance with certain embodiments of the present invention and using a quantization matrix generated from a quantization matrix of a precursor image by scaling. The method of FIG. 65b include some or all of the illustrated steps, suitably ordered e.g. as shown and may be similar to the method of FIG. 12 except that step 9012 is performed only if the first image is not classified as highly compressed, whereas corresponding step 1012 in FIG. 12 is typically performed unconditionally.

FIG. 65c is a simplified flowchart illustration of a method for recompression of images operative in accordance with certain embodiments of the present invention and using a quantization matrix generated by combining a quantization matrix of a precursor image and a second quantization matrix such as the one given in the JPEG standard. The method of FIG. 65c include some or all of the illustrated steps, suitably ordered e.g. as shown and may be similar to the method of FIG. 18 except that step 9815 is performed only if the first image is not classified as highly compressed, whereas corresponding step 1815 in FIG. 18 is typically performed unconditionally.

A system and methods of evaluating an effect of chroma downsampling in a compression process of an input image are now described with reference to FIGS. 66-71d. The system and methods described below with reference to FIGS. FIGS. 66-71d can be useful both stand-alone and in conjunction with other teachings of the present invention e.g. as described below with reference to FIGS. 72a-72d.

Throughout the description of the claimed subject matter and in the claims, reference is made interchangeably to the terms "chroma downsampling", "chroma subsampling" and "chroma spatial resolution reduction", or the like. The terms "chroma downsampling", "chroma subsampling" or "chroma spatial resolution reduction" are known in the art and the following definitions are provided for convenience purposes. The abbreviation "CDS" is used throughout the description and the claims interchangeable with any of the terms "chroma downsampling", "chroma subsampling" and "chroma spatial resolution reduction", or the like.

Throughout the description of the claimed subject matter and in the claims, reference is made to the term "CDS candidates group", or the like. The terms "CDS candidates group" as used herein relates to a group of blocks in an input image which are candidate for undergoing chroma downsampling. For example, in case a 4:2:0 chroma downsampling scheme is to be applied to an input image, each group of four blocks in the input image whose chroma components would be downsampled together and represented by a single block constitute a CDS candidates group. In another example, in case a 4:2:2 chroma downsampling scheme is to be applied to an input image, each group of two blocks in the input image whose chroma components would be downsampled together and represented by a single downsampled block constitute a CDS candidates group.

Throughout the description of the claimed subject matter and in the claims, reference is made to the term "target CDS block", or the like. The terms "target CDS block" as used herein relates to the block resulting from applying chroma downsampling to the blocks in the CDS candidate group from the original image.

Throughout the description of the claimed subject matter and in the claims, reference is made to the terms "compressed input image file" or the like. As used in the description and in the claims, this term relates to the computer resource that is used for storing and organizing any information which is required by the computer in order to render a compressed image. By way of example, a compressed input image file can include image data and metadata, where metadata includes compression data, which in turn includes details and data related to the compression that was applied to the image. The compression data may be required for decoding the image. For certain compressed images, the compression data can include a quantization matrix and/or a scaling factor (e.g., in case a scaled standard quantization matrix was used) that were used for the latest compression of the image, and which are required in order to reconstruct the image.

There is provided according to an aspect of the claimed subject matter a system and a method of evaluating an effect of chrome downsampling in a compression process of an input image. According to an example of the claimed subject matter, the method of evaluating an effect of chroma downsampling in a compression process of an input image can include: computing an error for a target CDS block based on characteristics of DCT coefficients in the U and/or V planes of a respective CDS candidates group in the input image, and further based on a diversity of the DCT coefficients in the U and/or V planes of the respective CDS candidates group in the input image; and computing an estimated perceptual effect of CDS over the input image based on a plurality of target CDS blocks error values.

Further by way of example of the claimed subject matter, the characteristics include an average of DCT coefficients in the U and/or V planes of the respective CDS candidates group. Still further by way of example of the claimed subject matter, diversity is characterized by a difference between values of DCT coefficients in the U and/or V planes of each one of the respective CDS candidates group and average of DCT coefficients in the U and/or V planes of the respective CDS candidates group.

Figure 66:
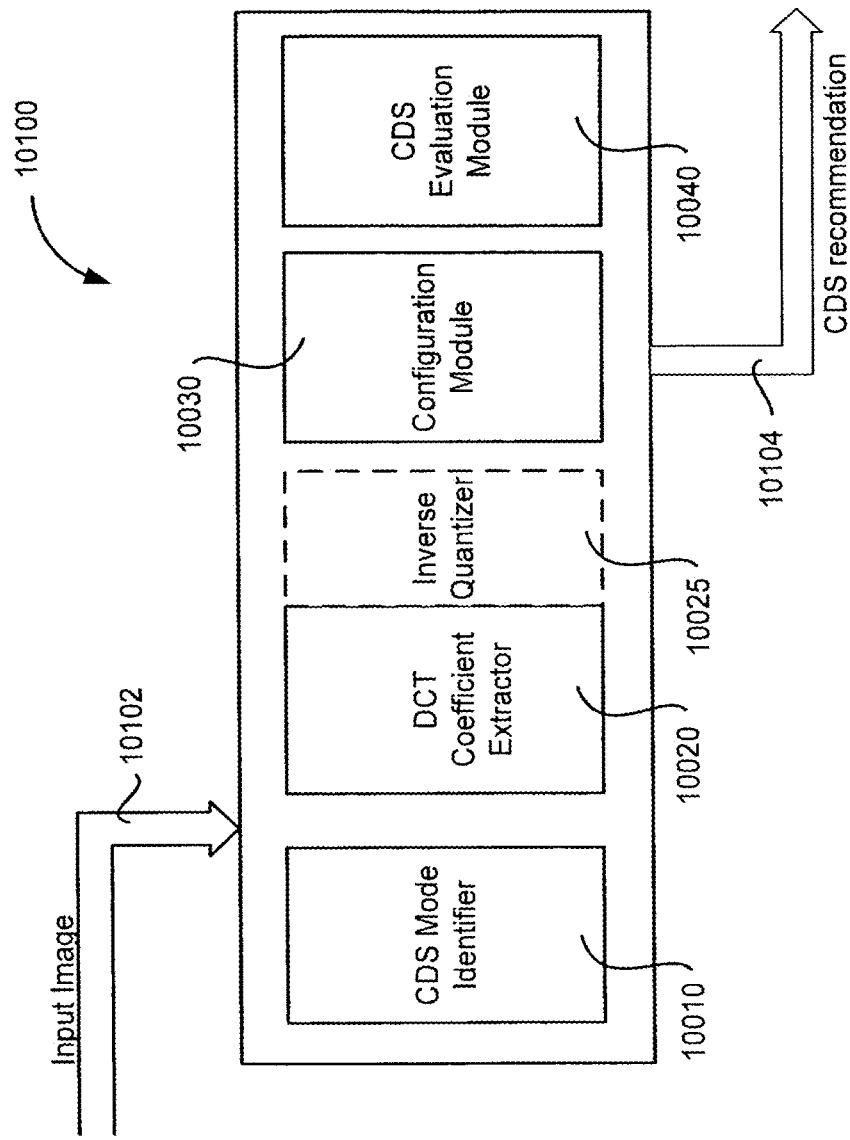
FIG. 66 is a block diagram of a system for evaluating an effect of chroma downsampling in a compression process of an input image, according to an example of the claimed subject matter.

Further examples of the claimed subject matter shall now be provided. Reference is now made to FIG. 66, which is a block diagram of a system for evaluating an effect of chroma downsampling in a compression process of an input image, according to an example of the claimed subject matter. According to an example, a system for evaluating an effect of chroma downsampling in a compression process of an input image 10100 can include a CDS mode identifier 10010, a DCT coefficient extract 10020, a configuration module 30 and a CDS evaluation module 10040. Further by way of example, the system 10100 can receive an input image 10102, process it and issue a recommendation with regard to an application of a CDS routine on the image, as will be described herein.

Figure 67:
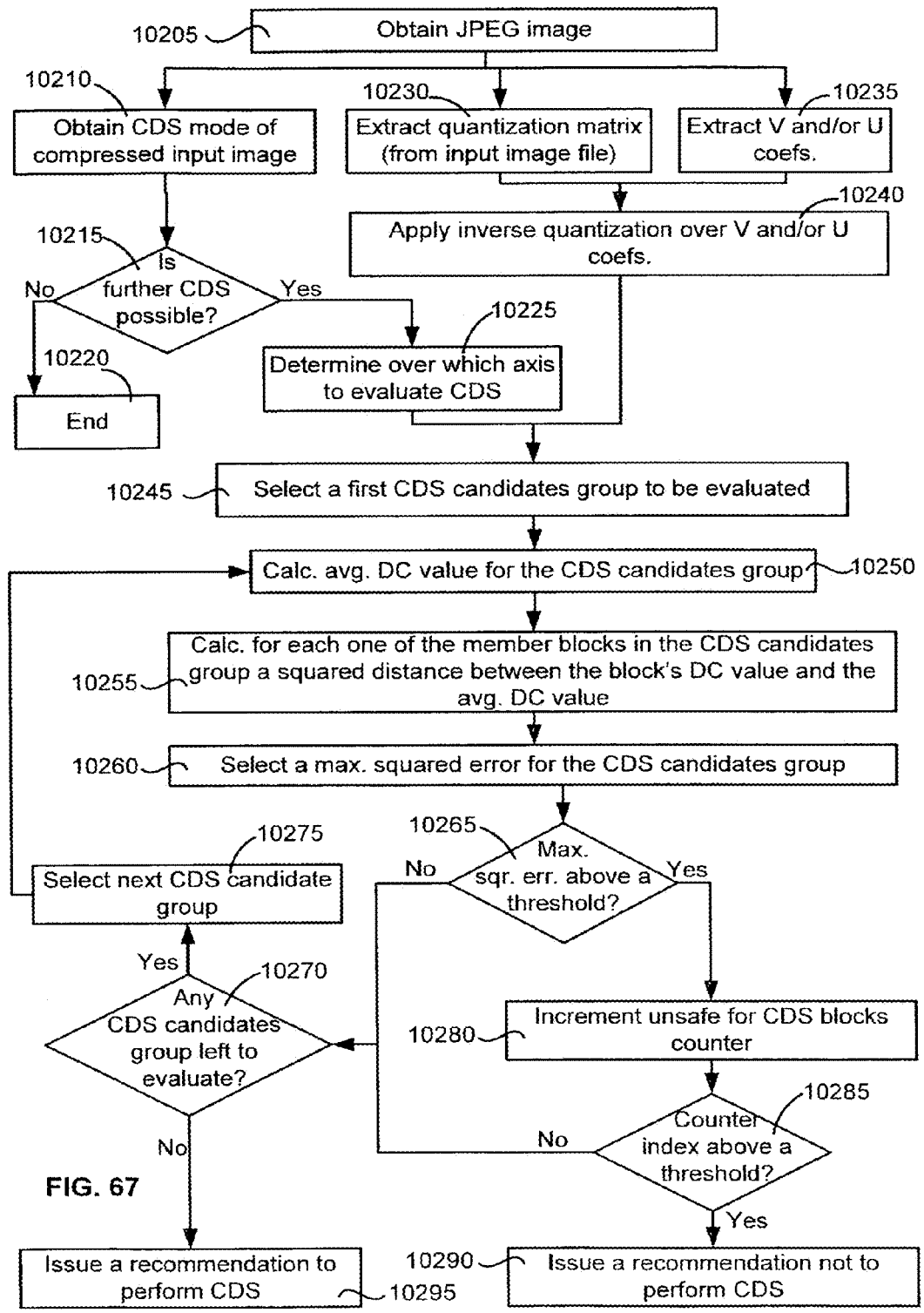
FIG. 67 is a flowchart illustration of a method of evaluating an effect of chroma downsampling in a compression process of a JPEG input image, according to an example of the claimed subject matter.
Figure 69:
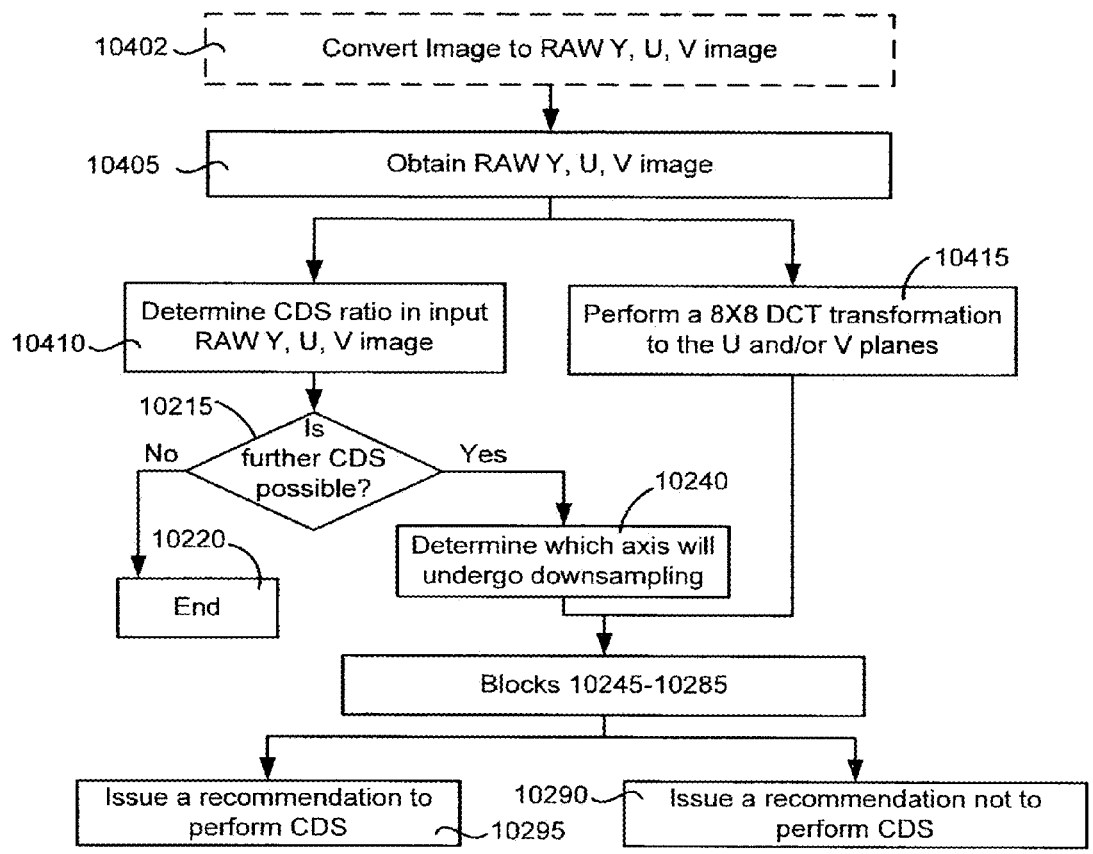
FIG. 69 is a flow chart illustration a method of evaluating an effect of chroma downsampling in a compression process of an input image, which includes conversion of image to RAW Y, U and V components and using the RAW Y, U and V components in the evaluation, according to an example of the claimed subject matter.

Reference is now additionally made to FIG. 67, which is a flowchart illustration of a method of evaluating an effect of chroma downsampling in a compression process of a JPEG input image, according to an example of the claimed subject matter. By way of example, a JPEG image may be obtained (block 10205) and provided as input to the system 10100. The input image 10102 can be analyzed to determine its (current) CDS mode (block 10210). In this regard, it would be appreciated that the input image 10102 may be an image which has already been subjected to some degree CDS. For example, the input image 10102 in FIG. 7 can be a JPEG image, and the input JPEG image could have undergone CDS in both axes, CDS in one of the horizontal or vertical axis, or the input image could be a JPEG image which had not undergone CDS at all. By way of example, for JPEG input images determining the CDS mode can be straightforward, since this information is usually available from the JPEG file itself. An example of a routine which can be used for determining a CDS mode of other types of images is described below.

By way of example, based on the current CDS mode of the input image. 10102 it can be determined whether further CDS is possible (block 10215). Still further by way of example, in case the input image 10102 is a JPEG image, if the JPEG image had already undergone CDS in both axis, no further CDS can be applied and the process would end (block 10220), however if this is not the case, the process proceeds to block 10225, where it is determined which over which axis CDS is to be evaluated. An example of a routine which may be used to determine over which axis CDS is to be evaluated is provided below. By way of example, blocks 10210, 10215, and 10225 can be carried out by the CDS mode identifier 10010

Possibly in parallel with the routine implemented for determining over which axis CDS is to be evaluated, and also in preparation for the actual evaluation process, blocks 10230, 10235 and 10240 can be implemented. At block 10230, the input JPEG's image quantization matrix can be obtained. For JPEG images, this information is also usually available from the JPEG file itself. At block 10235, the V and/or U DCT coefficients of the input image can be obtained. At block 10240, an inverse quantization may be applied to the V and/or U DCT coefficients of the input image giving rise to dequantized DCT coefficients in the V and/or U planes.

Once it is determined over which axis CDS is to be evaluated, and the dequantized DCT coefficients in the V and/or U planes are available, the process can proceed to the next block, where a first CDS candidate group is selected (for being evaluated) (block 10245). By way of example, the selection of the first CDS candidate group to be evaluated can be carried out by the configuration module 10030. Further by way of example, the configuration module 10030 can be adapted to select a set of blocks which will be merged into a single block after the CDS is performed. Further by way of example if the evaluation is performed for down-sampling along both the horizontal and vertical axes, the first CDS candidates group can include the upper-most left-most block, the block to its right and the two blocks underneath these. Then, in each following evaluation, a corresponding set of 2×2 blocks can be used for the evaluation, and each time the next CDS candidate groups can be selected in accordance with a predefined pattern. In a different example, for instance if the evaluation is performed for down-sampling along the horizontal axis only, the first CDS candidates group can include the upper-most left-most block, the block to its right, and each following CDS candidates group of blocks include a similar pair of blocks which are selected in accordance with a certain predefined pattern.

An example of the CDS evaluation routine will now be described. By way of example, the evaluation routine can be carried out by the CDS evaluation module 10040. By way of example, the evaluation routine can include computing an error for a target CDS block based on characteristics of DCT coefficients in the U and/or V planes of a respective CDS candidates group in the input image, and further based on a diversity of the DCT coefficients in the U and/or V planes of the respective CDS candidates group in the input image. An estimated perceptual effect of CDS over the input image can be computed based on a plurality of target CDS blocks error values.

Further by way of example of the claimed subject matter, the characteristics include an average of DCT coefficients in the U and/or V planes of the respective CDS candidates group. Still further by way of example of the claimed subject matter, diversity is characterized by a difference between values of DCT coefficients in the U and/or V planes of each one of the respective CDS candidates group and average of DCT coefficients in the U and/or V planes of the respective CDS candidates group.

Further details according to one example of the evaluation routine shall now be described with reference to FIG. 67. By way of example, as part of the evaluation routine, an average of DCT DC coefficients in the U and/or V planes of the respective CDS candidates group may be calculated (block 10250). Further by way of example, a difference between DCT DC values in the U and/or V planes of each one of the respective CDS candidates group and the average of DCT DC coefficients in the U and/or V planes of the respective CDS candidates group is calculated (block 10255), and a maximum squared difference between DCT DC values in the U and/or V planes of each one of the respective CDS candidates group and the average of DCT DC coefficients in the U and/or V planes of the respective CDS candidates group is selected (block 10260). For convenience this maximum squared difference is sometimes referred to herein as the error value for the CDS target block.

The error value for the CDS target block is compared against a threshold (block 10265), and if the error value for the CDS target block is below the threshold, it is determined whether there are any CDS candidates groups left to evaluate (blocks 10270). The threshold for the CDS target blocks can be determined by the configuration module 10030, and it can be programmed into the CDS evaluation module 10040. The CDS evaluation module 10040 can use the threshold as part of the evaluation routine of each CDS candidates group. An example of the manner by which the threshold for the CDS target blocks error values can be determined shall described below.

If at block 10265 it is determined that there are remaining CDS candidates groups to evaluate the next CDS candidates groups is selected (block 10275), for example by CDS evaluation module 10040, and the process returns to block 10250. By way of example the selection of the next CDS candidates groups is performed according to a predefined pattern. Further by way of example, the selected of the next CDS candidates group is performed by continuing a raster scan of the DCT planes being used and selecting the next pair or foursome of CDS candidate blocks.

If, for any of the CDS candidates groups, it is determined at block 100265 that the error value for the respective CDS target block is above the threshold, this CDS candidates group is regarded as being unsafe for CDS, and a counter which counts unsafe for CDS groups is incremented (block 10280). After the counter is incremented, a second threshold which relates to the counter index is checked against a counter index threshold (block 10285). By way of example, in a similar manner to the error value threshold, the counter index threshold can be determined by the configuration module 10030, and it can be programmed into the CDS evaluation module 10040. The CDS evaluation module 10040 can use the counter index threshold as part of the evaluation routine of the input image. An example of the manner by which the threshold for the counter index can be determined shall described below.

If the counter index crosses the counter index threshold, it is determined that based on the evaluation routine it is not recommended to perform a CDS and the respective input image, and a recommendation to this effect is issued (block 10290). If however, after the counter is incremented it is determined that the counter index does not (yet) cross the counter index threshold the process flow to block 10270, where it is determined whether there are any CDS candidates groups left to evaluate. If there are more yet to be evaluated groups of CDS candidate blocks, the process returns to block 10250 and the next group is evaluated. However if there are no more groups left to evaluate, it is determined that based on the evaluation routine it is estimated that CDS would not exceedingly reduce perceptual similarity between the input image and its chroma downsampled counterpart image, and a recommendation to this effect is issued (block 10295).

According to an example of the claimed subject matter, the evaluation routine is carried out using the V plane DCT DC value only. Accordingly, by way of example, in block 10235 only the DCT coefficients in the V plane are extracted, and possibly only the DCT DC coefficients in the V plane are extracted. At block 10240, the inverse quantization can be limited to only the DCT coefficients in the V plane, or to the DCT DC coefficients in the V plane. Block 10250-10265 may also be configured and applied with respect to DCT coefficients in the V plane or to DCT DC coefficients in the V plane.

It would be appreciated, that working on the V plane DCT DC value can reduce complexity of the evaluation algorithm, while still providing a reliable output. The V component contains a large portion of the 'red data', and the inventors discovered that the V component exhibited higher importance in determining the perceptual effect of chroma downsampling. According to further examples of the claimed subject matter, using additional DCT coefficients and/or the U plane component as well may allow for finer tuning of the recommendation, at the price of higher complexity.

Further by way of example, if there are four blocks from the input image in a CDS candidates group, labelled as follows:

$$B1=B_{(m,n)}, B2=B_{(m+1,n)}, B3=B_{(m,n+1)}, B4=B_{(m+1,n+1)}$$

Assuming chroma downsampling is performed both on the vertical and the horizontal axes, the four blocks will become a single block. The (rounded) average DCT DC value in the V plane of this set is calculated as:

$$AVG_{DC} = \text{round}\left[\frac{(B1_{DC}+B2_{DC}+B3_{DC}+B4_{DC})}{4}\right] \quad \text{Formula 1}$$

As will be explained below, by way of example, if the input image is already chroma downsampled in one direction, the average is calculated using only the two relevant blocks.

The error value for the CDS target block corresponding to blocks B1, B2, B3 and B4 (representing a CDS candidates group) can be calculated as follows:

$$E_{m/2,n/2} = \max_{i=1\ldots 4}(Bi_{DC}-AVG_{DC})^2 \quad \text{Formula 2}$$

If the input image is already downsampled in one direction then $\{i=1,2\}$, and either m or n are not halved.

If an Em,n error value for the CDS candidates group consisting of blocks B1, B2, B3 and B4 is above a first threshold, this CDS candidates group is regarded as being unsafe for CDS, and a counter which counts unsafe for CDS groups is incremented. The Em,n error value is calculated over the entire image. Optionally, a predefined pattern can be devised and used to provide a certain sub-set over the CDS candidates group, for example, such that only part of the image is processed as part of the classification process. As an example, the classification process may be carried-out on only the even values of m and n. If the counter counting the number of "unsafe for CDS" CDS candidates groups passes a second threshold, or in other words of if the counter passes the value N, representing N CDS candidates groups for which the E value exceed a threshold, it is determined that the input image should not undergo chroma subampling.

For non-limiting illustration purposes, evaluating an example of the method according to the claimed subject matter on a large image database, has shown that a value of a first threshold, that is the threshold that is used to determine whether a given CDS candidates group should be regarded as being unsafe for CDS, or not, can be, for example: TE=10,000. As mentioned above, this threshold value TE is used to evaluate the a maximum squared difference between DCT DC values in the V plane of each member block in the respective CDS candidates group and an average of the DCT DC coefficients in the V plane of the respective CDS candidates group.

Further by way of non-limiting example, and further according to the evaluation of an example of the method according to the claimed subject matter on a large image database, a second threshold which relates to the counter index can be, for example: N=10. In one example, evaluation of E, the error value for CDS candidates group in the input image, may stop after N CDS candidates group are discovered for which E is above the threshold. Using a threshold setting TE=10,000 for the error value threshold, and a threshold setting N=10 for the counter index threshold, provided good discrimination, as measured by a subjective visual evaluation of the test images.

Reference is now made to FIG. 3 which is a graphical illustration of a data structure in which the results of a subjective CDS classification are listed for a plurality of image files, and for each of the plurality of image files, there is recorded the results of an application of three different thresholds for evaluating CDS target block error, according to an example of the claimed subject matter. According to an example of the claimed subject matter, the threshold for evaluating a CDS target block error can be determined empirically, using such data, as will now be explained in further detail.

Further by way of example, the perceptual effect of chroma downsampling over a collection of test images (or image files) can be evaluated. For example, one or more human evaluators may be requested to evaluate the effect of chroma downsampling over a collection of test images. The collection of test images may be chroma dawnsampled, and the human evaluator may be requested to indicate whether based on his/her subjective impression there is any perceptual difference among the chroma downsampled image and its corresponding input image. If there is more than one evaluator, a common result can be obtain through any known statistical processing method, in a manner known per se. In FIG. 68 the results of such evaluation are summarized in the second from left column, where if there was no perceptual change as a result of chroma downsampling an input image, the entry for the respective image is "OK", but if there was a perceptual change, the entry for the respective image is "NOT OK". In FIG. 68 the perceptual similarity of the images was evaluated at 100% zoom and for CDS in both the chroma axes. It would be appreciated that other ratios can be used for evaluating perceptual similarity between the images. It would be also appreciated, that perceptual similarity can be evaluated for chroma downsampling in only one of the axes. Furthermore, it would be appreciated that perceptual similarity can be evaluated for each possible chroma downsampling mode (e.g., CDS in both the chroma axes, CDS in the horizontal axis only and CDS in the vertical axis only).

It would be appreciated that instead of or in addition to using human evaluator, a perceptual quality measure can be used and the process can be made automatic or semi-automatic. An automatic evaluation process that is based on a perceptual quality measure can, for example, involve up-sampling of the downsampled chroma planes to their original spatial resolution, which is required for alignment between the reference i.e. the original chroma plane and the down-sampled one, followed by a calculation of a known distortion measure such as, but not limited to, PSNR (Peak Signal-to-Noise Ratio), SSIM (Structural Similarity Index Measure) or VIF (Visual Information Fidelity). Further examples of perceptual quality measures which can be used include: a perceptual similarity measure which includes an added artifactual edges measure, and a perceptual similarity measure which is based on a combination of a texture measure and a local similarity measure. The latter perceptual quality measures are above.

In FIG. 68, three different thresholds for evaluating CDS target block error were used to calculate three different CDS target blocks error rates for each one of the images in the test set. Possible values for the thresholds used in FIG. 68 can be the following: THR1=5000, THR2=10000 and THR3=50000. According to an example of the claimed subject matter, for each CDS target block, an error value can calculated as the maximum squared difference between DCT DC values in the V plane of the respective CDS candidates group and the average of DCT DC coefficients in the V plane, of the CDS candidates group. Further in accordance with the example illustrated in FIG. 68, based on each of the three thresholds (THR1=500, THR2=0000 and THR3=50000), for each of the images in the test set, the number of target. CDS blocks for which the error value exceeds the respective threshold is recorded in a respective column of the data structure.

The results for each of the three thresholds can then be evaluated, and a threshold which provides a good distinction among images that have been evaluated as "OK" for CDS and images that have been evaluated as "NOT OK" for CDS is selected. The evaluation of the results for each of the three thresholds can be carried out manually, or through a dedicated algorithm designed for this purpose and implemented on a computer.

For example, looking at the results for the three threshold in FIG. 68, the results show that THR1 is too low and many blocks exceed it whether or not they are perceptually lossless under CDS. THR3 is too high so few blocks exceed it even when CDS causes perceptual loss, whereas THR2 allows reliable classification for this test set by classifying any image with at least 10 CDS target blocks for which the respective error value exceeds the threshold as not recommended for CDS. In this manner, the threshold for evaluating CDS target block error can be used to determine a counter index threshold. As mentioned above, the counter index threshold is used to indicate whether an input image is safe for CDS or not based on the number of CDS target blocks (or CDS candidates group) for which the error value is above or below a given CDS target block error threshold (and the CDS target block error threshold is associated with the counter index threshold).

Referring to the example shown in FIG. 68, THR2=10000 can be selected as the CDS target block error threshold and the respective counter index threshold is then 10. Any image for which the number of CDS target blocks, whose error value exceeds the target CDS block error threshold, is 10 or above is regarded as "NOT OK" for CDS, and for such an image a recommendation not to perform CDS shall be issued. Similarly, any image for which the number of CDS target blocks, whose error value exceeds the target CDS block error threshold, is below 10 is regarded as "OK" for CDS, and for such an image a recommendation to perform CDS shall be issued.

In FIG. 68, by way of example, all the evaluations underlying the values and entries in the data structure were performed with respect to CDS in both axes. It would be appreciated that for CDS in the vertical axis only and for CDS in the horizontal axis only similar evaluation may be performed, such that for each CDS mode a CDS target block error threshold and a respective index counter threshold are provided. According to an example of the claimed subject matter, the CDS target block error threshold and the respective index counter threshold that are used by the process of classifying chroma downsampling can be selected according to the chroma downsampling method that is being evaluated, and if more than one CDS mode is evaluated, the thresholds can be updated in transition from evaluating one CDS mode to the next.

In FIG. 68, a small test set was shown, as an example. It would be appreciated that many more images can be evaluated in order to obtain more accurate and more credible thresholds. Furthermore, by way of example, more or less than three candidate target CDS blocks error thresholds can be evaluated (for each of the CDS modes).

In FIG. 67 and in the description thereof, the input image was a JPEG image. In JPEG images, the DCT coefficient in each of the Y, U and V planes can be extracted from the input image in a straight forward manner. There is now described with reference to FIG. 69, which is a flow chart illustration a method of evaluating an effect of chroma downsampling in a compression process of an input image, which includes conversion of image to RAW Y, U and V components and using the RAW Y, U and V components in the evaluation, according to an example of the claimed subject matter.

In FIG. 67, an input image is processed to obtain respective RAW Y, U and V components of the input image (block 10405). In an example, an optional preliminary conversion of the image into RAW Y, U and V components can be implemented (block 10402). For example, in case the image is a RAW RGB image the RAW Y, U and V components can be calculated by applying the known RGB to YUV color transform, possibly as defined by CCIR 601 a.k.a. ITU-T BT.601. It would be appreciated that calculating RAW Y, U and V components for an input image is a process that is known in the art.

Once the RAW Y, U and V components are obtained, to process can proceed to blocks 10410 and 10415. At block 10410, the CDS ratio in the input image is determined based on the RAW Y, U and V components, for instance by comparing their spatial resolution. At block 10415, a 8×8 DCT transformation is performed in the U and V components to obtain the DCT coefficients in the V and/or U planes. As mentioned above, it may be sufficient to obtain the DCT coefficients in the V plane only. It would be appreciated that this can be sufficient and will result in lower complexity, since the DC is essentially a scaled average of the original values. However as this procedure will most commonly be used in the context of image compression, where DCT is required in any case (although possibly only for the reduced size plane, i.e., after chroma down-sampling), the DCT transformation may be carried out over the entire DCT matrix.

According to an example of the claimed subject matter, following block 10410, where the CDS ratio in the input image is determined based on the RAW Y. U and V components, it may be determined whether further CDS is possible, in substantially the same manner as was described above with reference to block 10215. If it is determined that no further CDS is possible the process is terminated, substantially in the same manner as was described above with reference to block 10220. If however further CDS is possible, the process can proceed substantially according to blocks 10240-10295 that were described above, and using the DCT coefficients in the V and/or U planes and based on the CDS ratio in the input image, it may be determined whether to issue a recommendation to perform CDS (block 10295) or to issue a recommendation not to perform CDS (block 10290).

It would be appreciated that while it is possible that only the V component would be calculated (e.g., when the input image is in RGB format), but in many cases the full conversion to the YUV space would be a byproduct of the main process (e.g., compression including CDS or conversion to the YUV space), and the classification process would be implemented as a control measure that is used to configure the main process. Under such circumstances, YUV calculation would need to be performed in any case.

Figure 70:
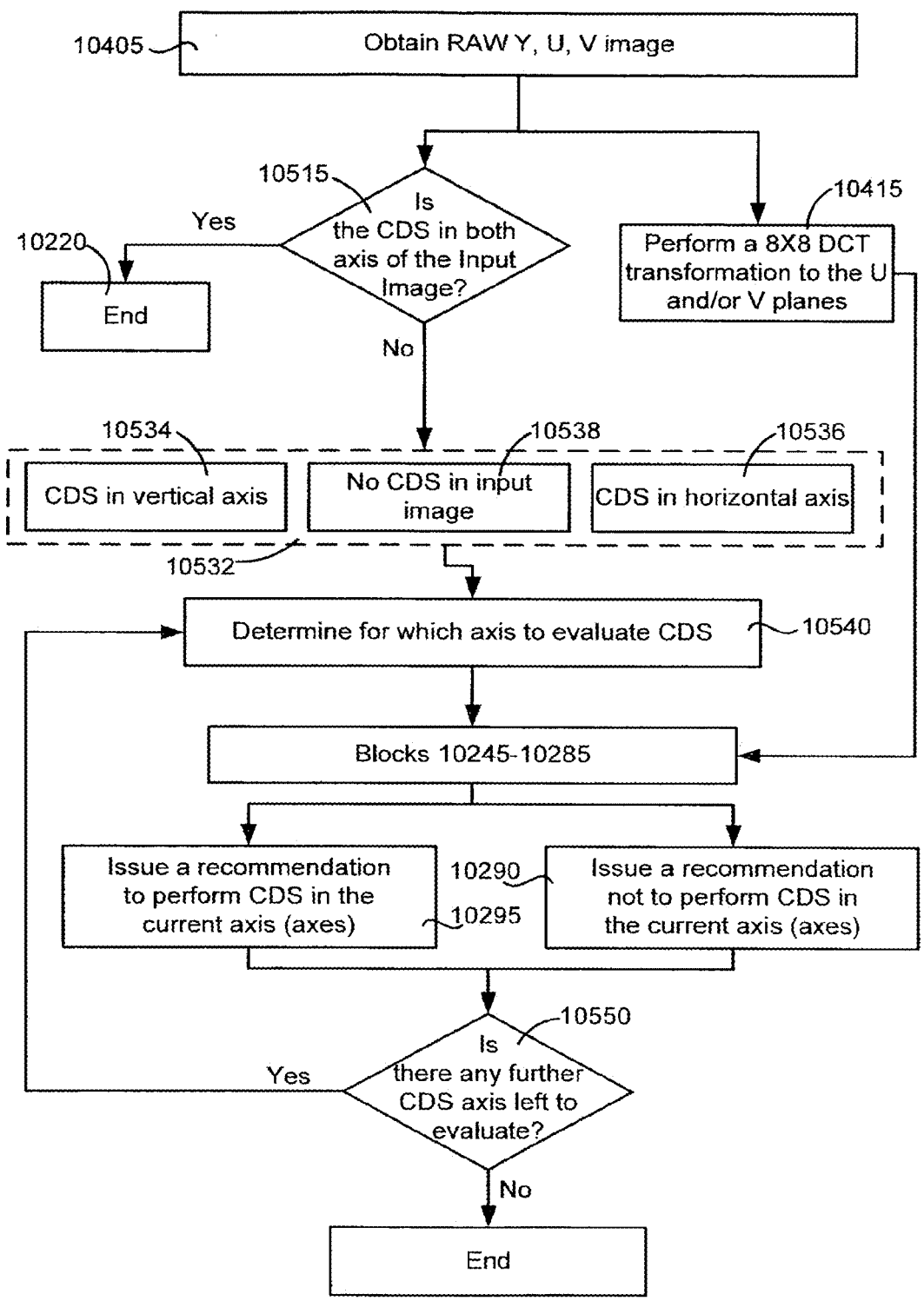
FIG. 70 is a flow chart illustration of a method of evaluating an effect of different modes of chroma downsampling in a compression process of an input image, in accordance with an example of the claimed subject matter.

Reference is now made to FIG. 70, which is a flow chart illustration of a method of evaluating an effect of different modes of chroma downsampling in a compression process of an input image, in accordance with an example of the claimed subject matter. According to an example of the claimed subject matter, say that a process of evaluating an effect of chroma downsampling in a compression process of an input image begins with an input of the RAW Y, U and V components corresponding to the input image, in substantially the same manner as was described above with reference to block 10405. A 8×8 DCT transformation is performed in the U and V components to obtain the DCT coefficients in the V and/or U planes, in substantially the same manner as was described above with reference to block 415. It would be appreciated that the process illustrated in FIG. 70 can be used for classifying JPEG images as well, and in this case, for example, block 10205 can replace block 10405 and blocks 10230-10240 can replace block 10415.

According to an example of the claimed subject matter, in addition and possibly in parallel with block 10415, it may be determined whether CDS was applied in both axis of the input image (block 10515). A similar routine as that which was described with reference to block 10410 (to determine the CDS ratio in the input image) can be used to determine whether CDS was applied in both axis of the input image. If it is determined that CDS was applied in both axis of the input image, the process is terminated substantially in the same manner as was described above with reference to block 10220. If however, it is determined that CDS was not applied in both axes, the process moves to block 10532, where it is determined which of the CDS modes was applied to the input image, and subsequently it is determined over which axis to evaluate an effect of applying CDS (or further CDS) to the input image (block 10540).

Returning to block 10532, by way of example, the possible input image CDS modes are: CDS in the vertical axis (block 10534), CDS in the horizontal axis (block 10536), or no CDS (block 10538). For example, if CDS was already applied to the input image in one of the axis (e.g. vertical or horizontal), at block 10540 CDS in the other axis can be evaluated. Further by way of example, if no CDS was applied to the input image (block 10538), the CDS evaluation module can initially evaluate the effect of CDS in both axis over the input image. Further by way of example, if no CDS was applied to the input image (block 10538), and it is determined that applying CDS in both axes over the input image is not recommended, the evaluation routine can be reconfigured so that the routine is repeated but this time it is used to evaluate the effect of applying CDS in one of the axes (say vertical). Still further by way of example, if no CDS was applied to the input image (block 10538), and it is determined that applying CDS in both axes over the input image is not recommended, and it is further determined that applying CDS in one of the two axes (say horizontal) is also not recommended, the evaluation routine can be reconfigured so that the routine is repeated but this time it is used to evaluate the effect of applying CDS in the other one of the two axes (say vertical).

Once it is determined at block 10540 whether to evaluate an effect of applying CDS (or further CDS) over both axes or over one of the axis (and in this case, over which one), the process can proceed substantially according to blocks 10240-10295, that were described above, and the process can return an evaluation whether it is recommended (block 10295) or not (block 10290) to perform CDS in both axes or in the respective axis.

At block 10550 it is determined whether there is any more axis to evaluate and if yes, the next axis to be evaluated is determined at block 10540, and blocks 10240-10295 are repeated. Such possible further evaluation was mentioned above by way of example. At the end of the process the recommendations may be consolidated if necessary.

Figure 71A:
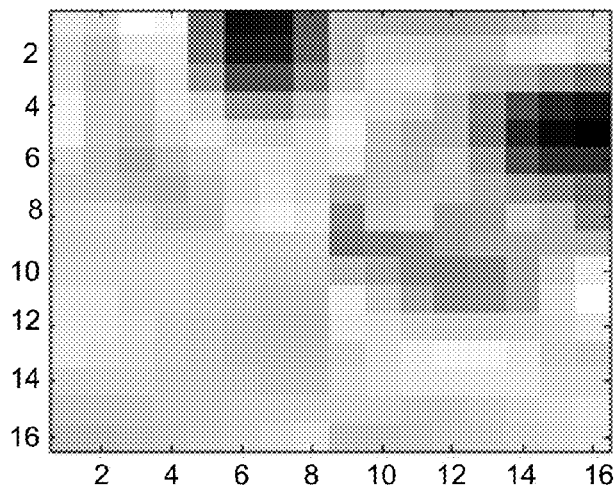
FIGS. 71a-71d collectively show a non-limiting illustration of certain aspects of a method evaluating an effect of chroma downsampling in a compression process, according to an example of the claimed subject matter.
Figure 71B:
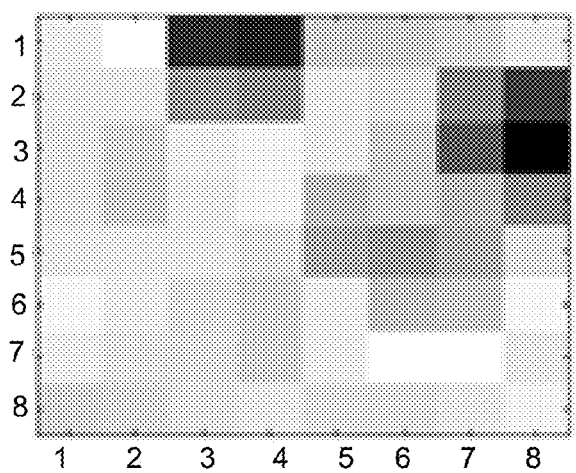
Figure 71C:
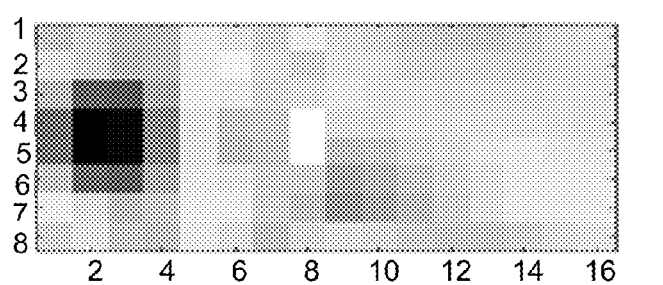
Figure 71D:
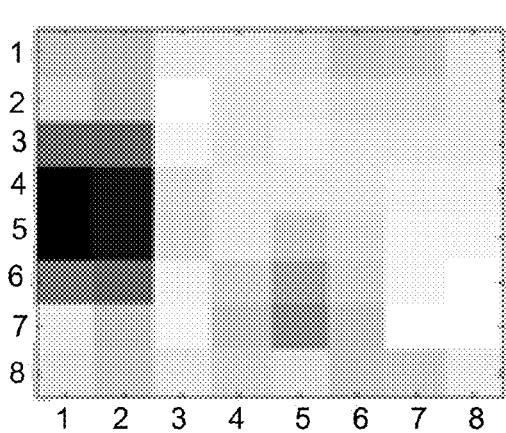

Reference is now made to FIGS. 71A-71D which provide a non-limiting illustration of certain aspects of a method evaluating an effect of chroma downsampling in a compression process, according to an example of the claimed subject matter. Initially, the Original V plane DCT values—after inverse quantization are obtained. In FIGS. 71A and 71B a 4:2:0 CDS mode is evaluated (CDS in both axes), and so the V plane DCT values 10605 of four adjacent blocks are shown, as an example. The four adjacent blocks form a CDS candidates group.

The (rounded) average DCT DC value in the V plane are calculated, for example using Formula 1, and the result in this case is 123. Using, for example, Formula 2, the four squared errors are calculated for each member block of the CDS candidate group: $(105-123)^2=324$; $(42-123)^2=6561$; $(182-123)^2=3481$; $(161-123)^2=1444$, and the maximum value: 6561 is identified. This is a relatively large error for the target CDS. Matrix 10610 illustrates the corresponding pixel values before chroma downsampling is applied and image 10615 represents the respective portion of the corresponding image. In FIG. 71B, the pixels after downsampling 10620 are shown, together with the corresponding DCT values (prior to quantization) 10625 and the respective portion of the corresponding image 10630. For example, it is assumed that the error value (6561) for the CDS target block when performing CDS subsampling in both axes is high, and it represents the entire image, so a recommendation is issued not to apply CDS in both axes of the input image.

For the sake of illustration, let's assume the number of target CDS blocks whose error value is above the threshold is larger than the counter index threshold, and in this case, it is recommended not to perform CDS in both axes, and the process moves to determine whether it is recommended to apply CDS in the horizontal axis. In FIGS. 6C-6D a 4:2:2 CDS mode is evaluated (CDS in the horizontal plane), and so the V plane DCT values 635 of two horizontally adjacent blocks are shown, as an example. The two adjacent blocks form a CDS candidates group.

The (rounded) average DCT DC value in the V plane are calculated, for example using Formula 1, and the result in this case is 119. Using, for example, Formula 2, the two squared errors are calculated for each member block of the CDS candidate group: $(70-119)^2=2401$; $(167-119)^2=230$, and the maximum value: 2401 is identified. This is a relatively small error for the target CDS. Matrix 10640 illustrates the corresponding pixel values before chroma downsampling is applied and image 10645 represents the respective portion of the corresponding image. In FIG. 71B, the pixels after downsampling 10650 are shown, together with the corresponding DCT values (prior to quantization) 10655 and the respective portion of the corresponding image 10660. For example, it is assumed that the error value (2401) for the CDS target block when performing CDS subsampling in the horizontal axis is low, and it represents the entire image, so a recommendation can be issued to apply CDS in the horizontal plane to the input image.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Figure 72A:
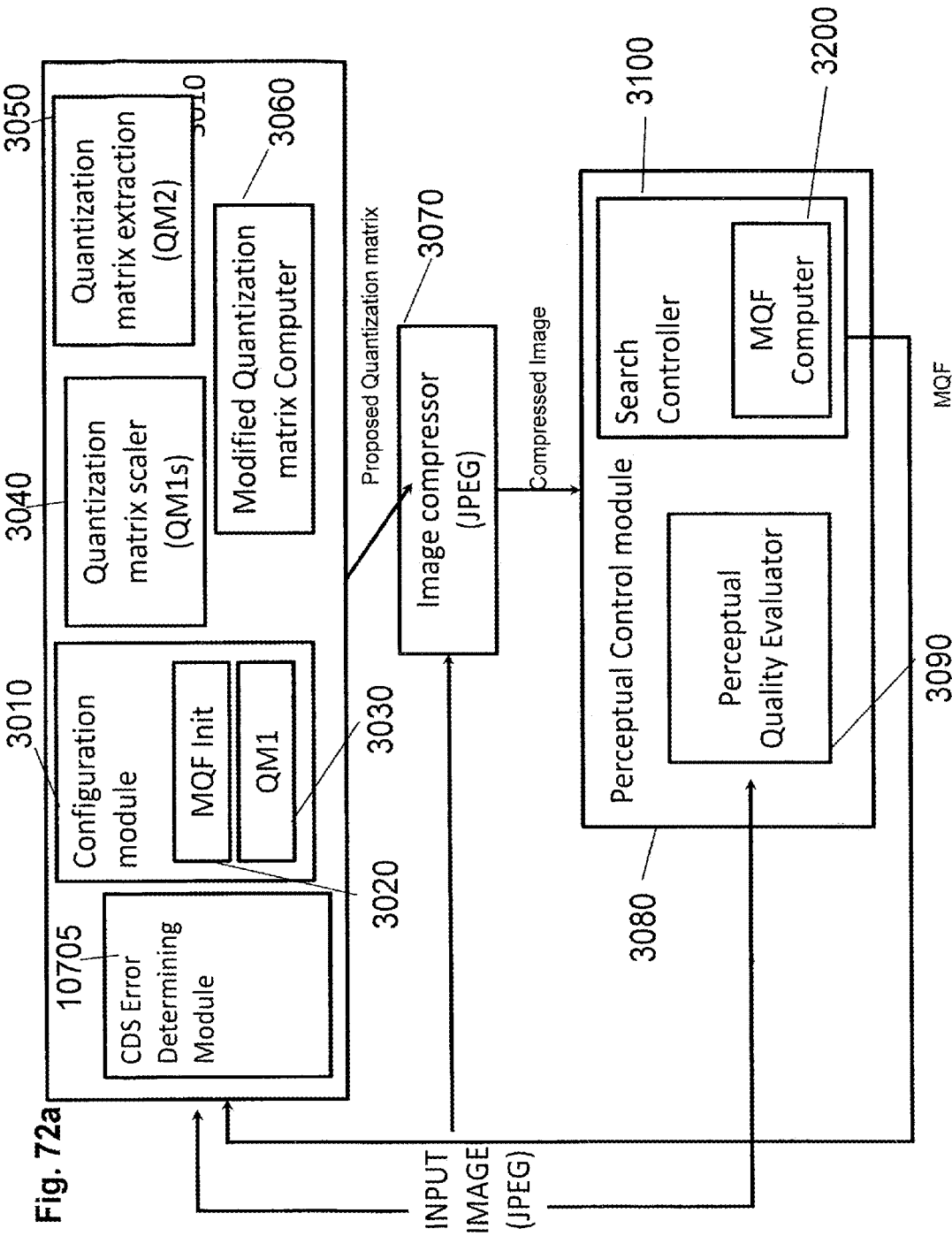
FIG. 72a is a simplified functional block diagram of a recompression system constructed and operative in accordance with certain embodiments of the present invention which is similar to FIG. 32a except that a CDS determining module is provided which is operative to evaluate an effect of chrome downsampling in the recompression process of the input image using any of the methods and apparatus of FIGS. 66-71d.

The systems and methods f of evaluating an effect of chroma downsampling in a compression process of an input image described above with reference to FIGS. 66-71d are useful in conjunction with other teachings of the present invention. For example, FIG. 72a is a simplified functional block diagram of a recompression system constructed and operative in accordance with certain embodiments of the present invention which is similar to FIG. 32a except that a CDS determining module 10705 is provided which is operative to evaluate an effect of chroma downsampling in the recompression process of an input image (in this case a compressed JPEG image) e.g. using any of the methods and apparatus described above with reference to FIGS. 66-71d. According to certain embodiments of the present invention, the CDS determining module 10705 can provide a recommendation with regard to the application of CDS downsampling as part of the recompression process. Still further by way of example, the CDS determining module 10705 can provide a recommendation which relates to one or more specific CDS modes, and the configuration module 3010 may be adapted to control the recompression process so that the mode of CDS downsampling that is used or not used during the recompression of the input image is in agreement with the recommendation provided by the CDS determining module 10705.

Figure 72B:
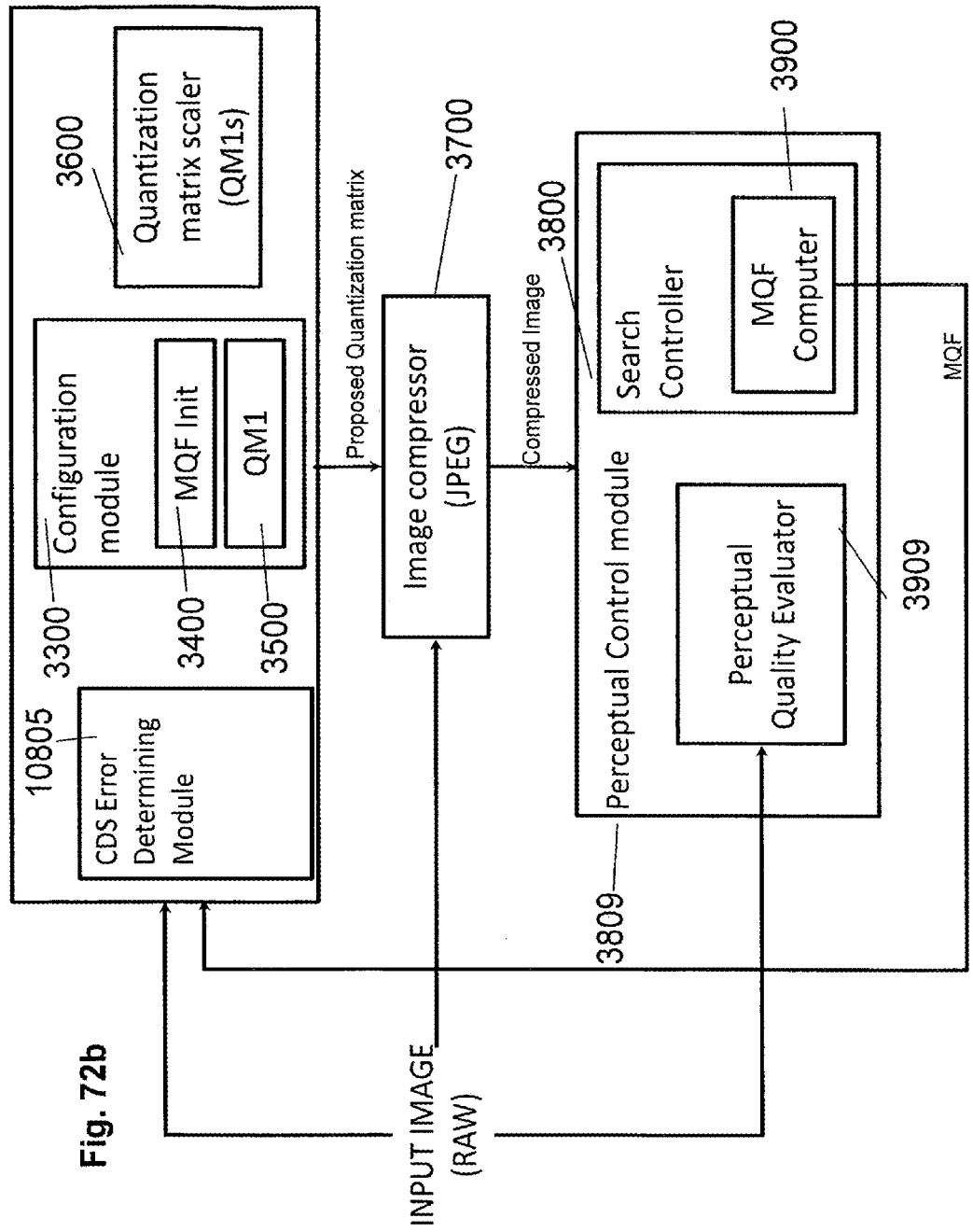
FIG. 72b is a simplified functional block diagram of a compression system constructed and operative in accordance with certain embodiments of the present invention which is similar to FIG. 32b except that a CDS determining module is provided which is operative to evaluate an effect of chroma downsampling in the compression process of an input image using any of the methods and apparatus described above with reference to FIGS. 66-71d.

In a further example, FIG. 72b is a simplified functional block diagram of a compression system constructed and operative in accordance with certain embodiments of the present invention which is similar to FIG. 32b except that a CDS determining module 10805 is provided which is operative to evaluate an effect of chroma downsampling in the compression process of an input image (in this case a RAW format image) e.g. using any of the methods and apparatus described above with reference to FIGS. 66-71d. According to certain embodiments of the present invention, the CDS determining module 10805 can provide a recommendation with regard to the application of CDS downsampling as part of the compression process. Still further by way of example, the CDS determining module 10705 can provide a recommendation which relates to one or more specific CDS modes, and the configuration module 3010 may be adapted to control the compression process so that the mode of CDS downsampling that is used or not used during the compression of the input image is in agreement with the recommendation provided by the CDS determining module 10805.

FIG. 72c is a simplified flowchart illustration of a method for recompression of images operative in accordance with certain embodiments of the present invention and using a quantization matrix generated from a quantization matrix of a precursor image by scaling. The method of FIG. 72c includes some or all of the illustrated steps, suitably ordered e.g. as shown in FIG. 12, and may be similar to the method as shown in FIG. 12 except that steps 10911 and 10912 are added. Thus, once the first image is obtained 10910, the chroma downsampling error can be determined for the first image 10911, and chroma downsampling of the first image can be controlled based on a relation between the potential chroma down sampling error and a chroma downsampling error threshold 10912.

FIG. 72d is a simplified flowchart illustration of a method for recompression of images operative in accordance with certain embodiments of the present invention and using a quantization matrix generated by combining a quantization matrix of a precursor image and a second quantization matrix such as the one given in the JPEG standard. The method of FIG. 72d include some or all of the illustrated steps, suitably ordered e.g. as shown and may be similar to the method of FIG. 18, and may be similar to the method as shown in FIG. 18 except that steps 10812 and 10815 are added. Thus, once the first image is obtained 10810, the chroma downsampling error can be determined for the first image 10812, and chroma downsampling of the first image can be controlled based on a relation between the potential chroma down sampling error and a chroma downsampling error threshold 10815.

It is appreciated that software components of the present invention including programs and data may, if desired, be implemented in ROM (read only memory) form including CD-ROMs, EPROMs and EEPROMs, or may be stored in any other suitable, non transitive, computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are computer-readable instructions for performing any or all of the steps of any of the methods shown and described herein, in any suitable order; machine-readable instructions for performing any or all of the steps of any of the methods shown and described herein, in any suitable order; non-transitive program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order, any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order, "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, UMTS, Satellite including (GPS, or other mobile delivery. It is appreciated that in the description and drawings shown and described herein, functionalities described or illustrated as systems and sub-units thereof may also be provided as methods and steps therewithin, and functionalities described or illustrated as methods and steps therewithin may also be provided as systems and sub-units thereof. The scale used to illustrate various elements in the drawings is merely exemplary and/or appropriate for clarity of presentation and is not intended to be limiting.

The invention claimed is:

1. A computerized method of image recompression, comprising:
compressing each individual block in at least one image plane of an image to be re-compressed, including:
JPEG-coding said individual block, using a global quantization matrix, thereby obtaining a proposed output block of integers; and
for at least one individual region in the at least one image plane:
generating a regional compression parameter defining a region-specific level of compression which guarantees no more than a controlled amount of perceptual degradation of said individual region;
generating a regional quantization matrix from said regional compression parameter; and
for at least one particular block in said individual region, determining whether at least one entry in the proposed output block of integers JPEG-coded from said particular block would have been zero if said JPEG-coding step applied to said particular block had used said regional quantization matrix rather than said global quantization matrix, and if so, zeroing said at least one entry.

2. The computerized method according to claim 1, wherein said JPEG-coding comprises DCT-transforming said individual block, quantizing each DCT-transformed individual block by dividing each entry therein by a corresponding entry in the global quantization matrix, thereby obtaining a block of numbers, and rounding said block of numbers to obtain the proposed output block of integers.

3. The computerized method according to claim 1, wherein said regional compression parameter is generated by performing a search, within a set of suitable values for said regional compression parameter, for a suitable parameter value to be used for recompression of said individual region.

4. The computerized method according to claim 3, wherein said search is performed for at least one first region and subsequently for at least one additional region adjacent to said at least one first region and wherein, when the search is performed for said additional region, a suitable value of said set of suitable values initiating the search is based at least partly on a final regional compression parameter value generated by said search for said at least one first region.

5. The computerized method according to claim 4, wherein said at least one first region comprises a region adjacent to said additional region along a row and a region adjacent to said additional region along a column and wherein said suitable value initiating the search is based at least partly on combining final regional compression parameter values generated by said search for said regions adjacent along said row and said column.

6. The computerized method according to claim 3, wherein said performing includes selecting one parameter value in said set over at least one other parameter value which is found to be less suited for recompression of said region.

7. The computerized method according to claim 1, wherein said regional compression parameter comprises an MQF value.

8. The computerized method according to claim 1 further comprising computing said region-specific level of compression, for a first region comprising a plurality of blocks, including:
compressing the first region giving rise to a second region, using a current level of compression;

using a measure of added artifactual edges along coding block boundaries to compute a region quality score for said first region;

comparing said region quality score to a desired quality threshold, including increasing or decreasing said current level of compression if said region quality score is respectively higher or lower than said quality threshold and returning to said compressing of the first region including using said increased or decreased level of compression as a current level; and using said current level of compression as said region-specific level of compression if said region quality score is predetermined to be close to said quality threshold.

9. The computerized method according to claim 8, wherein said using a measure comprises:

computing a difference image between the first and second images;

within said first region, computing for each boundary between two coding blocks a respective added-blockiness score indicating an extent of added artifactual edges along the respective boundary; and computing a region quality score based on the added-blockiness scores computed for each boundary within the first region.

10. The computerized method according to claim 9 wherein said measure is also based on a computation of local similarity and texture.

11. The computerized method according to claim 8 wherein said measure is based on a computation of local similarity and texture.

12. A computerized system of image recompression, comprising a processor operatively connected to a memory, the processor configured to:

compress each individual block in at least one image plane of an image to be re-compressed, including:

JPEG-code said individual block, using a global quantization matrix, thereby obtaining a proposed output block of integers; and for at least one individual region in the at least one image plane:

generate a regional compression parameter defining a region-specific level of compression which guarantees no more than a controlled amount of perceptual degradation of said individual region;

generate a regional quantization matrix from said regional compression parameter; and for at least one particular block in said individual region, determine whether at least one entry in the proposed output block of integers JPEG-coded from said particular block would have been zero if said JPEG-coding step applied to said particular block had used said regional quantization matrix rather than said global quantization matrix, and if so, zero said at least one entry.

13. The computerized system according to claim 12, wherein said JPEG-coding comprises DCT-transforming said individual block, quantizing each DCT-transformed individual block by dividing each entry therein by a corresponding entry in the global quantization matrix, thereby obtaining a block of numbers, and rounding said block of numbers to obtain the proposed output block of integers.

14. The computerized system according to claim 12, wherein the processor is configured to generate said regional compression parameter by performing a search, within a set of suitable values for said regional compression parameter, for a suitable parameter value to be used for recompression of said individual region.

15. The computerized system according to claim 14, wherein said search is performed for at least one first region and subsequently for at least one additional region adjacent to said at least one first region and wherein, when the search is performed for said additional region, a suitable value of said set of suitable values initiating the search is based at least partly on a final regional compression parameter value generated by said search for said at least one first region.

16. The computerized system according to claim 15, wherein said at least one first region comprises a region adjacent to said additional region along a row and a region adjacent to said additional region along a column and wherein said suitable value initiating the search is based at least partly on combining final regional compression parameter values generated by said search for said regions adjacent along said row and said column.

17. The computerized system according to claim 14, wherein said search is performed by selecting one parameter value in said set over at least one other parameter value which is found to be less suited for recompression of said region.

18. The computerized system according to claim 12, wherein said regional compression parameter comprises an MQF value.

19. The computerized system according to claim 12, wherein the processor is further configured to compute said region-specific level of compression, for a first region comprising a plurality of blocks, including:

compress the first region giving rise to a second region, using a current level of compression;

use a measure of added artifactual edges along coding block boundaries to compute a region quality score for said first region;

compare said region quality score to a desired quality threshold, including increase or decrease said current level of compression if said region quality score is respectively higher or lower than said quality threshold and return to said compressing of the first region including using said increased or decreased level of compression as a current level; and use said current level of compression as said region-specific level of compression if said region quality score is predetermined to be close to said quality threshold.

20. The computerized system according to claim 19, wherein said using a measure comprises:

computing a difference image between the first and second images;

within said first region, computing for each boundary between two coding blocks a respective added-blockiness score indicating an extent of added artifactual edges along the respective boundary; and computing a region quality score based on the added-blockiness scores computed for each boundary within the first region.

21. The computerized system according to claim 20 wherein said measure is also based on a computation of local similarity and texture.

22. The computerized system according to claim 19 wherein said measure is based on a computation of local similarity and texture.

23. A non-transitory computer readable storage medium tangibly embodying a program of instructions executable by a computer to perform a method of image recompression, comprising the steps:
- compressing each individual block in at least one image plane of an image to be re-compressed, including:
- JPEG-coding said individual block, using a global quantization matrix, thereby obtaining a proposed output block of integers; and
- for at least one individual region in the at least one image plane:
  - generating a regional compression parameter defining a region-specific level of compression which guarantees no more than a controlled amount of perceptual degradation of said individual region;
  - generating a regional quantization matrix from said regional compression parameter; and
- for at least one particular block in said individual region, determining whether at least one entry in the proposed output block of integers JPEG-coded from said particular block would have been zero if said JPEG-coding step applied to said particular block had used said regional quantization matrix rather than said global quantization matrix, and if so, zeroing said at least one entry.

* * * * *